United States Patent [19]
Nielsen et al.

[11] Patent Number: 5,251,153
[45] Date of Patent: Oct. 5, 1993

[54] FLEXIBLY PROGRAMMABLE IRRIGATION SYSTEM CONTROLLER

[75] Inventors: Wyn Y. Nielsen, La Jolla; Steven C. Carlin, Spring Valley; Dennis A. Kaiser, Escondido, all of Calif.

[73] Assignee: Solatrol, Inc., San Diego, Calif.

[21] Appl. No.: 687,762

[22] Filed: Apr. 18, 1991

Related U.S. Application Data

[63] Continuation of Ser. No. 250,841, Sep. 28, 1988, abandoned.

[51] Int. Cl.$^5$ .................. H04Q 3/00; G05B 23/02
[52] U.S. Cl. .................. 364/550; 137/551; 239/436; 340/825.06; 364/140
[58] Field of Search .......... 364/140, 509, 510, 550, 364/143, 430, 570; 239/436; 340/825, 825.06; 137/551, 554

[56] References Cited

U.S. PATENT DOCUMENTS

| | | | |
|---|---|---|---|
| 4,165,532 | 8/1979 | Kendall et al. | 364/420 |
| 4,176,395 | 11/1979 | Evelyn-Verre et al. | 364/420 |
| 4,244,022 | 1/1981 | Kendall | 364/420 |
| 4,646,224 | 2/1987 | Ransburg et al. | 364/143 |
| 4,722,478 | 2/1988 | Fletcher et al. | 239/69 |
| 4,740,882 | 4/1988 | Miller | 364/132 |
| 4,755,942 | 7/1988 | Gardner et al. | 364/420 |
| 4,807,664 | 2/1989 | Wilson et al. | 137/624.11 |
| 4,852,051 | 7/1989 | Mylne | 364/420 |
| 4,922,433 | 5/1990 | Mark | 364/420 X |
| 4,937,732 | 6/1990 | Brundisini | 364/420 X |

FOREIGN PATENT DOCUMENTS 8903726 5/1989 PCT Int'l Appl. .................. 364/420

Primary Examiner—P. S. Lall
Assistant Examiner—Ed Pipala
Attorney, Agent, or Firm—William C. Fuess

[57] ABSTRACT

A programmed irrigation controller automatically computes durations for, schedules, and controls split irrigation cycles at up to eight watering stations. The controller is manually entered with high-level information regarding soil type, terrain, and irrigation system watering head type, and also with a total irrigation time, for each station. The maximum "on" time duration for each individual split irrigation cycle, and a minimum "off" time duration, are determined from the high-level information input by table lookup. The controller computes the number of irrigation cycles at each station as its total irrigation time divided by its maximum "on" time duration. The controller schedules composite irrigation cycles for all stations so that no station overwaters within a single irrigation cycle or upon successive irrigation cycles that are too closely time proximate. Exclusionary time-of-day intervals that specify when no watering will occur can be inserted within the schedules. A water budgeting factor proportionately controls the numbers of split irrigation cycles. Special overlaid schedules provide useful special irrigation sequences/durations such as one-time deep soak, periodic deep soak, or syringe cycles. The programmed irrigation control for a single station may be copied for the control of additional stations.

3 Claims, 16 Drawing Sheets

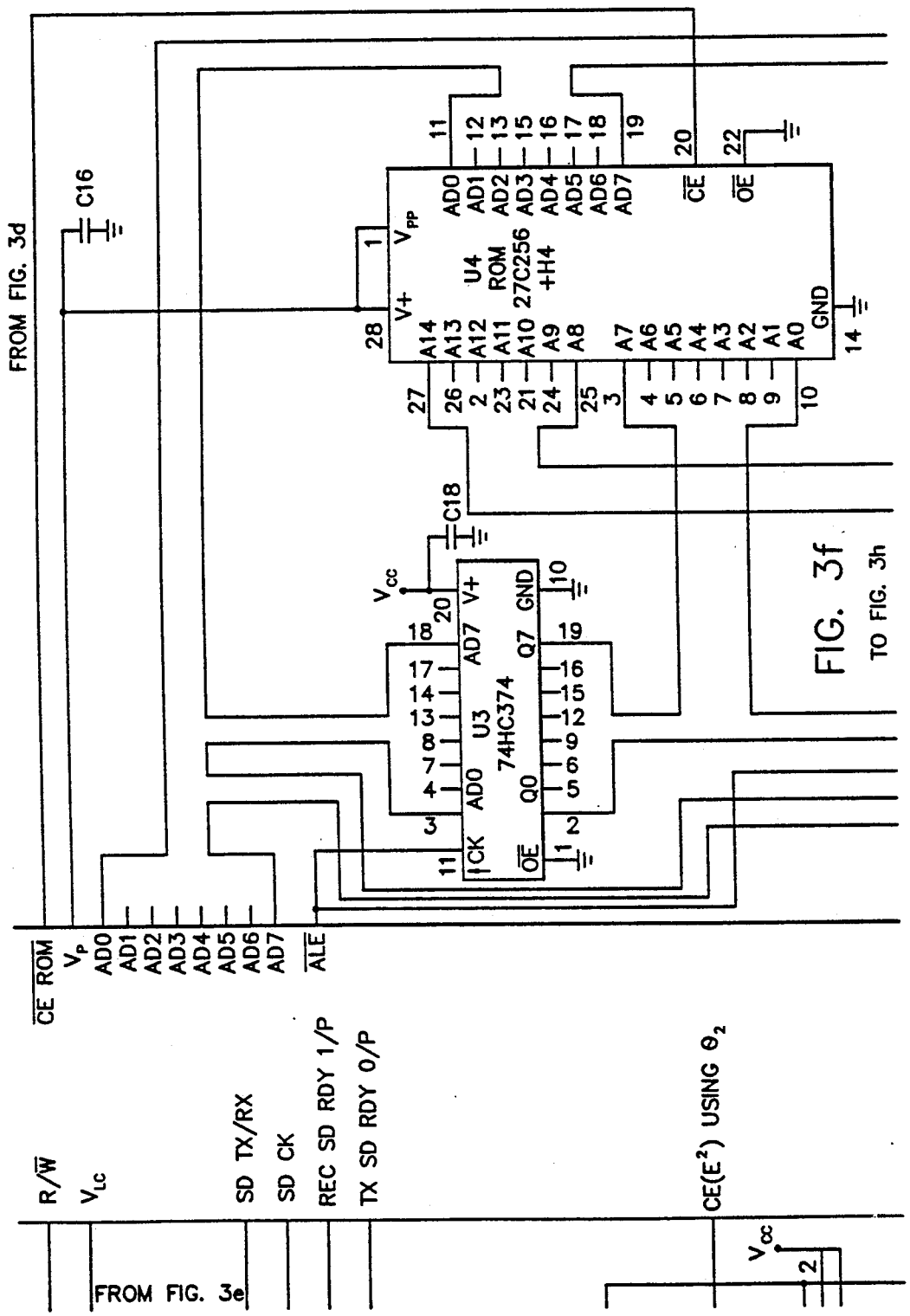

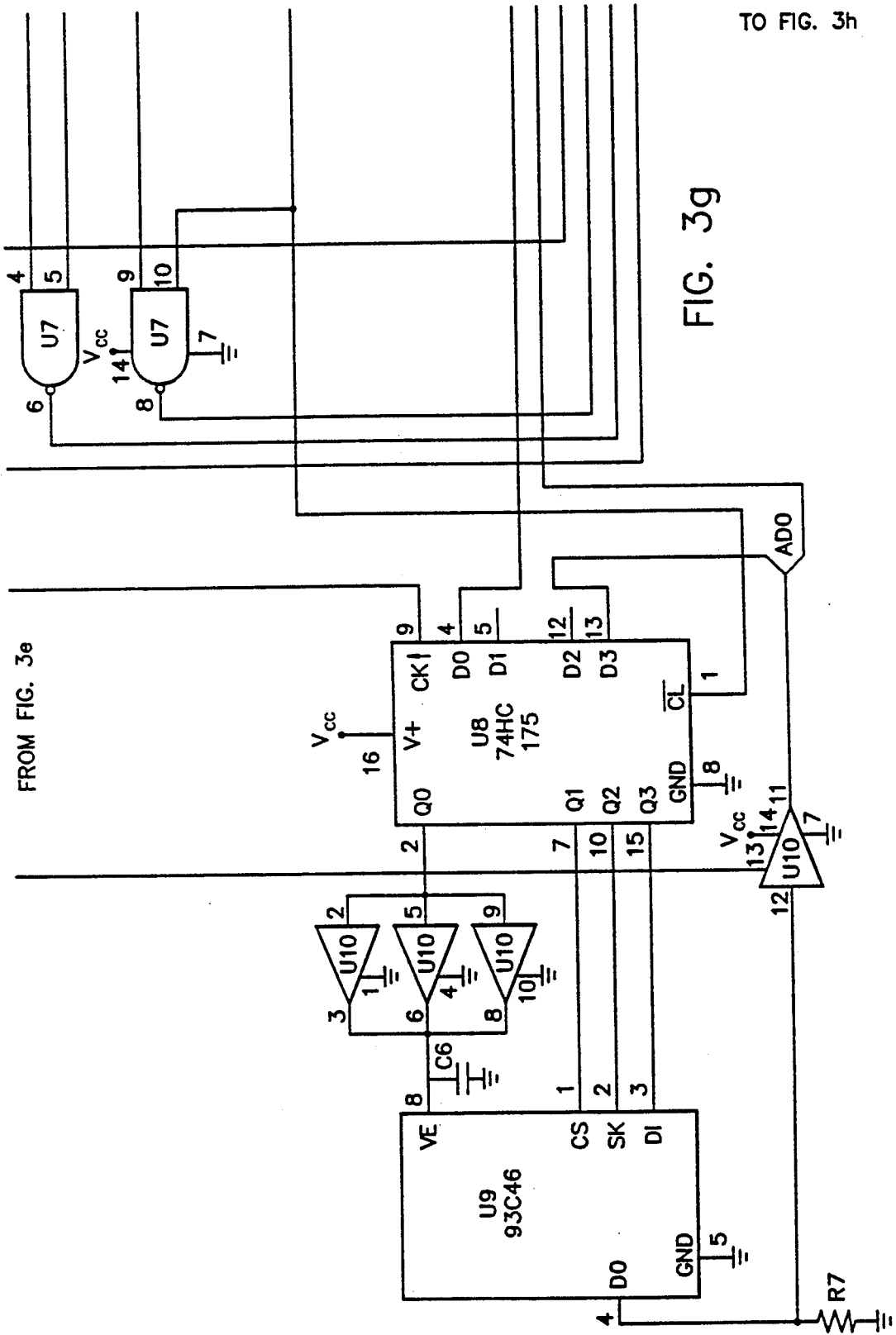

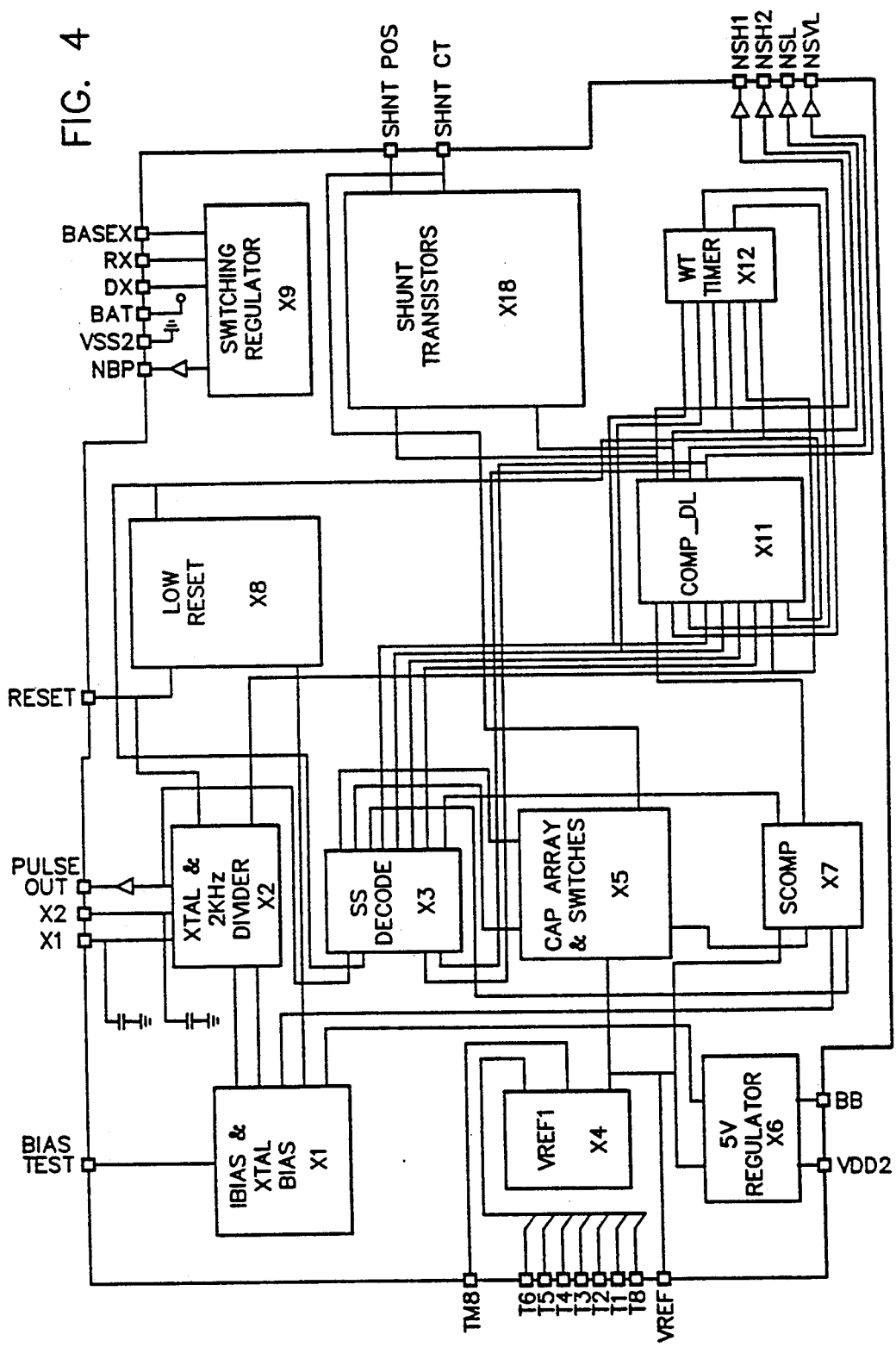

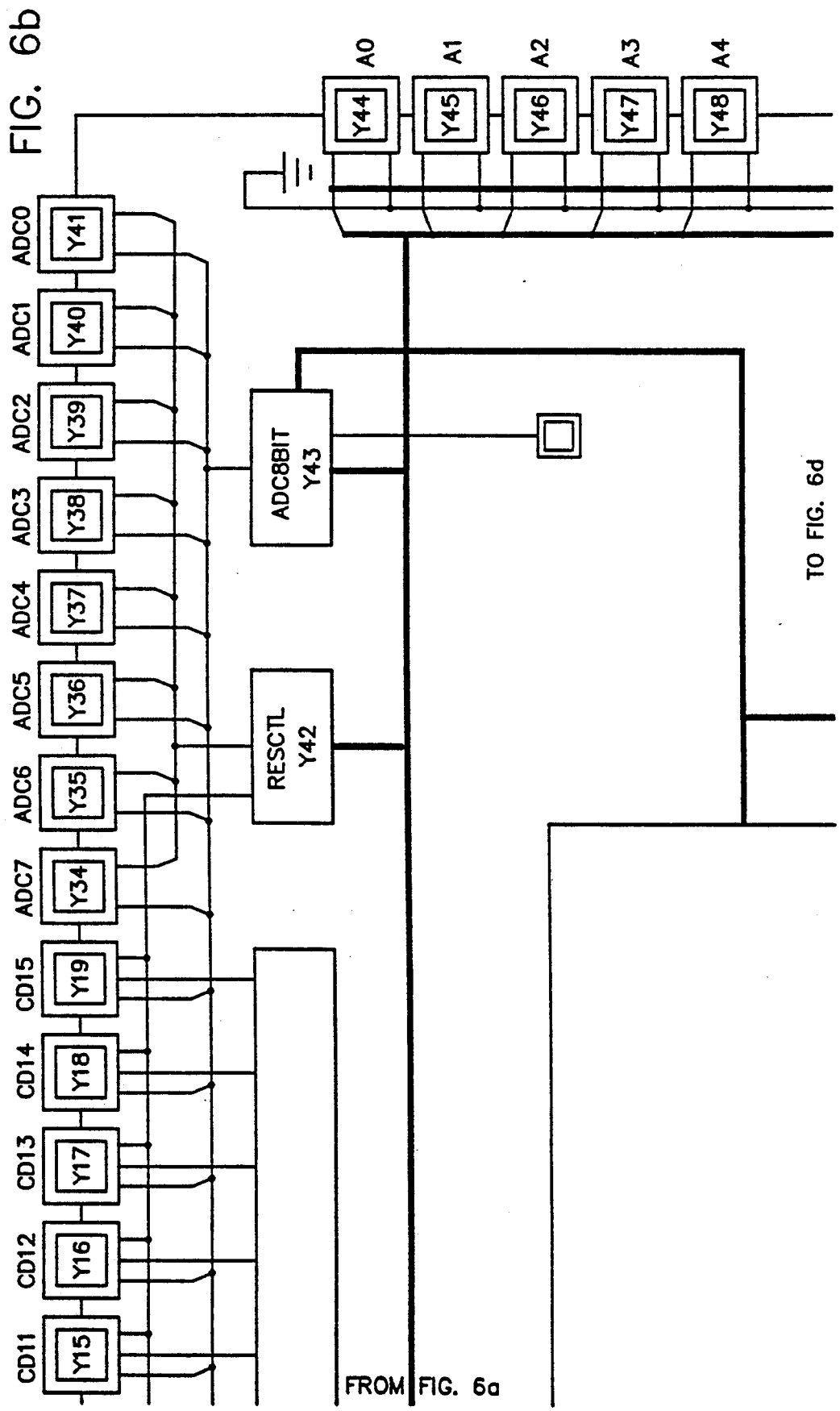

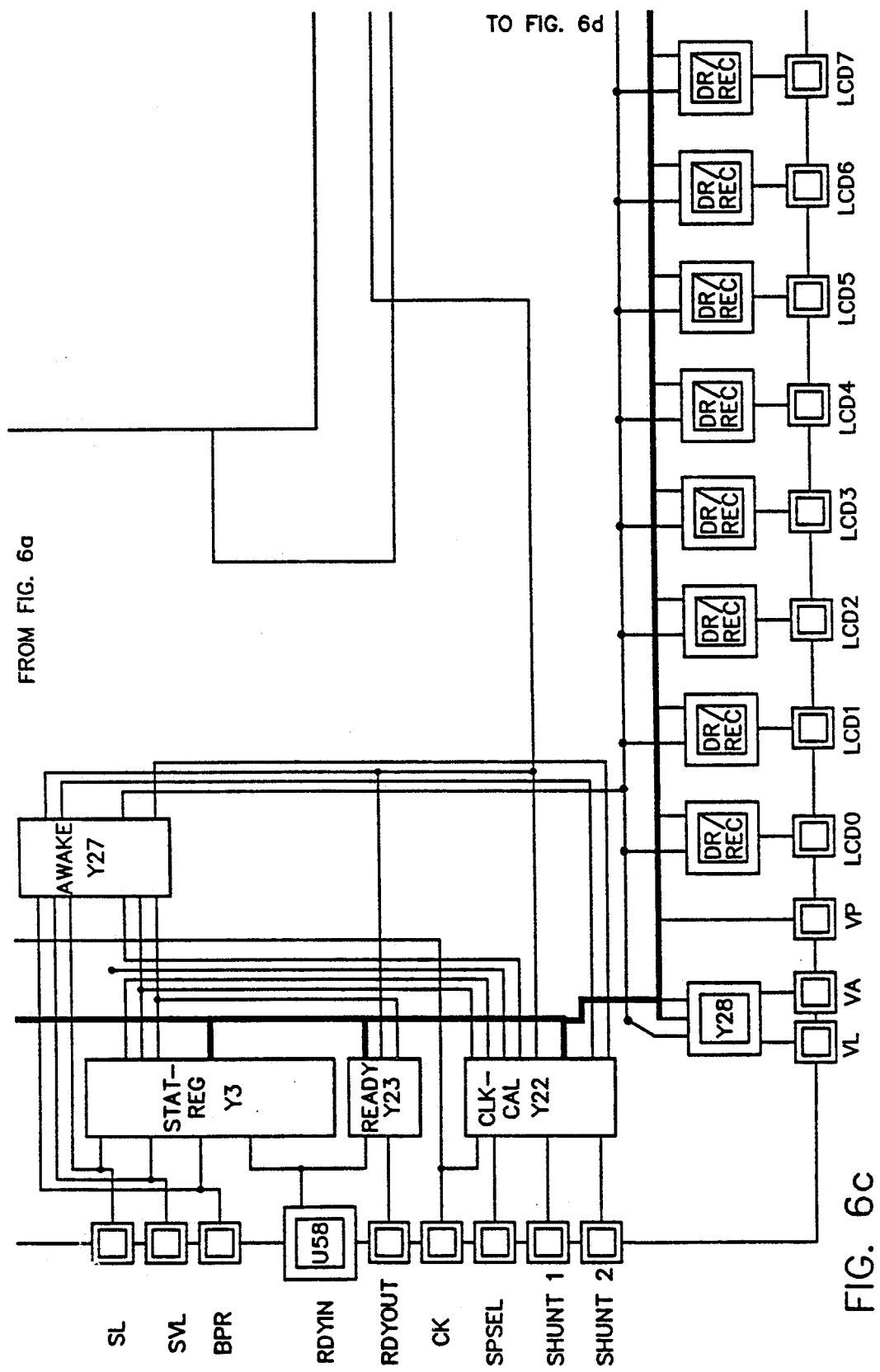

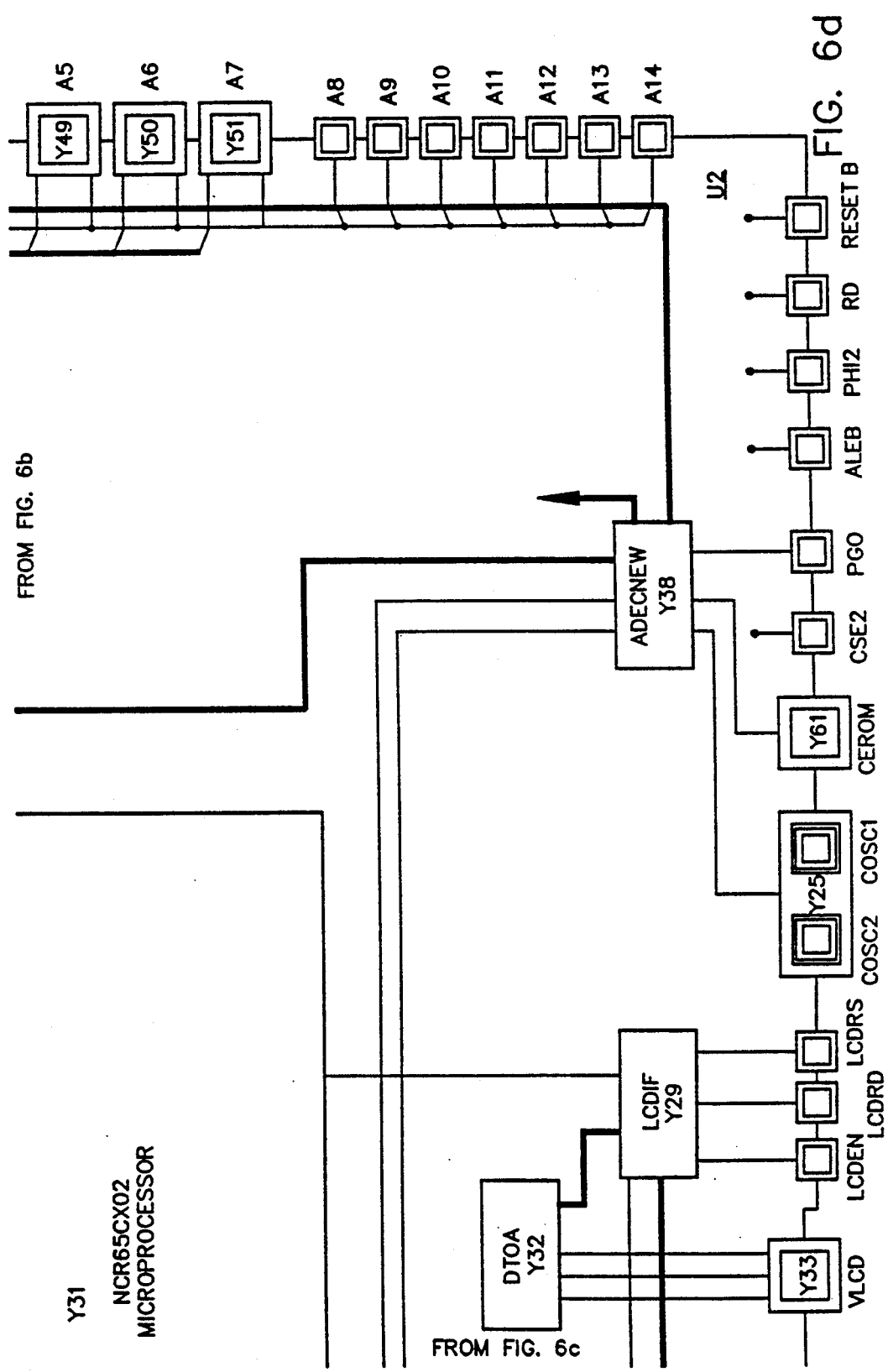

FLEXIBLY PROGRAMMABLE IRRIGATION SYSTEM CONTROLLER

This is a continuation of application Ser. No. 250,841 filed on Sep. 28, 1988, abandoned.

BACKGROUND OF THE INVENTION

1.0 Field of the Invention

The present invention generally concerns irrigation control and controllers. The present invention more particularly concerns solid-state digital irrigation controllers that have keys and displays and that accept user parameterization, commonly called "programming", of complex irrigation sequences and modes of operation.

2.0 Background of the Invention

Irrigation control has progressed from simple timed actuation, i.e., of switches or valves, to programmed control. Examples of existing programmed control include computation of total irrigation watering duration based on zone description, type of sprinkler components controlled, soil type and broad plant type categories (e.g., lawn vs. shrub).

One problem with previous irrigation control is that it has not been possible to specify a time period in which no watering is to occur. For example, facilities used by people are not usually irrigated when people are not likely to be present. Although undesired irrigation can be avoided by manual setting of all watering periods, this is inefficient, inconvenient, and incompatible with automated extrapolation of periodic irrigation cycles from supplied information.

Another aspect of existing programmed control is the use of a water budget feature. The water budget feature permits increasing or decreasing the watering time by a variable percentage. In theory the feature saves water by allowing reduction in the increases in the watering durations by a fixed percentage when the weather is wetter and/or cooler than expected. Many sprinkler heads apply water faster than the soil can absorb it, especially for sites with heavy clay soil, and/or sites with slopes and mounds. If water runs off or puddles from a normal irrigation cycle duration then runoff is even more pronounced when the water budget is set to 150%. One approach has been to divide the watering duration into two (2) cycles any time that the budget factor exceeds 150%. This gross division does not deal with a variety of conditions at the irrigation site, e.g., a site that cannot accept a 49% increase in watering duration.

Another problem exists with keeping track of total irrigation watering times at each irrigation station. Some existing irrigation controllers require the start times be entered for each irrigation repeat cycle with each separate irrigation station operating sequentially from this time. This is because hydrostatic pressure limitations in some irrigation systems demand that no more than one station should be irrigating, i.e., only one valve should be open, at any one time. For example, for each of eight stations performing three twenty-minute irrigation cycles, if station 1 starts at 12:00 midnight then station 2 may start at 12:20 a.m. and so on until station 8 may be scheduled to start at 2:20 a.m. Then station 1 may start again at 2:40 a.m. The number of cycles to be set is dictated by the total irrigation time divided by the individual irrigation cycle duration. Manual selection of such irrigation schedules for each individual irrigation station is difficult since it is particularly easy to lose track of how much total watering time is being entered. This tends to lead to inaccuracies that undesirably result in overwatering or underwatering.

The complexities inherent in stagger-scheduling irrigation of a number of irrigation stations are compounded by reducing the durations of individual irrigation cycles. For example, in the previous example where eight stations must each irrigate for one hour total duration, programming convenience might suggest a schedule of twelve irrigation cycles of five minutes each for each station. Station 1 would irrigate for five minutes starting each hour on the hour from midnight to 11:00 p.m. during twelve total irrigation cycles of five minutes each. Station 2 would start five minutes past the hour during the hours from 12:05 a.m. to 11:05 p.m. With existing irrigation controllers and valves these repeated short cycles use more energy, and induce more wear, in the valves. More importantly, this easy programming of shorter cycles may not permit sufficient ground penetration of irrigation water in certain types of soils with certain types of sprinklers.

Another problem arises when irrigation cycles are programmed too closely to one another. For example, if two stations only are controlled to irrigate during ten minute cycles for six total cycles each, giving a total watering duration of one hour at each station, an irrigation schedule that alternates between the two stations every ten minutes commonly results. This short off time (10 minutes) between the irrigation cycles at each of the two stations often results in insufficient soak time at each station between successive cycles. Water run off and wastage may result.

Existing irrigation control on one schedule cannot simultaneously integrate another schedule, e.g., long and infrequent deep watering cycles or short and frequent syringe cycles. For example, existing irrigation control does not allow a "periodic deep watering cycle" to be scheduled. Such a cycle would allow periodic long watering cycles for deep watering trees planted in lawns, or for flushing out salts in drip applications. For example, a shallow-rooted bluegrass lawn planted at a site with loamy soil and irrigated with spray heads having a precipitation rate of 1.7 inches per hour might be scheduled to water every other day (3.5 times per week) during the warm season for 15 minutes total watering duration. This schedule would apply about 0.4 inches of water per watering day (or about 1.5 inches per week). This schedule might be fine for watering the lawns, but not for trees.

To deep water trees planted in lawns, every 45 days an additional 80 minute cycle would be appropriate. This would apply 2.3 inches of water in order to soak the soil to a depth of almost 3 feet. With existing irrigation equipment the only easy and effective way to deep water trees in lawns is to install separate valves and bubblers for the trees. This involves extra cost and is rarely done.

Existing irrigation control doesn't permit the performance of periodic syringe irrigation cycles (multiple short irrigation cycles) until the completion of the normal irrigation watering schedule. In a desert, it would be desirable to schedule syringes to occur, for example, at one hour intervals every day from 9:00 am to 6:00 pm during the hot months of June through September. These cooling syringes would be in addition to the regularly scheduled irrigation cycles. In cold climates, syringe cycles can be specified for "frost wipe" applications to prevent damage to frosted turf, such as when people walk during early morning on frost-covered golf courses.

In summary, the failure to provide excluded watering time intervals in periodic (cyclic) irrigation control/controllers; to overcome deficiencies in water budgeting; to control total watering duration to eliminate underwatering or overwatering; to eliminate insufficient station on times; to avoid insufficient station off times; and to provide periodic alternate watering schedules such as periodic deep watering cycles or frequent syringe cycles are typical deficiencies of existing irrigation control. Improvements in these areas would, be expected to save money on water while reducing problems with plant disease, runoff, slope and pavement erosion, and liability for damages associated with under-watering and overwatering.

SUMMARY OF THE INVENTION

The present invention contemplates irrigation control based on the use of programmed information, generally at a higher degree of abstraction then previously used, in order to automatically calculate in response to such information irrigation control cycles that are (i) numbered and (ii) timed and (iii) diurnally allocated in an optimal manner.

The present invention contemplates an irrigation controller programmable (parameterizable) so that time-of-day intervals that specify when no watering is to occur can be inserted within normal, ongoing, periodic irrigation cycles; a water budgeting factor is used to control the numbers of irrigation cycles; total irrigation time duration is automatically split into either an automatically calculated, or a user-defined, number of irrigation cycles; the maximum "on" time duration for each individual split irrigation cycle may be automatically calculated from high level information regarding the irrigation site and system; a minimum "off" time duration between split irrigation cycles may be automatically calculated from high-level information input concerning the irrigation site and system; both the number and the temporal allocation of split watering cycles within a defined total watering time duration are automatically calculated from high level information regarding the irrigation site and system; special scheduling and set-up programs provide useful special irrigation sequences and/or durations; special irrigation cycles such as periodic deep soak, syringe and/or alternate day or calendar even day-odd day cycles are provided; and programmed irrigation control for a single station may be flexibly copied, wholly or partially with such modifications as may be desired, into the control of additional stations. The consistent purpose of all such capabilities is to reduce water wastage; to provide optimal irrigation cycles and durations; to increase ease and accuracy of controller set-up, review, modification, or reset; and to save time and money.

In accordance with the present invention, one or more excluded time intervals when no watering is to occur are specified. In many situations there are certain times of the day when no watering is desired. The irrigation controller in accordance with the present invention automatically calculates irrigation cycles while permitting the user to define an "excluded interval" when no watering is desired. The controller automatically skips this "excluded interval" if any scheduled watering cycle for the day is not finished before this interval begins then it is completed after the end of the "excluded interval".

Water budgeting is used to determine the numbers of split irrigation cycles in order to avoid runoff. The controller in accordance with the present invention determines the numbers of split watering cycles in accordance with the water budgeting factor: as the water budgeting factor is increased or decreased the numbers of active split watering cycles are increased or decreased. The time duration for each split watering cycle may thus remain approximately the same, avoiding runoff due to overly long irrigation cycles.

Total irrigation time durations are automatically split into an automatically calculated (or user-defined) number of repeated irrigation cycles in order to minimize runoff. The controller in accordance with the present invention automatically generates a matrix of repeated irrigation cycles based on total irrigation time information.

An irrigation cycle maximum "on" time, is automatically determined based on site information typically relating to the type of soil (e.g., sand, loam, or clay), the type of sprinklers being used (e.g., spray heads, rotor heads, impulse heads), and whether or not the terrain is level or sloping. Based on this information, the maximum "on" time is automatically determined, normally by table lockup. From this determination, and from the total irrigation time duration, the number of repeated irrigation cycles into which the total irrigation time duration is to be split is calculated. Each of these cycles (save possibly a partial last cycle) is of a duration equal to the maximum "on" time. The "on" time is thus essentially an optimum irrigation cycle time duration for the particular site. Alternatively, the maximum "on" time can be user-defined or user-modified.

Normally the automatically determined, user-defined or user-modified maximum "on" time will be less than the total irrigation time. Therefore the calculated number of irrigation cycles is two or more. In accordance with one aspect of the present invention, these two or more irrigation cycles will be automatically diurnally allocated. The automatic temporal allocation of the irrigation cycles will avoid any "excluded interval" within which no watering is to occur.

A minimum "off" time between irrigation cycles is also automatically determined from the site information. The minimum "off" time is to insure that there will be a sufficiently long latent period between start times so as to allow the irrigation water to soak in before a next "on" cycle begins.

The automated determination of the duration, determination of the time separation, calculation of the numbers, and temporal scheduling of split irrigation watering cycles in accordance with the present invention promotes water conservation because the user always sets, and knows, the total irrigation time.

In accordance with the present invention, high level information regarding the irrigation site and system, plus the total irrigation time duration, are entered into the irrigation controller. From this information the irrigation controller automatically generates irrigation schedules. To do so the duration of an irrigation cycle (the maximum "on" time) and the necessary minimum temporal separation between successive cycles (the minimum "off" time) are first determined. The number of irrigation cycles is then calculated. Finally the irrigation cycles are scheduled, or allocated, within a diurnal period so that successive cycles at each station are temporally separated by at least the minimum "off" time while all stations are stagger-sequenced, in priority order, with no more than one station enabled to irrigate at any one time.

The present invention further contemplates a wide variety of special programs for satisfying diverse irrigation scheduling needs.

A "mini setup" is for irrigation applications that only need one start time per valve.

An "autosplit setup" in accordance with the present invention causes automatic calculation of split irrigation cycle times, as described above.

A "ration setup" in accordance with the present invention is a special program for odd/even day of the month water rationing. The odd/even water rationing setup in accordance with the present invention is sensitive to calendar month dates.

A "one-time setup" in accordance with the present invention programs one-time deep soak cycles for soaking in fertilizer or for watering new trees and shrubs immediately after planting. This setup can be used in conjunction with other setups, semi-automatically accomplishing a one-time deep soak before the controller automatically reverts to a normal watering program (such as "mini", or "autosplit").

A "special setup" permits control of special applications (such as lights, fountains, pumps, etc.) that must operate at the same time on any particular programmed day. This setup can also be run in conjunction with one of the other irrigation oriented setups, because individual stations can be designated as either valves, pumps, lights, etc. in a "system setup mode".

The present invention also contemplates adding "overlay" programs for periodic deep soak(s), and for syringe cycles. These overlay programs are in addition to any of the regular watering programs. The "periodic soak" cycles accomplish periodic deep watering of trees in lawns and ground cover areas, and the periodic leaching of salts in drip irrigated areas. These soak cycles use the same sprinklers and valves as the normal watering cycles, and in accordance with the invention, their duration is automatically calculated from site information. The "syringe" cycles are multiple short cycles for summer cooling or winter frost-wipe applications. In accordance with the present invention, multiple syringe cycles may conveniently be scheduled by merely programming the time-of-day interval during which syringes will transpire, the duration of each syringe cycle, and the tempral separation between successive syringes. Further in accordance with the invention, active months for syringing may be specified.

Notably, this syringing information is quite unlike that entered to schedule normal irrigation watering cycles. This optimization of the nature, and format, of information solicited from the user/programmer is characteristic of the irrigation controller in accordance with the present invention, which is extremely user friendly. The irrigation controller generally accepts information in a format most familiar and convenient to the user, and automatically performs all necessary calculation to schedule and control irrigation based on the entered information.

The present invention contemplates that irrigation control parameters entered for an individual irrigation station (with considerable ease in accordance with the various aspects of the invention) may be copied so as to serve as the irrigation control parameters for another, independent, irrigation station. This copying may be done either without, or with, modifications to the parameters as used for the new station, all as is desired. This saves considerable effort in entering repetitive information, and still allows for different settings if desired.

For each different type of watering setup, the controller in accordance with the present invention permits the creation of an alternate version irrigation schedule. Information can be copied back and forth between the standard and alternate versions of each irrigation schedule. The controller permits selectable review, modification, or entry of new schedules. The ability to create, and try out new, alternate, irrigation schedules while retaining the previous schedule permits flexibility in trying new irrigation schedules and ease of evaluation and change.

The present invention contemplates that an irrigation controller selectively enabling and disabling irrigation at a number of logically-identified irrigation stations that are connected by wiring to physical terminals of the controller, might selectively associate the logically-identified irrigation stations with the physical connections. Each successive one of the physical irrigation stations is identified to the irrigation controller, normally by momentarily lifting its electrical connection at a terminal block. The irrigation controller associates a specified logical number for each irrigation stations with each physical station identified. By this procedure the irrigation controller may associate each logically numbered one of the of irrigation stations that it controls with a corresponding physical one of the actual physical irrigation stations.

The present invention contemplates that irrigation stations can be selectively disabled, under programmed control, without any necessity of physically disconnecting (by a swith or otherwise) the electrical connection to a disabled station(s).

The irrigation controller in accordance with the present invention is, despite its versatility and flexibility, extremely user friendly. The controller offers two-button programming with a self-prompting question and answer format. Menus and data entry screens are automatically advanced. All programming is done by answering either OK or NO to simple questions. An on-line help feature gives directions and help.

The controller has a modular design with the ability to upload and download programs, and to centrally manage each of a plurality of irrigation stations. An integrated moisture sensor control permits programmable "wet" and "dry" levels for each station. An information viewing mode permits the user to view the history of the 128 most recent programming and operational events, to get directions, to do a system self test, or to view the cumulative month-to-date irrigation time durations by station. Built-in wire continuity testing and system self-test and report functions are also included.

These and other aspects and attributes of the present invention will become increasingly clear upon reference to the following drawings and accompanying specification wherein:

BRIEF DESCRIPTION OF THE DRAWINGS

FIG. 4 is a block diagram of a first, U1, Application Specific Integrated Circuit (ASIC) used in the preferred embodiment of an irrigation controller in accordance with the present invention;

DESCRIPTION OF THE PREFERRED EMBODIMENT

Figure 1:
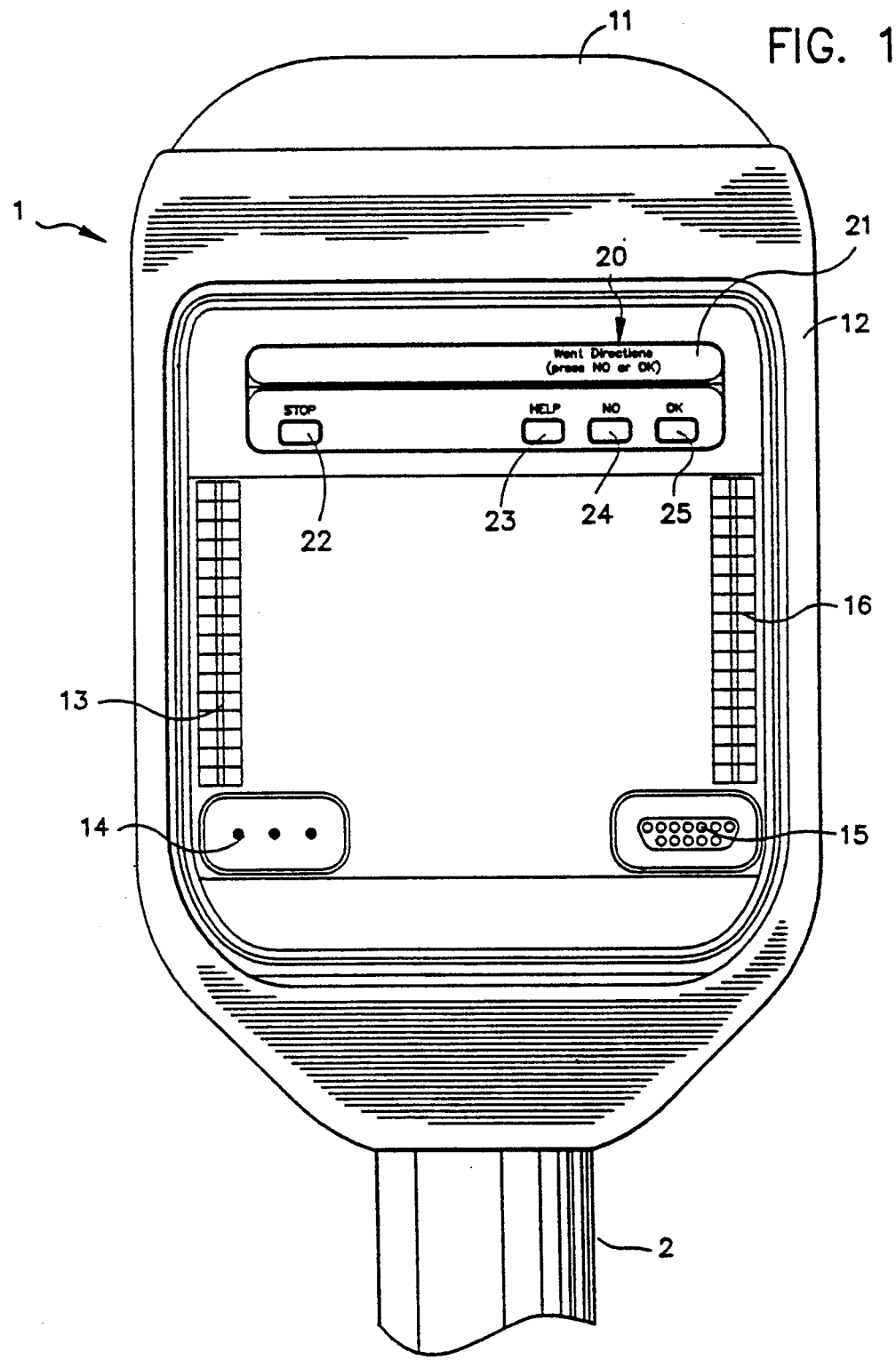
FIG. 1 is a pictorial diagram of an irrigation controller in accordance with the present invention.

1.0 The Preferred Embodiment of the Invention is in a Light-Energized Irrigation Technology Controller The present invention is embodied in an 8-station light-energized irrigation controller. The irrigation controller is spoken of as being "light-energized" and (along with the irrigation valves that it controls) to embody "Light-Energized Irrigation Technology" (LEIT). This description is in lieu of describing, for example, the controller to be "solar powered" because it employs an extremely small area light (solar) collector. Resultant to the small energy collected, the controller uses extremely little energy for all irrigation functions, including control of up to eight (8) valves. The acronym LEIT when applied to irrigation controllers is a trademark of Solatrol, Inc. (assignee of the present invention), i.e., LEIT TM Irrigation Controllers.

1.1 Operational Specification of the Preferred Embodiment of an Irrigation Controller in Accordance with the Present Invention No electrical power input is required. Light energy required is 0.4 milliwatts/sq cm incident light for a minimum of 7 hrs/day. This is equivalent to one tenth of the amount of light at 55 northern latitude (e.g., in Canada) on a cloudy winter's day.

The power for the controller's display (when actuated) is derived from a POWERKEY TM (trademark of Solatrol, Inc.) power source. The POWERKEY TM power source packages a 9-volt alkaline battery that is used to energize the Liquid Crystal Display (LCD) of the controller during installation and programming.

The signal output of the controller to its controlled valves is 3.5 volts DC, 0.04 amps. No circuit breaker and no transformer are required.

Up to 8 valves (including up to 4 Master Valves) may be connected to each controller. Up to 8 electronic soil moisture sensors or optionally, other electronic sensing devices, may also be connected to each controller.

A user-defined emergency backup program and critical system parameters are stored in non-volative memory in case of memory loss from prolonged light interruption; no batteries are needed.

The operational temperature range is from −10° C. to 70° C. The storage temperature range is −40° C. to 70° C.

1.2 The Preferred Embodiment of a LEIT TM Irrigation Controller Interfaces with Certain Optional Accessories The preferred embodiment of a LEIT Irrigation controller in accordance with the present invention interfaces to certain optional accessories and equipments.

A POWERKEY TM (trademark of Solatrol, Inc.) power source is a combination keyring and keyfob-cased battery for powering the display during programming and/or interactive operation.

An optional Multiprogrammer TM unit plugs into the digital interface of the controller for uploading and downloading the watering programs for up to 64 controllers.

An optional WIRESCOPE TM (trademark of Solatrol, Inc.) unit is a hand-held diagnostic unit that checks for proper controller and valve operation from the valve station end of each station wire, and can optionally give an identifying readout of valve and sensor numbers by station and controller.

Up to 8 optional soil moisture sensor units can connect to the controller to give precise irrigation system control based on readings of available soil moisture tension, or optionally, percentage soil saturation.

An optional remote test command assembly is a replacement controller face-plate that receives signals from a hand-held transceiver in order to allow wireless remote "manual" operation of valves and sensors from the valve or sensor locations.

An optional radio-link central module mounts permanently below the controller and acts as a transceiver for wireless communication between the controller and a radio-link central system.

The POWERKEY TM power source is manually plugged to the controller in order to provide power to the controller for first use precharging, and during each occurrence of the programming/parameterization of the controller's operation and/or the reviewing of data in the controller's memory. In the latter two cases, the POWERKEY TM power source also provides built-in illumination of the controller's display and control switches. The power source during operation of the controller to control irrigation may be the POWERKEY TM power source if it is still pluggably attached (an abnormal condition), but is normally light (even extremely dim light, such as moonlight) that falls upon the controller.

1.3 Features and Benefits of the Preferred Embodiment of a LEIT Irrigation Controller in Accordance with the Present Invention The preferred embodiment of an irrigation controller in accordance with the present invention is light-energized with a built-in incident light collector. It exhibits sufficient energy storage to drive a custom CMOS ultra-low-power microcomputer with 32K RAM memory and to cycle up to eight (8) ultra-low-power irrigation valves up to sixteen (16) times per twenty-four (24) hour period. This provides complete independence from any need for AC power, saving on energy and installation costs and permitting the controller to be located closer to the valves.

An easy to read two-line LCD display with automatic prompting is implemented. The user is guided through the programming process with easy to understand two-line "prompts," thus substantially eliminating confusion, mistakes, and requirements to repeatedly reference printed or human authority.

Two-button programming with "best guess" defaults is used for all settings. All programming is done by answering simple questions with OK or NO answers. The controller automatically gives the user "best guess" defaults where applicable.

An on-line help feature gives directions and information for each operational mode and parameter insertion. These on-line help messages are available at any time by pressing a HELP key.

The design is modular in that multiple 8-valve-station controller units can be integrated together. The individual 8-valve-station controller units can be networked together into optionally radio-linked centrally controlled systems, or, alternatively, multiple unrelated controllers on various sites can be centrally managed by optional multi-programming equipment.

Each of the 8 stations for a single controller unit can be independently programmed within one of six different runtime modes (Mini, Autosplit, Ration, ISC, One-Time, and Special. This gives the Irrigation Controller great programming flexibility. Options for (i) simplified "Mini" setups, (ii) "Autosplit" setups with automatically programmed split cycles and sequential non-overlapping operation, (iii) "Ration" setups for odd/even (day of month) water rationing, (iv) "ISC" setups with complete independence between stations, (v) "Special" setup for lights, fountains, and pump-start relays, (vi) periodic or one-time "Add-on Soak Cycle" setups, and (vii) for multiple "Add-on Syringe Cycle" setups are implemented.

Controller timing control of the irrigation valves is from 1 minute to 240 minutes in one minute increments. Thus one minute precision in starting or stopping irrigation is combined with the ability to set watering durations of up to 4 hours for each start time. One-time or periodic "soak cycles" can have a duration of up to 8 hours.

A calendar is maintained based on "perpetual calendar" data in permanent memory. Schedules may be established for specific days or every "so many" days. This permits flexible day cycles for irrigation, and allows different stations to operate on different day cycles.

Up to 128 automatic starts per day are enabled, thereby meeting the most demanding applications.

The controller's split cycle capability permits watering times to be split into up to 16 substantially equal increments. This minimizes runoff and puddling by splitting the programmed watering duration into shorter cycles each of which is separated by a programmable minimum "off" time.

A System Budgeting Factor of 10 to 200% acts to determine the numbers of split cycles. The System (water) Budgeting Factor increases or decreases the number of split cycles instead of acting as a total duration multiplier which can lead to runoff and puddling. Monthly budgeting with pre-set default values for each month is also available. This allows an entire year's scheduling to be set up.

An Integrated Moisture Sensor control with programmable "wet" and "dry" trigger levels is optionally implemented for each valve station. This keeps the soil moisture level for each valve within the optimal range for the growth of the type of vegetation being watered by that valve, instead of merely using the optional moisture sensors as switches to override cycle starts.

Automatic sequential program generation permits "Excluded Time Intervals". The controller automatically generates a sequential matrix of start times for all active valves and split irrigation cycles based on user input for determined total watering durations by valve, either site information selection or operator entered number of split cycles, and on any user-defined "Excluded Time Intervals" when no watering is desired.

For very simple applications a "Mini" setup is available. This simple setup mode is extremely easy to use, and it is designed for applications where some of the more sophisticated features of the controller are not needed.

All valve stations can be programmed totally independent of one another in the "ISC" setup mode. This allows individual stations to be watered at different times on different days, and it also allows several stations to be running simultaneously for special applications where there are no hydraulic pressure or supply limitations. Another option, the "Special setup", can be used for control of non-valve devices such as pumps, or lighting equipment.

One-time or periodic "Soak" cycles can be overlaid on any regular watering program. This feature can be used for watering in fertilizer, for periodically deep watering trees and shrubs in turf areas, and for periodically leaching salts in drip applications.

Multiple daily cooling or frost-wipe "Syringe" cycles can be overlaid on any regular watering program for any pre-programmed month(s) when needed. These cycles help prevent wilting and scorching of plant materials during hot summer months or damage from freezing or morning dew in cold weather months.

Even and odd days can be automatically excluded as watering days in the "Ration" setup mode. This allows for odd/even water rationing schedules to be easily programmed where this is mandated by law.

A programmable "Delay Start" permits watering to be suspended for up to 14 days during rainy weather, and at the end of the programmed "Rain Delay" the regular watering schedule will automatically resume.

A special "View Info" mode allows the user to review all settings or to view an event report which displays the controller history and current operational setup. This permits the user to easily review the current controller settings or to view a list of the last 128 events (watering cycles, program changes, etc.) in chronological order starting from the earliest event.

Built-in wire continuity and short testing, system self-test and report functions are implemented. The user is alerted if shorted or open valve wires exist, and the unit performs a self-diagnostic test when requested.

A "Test Sequence" allows each valve to be operated in sequence for one to ten minutes. This allows the irrigation system to be easily periodically tested. A STOP key lets the operator immediately stop the test sequence if broken sprinklers or pipes are found.

Both valve stations and sensors can be operated automatically, semi-automatically, or manually. In semi-automatic mode, all or selected valves can be run once using the "One-Time" setup. This allows the user to do a one-time soak for watering in fertilizer or new plantings. The controller then automatically reverts to the automatic "Run" mode.

Three level access codes provide security and render the controller useless if stolen. Separate codes for gardeners, supervisors, and factory personnel insure that only authorized individuals can change the controller settings, and that codes can be easily changed as operating personnel change.

1.4 Functions Performed by the Preferred Embodiment of an Irrigation Controller In Accordance with the Present Invention The preferred embodiment of an irrigation controller in accordance with the present invention (i) receives specified information; (ii) makes decisions and performs calculations based on the specified information; (iii) typically displays the decisions and results derived in order that such may be, if desired, manually changed or modified; (iv) generates irrigation schedules for one or more irrigation stations in accordance with calculated results and (v) conducts irrigation in accordance with the generated schedules.

Information may be specified to the controller by manual data entry or by the download of information (and/or firmware operating programs) through communication ports of the controller.

The calculations are performed by a microprocessor, embedded within one of the Application Specific Integrated Circuits of the controller, that operates under control of firmware instructions resident within any of ROM, RAM, and EE memories of the controller.

1.4.1 Basic Function of-Setting Up an Irrigation Schedule

The preferred embodiment of an irrigation controller in accordance with the present invention accepts high level information regarding the irrigation site and equipment. This high level information typically concerns (i) soil type, (ii) type of sprinkler or irrigation head, and (iii) terrain.

From these informational inputs a table lookup is performed to determine (i) the maximum "on" time of an individual irrigation watering time and (ii) the minimum "off" time between successive irrigation cycles. A typical table with times in minutes is as follows:

The preferred embodiment of the irrigation controller further receives, e.g., by manual data input, a specification of the desired total irrigation time duration for each station. The controller calculates the number of irrigation cycles within the irrigation schedule for that station as:

$$\# \text{ cycles} = \frac{\text{total irrigation time duration}}{\text{maximum "on" time duration}}$$

For example, for a station irrigating hilly terrain, loam, soil, with a microspray irrigation head the number of cycles for a total irrigation watering time of 30 minutes is:

$$\text{number of cycles}_{station\ n} = \frac{30\ \text{min}}{10\ \text{min}} = 3 \text{ cycles (of 10 min each)}$$

The irrigation controller may optionally display the irrigation cycle time and number of cycles. The number of cycles may be fractional. In such cases the duration of the last cycle is truncated, so that the total of all the split cycles always exactly equals the duration entered by the user.

The preferred embodiment of the irrigation controller then proceeds by use of (i) the minimum irrigation "off" time, and (ii) the maximum irrigation "on" time that now becomes the duration of an optimal, normal, non-partial irrigation cycle (both quantities derived by table lookup) and (iii) the calculated number of irrigation cycles, to generate the irrigation schedules. The manner of this schedule generation is to (i) allocate irrigation cycles for any one station as "on" times followed by "off" times until the calculated number of irrigation cycles ensue, insofar as (ii) the necessary and prioritized scheduling of irrigation cycles for other stations permits. These rules are best illustrated by example. If, for example, station 1 is a sole station that should, in accordance with the previous example of hilly terrain loam soil with a microspray irrigation head, irrigate for 3 cycles of 10 minutes each cycle separated by 30 minutes between cycles, an irrigation schedule would be generated as follows:

| Time | Station #1 | Station #2 | ... | Station #8 |
|---|---|---|---|---|
| 12:00 mid. | on | off | | off |
| 12:05 | — | — | | — |
| 12:10 | off | — | | — |
| 12:15 | — | — | | — |
| 12:20 | — | — | | — |
| 12:25 | — | — | | — |

TABLE 1

Lookup Table for "On" and "Off" Times of Irrigation Split Cycles

| | MAX ON | | | | | | MIN OFF | | |
|---|---|---|---|---|---|---|---|---|---|
| HEAD TYPE | LEVEL SAND | HILLY SAND | LEVEL LOAM | HILLY LOAM | LEVEL CLAY | HILLY CLAY | SAND | LOAM | CLAY |
| FLAT SPRAY | 3 | 3 | 6 | 3 | 3 | 2 | 30 | 30 | 30 |
| LAWN SPRAY | 5 | 5 | 9 | 5 | 5 | 3 | 30 | 30 | 30 |
| ROTOR | 8 | 8 | 16 | 8 | 8 | 5 | 30 | 30 | 30 |
| IMPACT | 8 | 8 | 16 | 8 | 8 | 5 | 30 | 30 | 30 |
| STREAM SPR | 8 | 8 | 16 | 8 | 8 | 5 | 30 | 30 | 30 |
| MICROSPRAY | 10 | 10 | 20 | 10 | 10 | 7 | 30 | 30 | 30 |
| DRIP | 30 | 30 | 60 | 30 | 30 | 30 | 30 | 30 | 30 |

(The maximum ON values in this lookup table were calculated by dividing the maximum precipitation rate for each type of sprinkler into the minimum percolation rate typical for each type of soil, and multiplying by 60 to convert to minutes. Since sandy soils require more frequent irrigation than loam soils because of their low moisture holding capacity, the same maximum ON values were used for sand as for clay even though sand has a much higher percolation rate than clay. Loam has the proper balance of percolation rate and moisture holding capacity, and thus the maximum ON times for loam are longer than for either sand or clay. The minimum OFF times are based on field observation.)

| Time | Station #1 | Station #2 | ... | Station #8 |
|---|---|---|---|---|
| 12:30 | — | — | | — |
| 12:35 | — | — | | — |
| 12:40 | — | — | | — |
| 12:45 | — | — | | — |
| 12:50 | — | — | | — |
| 12:55 | on | — | | — |
| 1:00 am | — | — | | — |
| 1:05 | off | — | | — |
| 1:10 | — | — | | — |
| 1:15 | — | — | | — |
| 1:20 | — | — | | — |
| 1:25 | — | — | | — |
| 1:30 | — | — | | — |
| 1:35 | — | — | | — |

-continued

| Time | Station #1 | Station #2 | ... | Station #8 |
|---|---|---|---|---|
| 1:40 | — | — | | — |
| 1:45 | — | — | | — |
| 1:50 | on | — | | — |
| 1:55 | — | — | | — |
| 2:00 | off | — | | — |
| 2:05 | — | — | | — |
| | etc. | | | |

The last irrigation by station #1 was during the period 1:50 to 2:00 a.m. The cycle recommences the following day.

If station #2 is also enabled under the same circumstances the combined irrigation schedules will be as follows:

| Time | Station #1 | Station #2 | ... | Station #8 |
|---|---|---|---|---|
| 12:00 mid. | on | off | | off |
| 12:05 | — | — | | — |
| 12:10 | off | on | | — |
| 12:15 | — | — | | — |
| 12:20 | — | off | | — |
| 12:25 | — | — | | — |
| 12:30 | — | — | | — |
| 12:35 | — | — | | — |
| 12:40 | — | — | | — |
| 12:45 | — | — | | — |
| 12:50 | — | — | | — |
| 12:55 | on | — | | — |
| 1:00 am | — | — | | — |
| 1:05 | off | on | | — |
| 1:10 | — | — | | — |
| 1:15 | — | off | | — |
| 1:20 | — | — | | — |
| 1:25 | — | — | | — |
| 1:30 | — | — | | — |
| 1:35 | — | — | | — |
| 1:40 | — | — | | — |
| 1:45 | — | — | | — |
| 1:50 | on | — | | — |
| 1:55 | — | — | | — |
| 2:00 | off | on | | — |
| 2:05 | — | — | | — |
| | etc. | | | |

The last irrigation was by station #2 was during the period 2:00 to 2:10 a.m. The cycles recommence the following day.

If the full eight stations are all enabled under the same circumstances then the combined irrigation schedules will be as follows:

| Time | Station #1 | Station #2 | ... | Station #8 |
|---|---|---|---|---|
| 12:00 mid. | on | off | | off |
| 12:05 | — | — | | — |
| 12:10 | off | on | | — |
| 12:15 | — | — | | — |
| 12:20 | — | off | | — |
| 12:25 | — | — | | — |
| 12:30 | — | — | | — |
| 12:35 | — | — | | — |
| 12:40 | — | — | | — |
| 12:45 | — | — | | — |
| 12:50 | — | — | | — |
| 12:55 | — | — | | — |
| 1:00 am | — | — | | — |
| 1:05 | — | — | | — |
| 1:10 | — | — | | on |
| 1:15 | — | — | | — |
| 1:20 | on | — | | off |
| 1:25 | — | — | | — |
| 1:30 | off | on | | — |
| 1:35 | — | — | | — |
| 1:40 | — | off | | — |

| Time | Station #1 | Station #2 | ... | Station #8 |
|---|---|---|---|---|
| 1:45 | — | — | | — |
| 1:50 | — | — | | — |
| 1:55 | — | — | | — |
| 2:00 | — | — | | — |
| 2:05 | — | — | | — |
| | etc. | | | |

The last irrigation by station #1 was during the period form 2:40 to 2:50 a.m. The last irrigation overall was by station #8 during the period from 3:50 to 4:00 a.m. In total, eight stations have irrigated for a total of 30 minutes each during 4 chronological hours.

The goal of the staggered starts is to (i) operate one irrigation station at a time with (ii) a minimum amount of dead time on all stations consonant with (iii) operating each station in accordance with its maximum "on" and minimum "off" times while (iv) prioritizing between stations in accordance with their numbers. Each successive station is looked at in turn to see if an irrigation cycle for that station will properly fit within a window within the combined schedules, and if so the cycle is scheduled and the station will water. Which station's cycle to insert in any given window is determined by (i) which station has had the longest wait for a turn to have an irrigation cycle, and if two stations have equal waits then by (ii) the lowest numbered station first.

1.4.2 Exclusionary Periods

The preferred embodiment of an irrigation controller in accordance with the present invention accepts the specification, normally by user input, of one or more exclusion time intervals during which irrigation is not to transpire from any station. The specification is normally in the form of interval start and stop times, which are the corresponding times that irrigation is stopped and permissively restarted. The scheduling of irrigation cycles simply works around these one or more exclusion time intervals. An irrigation cycle may start before an exclusion interval, be suspended (off) during the exclusion interval, and resume to completion after the exclusion interval. This in essence adds an extra split watering cycle.

1.4.3 Budgeting of Irrigation

The preferred embodiment of an irrigation controller in accordance with the present invention accepts specification of a budget factor. The controller uses this budget factor to calculate a new, budgeted, total irrigation time duration as budgeted total irrigation time duration =

$$\text{budget factor} \times \text{total irrigation time duration}$$

For example, if the budget factor is 200% and a station's total irrigation time is 1 hour, then $$\text{budgeted total irrigation time duration} = 200\% \times 1 \text{ hour} = 2 \text{ hours}$$

The controller then proceeds to calculate a budgeted number of irrigation cycles in consideration of the maximum "on" time derived from the table lookup as $$\text{budgeted number of cycles} = \frac{\text{budgeted total irrigation time duration}}{\text{maximum "on" time duration}}$$

For example, for the hilly terrain loam soil irrigated with a microspray irrigation head:

$$\text{budgeted number of cycles} = \frac{2 \text{ hours}}{10 \text{ minutes}}$$
$$= 12 \text{ cycles}$$

This should be compared to the 6 cycles during which irrigation would normally transpire. The creation of irrigation schedules for the adjusted (budgeted) number of irrigation cycles transpires normally. There is also a Monthly Budget feature that allows a different budget to be set for each month of the year. Defaults are provided for each month.

1.4.4 Deep Soak Cycles

The preferred embodiment of an irrigation controller in accordance with the present invention accepts programming of a deep soak cycle for a selected station that overrides, supplants, and substitutes for all normal irrigation that might otherwise normally be scheduled for the station upon a particular day.

The (i) time duration, (ii) first occurrence, and (iii) periodicity days of the soak cycle are specified to the irrigation controller. The soak duration can be automatically calculated from site information, or user entered. For example, a particular, station might be programmed to conduct a 1 hour soak cycle every 30 days from a set day. Upon the set day, and each 30 days thereafter, the composite irrigation schedules will be routinely computed in a normal manner as if the particular station had only one irrigation period of duration 1 hour. All other irrigation cycles at other stations may be shifted in time-of-day but will otherwise proceed normally. Any base irrigation cycles that fall on a soak day for any particular station are skipped. Syringe cycles, if programmed, can fall on a soak day (see below).

1.4.5 Syringe Cycles

Syringe cycles are implemented in the preferred embodiment of an irrigation controller in accordance with the present invention as a separate schedule, automatically generated, that is (i) prioritized above the normal irrigation schedules. Syringe cycles are programmed in common for all stations based on one (only) set of input information for all parameters, except the syringe cycle duration. (They are not, however, conducted simultaneously.)

The controller accepts specification of the (i) syringe cycle duration by station, (ii) start time of the first station's (i.e., station #1) initial syringe cycle occurrence, (iii) start time of the first station's final syringe cycle occurrence, (iv) periodicity of the syringe cycles in the defined time interval, and, (v) active months during which syringe cycles are to be performed. The controller schedules syringe cycles of the indicated duration starting at the initial start time for station #1 followed by station #2 continuing up to station #8. After the proscribed time interval the syringe cycles repeat, and so continue until the last sequence of eight cycles upon the eight stations. This schedule is enabled only for the designated months.

For example, 1 minute duration syringe cycles might be specified to occur every two hours during a syringe period starting at 10:00 a.m. and ending with a 6:00 p.m. start time. Eight minutes of syringes would transpire, one minute per station, from 10:00 to 10:09 a.m. Another series would transpire from 12:00 noon to 12:09 p.m. The final series would be from 6:00 to 6:09 p.m. Each of these series would suspend any other irrigation cycle otherwise in progress. Each suspended cycle will conclude to its full scheduled duration at the end of the current series of syringe cycles.

2.0 Overview

The preferred embodiment of an irrigation controller in accordance with the present invention uses Light Energized Irrigation Technology (LEIT TM). It can operate with the amount of incident light available in northern latitudes on a worst-case cloudy winter's day without needing any of the batteries, external solar panels, or the A.C. power connections required for traditional controllers. It is also extremely flexible and versatile in its operation.

A diagrammatic view of the preferred embodiment of the controller, with its cover plate removed and operator's panel area exposed, is shown in FIG. 1. Controller 1 is typically attached to post 2. An array of photovoltaic devices 10 (not shown) is located under transparent lid 11 to case 12.

Various electrical connectors are presented. A valve connector block 13 permits electrical connection by wires (not shown) to up to eight (8) electrically actuated valves. A control key socket 14 accepts a pluggable POWERKEY TM power source (not shown), being a 9 vdc battery suitably packaged so as to plug into socket 14. A digital accessory connector 15 permits communication connection to a multiprogramming unit (not shown) that may upload and download programs into the controller 1 (among other alternative ways of programming controller 1). The connector 15 is a standard type, and may, under firmware control within controller 1, interface to further devices. A sensor connector block 16 permits connection of up to eight (8) optional soil moisture sensors or other sensing devices. These soil moisture sensors, and the control proceeding therefrom, are not taught within this specification for being unimportant to the present invention.

A control panel 20 contains a liquid cystal display (LCD) 21 for showing information, questions, and directives. The control panel 20 also contains pushbutton switches 22-25. A STOP switch 22 stops the present controller 1 operation and turns off any valves previously turned on. A HELP switch 23 causes the controller 1 to display more information and/or instructions, keyed to the current operation or displayed questions, in LCD 21. The NO switch 24 and the OK switch 25 are used to answer controller-presented questions about the installation and the parameters of irrigation (e.g., the watering schedule) and to enable selectable readout of controller stored data.

The controller 1 is controlled in its operation by firmware running on a special Application Specific Integrated Circuit (ASIC) that includes a microprocessor. The explanation of the controller 1 hardware is contained in major sections 3-5 of this specification. The firmware executed by controller 1 is attached as Appendix A to this specification. This major section 2 deals with the user interface to controller 1, and serves to show its many unique aspects in accordance with the present invention.

The term "programming" used throughout this specification includes actions performed at the operator interface to the controller 1—actions normally but not necessarily performed in the field—by which the controller 1 is parameterized and directed in its programmed operation. The firmware itself is, of course, also "programmed". In some cases the act of "programming" at the operator's panel will alter the flow, as well as the parameters used, within the firmware; thus constituting a form of "programming" at the process control level. The word "programming" is used to refer to the total compendium of operator/programmer interface to, and control of, irrigation controller 1. The word includes actions more exactingly thought of as parameterization (typically done in the field), as well as actions more exactingly thought of as coding (typically done in the factory or depot).

2.1.1 Talking to the Controller

The key features of the new user interface are as follows:

2.1.1.1 All Data Entry and Review is Accomplished by Using Only Two Keys

These two keys are labeled "OK" and "NO". Two other supplemental keys are present on the control panel for the LEIT Irrigation Controllers. These keys are the "HELP" and "STOP" keys. The "HELP" key provides context sensitive help messages, and the "STOP" key serves as the universal "exit" or "stop current action" key.

2.1.1.2 The User is Prompted

The user is always prompted with what to do next, either in the form of questions that allow the user to make OK (yes) or NO decisions, or self-advancing menus and data entry screens. For example:

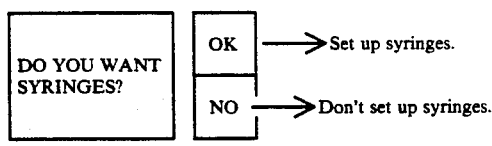

2.1.1.3 The User Always Knows His/Her Choices

The user always knows all the choices possible because all menus and number entry screens automatically self-advance (after a pause to let the user accept or reject the default value). Menu options cycle in a continuous loop until the user selects one of the options by pressing the OK key. To remind the user that he must press OK to select an option, there is a blinking $^OK$ symbol displayed on screen along with each option as the options are displayed one at a time.

Likewise, when numbers are to be entered, the numbers cycle in a continuous loop, so the user always knows the entire range of possible numbers. All number entry and menu selection can be done with one key, since the user can enter a number or make a menu selection just by waiting for the appropriate number or menu item to appear on the display, and then pressing OK. For example:

2.1.1.4 The Display May be Accelerated

Advanced users do not need to wait for the appropriate menu item or number to appear on the display, since the NO key doubles as an advance key. Pressing the NO key once advances the menu or number entry screen to the next menu item or number. Holding the NO key down causes the automatic advancing action to speed up, so that the user can get to the desired menu item or number more quickly. For example:

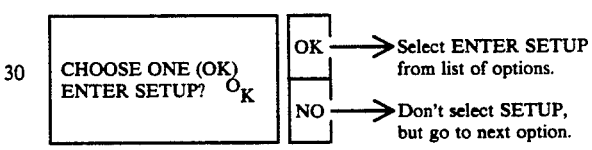

After the user advances the display by pressing the "NO" key (or waits for it to automatically advance), the display reads:

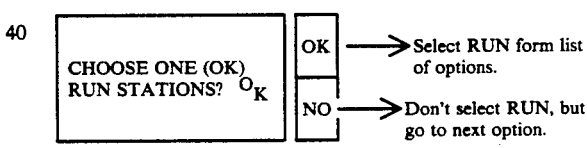

2.1.1.5 Each Entry Is Confirmed or Rejected

After each entry is made by pressing the OK key, the user is given a chance to either confirm or reject the entry by the use of confirm screens. These confirm screens show the information that was just entered, followed by a blinking $^ok$ character. Pressing the OK key confirms the entry, whereas pressing the NO key rejects it and allows the user to go back to the data entry screen to change the entry. For example:

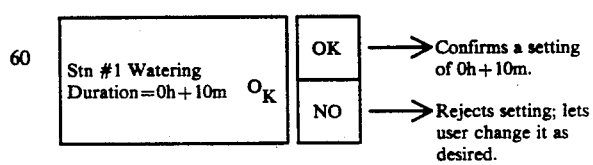

After entering the new setting, users again get a confirming screen to let them accept or reject the new setting.

2.1.1.6 Repetitive Information May Be Copied

When repetitive information is being entered, the user interface allows information to be copied to greatly reduce the required number of keystrokes. For example, if Station #1 is set to water on Monday, Wednesday, and Friday (with Tuesday, Thursday, Saturday, and Sunday as off days), the user gets the following question:

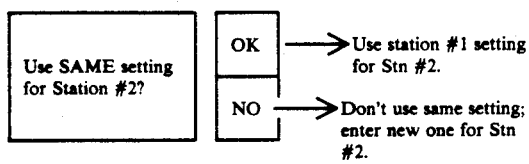

This saves a loss of time in re-entering the information for each station. If the user wants to change the setting, he/she just presses NO and the controller will automatically go back to the appropriate data entry screen for Station #2. If the user copies the setting to the next station in error, however, then he/she can go back and change the setting. This is because the user automatically gets a confirm screen after copying the settings to the next station.

2.1.1.7 The STOP and HELP Keys

Besides the OK and NO keys, there is a HELP key for getting instructions from the controller, and a STOP key for stopping whatever the controller is doing.

2.1.1.7.1 Using the HELP key.

The user may press the HELP key at any time to ask the controller for more information about what to do next. When the user is finished reading the message, he/she will be asked if he/she wants to "Repeat the message?" Pressing NO removes the help message and returns to what was previously displayed. See FIG. 1 for the location of the keys.

2.1.1.7.2 Using the STOP key.

Whenever the POWERKEY TM power source is inserted, the STOP key will stop whatever the controller is doing, no matter which mode it is in at the time. All the controller keys, including the STOP key, are inactive whenever the controller is actually running (or idling) by itself with the POWERKEY TM power source removed, that is, in either the AUTOMATIC, SEMI-AUTOMATIC or STAY IDLE/OFF modes.

If the user is entering or retrieving information in one of the set up modes, STOP will also cancel any scheduling entries the user has made and return the user to the main option list (CHOOSE ONE (OK)) screen. This is not the normal way to exit a mode, and should be used only when necessary. Normally, the user will use the STOP key only if he/she changes his/her mind and wants to start completely over again.

2.1.2 Controller Functions

The operation of the irrigation controller is organized into four main groups of functions called "Modes" These Modes are ENTER SETUP, RUN STATIONS, STAY IDLE/OFF, and VIEW INFO. Table 2 shows the the functions of these four Modes. Each of these modes is further organized into sub-modes.

The controller can only be operating in one Mode at a time. For example, if the user wants to enter a new setup, then the controller cannot be running stations manually at the same time.

TABLE 2

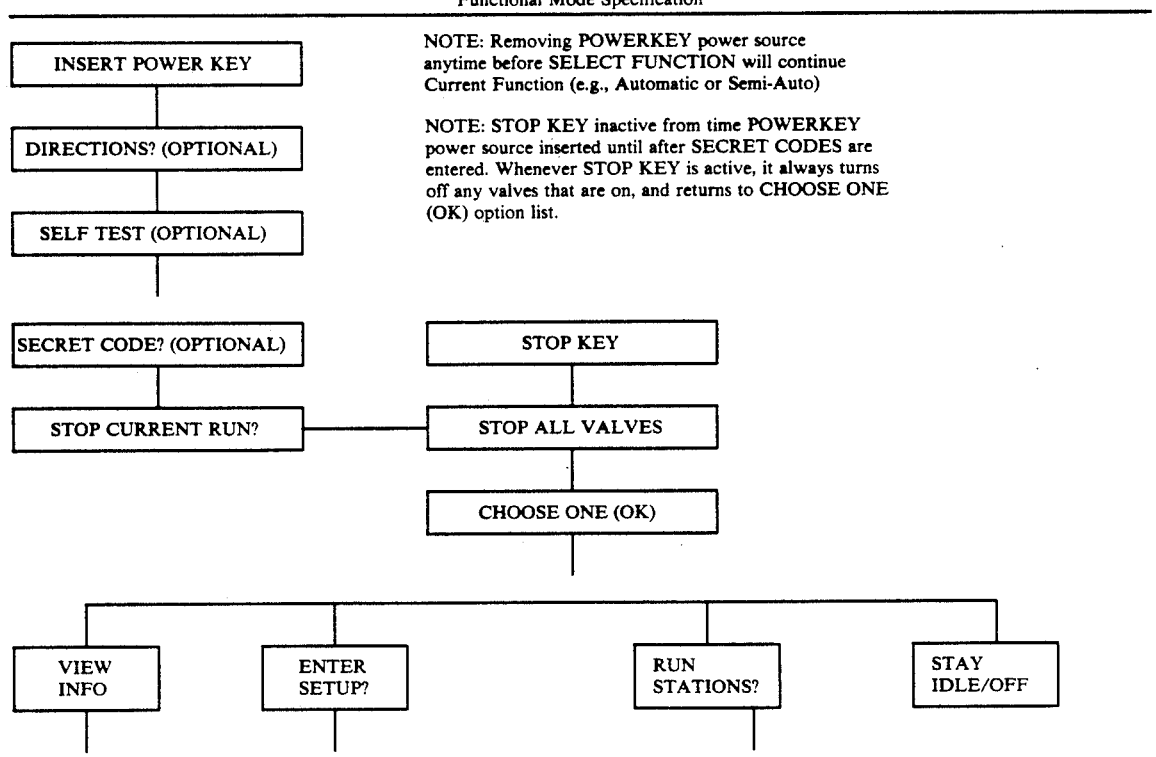

TABLE 2-continued

Functional Mode Specification

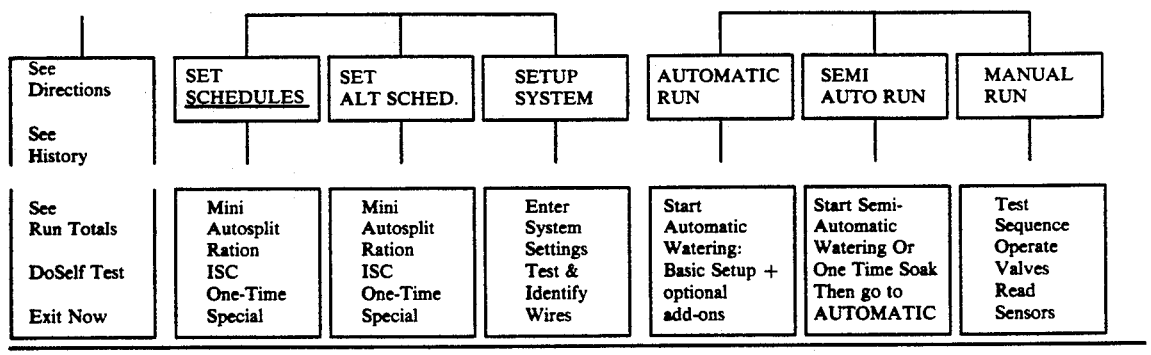

2.1.2.1 Using the Menus

In order to use one of the Modes, the user starts at the "Main Menu" Screen (which reads "CHOOSE ONE (OK)") and selects one of the Modes by using the NO and OK keys as described earlier. If the Mode has several functions, the user selects one of the functions in the same way. For example, in RUN STATIONS Mode the user selects whether he/she wants to use Automatic Run, Semi-Auto Run, or Manual Run. When the user is finished using the Mode, the controller will ask "EXIT now?" and if the user presses OK the "main menu" screen will be displayed again.

There are 4 main options used in setting up and running the controller. These options are chosen from a self-advancing list by pressing the OK key. The STOP key always abandons the current screen and returns to the "Main Menu".

A brief description of the 4 Main-Functions or Modes of the Controller follows:

The first mode is ENTER SETUP. This mode lets the user enter SCHEDULES or ALTERNATE SCHEDULES to tell the controller when and how to run each valve or station. The ENTER SETUP mode also lets the user set up the SYSTEM to fit his/her site and specific application.

The second mode is RUN STATIONS. It lets the user run stations in 3 ways: AUTOMATIC, SEMI-AUTOMATIC, and MANUAL. The AUTOMATIC RUN mode is the normal way to turn valves on and off as scheduled in the SET SCHEDULES mode. The SEMI-AUTO RUN mode lets the user do an immediate one-time soak or a normal watering cycle before reverting to the AUTOMATIC RUN mode. The MANUAL RUN mode allows the user to operate valves one at a time or a defined TEST SEQUENCE, and it lets the user take moisture sensor readings.

The third mode is STAY IDLE/OFF. No watering will occur if the user chooses "STAY IDLE/OFF". The controller will keep all the user's setups but none of them will be run.

The fourth mode is VIEW INFO. The VIEW INFO mode lets the user SEE HISTORY events by date, SEE DIRECTIONS, SEE RUN TOTALS or DO a system SELF TEST.

Before the user can begin watering, the user needs to complete both the SETUP SYSTEM and SET SCHEDULES Modes. The user then chosses RUN STATIONS, followed by either AUTOMATIC RUN, SEMI-AUTO RUN, or MANUAL RUN.

2.2.1 Setting the Display Contrast

The user should open the POWERKEY TM power source by removing its screws. The user snaps in a fresh 9 V battery (alkaline type) and reassembles the POWERKEY TM power source. The user unlocks and opens the controller's front cover and inserts the POWERKEY TM power source by gently pressing it into the socket located at the lower left of the controller. Since the internal light energy storage capacitor ® may not be fully charged, the controller may need a few moments of charging from the battery in the POWERKEY TM power source. Once initially charged, the system will operate from skylight energy alone, rain or shine, day and night, all year-round. Plugging the POWERKEY TM power source into the controller supplies extra energy to run the controller for communicating with the user. During this communication the display is constantly enabled and the front panel is lighted for night time convenience.

While the unit is charging, the following message flashes intermittently:

```
Charging
Please wait ...
```

When charging is completed, the display will then show:

```
Press OK when
most readable 1
```

The contrast of the display will change once a second. The user should press the OK key when the display is the most readable. The different contrast levels are numbered from 1 to 5 for convenience.

2.2.2 System Self Test

When the controller is accessed with the POWERKEY TM power source, the controller asks the user if he wants to perform a self-test. The test includes checking values and sensors, and looking for broken or shorted wires.

The controller then displays the results of the test, the current date and time, and its present status. See the program listing of the Appendix for a description of status messages.

2.2.3 Optional Secret Codes

If an optional Secret code has been assigned, then a Secret code number must be entered in order to use the controller. The display reads:

```
ENTER SECRET
CODE = 000000
```

The user should enter the six digits by using the NO and OK key as described earlier. The irrigation controller will check to see if the entry matches the code that was entered during the Secret Code Set Up. The controller gives two changes at entering the correct code. After that, it will not respond to any key presses for 10 minutes.

2.2.4 Optional Instruction Screens

The irrigation controller in accordance with the present invention has a built-in instruction manual that gives the user brief explanations of the keys and the controller operating modes. The 2-line instruction screens automatically change at a rate that is comfortable for reading. The first two screens present a Welcome Message and let the user decide whether or not he/she wants to view the instructions:

```
Welcome to the
Controller
```

```
Want Directions?
(Press OK or NO)
```

Once the user has started the automatic scrolling display of the built-in instruction screens, he or she can stop the process merely by pressing the STOP key.

2.3 HOW TO SET UP THE IRRIGATION CONTROLLER

2.3.1 Set-Up Sequence

First time set up for the controller requires four steps:
1) Set the time and date,
2) Assign a Secret code (optional),
3) Enter Watering Schedule, and
4) Wire and assign stations for all valves and sensors.

Steps 1, 2, and 4, are done using the SETUP SYSTEM sub-mode, and step 3 is done using the SET SCHEDULES sub-mode. Note that step 4 must be done in the field with the controller connected to its valves. Steps 1-3 may be done prior to field installation, but care must be taken to ensure an adequate light supply for the controller while it is waiting to be installed.

2.3.2 Setup System

The user should select the SETUP SYSTEM sub-mode from the ENTER SETUP Selection Screen. There are seven choices in this mode:

```
SETUP SYSTEM :        SETUP SYSTEM :
Set Time/Date?  OK    Setup Sensors?  OK
```
OR

```
SETUP SYSTEM :        SETUP SYSTEM :
Set Site Info?  OK    Set User Codes?  OK
```
OR

```
SETUP SYSTEM :        SETUP SYSTEM :
Do Wire Check?  OK    Exit Now?  OK
```

```
SETUP SYSTEM :
Setup Stations?  OK
```

The user should press NO (or let the controller automatically advance) to switch between the screens and OK to select the operation shown on the screen.

2.3.2.1 Time Set Up

The user should select Set Time/Date from the SETUP SYSTEM menu to see or set the present time and date setting for the controller's internal clock. The display shows the current time and date:

```
Time is 10:00 am
FRI MAY 6,'88?
```

The user should verify the time by pressing OK. To change the time, the user presses NO and the display will show:

```
Time : 10:00 am
```
then

```
Time : 10:00 am
```
then

```
Time : 10:32 am
MON
```
then

```
Time : 10:32 am
FRI JAN
```
then

```
Time : 10:32 am
FRI MAY _1
```
then

```
Time : 10:32 am
FRI MAY 12,'88
```
then

```
Time : 10:32 am
FRI MAY 6,'88?
```

The user should enter the six settings: hours, minutes, day of the week, month, date, and year. The user should then press OK to confirm that the time and date are correct.

2.3.2.2 Set Site Info

Set Site Info lets the user enter information about the terrain, soil type, and sprinkler types being used for each station at the site being irrigated. This information is used by the controller to automatically calculate split ON times and soak durations.

The first screen reads:

```
Stn 1: Level sand,
flat sprays?     OK
```

If this is incorrect for the particular site in question, the user presses NO and the screen changes to read:

```
Stn 1: Site Info
level sand?      OK
```

The soil type and terrain automatically advance (level sand, hilly sand, level loam, hilly loam, level clay, and hilly clay) and when the appropriate choice is displayed the user presses OK.

The next screen reads:

```
Stn 1: Site Info
Flat sprays?     OK
```

The sprinkler, types also automatically advance (flat sprays, lawn sprays, rotor heads, impact heads, stream sprays, microsprays, and drip emitters).

Again the user presses OK when the correct information for the station in question is displayed. The last screen for each station is a confirming screen:

```
Stn 1: Hilly loam,
lawn sprays?     OK
```

2.3.2.3 Setup Stations

The user should employ this SETUP SYSTEM function to tell the controller which wires represent which station numbers. Unlike conventional controllers which have terminal strips that must be wires with station number 1 attached to the top terminal and station number 8 attached to the bottom one, the user can attach pairs of valve wires to the terminal strip of the irrigation controller in accordance with the present invention in any order that is convenient. The user can then assign station numbers to the wires as described below in the section on "Wire Checking".

2.3.3 Wire Checking

After a jacketed pair of wires has been run from each valve and sensor back to the controller, the user should select Do Wire Check from the SETUP SYSTEM menu. Checking of the valve wiring and sensor wiring are done separately.

2.3.3.1 Do Wire Check

The controller will check each valve wire and show its findings on the display:

```
Valves: VsVVVsoo
starting at top
```

The V sign means the valve was installed correctly, s means the wire is shorted, and o means that there is nothing connected to that valve position. The valve positions start at the top of the connector. Looking at the connector, the display above means:

V 1st position, Valve wired OK
s 2nd position, Wires shorted
V 3rd position, Valve wired OK
V 4th position, Valve wired OK
V 5th position, Valve wired OK
s 6th position, Wires shorted
o 7th position, Not connected to valve
o 8th position, Not connected to valve The user will not be able to assign station numbers to valves with shorted wires. If the user wants to ignore the short for now, then he/she should remove the shorted pair from the connector. The repair can be made and the number assigned later. Alternatively, it may be recognized that the user may intentionally create shorted valve wire pairs at the valve end, and the controller may be programmed to recognize removal of these shorts, exposing either a connected valve or open wire (station).

Valve positions showing no connection may be unused, or may indicate a broken wire. The controller does not know whether the user is simply not using all eight valves, or if the wiring is faulty. The user will need to decide if any action is called for in those cases.

The display is constantly being updated. As a faulty wire is repaired, the display will change to show a good connection. When all positions that have valves are reading "V", the user should then press the OK key. The user may of course press STOP at any time to abandon wire checking.

2.3.3.2 Assign Station Numbers

Setup Station allows the user to assign station numbers to the valve positions. The first display reads:

```
View Current
Station IDs?
```

The default ID is:

```
Current ID (from
TO?): 12345678   OK
```

The next screen reads:

```
Enter new
Station IDs?
```

If the user wants to change the station ID numbers, he/she press OK. The next screen reads:

```
5 stations
wired: ID all 5?
```

The controller display now reads:

```
Stn #s: --------
Unplug #1 to ID!
```

The actual station identification is done by visiting each valve location. The user should unplug the waterproof connector from the valve that he wants to be station #1 and then after 2 seconds plug it in again. Unplugging and replugging the wires at the valve will cause the controller to automatically assign station #1 to the pair of wires that is currently connected to that valve. The display shows valve numbers as the user assigns them. For example, if the pair of wires that come from the valve that the user wants to be station #1 are physically located in the third position down from the top on the valve wire terminal strip in the controller housing, then the display would read:

```
Stn #s: --1----
Unplug #2 to ID!
```

The user should now unplug and replug the waterproof connector from the valve that he/she wants to be station #2. The user should repeat this process until all the stations with wires attached have been assigned. During this process, the display shows the stations that have been assigned (indicated by numbers), along with those that are still unassigned (indicated by "—" signs):

```
Stn #s: 35142---
SAVE new ID ?
```

When all valves with wires attached have been assigned numbers, the user is asked if he wants to "SAVE new ID?" In no wires are attached to one or more of the terminal strips (or if there are wires attached, but there is a break in one of the wires causing an "open" condition), the controller will automatically assume that the user does not want to assign station numbers to the open terminals. If the user later adds wires (or repairs "open" wires), then he/she can go back into the SYSTEM SET UP mode and assign valve numbers to them.

After assigning numbers to all the valve connected to the controller, the user can then check the operation of the valves manually by using the MANUAL MODE.

2.4 HOW TO ENTER WATERING SCHEDULES

2.4.1 Schedule Set Up Types

There are six possible Watering Programs or Schedule Set Ups that can be used when programming the irrigation controller in accordance with the present invention. Each of these setups, in turn, has a REGULAR and an ALTERNATE version, so that the user can experiment with different programs without losing his/her original programs. This gives the user unparalleled scheduling flexibility.

The ALTERNATE Watering Set Ups can be used to program an alternate watering schedule for special situations such as plant establishment periods, or for setting up alternate trial schedules without having to alter the regular set ups for the controller. Functionally the Alternate Set Ups are identical to the regular set ups, and all the settings available in the regular set ups are available in the alternate set ups as well.

Of the six types of set ups, four of them are Basic Watering Setups that can be run by themselves. The last two are Optional Add-On Setups that can be run in combination with any one of the basic setups, but cannot be run by themselves. The choices for Basic watering Setups appear on the screen in the following orders:

```
SET SCHEDULES:          SET SCHEDULES:
Use Mini?      OK   OR  Use Autosplit?   OK SET SCHEDULES:
Use Ration?    OK
```

The two choices for Optional Add-On Setups are:

```
SET SCHEDULES:          SET SCHEDULES:
Use One-Time?  OK   OR  Use Special?     OK
```

When the user first selects SET SCHEDULES or SET ALT SCHED., the controller will show all six set up types in the above order. The user should select the BASIC SETUP that he/she wants to use for scheduling his/her irrigation system.

If the user wants to program any OPTIONAL ADD-ON SETUPS to take advantage of the controllers unique ONE-TIME soak and SPECIAL cycle features, then he/she should enter BASIC SETUP first, then come back to the SET SCHEDULES or ALT SCHED. mode and choose the appropriate ADD-ON SETUP (i.e., ONE-TIME, or SPECIAL).

2.4.1.1 The MINI Set Up

The user should select the MINI SETUP if his/her irrigation installation needs only the basic watering requirements of:
* What time to start watering
* How long to water
* How often to water If the MINI SETUP is selected then only one start time is available for each valve. After the start time for the first valve has been set, the start times for each of the other valves will be sequential. The MINI SETUP is very simple and easy to enter into the controller, but some of the more sophisticated features of the controller like split cycles are not available if this setup mode is chosen.

If the user wants to use split watering times, odd/even rationing syringe cycles, periodic soak cycles, or if the user wants independent control of each individual station, then the user should select one of the other three basic setups.

Table 3 is a Watering Chart that the user can use for recording the information needed for the MINI Set Up. Answering the questions on the chart and then entering them into the controller with the SET SCHEDULES Mode will help the user to get a better overall picture of what he/she is doing until he/she gets accustomed to the controller's self-prompting data entry screens. The Watering Chart will also be useful for keeping records of how a controller(s) is (are) programmed.

TABLE 3

| Sample "MINI SET UP" Watering Chart | |
|---|---|
| B) Water Cycle: | |
| Water on specific days of the week? NO | |
| Water every "so many" days? YES | |
| VALVE #1 SETTINGS | VALVE #8 SETTINGS |
| 100% Watering Dur. = 0 hrs + 20 min. | 100% Watering Dur: = 4 hrs + 00 min. |
| Watering Day Cycle = | Watering Day Cycle = |

TABLE 3-continued
Sample "MINI SET UP" Watering Chart

B) Water Cycle:
Water on specific days of the week? NO
Water every "so many" days? YES

| VALVE #1 SETTINGS | ... | VALVE #8 SETTINGS |
|---|---|---|
| Every 2 days | | Every 10 days |
| {OR} | | {OR} |
| Watering Day Cycle = | | Watering Day Cycle = |
| M W F | | Saturday |
| Every: | | Every: |
| 1 week | | 2 weeks |
| Start Time = | | Start Time = |
| 5:30 am | | Sequential |

2.4.1.2 The AUTOSPLIT Set Up

The AUTOSPLIT Set Up will meet the user's needs for most watering situations. The user can use this setup to program multiple watering cycles by automatically splitting the total (100%) watering duration (1 minute to 4 hours) that he/she sets into a number of short "Split Cycles" for erosion control and better water penetration. The controller automatically inserts the optimum length of each split ON cycle (ranging from 1 minute to 60 minutes), and the minimum length of time that the water is to remain OFF before the next split ON cycle for that station (ranging from 0 minute to 60 minutes). These maximum ON and minimum OFF times are determined from a built-in lookup table (Table 1 of Section 1.4.1) that has values calculated from the site information (soil type, sprinkler type, and terrain) entered in SETUP SYSTEM. The user can modify these maximum ON and minimum OFF times if desired.

With the AUTOSPLIT SETUP each station can be programmed with different splits, and even different watering day cycles. However, all valve stations will always operate sequentially to insure that each valve has sufficient pressure to operate at maximum efficiency. The user need only choose one start time for the first active station and the controller automatically calculates sequential start times for all the other active valves for each split ON time.

Normally valves will turn on one after another, except for days when only a few valves are active and the user has programmed a Minimum OFF time that is longer than the total duration of the active valves. In such cases, the next ON time will be delayed until that particular valve has been off for at least the Minimum OFF time. For days when most of the valves are active, the length of time between split ON times for any one valve is usually greater than the Minimum OFF Time, so that there are no delays between stations. Of course, if the user wants multiple repeat ON times without any delays between starts, then he/she can always set the Minimum OFF time to zero.

In cases where there are certain times during the day when the user does not want any watering to occur, the AUTOSPLIT Set Up allows the user to enter an "Excluded Time" period during which no watering will occur. Thus, if the user is irrigating a park where there is pedestrian traffic from 7:00 am to 6:00 pm, he/she could designate this time period as an Excluded Time, and any watering cycles that were not completed before 7:00 am would automatically be stopped at 7:00 am and resumed again at 6:00 pm. A sample "AUTOSPLIT SETUP" watering chart is contained in the following Table 4.

TABLE 4
Sample "AUTOSPLIT SETUP" Watering Chart

A* Water Cycle:
Water on specific days of the week? NO
Water every "so many" days? YES

| STATION #1 SETTINGS | ... | STATION #8 SETTINGS |
|---|---|---|
| 100% Duration: | | 100% Duration: |
| 0 hr: 20 min | | 1 hr: 00 min |
| Split ON Time | | Split ON Time |
| 0 hr: 5 min | | 0 hr: 15 min |
| Split OFF Time | | Split OFF Time |
| 0 hr: 30 min | | 0 hr: 30 min |
| Day Cycle = | | Day Cycle = |
| Every 2 days | | Every 10 days |
| Excluded Period | | Excluded Period |
| FROM: 7:30 am | | FROM: 7:30 am |
| TO: 5:30 pm | | TO: 5:30 pm |
| Start Time = | | Start Time = |
| 3:00 am | | Sequential |
| VALVE #1 SYRINGE TIMES | | VALVE #8 SYRINGE TIMES |
| Syr. Months: | | Syr. Months: |
| JJAS | | JJAS |
| Syr. Duration: | | Syr. Duration: |
| 5 min | | 5 min |
| Syringe Period: | | Syringe Period: |
| FROM: 10:00 am | | FROM: 10:00 am |
| TO: 5:00 pm | | TO: 5:00 pm |
| Time between: | | Time between: |
| 1 h + 00 m | | 1 h + 00 m |
| VALVE #1 SOAK TIMES | | VALVE #8 SOAK TIMES |
| Soak Duration: | | Soak Duration: |
| 0 hr: 40 min | | 2 hr: 0 min |
| Every: 14 days | | Every: 30 days |

The user can also specify Syringe Cycles for one or more valves with the AUTOSPLIT Set Up. Syringe Cycles can be set up for summer cooling in hot desert areas, and for frost protection in cold winter areas. If the user chooses to use the Syringe Cycle feature, the controller will ask the user to specify the months in which he/she wants syringe cycles to occur. Whenever Syringe cycles are active, they will run every day in the months that the user has specified. The user can specify a separate duration (of 1-15 minutes for each selected valve) for Syringe Cycles, and the user can also specify the time period during the day when syringes are to occur, along with the time between Syringe Cycles. Syringe cycles can be programmed to occur during Excluded Times, if the user so desires. If a basic watering time for another valve occurs when a Syringe Cycle is scheduled, then the regular watering will be temporarily interrupted to complete the Syringe Cycle and then the remainder of the regular watering for the interrupted valve will be completed. This insures that the Syringe Cycles will always occur exactly when the user wants them without changing the total duration of any of the basic watering cycles.

The user can also specify Soak Cycles for one or more valve stations with the AUTOSPLIT Set Up. Soak Cycles can be used for watering in fertilizer, for periodically leaching salts in drip applications, and for providing extra cycles for deep watering trees and shrubs. Soak Cycles ignore soil sensing and the Budgeting Factor, and they use the same split criteria (maximum On, and minimum OFF times) as the basic AUTOSPLIT Set Up. The controller automatically calculates the soak duration needed to water to a depth of two to three feet based on the entered site information. The lookup table used in the preferred embodiment of the controller is given in Table 5. If the user should program a Soak Cycle for a particular valve that occurs on the same day as one of the basic watering cycles for that valve, then the Soak Cycle automatically overrides the basic watering cycle on that day. This feature insures that the user will not miss a needed deep Soak Cycle because he/she inadvertently programmed that cycle at a time that happens to overlap a normal basic watering cycle.

2.4.1.3 The RATION Set Up

The RATION SETUP can be used in cases where there is mandatory "odd/even" water rationing in effect in the user's area. This setup is similar to the AUTOSPLIT SET UP, except that it allows the user to specify whether he/she wants watering to occur on "odd" or "even" days of the month. The controller automatically keeps track of the dates for each different

TABLE 5

Soak Duration Lookup Table

| SOIL TYPE | SPRINKLER TYPE | PRECIP (IN/HR) | MAX ON (MINS) | # OF SPLITS | SOAK DURATION (MINS) | SOAK DEPTH (INS) | MAX ON (MINS) | # OF SPLITS | SOAK DURATION (MINS) | SOAK DEPTH (INS) |
|---|---|---|---|---|---|---|---|---|---|---|
| Sand | Flat Spray | 3.0 | 3 | 7 | 21 | 38 | 3 | 7 | 21 | 38 |
| Sand | Lawn Spray | 2.0 | 5 | 7 | 35 | 42 | 5 | 7 | 35 | 42 |
| Sand | Rotor Head | 1.2 | 8 | 7 | 56 | 41 | 8 | 7 | 56 | 41 |
| Sand | Impact Head | 1.2 | 8 | 7 | 56 | 41 | 8 | 7 | 56 | 41 |
| Sand | Stream Spray | 1.2 | 8 | 7 | 56 | 41 | 8 | 7 | 56 | 41 |
| Sand | Microspray | 0.9 | 10 | 7 | 70 | 38 | 10 | 7 | 70 | 38 |
| Sand | Drip Emitter | 0.3 | 30 | 7 | 210 | 38 | 30 | 7 | 210 | 38 |
| Loam | Flat Spray | 3.0 | 6 | 6 | 36 | 38 | 3 | 12 | 36 | 38 |
| Loam | Lawn Spray | 2.0 | 9 | 6 | 54 | 38 | 5 | 12 | 60 | 42 |
| Loam | Rotor Head | 1.2 | 16 | 6 | 96 | 40 | 8 | 12 | 96 | 40 |
| Loam | Impact Head | 1.2 | 16 | 6 | 96 | 40 | 8 | 12 | 96 | 40 |
| Loam | Stream Spray | 1.2 | 16 | 6 | 96 | 40 | 8 | 12 | 96 | 40 |
| Loam | Microspray | 0.9 | 20 | 6 | 120 | 38 | 10 | 12 | 120 | 38 |
| Loam | Drip Emitter | 0.3 | 60 | 6 | 360 | 38 | 30 | 12 | 360 | 38 |
| Clay | Flat Spray | 3.0 | 3 | 16 | 48 | 36 | 2 | 16 | 32 | 24 |
| Clay | Lawn Spray | 2.0 | 5 | 16 | 80 | 41 | 3 | 16 | 48 | 24 |
| Clay | Rotor Head | 1.2 | 8 | 16 | 128 | 39 | 5 | 16 | 80 | 24 |
| Clay | Impact Head | 1.2 | 8 | 16 | 128 | 39 | 5 | 16 | 80 | 24 |
| Clay | Stream Spray | 1.2 | 8 | 16 | 128 | 39 | 5 | 16 | 80 | 24 |
| Clay | Microspray | 0.9 | 10 | 16 | 160 | 36 | 7 | 16 | 112 | 26 |
| Clay | Drip Emitter | 0.3 | 30 | 16 | 480 | 36 | 30 | 16 | 480 | 36 |

The AUTOSPLIT Set Up allows the user to review the settings that he/she has entered. The controller will tell the user when he/she has finished entering the required information, and then it will ask the user if he/she wants to review any settings. Answering NO will skip the entire settings review process. Answering OK will give the user a series of questions to answer. Each question will allow the user to review one group of settings. There are questions for reviewing the Basic Set Up (100% Watering Duration, Number of Split Cycles, the Split ON and OFF settings, the Watering Day Cycle, and the Start Time and Excluded Times), the Syringe Set Up, and the Soak Set Up for all active stations.

When the user is finished with the Settings Review, the user is asked if he/she wants to "Review All ON Times?" Just as with the Settings Review, answering NO here will skip the entire ON Times Review process. Answering OK will give the user a few questions to answer relating to the day that he/she wants to review, and the budget factor (normally 100%) that he/she would like to use for his/her review. Once the user has answered these questions then he/she will be able to review the ending time for the day and every split (or unsplit) ON time during the selected day for each active station. This will allow the user to know in advance exactly when each station will turn on, and it will also tell the user the duration for each ON time, the type of ON time (Basic Watering Cycle=ON, Syringe Cycle=SYR, or Soak Cycle=SOAK), and the Split Cycle Number (for example, ON #2 of 4). Because the controller automatically prompts the user with all the right questions, it is easy to use these considerable capabilities.

month that the RATION SETUP is in effect, and only allows watering on either "odd" or "even" watering days as appropriate. In this setup the user can specify the interval between watering days with the obvious limitation that the time between watering days must always be divisable by two to avoid disrupting the odd-/even pattern. In other words, the user can specify watering ever other day, every fourth day, every tenth day, etc., but the user cannot water every third day, every seventh day, etc. All of the other features of the AUTOSPLIT SET UP are available in the RATION SETUP as well. Split Watering Cycles, Excluded Times, Syringe Cycles, Periodic Soak Cycles, and Soil Sensors can all be used in the RATION SETUP.

2.4.1.4 The ONE-TIME Set Up

This simple add-on set up is used for Semi-Automatic Watering and for setting up One-Time Soak cycles for watering in fertilizer or new landscape plantings. Basically with this set up all the user does is enter Durations and Split Cycles for each station and (optional) Excluded Times. The user can either enter normal durations like he/she would for the Autosplit Set Up, or he/she can enter automatically calculated extra long durations (with split cycles for runoff control) for a One-Time Deep Soak cycle. The user does not need to enter a start time for this set up. To use the ONE-TIME Set Up the user goes into the Semi-Automatic Mode and enters the time that he/she wants to start the One-Time Watering, and also the basic set up that he/she wants to use. The controller does the One-Time Watering or Deep Soak Cycle, and then reverts to the basic set up that the user has selected.

2.4.1.5 The SPECIAL Set Up

This add-on setup is for special situations, e.g., lights, fountains, pumps, or for running more than one station at a time. Only stations that have been assigned as SPECIAL in SETUP SYSTEM can be used for the SPECIAL Set Up. Thus, if the user wants to run lights, fountains, or pumps via an optional pump start relay unit, the user needs to complete SETUP SYSTEM before using the SPECIAL setup. Stations that have been assigned as valves in SETUP SYSTEM are skipped in the SPECIAL setup. Conversely, stations assigned as SPECIAL in SETUP SYSTEM are skipped in the Mini, Autosplit, Monthly, One-Time and Ration setups. Like the I.S.C. set up, each station used with the SPECIAL Set Up can be programmed to operate multiple times on scheduled days, and more than one station can operate simultaneously.

2.5 STEP-BY-STEP SETUP SCHEDULES INSTRUCTIONS

After selecting SET SCHEDULES the user sets up the valves in one of the following six ways:

1) Using the "MINI SETUP" Watering Set Up, or
2) Using the "AUTOSPLIT SETUP" Watering Set Up, or
3) Using the "RATION SETUP" Watering Set Up, or
4) Using the "ONE-TIME SETUP" Watering Set Up, or
5) Using the "SPECIAL SETUP" Watering Set Up The user need only to select and enter information for the set ups that are needed for a particular application or job site. If the user needs to enter information for several different types of setups, then he/she must select the appropriate setups one at a time from the SET SCHEDULES menu. If the user wants to add another setup at a later time, then he/she simply selects the setup(s) that he/she wants to add and enters the appropriate information. The user can enter information into all of the setups and still run whichever setup is needed at any particular time when the controller is in RUN STATIONS Mode.

Each of the six types of Set Ups has a regular and an alternate version. For example, the user can enter both an AUTOSPLIT and an ALTERNATE AUTOSPLIT setup, run the ALTERNATE AUTOSPLIT Set Up for a three month plant establishment period, and then switch to running the regular AUTOSPLIT Set Up. Likewise, the user can determine whether or not to actually use ADD-ON ONE-TIME or SPECIAL Set Ups at the time that the user puts the controller into the SEMI-AUTOMATIC or AUTOMATIC RUN Mode. Just because the user chooses a One-Time or a Special Set Up, he or she does not necessarily have to use these setups if site conditions do not require their use at any particular time. The user can turn them "on" and "off" in the SEMI-AUTOMATIC or AUTOMATIC RUN Modes.

The "Mini" and "Autosplit" Valve Setups are next described in detail.

2.5.1 "MINI" Valve Set Up

If the user chooses MINI from the Set Schedules Menu (list of choices) then the display will show the following autoscrolling list of choices:

```
Mini Setup:           Mini Setup:
Review setup ?   OR   Modify setup ?

Mini Setup:           Mini Setup:
Do New Setup ?   OR   EXIT now ?
```

The actual display will depend upon whether or not the user has previously entered a MINI Set Up. The No key is used to switch back and forth between these four screens (if necessary). "Do new setup" is selected by pressing OK.

The user next performs the set up for the valves themselves. The user is required to set up each active valve station by entering three settings for each station:

HOW LONG to water (100% Watering Duration)
HOW OFTEN to water (Watering Day Cycle), and
WHEN to start water (Watering Start Time for first active station)

The user is first asked to set the 100% WATERING DURATION in hours and minutes for Valve Station 1. The display now reads:

```
Stn #1 Watering
Duration=_0h+ 0m
```

The user must now enter the desired watering duration in hours and minutes. The duration that the user enters should be the length of time that the user wants to water under normal circumstances, that is, with a Water Budgeting Factor of 100%. If the user later changes the Water Budgeting Factor when he/she goes into the AUTOMATIC or SEMI-AUTO mode, the 100% duration entered here will be increased or decreased by the Water Budgeting Factor (BF). Thus, a BF of 140% will increase the duration by 40%, while a BF of 60% will decrease it by 40%.

The user can select watering durations from 1 minute up to a maximum of 4 hours by integral minutes. The NO key is used to set or change the hours setting first. The numbers automatically advance every 0.6 second after a 1 second delay. After the user accepts the hours setting by pressing OK, the minutes setting is changed in the same way. For example, if the user wants to water for 1 hour and 20 minutes the display should read:

```
M1 100% Watering
Duration=1hr+20m   O_K
```

If the user enters a duration of 0h+0m, the controller will ask:

```
NO Watering for
Station #1      O_K
```

After the user confirms the minutes for Station 1 by pressing OK, he/she is asked:

```
Use SAME setting
for STATION #2 ?
```

If the user presses OK, the controller automatically displays a confirming screen for Station 2 with the duration that he/she entered for Station 1. If the user wants to use a different duration for Station 2, the user should press NO to get a new entry screen for setting Station 2 hours and minutes.

This pattern is repeated for all eight valves. Each time the user is asked if he/she wants to use the same setting for the next station, and each time the user can either accept or change this setting.

When 100% Watering Durations have been entered for all the active valve stations, the controller asks the user to enter the appropriate Watering Day Cycle for each station. How the user sets the Watering Day Cycle depends upon whether the user selects a Specific Days or an Every "So Many" Days cycle:

```
M* Water Cycle        M* Water Cycle :
Specific days ?   OR  So Many" days ?
```

The display will show the currently selected watering cycle. There are two types of watering cycles. If the user does not want the choice displayed, he or she then presses "NO" or waits 2 seconds and then the other choice will be displayed. The user presses "OK" to select the Water Cycle he or she wants to use.

In most cases watering every "so many" days (for example, every 3 days) gives the most consistent moisture levels for plants. However, in some cases it is necessary to avoid watering on certain days of the week. In those cases, the user should choose a Specific Days Water Cycle (for example, Monday-Wednesday-Friday). The Water Cycle that is choosen will apply to all the active valves for the MINI SETUP. The user cannot mix Specific Days and "So Many" Days Water Cycles.

If the "specific days" method was chosen, then the display reads:

```
Stn 1 ON: -------
ON days: MON ?   O_K
```

After a delay the MON? automatically changes to TUE? and the days continue to advance automatically. The user needs only to press OK for the days on which he/she wants to water. The controller automatically assumes NO watering is wanted if the NO key or automatic advance is used. If the user presses OK for Monday, the display reads:

```
Stn 1 ON: M------
ON days: TUE ?   O_K
```

The day(s) selected is (are) determined by its (their) place on the top line of the display. For example, the first T represents Tuesday, but the second T represents Thursday. Also the first S represents Saturday, and the second S represents Sunday. When all the days have been entered, the user is asked to confirm (or reject) the day settings. For example, if Monday, Wednesday, and Friday is entered, the display reads:

```
Stn 1 100%= 0h+20m
Every M-W-F--  O_K
```

In the specific case that only one day is selected, the controller asks if the user wants to water on that day every week, every other week, etc. The display reads:

```
Stn 1 100%= 0h+20m
Every 1 wk
```

The user can select a one to nine week repeat cycle interval. This, in essence, allows the user to water every 7, 14, 21, 28, 35, 42, 49, 56, or 63 days on a specific day of the week.

If the "Specific Days" method was not chosen, the display shows the "every So Many Days" cycle:

```
Stn 1 100%= 0h+20m
Every 1 days
```

As usual, the user must use the "NO" key (or let the numbers automatically advance) to change the setting and the "OK" key to select the desired one. "Every 1 days" means every day, "Every 2 days" means every other day, etc. The user can select watering day cycles from every day to every 90 days in one day increments.

After setting the watering day cycle for Station #1, the user is asked "Use SAME setting for Station #2?" The user can either do this or change the setting as desired. Thus, the user can water every day for Station #2 even though Station #1 waters every three days.

After setting the Day Cycle, the user is asked if he/she wants an Excluded Period, and is then asked for a Start Time for the controller generated watering sequence. Excluded Periods are a feature of the irrigation controller in accordance with the present invention. They permit a user to specify when NO watering is to occur. The user is first asked if he/she wants an Excluded Period:

```
Do you want an
Excluded Period?
```

If the user presses NO, all other questions on Excluded Periods are skipped. If the user does want an Excluded Period, he/she is then first asked to define the start time for the period:

```
Excluded Period:
12:Midn
```

The user should actuate the NO key (or let the numbers automatically advance) to set the beginning or "Excluded FROM Time" for his/her excluded time "window." As the user (or the controller) advances the hour, the am and pm indicator also changes. The user should be sure that the hour reads "am" if he/she wants the Excluded Time Interval to start in the morning (am), or else "pm" if the user wants it to be in the afternoon or evening (pm). when the user has set the correct am/pm hour, he/she should then press OK and set the minutes after the hour for the "Excluded FROM" Time. The user is next asked to enter the ending or "Excluded TO Time" for his/her excluded time "window":

> Excluded Period:
> 10:00am-10: am

The "Excluded TO" time can never be before the "Excluded FROM" time, so the default valve for the "Excluded TO" time is always the same as the "Excluded FROM" time. The user employs the NO key (or lets the numbers automatically advance) to set the "Excluded TO" time to meet his/her special needs. For example, if the user was irrigating a public park or golf course where no watering was wanted during times when people were likely to be playing on the turf areas, then the user might set an Excluded Time Interval FROM 7:00 am TO 7:00 pm.

The user is next asked to enter the Start Time for the Mini setup. The display shows:

> Start Time each
> ON day = 12:Midn

The default Start Time is always 12:Midnight, since this is the earliest possible hour that the controller can start watering. The user should change the hours by pressing the "NO" key until the hour desired (for example, 6:pm) is displayed (or let the controller automatically advance the hour), and then press "OK." The am/pm setting automatically changes as the user changes the hours, and Midnight and Noon are indicated for easy identification. If the user selects either Midnight or Noon as a Start Time, then the display changes to read:

> Start Time each
> ON day=12:00am    For midnight; OR

> Start Time =
> ON day = 12:0pm   For noon

The user should change the minutes setting if desired by pressing the "NO" key (or letting the numbers auto-scroll) until the time wanted is displayed (for example, 6:15 pm), and then press "OK." The display then reads:

> Start Time = each
> ON day=6:15pm

Because the controller automatically calculates the start times for all the other valves, the Mini valve set up is now complete. The valves will always operate sequentially without overlap even if the user later sets the Water Budgeting Factor up to its maximum of 200%.

The display now reads:

> Mini setup:
> SAVING new setup

After a 2 second delay the following auto-scrolling menu appears:

> Mini Setup:          Mini Setup:
> Review Setup? OK  OR  Modify Setup? OK

> Mini Setup:          Mini Setup:
> Do New Setup? OK  OR  EXIT now? OK

If the user selects "review setup" from the menu, he/she can view, but not change, some or all of the current settings. "Modify Setup" also allows the user to step through some or all of the settings, but pressing NO when in modify mode allows the user to be back and change the currently displayed setting.

If the user elects to review the settings, the display will read:

> Review
> Basic setup ?

The user should confirm that he/she wants to review the basic setup by pressing "OK." The display will then show the 100% Watering Durations, split cycle criteria and watering Day Cycles for each of the valves in turn. Each screen has a blinking "$O_K$" character at the end, to remind the user that he/she needs to press OK to see the next screen. Depending on whether the "Specific Days" or "So Many" Days mode is selected, the display format will vary as shown below:

> Stn 1 100%=1h+20m       for specific days with multiple
> every M-W-F S  OK       days per week selected

OR

> Stn 1 100%=1h+20m       for specific days with only one day
> on Mon @2wks  OK        selected, where @2 wks = every 2 wks

OR

> Stn 1 100%=1h+20m       for "so many" days mode
> Every 2 days  OK

The user should press "OK" to review the settings for the next valve station. The user should keep pressing "OK" to view the settings for all the active valves. Pressing "NO" while in this "review" mode will allow the user to jump to the next review item. For example, pressing "NO" when reviewing durations, jumps to the day cycle review screens. The user cannot change any settings in the review mode. To change settings the user needs to select Modify Setup or Do New setup to start the MINI setup over again. Modify Setup works like Review Setup, except that each item has a blinking "?", and pressing "NO" allows the user to go back and change the displayed setting.

The user is next asked if he/she wants to review the controller generated start time sequence for all the active valve stations:

> Review daily schedule ?

If the user wants to skip this start time review, then he/she should press "NO". The user will then be returned to the Review/Modify/Do New Setup EXIT now screen. If the user decides to proceed with reviewing the daily schedule, then he/she will be asked the following question:

> Water Budget to use = 100%

The user should press "OK" to confirm a Budget Factor of 100%, or use the "NO" key to change the Budget Factor to the desired value. The Budget Factor can range from 10% to 200% in 10% increments. The user is next asked to set which day he/she would like to review. If the controller is in "So Many" Days mode, the screen reads:

> Review for Day = #1    where day #1 is today, day #2 is tomorrow, etc.

whereas in "Specific Days" mode the screen reads:

> Review for Day = MON

In either case, the user should select the appropriate day number or name by pressing the "NO" key, and then hitting "OK" to confirm his/her selection. In the "So Many" Days mode, the controller will always water on day #1. For example, if the user has set up his/her program for every other day (every 2 days), day numbers 1, 3, 5, etc. will be active watering days, while no watering will occur on day numbers 2, 4, 6, etc. Likewise, for every third day watering (every 3 days), day numbers 1, 4, 7, etc. will be active watering days, and no watering will occur on the days between these active watering days (i.e., day numbers 2, 3, 5, 6, etc.).

In the case of "Specific Days" the user is then asked an additional question:

> Review MON for week = #1

Suppose that the user has set up his/her schedule for watering on Monday every other week. The controller will always water the first week, so the active watering weeks will be week #1 and week #3, while no watering will occur for week #2 and week #4.

After the user has set the budget and day for review, he/she will get the following message screen:

> Press OK to see ending time  OK

When the user presses OK, the following screen is displayed:

> Watering ends at 6:17 pm  OK

After pressing OK again, the following screen appears:

> Press OK for to see each ON time  OK

The user should press "OK" and the Start Time for the first active valve will be displayed as follows:

> Stn 1 ON 1 of 1 =
> 1h+20m @ 6:15pm  OK

The user should Press "OK" again and the controller generated start time for station #2 will be displayed:

> Stn 2 ON #1 of 1 =
> 0h+15m @ 7:35pm  OK

The user should keep pressing "OK" to view the start times for all the other valve stations. When the review is finished the display reads:

> Mini setup:
> Review setup ?  OK

The user should press "OK" to start the review process over again.

2.5.2 AUTOSPLIT VALVE SET UP

This station setup is called AUTOSPLIT because the 100% watering durations that the user sets are split into shorter repeat cycles whose length is automatically determined based upon user entered information about the site. The controller automatically calculates the next available start time for each successive station and for each additional split watering cycle, starting at the start time that the user specifies and automatically skipping over any specified "excluded time" when no watering is desired. This automatic sequential start time generation allows the user to get maximum utilization of the time available for irrigation, and it prevents hydraulic problems that could occur if several station run times were to overlap.

Besides Split Watering Cycles and excluded watering times, this setup has many other powerful features. The user can set a different watering day cycle for every valve station if he/she so desires, can program multiple syringe cycles for any station for any desired months of the year, can program periodic deep soak cycles for any station, and with optional soil sensors can program "soak" and "dry" limits for integrated soil moisture sensing.

With all these powerful features, the AUTOSPLIT setup is still easy to program because the controller prompts the user with all the right questions, and gives him or her the best guess "default" answers for all the questions. Help is available every step of the way merely by pressing the HELP key. After the user has entered all the information, he/she can then review all the settings that were entered and can also review the repeat start times for all the valve stations that the controller automatically calculates.

If the user wants to experiment with making changes to the AUTOSPLIT setup without losing his or her original setup, there is even an ALTERNATE AUTOSPLIT setup available. The "AUTOSPLIT" and "ALTERNATE AUTOSPLIT" SETUPS are done in exactly the same way.

Before proceeding with entering the schedule by station the user should consider what he/she wants each station to accomplish, and what kind of plants it will be watering. A station represents a valve and a moisture sensor, if sensors are being used. If the user assigns station numbers (as is suggested in Setup System) according to the desired types of watering schedules for the different types of plant materials, then entering these different types of schedules becomes much easier. That is because the controller asks the user if he/she wants to use the same setting for the next station. This allows information entered for one station to be copied to the next station. If stations with similar types of schedules are grouped together by station number, this makes it much easier for the user to enter the necessary information.

For example, assume that stations 1 through 5 are turf stations that the user wants to water on Monday, Wednesday, and Friday, and stations 6 through 8 are shrub stations that the user wants to water on Saturday every other week. Once the user enters the 100% Duration and the Watering Days Cycle for Station #1, the displayed 100% Durations and Watering Days will initially be the same for Stations 2 through 6, and the start times for Stations 2 through 6 will be sequential. Thus, the default Start Time for Station #2 will be the ending time for Station #1, etc. When the user changes to a different Watering Day Cycle for Station #6 (instead of accepting the default cycle from Station #1), the Start Time that the user enters for the AUTOSPLIT setup automatically becomes the start time for the first active station on the new Watering Day Cycle (i.e., Station #6), and the automatically generated start times for Stations 7 and 8 are sequential from this start time.

The information needed to set up the stations is summarized in the Autosplit Watering Chart (Table 6). For most of the items on the Watering Chart, the stations are set up one after another, following the Watering Chart horizontally from row to row. When questions pertaining to each item have been answered for all eight stations, the controller moves down to the next row in the Watering Chart. However, where several different items are related, the related questions are all asked for the first station and then the same series of questions is repeated for each subsequent station in turn.

The first item that needs to be set for each station is the 100% WATERING DURATION. The display screen for Station #1 reads:

```
Stn 1 100% Watering
Durat on= 0h+ 0m
```

The user should set the total length of time in hours and minutes that he/she wants Station #1 to run for each irrigation day. The user should keep in mind that each start time can be split into shorter "split" watering times for erosion and runoff control.

The irrigation controller permits the user to set a 100% Duration anywhere from 1 minute to 4 hours. If the user sets the BUDGETING FACTOR to anything other than 100% when the controller is in the RUN or SEMI-AUTO mode, then the 100% Duration set here will automatically be multiplied by the Budgeting Factor. Depending on whether the Budgeting Factor is greater than or less than 100%, it can increase or decrease the actual total duration for each station. Thus, with a 100% Duration setting of 40 minutes, the actual total duration would be 60 minutes with a Budgeting Factor of 150% or 20 minutes with a Budgeting Factor of 50%.

Even though the total watering duration is increased when the user increases the Budgeting Factor, there is no danger of runoff or erosion with the controller in accordance with the present invention because individual Split Watering Cycles will never be longer than the maximum ON time that the user designates (see below). When the user increases the Budgeting Factor, then more Split ON Times will occur, each separated by the minimum OFF time that the user has specified (see below). Likewise, when the user decreases the Budgeting Factor, then fewer Split ON Times will occur but each Split ON Time will never be longer than the maximum Split ON time that the user has designated (although the last Split ON Time may be shorter than the maximum ON time if the 100% Duration does not split into an even number of Split Watering Cycles).

The user should also be aware that by use of soil sensors the actual total run time for any given station may be shorter than the 100% Duration that is set. The soil sensors can terminate a watering cycle in the middle, or eliminate a split start time completely, if there is adequate moisture in the soil.

After the user has set the 100% Duration for Station #1, he/she will be asked:

```
Use SAME setting
for Station #2 ?
```

Pressing NO allows the user to change the setting, and pressing OK takes the user to the confirm screen for Station #2:

```
Stn 2 100% Watering
Duration = 1h+5m  OK
```

After the 100% Duration settings have been entered for all eight stations, the next display deals with SPLIT WATERING CYCLES and reads:

```
Press O_K to split
using site info  O_K
```

This screen is for information only, since splits are mandatory. Split cycles divide the 100% Watering Duration split into several shorter watering cycles. The Split Watering feature is useful for newly seeded areas, slopes, or anywhere heavy soils exist to reduce runoff and erosion. If the user presses NO, a help message automatically appears that explains splits and how they work. After OK is pressed the next screen reads:

```
Stn 1: View
Site info ?
```

This allows the user to view (but not to change) the site information (terrain and soil type, and sprinkler type) entered in Setup System. A typical site info screen might be:

```
Stn 1: hilly loam,
lawn sprays  O_K
```

If the user presses OK (or NO) in response to this question, the display jumps to the next screen:

```
Using site info
to auto-split...
```

This screen tells the user that the controller is going to use the site information to automatically enter the best maximum ON, minimum OFF, and number of splits for the current station. A typical example for the next screen is:

```
Stn 1: 5 splits
@ 3m ON, 30m OFF  O_K
```

If the user presses OK, the automatically generated split criteria are confirmed. If the user wants to change these settings, he/she can press NO. This allows the user to directly change first the maximum ON time, then the minimum OFF time, followed by a new confirming screen. The sequence of screens for this direct modification process is as follows:

```
Stn 1 100% = 0H+15m         Stn 1 100% = 0h=15m
@ _3m ON, 30m OFF           @ 5m ON, 30m OFF
```

```
Stn 1: 3 splits
@ 5m ON, 30m OFF  O_K
```

Each Split ON Time can range from 1 minute to 60 minutes (for drip applications), and it is not necessary for the Split ON Time to divide evenly into the 100% Duration that the user has set. If the Split ON Time does not divide evenly into the 100% Duration, the controller automatically shortens the length of the last Split ON Time. For example, if the user's 100% Duration were set at 1 hour+5 minutes (65 minutes) and if the user entered a value of 10 minutes for the Split ON Time, then the controller would run six ten minute Split ON Times and then the last ON time would only be 5 minutes. The automatically entered Split ON Times for various combinations of soil, terain, and sprinklers built into the controller are as shown in previous Table 1 of Section 1.4.1.

The split criteria confirming screen tells the user how many Split Watering Cycles the controller will perform with the 100% Watering Duration and Split ON Time that has been entered. If the user wants to change the number of watering cycles, he/she can do so by pressing NO. The user will be taken back to the screen for directly entering the Split ON Time, and the user can decrease the number of Split Watering Cycles by increasing the Split ON Time, or the user can increase the number of split cycles by decreasing the Split ON Time. For example, if the 100% Duration was 1 hour+5 minutes (65 minutes) and the user changed the Split ON Time from 10 minutes to 5 minutes, then 13 Split Watering Cycles would result instead of 7. If the displayed number of split ONs is acceptable, the user then presses OK.

The Split OFF Time is the minimum time between Split ON Times. The user should set the Minimum OFF Time for long enough to allow the water from the Split ON Times to soak into the soil. Usually the pre-set valve of 30 minutes is adequate, but the Minimum OFF can be set anywhere from 0 to 60 minutes.

The Watering Day Cycle is set up next. Like in the Mini setup the user is first asked whether to use "Specific Days" or "So Many Days". If the "Specific Days" method was chosen, then the display reads:

```
Stn 1 ON: -------
On days: MON ?  O_K
```

The user should press the keys to select which days to turn on for station 1:

```
NO    Make the displayed day an OFF day and move
      to the next day
OK    Make the displayed day a watering day and
      move to the next day
```

Just as with the MINI setup, the day selected is determined by its place on the display. For example, the first T represents Tuesday, but the second T represents Thursday. Thus, M--T-S- would designate Monday, Thursday, and Saturday as the desired watering days. Also, like with the Mini setup, the days automatically advance, so that the user only needs to use the OK key.

In the specific case that only one day is selected, the controller then asks the user if it is wanted to water on that day every week, every other week, etc. The display reads:

```
Stn 1 ON: M------
MON every 1 wks
```

The user can select a one to nine week repeat cycle. This in essence allows the user to water every 7, 14, 21, or 28, 35, 42, 49, 56, or 63 days on a specific day of the week.

If the "Specific Days" method was not chosen, the display shows the "Every So Many Days" cycle:

```
Stn 1 100% = 1h+ 5m
Every 1 Days
```

The user should select how many days are wanted between watering says for station 1. "Every 1 days" means every day, "Every 2 days" means every other day, etc. Watering day cycles can be anywhere from 1 to 90 days in increments of 1 day.

After setting the Day Cycle, the user is asked if he/she wants an Excluded Period, and is then asked for a Start Time for the controller generated watering sequence. Excluded Periods are a feature of the irrigation controller in accordance with the present invention. They permit a user to specify when NO watering is to occur. The user is first asked if he/she wants an Excluded Period:

```
Do you want an
Excluded Period?
```

If the user presses NO, all other questions on Excluded Intervals are skipped. If the user does want an Excluded Period, he/she is then first asked to define the start time for the period:

```
Excluded Period:
12:Midn
```

The user should actuate the NO key (or let the numbers automatically advance) to set the beginning or "Excluded FROM Time" for his/her excluded time "window." As the user (or the controller) advances the hour, the am and pm indicator also changes. The user should be sure that the hour reads "am" if he/she wants the Excluded Time Interval to start in the morning (am), or else "pm" if the user wants it to be in the afternoon or evening (pm). When the user has set the correct am/pm hour, he/she should then press OK and set the minutes after the hour for the "Excluded FROM" Time. The user is next asked to enter the ending or "Excluded TO Time" for your excluded time "window":

```
Excluded Period:
10:00am-10: am
```

The "Excluded TO" time can never be before the "Excluded FROM" time, so the default valve for the "Excluded TO" time is always the same as the "Excluded FROM" time. The user employs the NO key (or as the numbers automatically advance) to set the "Excluded TO" time to meet his/her special needs. For example, if the user was irrigating a public park or golf course where no watering was wanted during times when people were likely to be playing on the turf areas, then the user might set an Excluded Time Interval FROM 7:00 am TO 7:00 pm.

The next screen lets the user enter the Start Time for the AUTOSPLIT automatically generated watering sequence. All the user needs to do is enter one Start Time, and the controller automatically calculates the start times for all stations for each Split ON Time, taking into account Excluded Times, and Minimum OFF times.

```
Start Time each
ON day = 12:Midn
```

The earliest Start Time that the user can set for the day's watering is at 12:Midnight, so the controller automatically gives this time as the default Start Time. The maximum amount of time available for watering each day is 23 hours and 59 minutes. Accordingly, if long 100% or Soak (see below) Watering Durations or a long Excluded Period (which decreases the amount of available time for watering) have been set, the user must set the Start Time early enough to complete the day's watering before 11:59 pm. If the user sets the Start Time too late, then an error message will result when the setup is completed. If the user wants to water only in the middle of the night, then the Start Time should be set at 12:Midnight and a long excluded time such as FROM 3:00 am TO 10:00 pm would be set. What results is watering from midnight to 3:00 am with the rest of the daily watering being finished from 10:00 pm until all the split ON times have been completed. This accomplished the same thing as watering from 10:00 pm on one day until 3:00 am on the next (which is something that you cannot do with the controller because it treats each 24 hour entity starting at 12:00 midnight as a separate day).

After setting the Start Time for the basic watering schedule, the user is next asked if he/she wants Optional Syringe Cycles:

```
Do you want
Syringe Cycles ?
```

The user may set multiple Syringe Cycles with 1-15 minutes per cycle and with the ability to specify which part of the day and which months of the year that syringing is to occur. Thus, the user is able to set cooling syringes for desert areas to automatically syringe for say 5 minutes every hour from 9:00 am until 6:00 pm every day during the hot months of July, August, and September.

The controller further performs optional Soak Cycles. The question is asked:

```
Do you want
a Soak Cycle ?
```

The user may set up periodic Soak Cycles for deep watering trees in lawns, leaching salts in drip applications, etc. These Soak Cycles will permit the user to program durations of up to 8 hours per valve with repeat cycles ranging from once a week to once every 63 days (in Specific Days mode) or from 1 day to 90 days (in "So Many Days" mode). The user is able to program different Soak cycles for each different valve station. The first screen reads:

```
Stn 1: Do Soak?
(100%=0h+15m)    OK
```

Like with split cycles, the soak duration is automatically calculated based on the user entered site into.

The following screen tells the user that this is going to occur:

```
Use site info
to calculate    OK
```

If the user presses NO, a HELP message explains further what the controller is doing. Pressing OK gives the user the following typical screen:

```
Stn 1 SOAK=2h+8m
with 16 8m ONs    OK
```

If the user does not like the controller calculated soak duration, he/she can press NO and then modify the hours and minutes as desired.

After the Syringe and Soak Cycle information has been entered (or skipped if the user does not want to use these features), all the information that the controller needs to automatically calculate the AUTOSPLIT watering schedule will have been entered. If the user's set up is good, that is, if the user has not made any errors such as programming more hours than are available in a day, etc.), the display reads:

```
Autosplit setup:
SAVING new setup
```

The Review Set/Modify Setup/Do New Setup/Exit Now autoscrolling menu screen now appears. Pressing OK when the screen reads "review Setup?" permits the user to enter the Review Settings mode which permits viewing some or all of the information that was entered in a systematic way. Pressing NO here skips all the questions and display screens dealing with Reviewing Settings. If the user presses OK, then he/she is first asked if he/she wants to "Review Basic Setup?"

2.5.3 Review Basic Setup

```
Review
Basic Setup ?
```

If the user presses OK, 100% Duration for Station #1 is shown.

```
Stn #1 Watering
Duration=0h+5m    OK
```

The user should press OK to see the Duration setting for Station #2, etc. If the user does not want to continue reviewing these settings or if the user wants to go forward and look at the next group of settings, for example, split cycle criteria, then the user should press NO and the controller will jump forward to the next block of settings.

When the user has finished reviewing the Duration settings, the Split Cycle Criteria that have been entered will be shown next (by station).

```
Stn 1: 2 Splits
@ 3m ON, 30m OFF    OK
```

After the user finishes reviewing the split maximum ON's and minimum OFF's for each station, the watering day cycles are reviewed.

```
Stn 1 100% = 0h+5m
every 2 days    OK
```
for "so many days" mode
OR

```
Stn 1 100%=0h+5m
on M-W-F--    OK
```
for "specific days" mode

Next the Start Time and Excluded Period that have been entered are shown:

```
Excluded Period:
none entered    OK
```

```
Start Time each
ON day=12:00am    OK
```

Since the start and excluded times apply to all 8 stations, these review screens appear only once (i.e., it is not repeated for each of the 8 valve stations).

Display screens are also available to view the Syringe and Soak setups.

After all the settings have been reviewed (or after the user presses NO for the Review Settings question), it is permitted to review all the controller generated start times for any day that the user chooses to review. The user will get a screen that reads:

```
Review
daily schedule ?
```

If the user does not want to review all the ON times, he/she should then press NO and the controller will revert back to the Review Setup?/Modify Setup?/Do New Setup?/Exit Now? autoscrolling screen. If the user presses OK, then he/she will have to answer several more questions before it is possible to actually start reviewing the ON times for each valve station. The first question is:

```
Water Budget
to use = 100%
```

The user should press the NO key to set the Budget Factor for this review anywhere from 10% to 200% in 10% increments, or should press OK to accept the default Budget of 100%. The Budget Factor does NOT affect syringe and soak watering times; it only affects the basic watering program. The user can review the ON times at any budget that is wanted. Changing this setting, however, has NO effect on the Budget Factor that is actually used when the controller is running. The user may set the actual run-time Budget Factor when the user next causes the controller to enter the AUTOMATIC RUN or SEMI-AUTO RUN Mode.

The user should next tell the controller which day the user would like to review. In "So Many" Days mode, the display reads:

```
Review for
Day = # 1
```

The user should remember that in "So Many" Days mode, watering always occurs on Day #1 whether the day cycle is set to every day or every 30 days. For every other day watering schedules, days 1, 3, 5, etc. will be watering days and days 2, 4, 6, etc. will be "off" days when no watering occurs.

For Specific days Mode, the display reads:

```
Review for
Day = SAT
```

Once the user has picked the specific day that he/she wants to review, the user is then asked for the week that he/she wants to view:

```
Review Sat
for Week = # 1
```

The user should select either week 1, 2, 3, etc., up to 9 for review. The user should remember that he/she can program watering on Saturday every other week if so desired, so that in weeks 1 and 3 watering would occur on Saturday, while in weeks 2 and 4 no watering would occur in this example.

With the optional Syringe and Soak features, the user is able to review Syringe and Soak ON Times if Syringes or Soaks are scheduled for the day being reviewed.

Once the user has answered these preliminary questions, the user will get the following message screen:

```
Press OK to see
ending time   OK
```

After viewing the ending time for the day, the next screen reads:

```
Press OK for
each ON Time
```

The user should press OK in order to display the first ON Time for station #1 (if station #1 is an active valve) for the day selected (if any ON times exist). Pressing OK again will display the first ON Time for station #2, etc. All the Split ON Times for all the active valve stations will be sequentially displayed until all the ON Times for the day have been displayed or until the user presses STOP to stop the review process (or NO to get back to the Review Setup?/Modify Setup?/Do New Setup?/EXIT now? menu screen).

The display screen for reviewing the generated sequence of ON times tells the user the station number, the split cycle number, the watering duration for that particular split ON, and the actual time that the station in question comes on. Generated starts are also differentiated as to whether they are a basic watering Split ON Time, a Soak Cycle Split ON Time, or a Syringe ON Time by the first line of the display:

```
Stn 1 ON 1 of 7
0h+10m @10:00am   OK
```
For Basic Watering Split ON Times;

OR

```
Stn 1 SOAK1 of 13
0h+10m @10:00am   OK
```
For Soak Cycle Split ON Times;

OR

```
Stn 1 Syr 1 of 10
0h+ 5m @12:30pm   OK
```
For Syringe ON Times.

Pressing NO at any time during this review process takes the user back to the review Setup?/Modify Setup?/Do New Setup?/Exit Now? autoscrolling menu screen (where the user can press OK to start the generated sequence review over again for a different day or for a different Budget Factor). This review process will permit the user to view everything in advance, so the user always knows exactly what the controller is going to do on any given day. Of course, the user can skip this review process completely just by answering NO to the first question.

If the user selects Modify Setup instead of Review Setup, he/she can selectively change settings by stepping through a similar sequence of screens. Pressing OK confirms the displayed setting, and pressing NO takes the user back to the original data entry screen.

2.6 HOW TO AUTOMATICALLY RUN THE CONTROLLER

2.6.1 Automatic Run Mode

After finishing SET SCHEDULES, the user should select the RUN STATIONS mode, then he/she should choose AUTOMATIC RUN from the autoscrolling menu. The display then reads:

```
Do you want to
delay watering?
```

Pressing OK allows the user to set a day of from 1 to 14 days before automatic watering actually begins. This is useful as a "rain delay" when the user wants to not run the controller during a rainy period, but then wants it to resume automatic operation without having to visit the controller again. The next screen reads:

```
Delay watering
for _1 days
```

The rain delay can be set for anywhere from 1 to 14 days. The next screen reads:

```
View Active
Station #s ?
```

If the user presses OK, the following screen is displayed:

```
Using: 12345678
Is this OK ?
```

If the user wants to disable one or more stations, he should press NO and the display will change to read:

```
Using: --------
Use Stn 1 ?
```

The user should press OK if he/she wants to use station #1, or NO if he/she does do not want to use this station. If the user presses OK, the display reads:

```
Using: 1-------
Use Stn # 2 ?
```

Note that there is now a "1" instead of a "-" for station #1, indicating that this station is now active. After a delay the station number automatically advances to Stn #2, and a "-" is automatically inserted on the top line. Thus, the user needs only press OK for the stations that he/she wants enabled. The user should repeat this process until all the desired valves are turned on (number displayed) or off ("-" sign displayed) as desired. When the user has made his/her entry for station #8, the display will read something like:

```
Using: 1-3456-78
Is This OK ?
```

The user should press OK to confirm that he/she indeed wants stations 1 and 5 disabled, or NO if he/she wants to go back and change his/her settings.

The user should use this Enable/Disable set up to tell the controller which valve stations that he/she wants to be active (enabled). The controller comes pre-set with all the stations active. A user's installation, however, may require less than eight valve stations or the user may need to inactivate (disable) one or more of the stations while he/she repairs his/her irrigation system. In such cases, the user can temporarily inactivate one or more valves. Any disabled valves will be skipped when the controller is actually running, and any previously scheduled watering times for the inactivated valves will be skipped.

After the enabled/disable setup has been completed (or skipped if the default is accepted), the user is asked to choose which previously entered schedule setup that he/she wants to run. The next screen reads:

```
AUTOMATIC RUN:
Mini Setup ?  OK
```

The second line of the displays automatically advances after a delay, and the user needs to press OK when the appropriate setup is displayed. The last choice on the autoscrolling menu is "EXIT now?", and the user can select this option if he/she decides not to start the automatic run until later. After the setup is chosen, the next screen reads:

```
Water Budget
to use = 100%
```

The user needs to either accept the default value for the water budget, or select a new valve anywhere from 10% to 200% in increments of 10%. The next screen reads:

```
To water, take
Power Key out!
```

The user then needs only to remove the POWER-KEY TM power source to begin automatic watering. The controller will now run with the chosen watering setup in it, and valves will turn on the next time a start time occurs.

2.7 HOW TO MANUALLY RUN THE CONTROLLER

2.7.1 Manual Mode

The user should select MANUAL Mode to turn the valves on or off independent of the timer, to run a timed Test Sequence for checking the irrigation system, or to read the soil moisture sensors.

There are four choices in MANUAL Mode:

```
MANUAL RUN:           MANUAL RUN:
Run Stations? OK  OR  Run Test Seq? OK

MANUAL RUN:           MANUAL RUN:
Read Sensors? OK  OR  EXIT Now  OK
```

The user should press OK to select the operation shown on the screen, or NO to switch between screens. If STOP is pressed, then all valves will be turned OFF, and the main "CHOOSE ONE (OK)" function select screen will be displayed.

2.7.1.1 Manual Valve Operation

Select "Run Stations" from the MANUAL RUN Mode to manually operate the valves. The display reads:

```
Stn #: --------
Turn #1 ON ?
```
where - = off and number = on

The status of all the valves is shown on the first line of the display. The valves are shown in order; the valve number displayed means the valve is on, and --- means the valve is off.

The second line of the display shows the condition of any one valve. In the example above, the user can press OK to turn valve #1 ON, or NO to leave it OFF. If the user presses OK, the display changes to read:

```
Stn #: 1--------
Turn #1 OFF ?
```

Pressing OK again, station #1 turns OFF and the display changes to read:

```
Stn #: --------
Go to Stn #2 ?
```

If the user again presses OK, the display changes to read:

```
Stn #: --------
Turn #2 ON ?
```

If the user presses NO, the display changes to read:

```
Stn #: --------
Go to Stn #3 ?
```

If the user doesn't press OK or NO, the display auto-scrolls after a pause between three different screens:

```
Stn #: --------        Stn #: --------
Turn #2 ON?     OR     Go to Stn #3 ?
```

```
Stn #: --------
EXIT now ?
```

If a valve is already on, the first menu choice is:

```
Stn #: -2-----
Turn #2 OFF ?
```

Pressing OK will shut if off, while pressing NO or letting the menu auto-scroll will allow the user to move on to station 3 with station 2 still running.

Once a valve is manually turned on, it will stay on until the user either 1) turns it off as described above, 2) presses the STOP key, or 3) removes the POWER-KEY ™ power source. Normally, the user should only use the second and third ways of manually turning a valve off in emergencies. Pressing the STOP key in Manual Mode takes the user back to the main function select menu screen.

When the user has finished turning ON and OFF stations in MANUAL RUN, the menu choice "EXIT now" is chosen. If any stations are still on when the user chooses to exit, the following screen is displayed:

```
All stations ON
Turning OFF now
```

2.8 HOW TO REVIEW SYSTEM HISTORY WITH VIEW INFO MODE

2.8.1 Reviewing System History

The user may review the performance of the controller by entering VIEW INFO mode and selecting See History. The controller stores the last 128 significant events in chronological order, ending with the most recent event. An event can be a valve start, a status event, or a programming event. The user must press OK to see the next screen, or STOP to end the history review.

The data stored from each valve start is displayed as follows:

```
Stn 1: 10:00am
0h+15M   O_K
```

The history shows the station number, the starting time, and the actual ON time used.

3.0 FUNCTIONAL DESCRIPTION OF THE PREFERRED EMBODIMENT OF AN IRRIGATION CONTROL IN ACCORDANCE WITH THE PRESENT INVENTION

Figure 2:
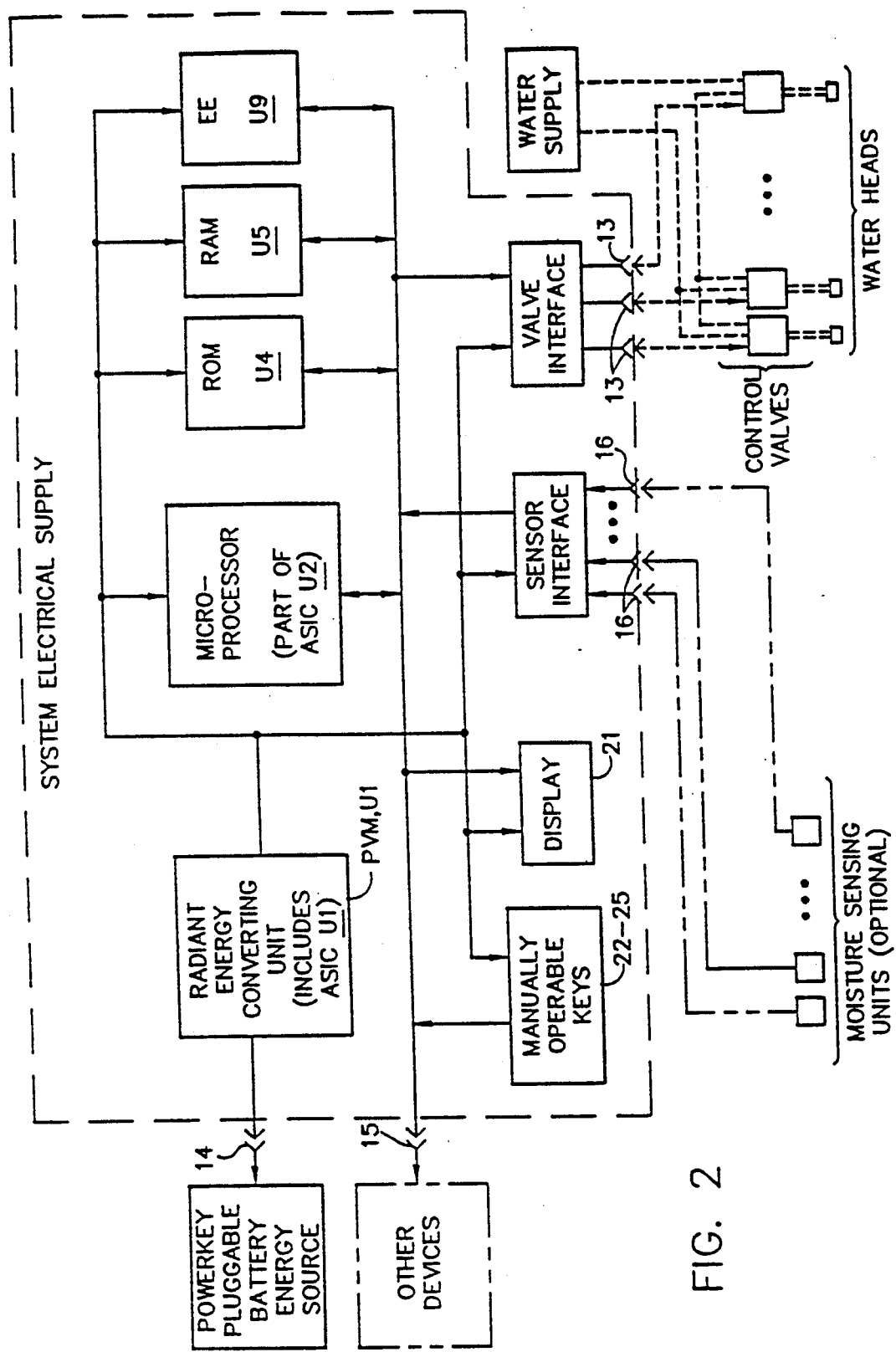
FIG. 2 is a block diagram of an irrigation system in accordance with the present invention including the irrigation controller illustrated in FIG. 1.

A preferred embodiment of an irrigation control system in accordance with the present invention is shown in FIG. 2. An irrigation controller 1 (previously seen in FIG. 1) operates under control of MICROPROCESSOR U2 (partial) executing programmed firmware that is resident in memories types ROM U4, RAM U5, and EE U9. The MICROPROCESSOR U2 (partial) communicates with MANUALLY OPERABLE KEYS 22-25 (previously seen in FIG. 1) for receipt of data and control. It interfaces with DISPLAY 21 (previously seen in FIG. 21) for the display of questions, parameters, and help messages to a human user/programmer (as detailed in previous section 2.0).

The MICROPROCESSOR U2 (partial) of irrigation controller 1 optionally communicates externally through a SENSOR INTERFACE 26 of plugjack 16 (shown in FIG. 1) to up to eight MOISTURE SENSING UNITS (optional) 27a-27h (shown in phantom line). This optional communication is the purpose of sensing soil moisture at up to eight locations. The MICROPROCESSOR U2 (partial) communicates through VALVE INTERFACE 28 of plugjack 13 (shown in FIG. 1) to up to eight electromagnetically actuated CONTROL VALVES 29a-29h (shown in dashed lines). This communication is for the purpose of gating the flow of pressurized water from WATER SUPPLY 30 through a selected one of CONTROL VALVES 29a-29h at any one time to a corresponding one of WATERING HEADS 31a-31h (shown in dashed line).

The MICROPROCESSOR U2 (partial) may optionally communicate through plugjack 15 (shown in FIG. 1) to OTHER DEVICES 32 (shown in phantom line) for purposes of receiving the download of firmware programs, parameters, and/or commands. This interface need not be enable to operate the irrigation controller 1, which in preferred embodiment comes from the factory with that control program that is appendicized to this specification within its ROM memory U4 and EE memory U9, and which in the preferred embodiment may have all necessary parameters and control entered through MANUALLY OPERABLE KEYS 22-25. Indeed, if necessary firmware could be entered into controller 1 through its MANUALLY OPERABLE KEYS 22-25. The digital interface to OTHER DEVICES 32 simply represents a less fedious way of communicating.

The preferred embodiment of the controller 1 normally derives all its power, and all power for MOISTURE SENSING UNITS 27a-27h and CONTROL VALUES 29a-29h, during quiescent operation both day and night from radiant light energy impingent upon RADIANT ENERGY CONVERTING UNIT (includes ASIC U1) that comprises each of PVM1, U1, and ASSOCIATED CIRCUITRY. "PVM" stands for photovoltaic module and "ASIC" stands for application specific integrated circuits. All "U" designations stand for integrated circuit chips that may be referenced in FIG. 3 (to be discussed).

The preferred embodiment of controller 1 is powered during its operation to accept user programming not by the RADIANT ENERGY CONVERTING UNIT PVM1, U1, and ASSOCIATED circuitry but rather by electrical connection through plugjack 14 (shown in FIG. 1) to the POWERKEY ™ PLUGGABLE BATTERY ENERGY SOURCE 33. This SOURCE 33, normally not a part of irrigation controller 1 during its quiescent operation, is shown neither in shadow line for being optional, nor in dashed line for being related to the controller 1 of the present invention but not part thereof. Rather, the POWERKEY ™ PLUGGABLE BATTERY ENERGY SOURCE is shown in solid line in order to illustrate that for the purposes of programming the controller in accordance with the present invention it must be present.

This required presence is because the SOURCE 33 supplies the greater power that the MICROPROCESSOR U2 (partial) needs to exit the predominantly somulent (inactive) state that it only intermittently and momentarily leaves to effect irrigation control in accordance with the schedules, and to assume a high duty cycle at operation. The SOURCE 33 also supplies the power requirements of MANUALLY OPERABLE KEYS 22-25 and of DISPLAY 21 during user programming. Although the energy storage within the RADIANT ENERGY CONVERTING UNIT might suffice to permit user programming, it is unwise to deplete this energy storage to an undetermined amount (dependent on the length and adeptness of user programming)—especially at night when no energy recovery is possible and especially when the controller is programmed to immediately begin controlling irrigation cycles. Instead, the SOURCE 33 actually charges the energy storage means within the RADIANT ENERGY CONVERTING UNIT, and always leaves the controller 1 fully powered and ready to control irrigation of the end of a user programming sequence.

3.1 FUNCTIONAL DESCRIPTION OF THE PREFERRED EMBODIMENT OF AN IRRIGATION CONTROLLER IN ACCORDANCE WITH THE PRESENT INVENTION

The schematic diagram of FIG. 3a through FIG. 3h, substantially a block diagram because the very substantial function of the circuit shown is contained in two Application Specific Integrated Circuits (ASICs) U1 (shown in FIG. 4) and U2 (shown in FIG. 5)—shows the preferred embodiment of irrigation controller 1 (previously seen in FIGS. 1 and 2) in accordance with the present invention.

Figure 3A:
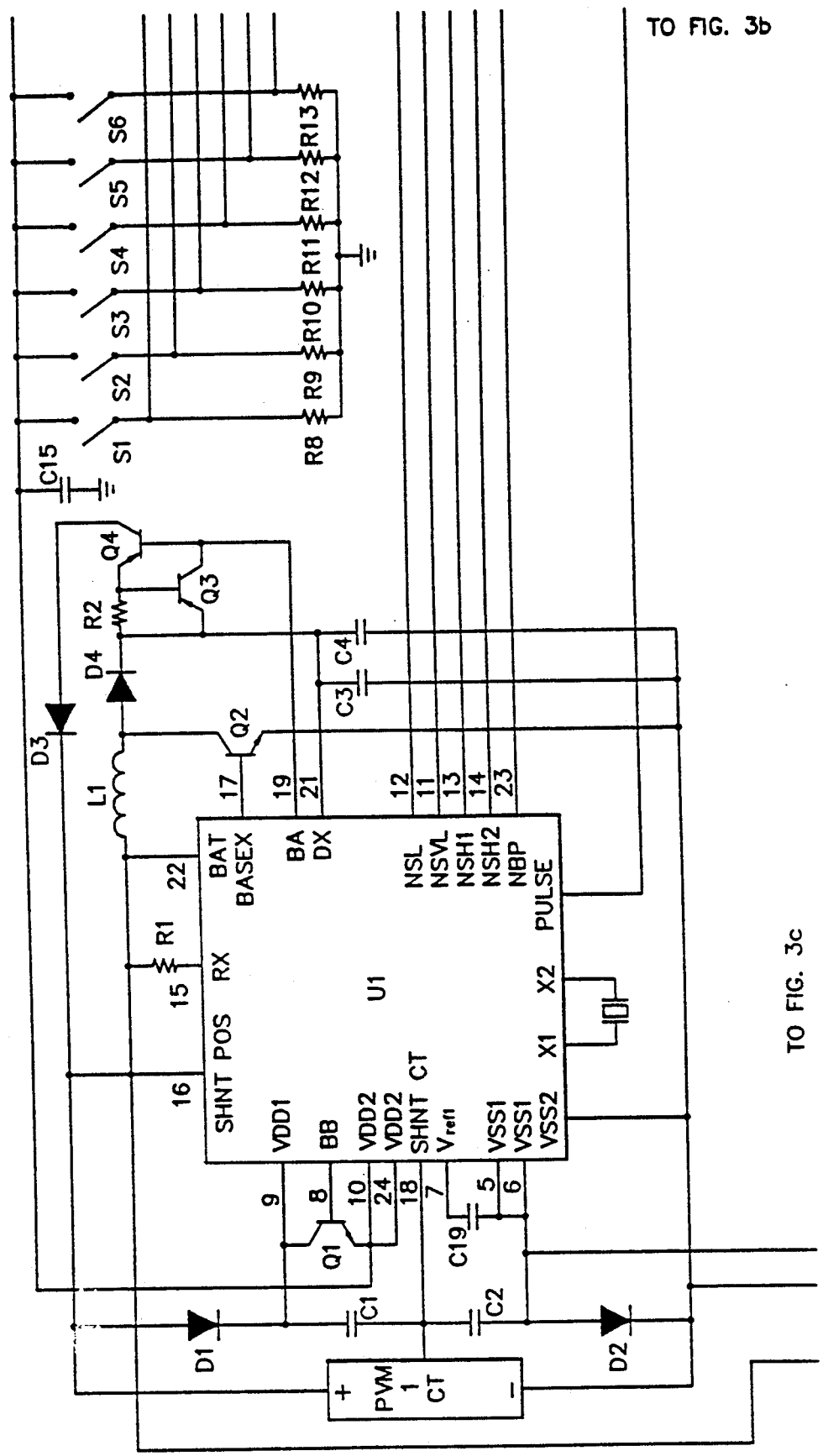
FIG. 3 consisting of FIG. 3a through FIG. 3h, is a schematic diagram of the preferred embodiment of an irrigation controller in accordance with the present invention.
Figure 3B:
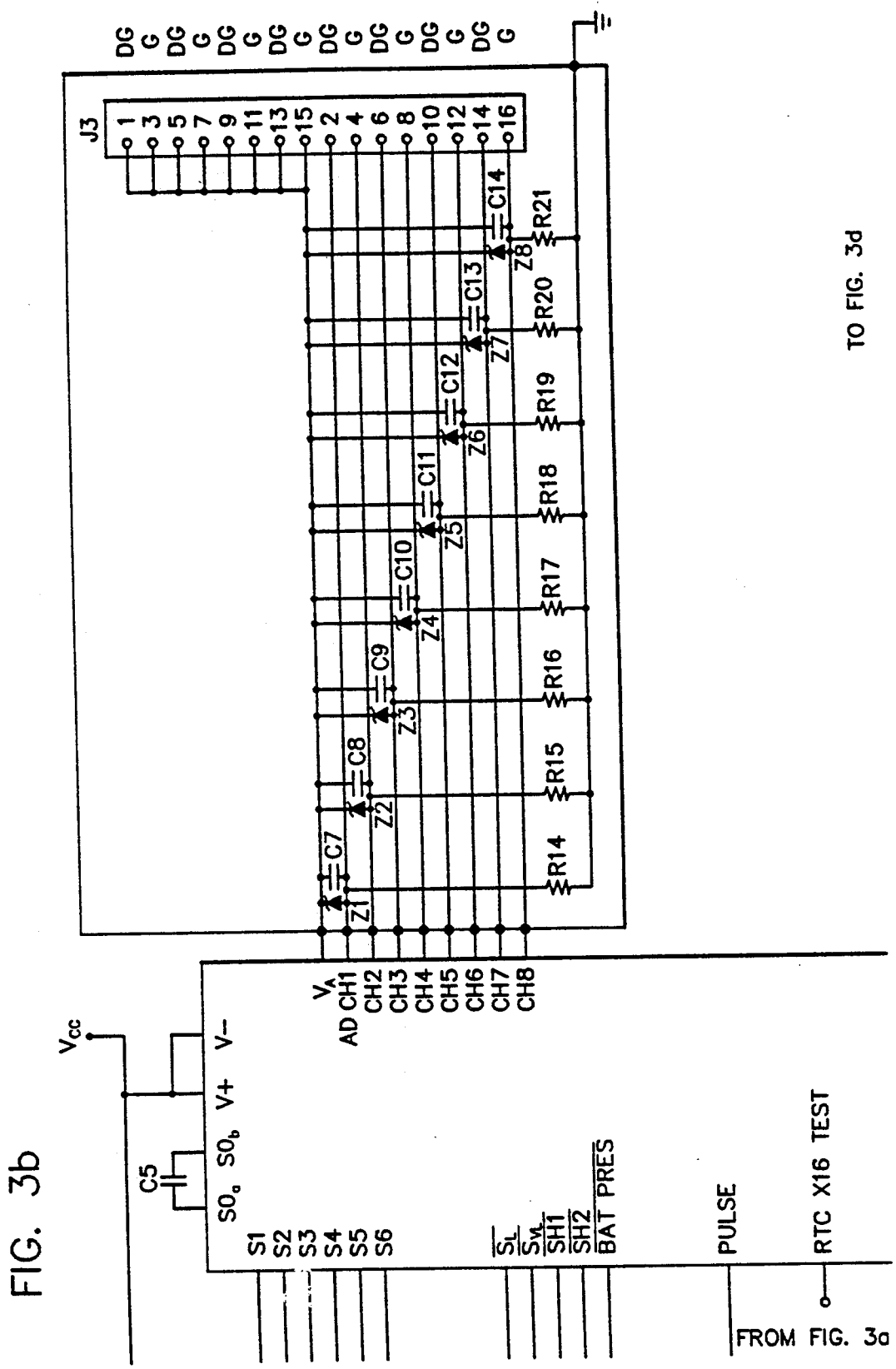
Figure 3C:
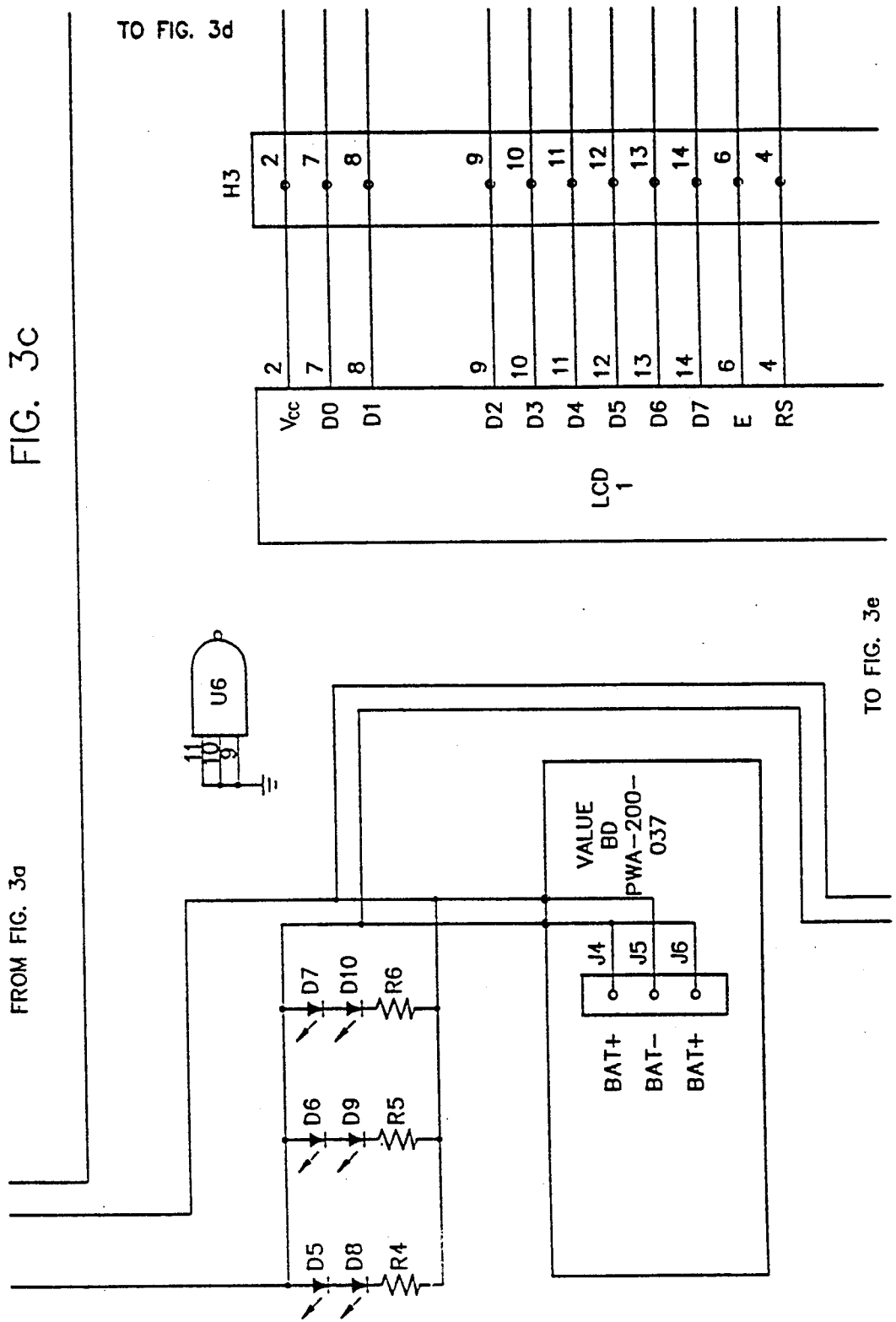

Commencing in FIGS. 3a and 3c, primary power is provided to the irrigation controller in accordance with the present invention by photovoltaic module PVM 1 or, alternatively, by a POWERKEY ™ power source. The POWERKEY ™ power source is a battery that is connected between terminals BAT + and BAT —. During programming of the irrigation controller 1 the POWERKEY ™ power source (not shown) is always connected. Thereby the battery provides the considerable power necessary to energize the display LCD 1, and, importantly, operate the entire controller 1 at the high duty cycle necessary to conduct communications with the operator. The battery also serves to initially charge the capacitor power storage (both at a current limited rate) each time the POWERKEY ™ battery power source is replugged to its receptacle 14 (shown in FIGS. 1 and 2). This insures that after each user interface communication the controller is always left in a fully charged condition.

During normal, quiescent, operation all low-power CMOS circuitry and the low-power valves are energized by energy stored in supercapacitors (SUPERCAPS) C1, C2. It is the function of first ASIC U1 to manage the voltage and power levels of the irrigation controller, and, most particularly, to control the charging of SUPERCAPS C1, C2 by PVM 1 and the POWERKEY ™ power source. The SUPERCAPS C1, C2 will automatically be charged by connection of the POWERKEY ™ power source. The ASIC U1 operates to control this charging through a constant current source implemented by transistors Q3, Q4 and resistor R2. This constant current source is controlled by a switching regulator implemented from transistor Q2, inductance L1, diode D4, and capacitors C3, C4, all under the control of ASIC U1. The switching regulator and constant current source act jointly to pass, during the presence of bright sunshine or of the POWERKEY ™ power source, up to 63 milliamperes through steering diode D3 to charge SUPERCAPS C1, C2. The diodes D1, D2 prevent discharge of the charged SUPERCAPS C1, C2.

Continuing in FIG. 2a, connections to the ASIC U1 that is used for power management and control include VDD 2. VDD 2 is the main +5 vdc power for the irrigation controller 1 and other components (such as CONTROL VALVES 29a-29h or MOISTURE SENSING UNITS 27a-27h both shown in FIG. 2) to which it is attached in order to form an irrigation system. Signals BA and DX provide local control to the switching regulator and constant current source. The abbreviation NSL stands for system low voltage, NSVL stands for system very low voltage, NSH1 stands for the first shunt from the upper SUPERCAP, NSH2 stands for the second shunt from the lower SUPERCAP, and NBP produces a battery present control signal. The output PULSE is a real time clock interrupt of 30 microseconds duration occurring each ½ millisecond.

The logical control function of the irrigation controller 1 is substantially implemented by digital ASIC U2, shown extending across each of FIGS. 3b, 3d, 3f, and 3h. The main switch control inputs S1-S6 to ASIC U2, used for operator programming of the irrigation controller 1, are from corresponding switches S1-S6 shown in FIG. 3a. The switches S1-S6 respectively implement the stop, unused, unused, help, no, and ok switch control inputs to ASIC U2. These switches S1-S6 are called the MANUALLY OPERABLE KEYS 22-25 in FIG. 2.

Figure 3D:
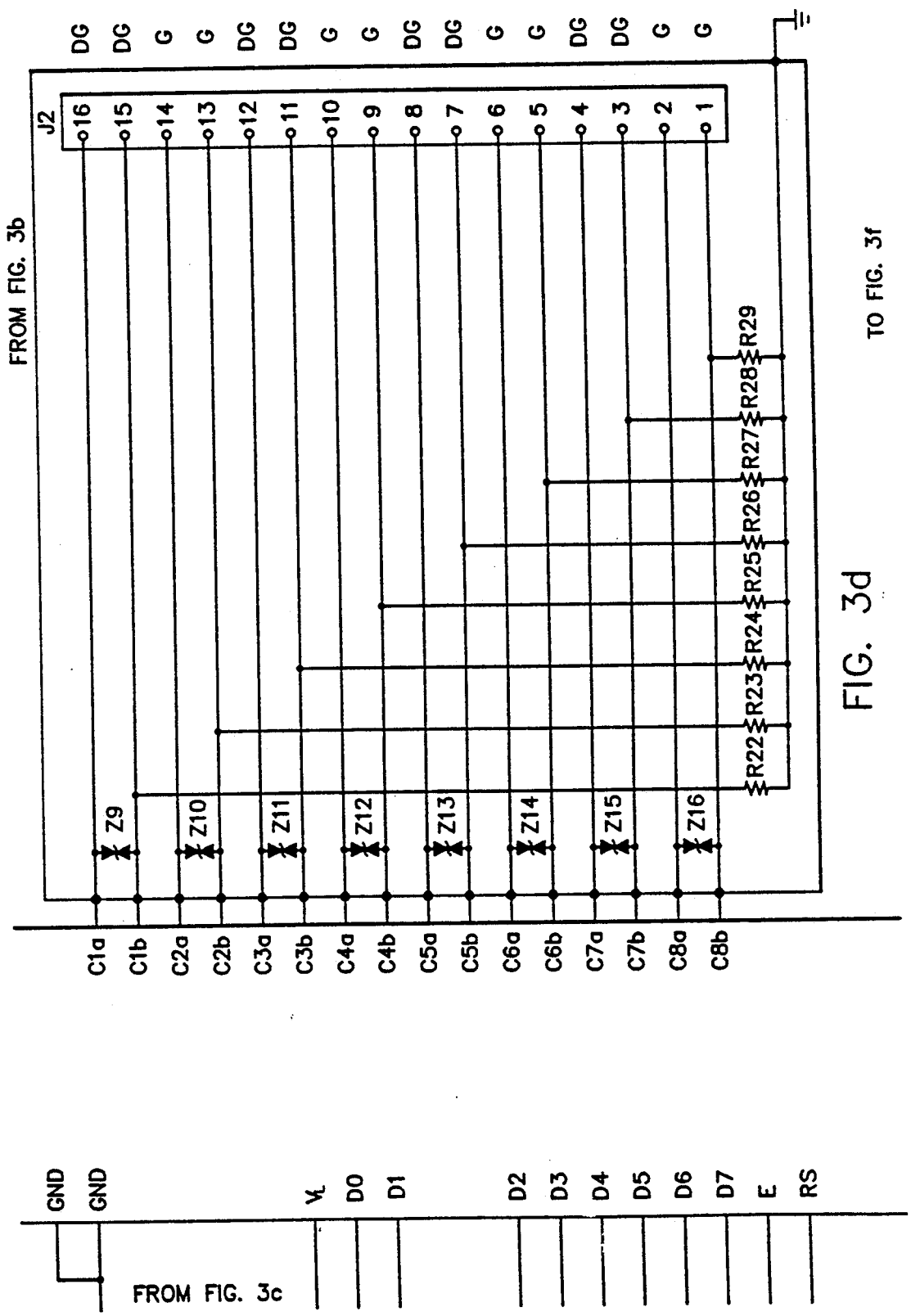
Figure 3E:
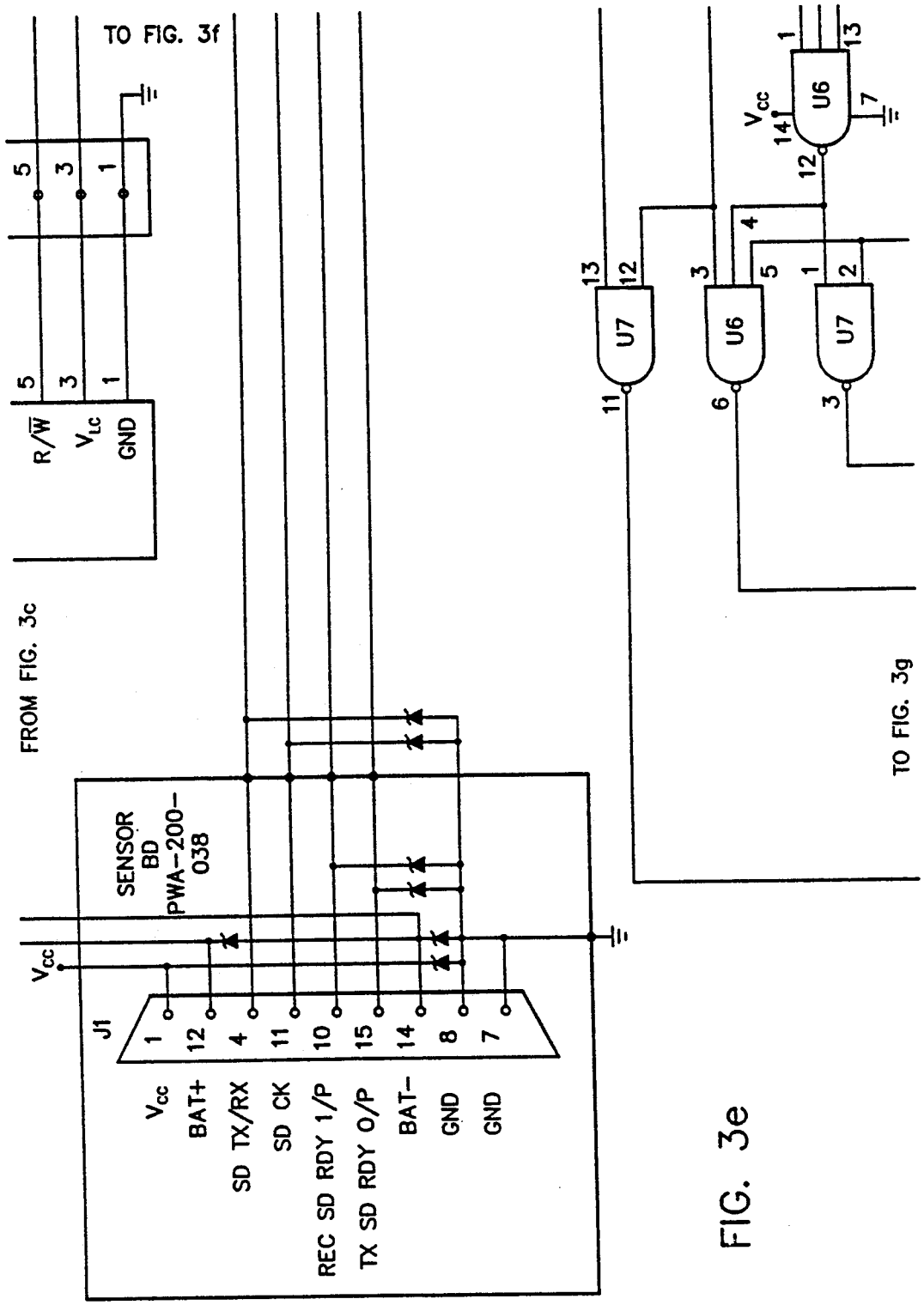

Referring to FIGS. 3b and 3d, up to eight soil moisture sensors that are connectable to terminal block J3 produce signals that are received into corresponding eight analog to digital converter channels, AD CH1 through AD CH8, of ASIC U2.

In a similar manner one side of each coil driver of up to eight valves that are hooked to the eight valve channels on terminal block J2 is internally connected within ASIC U2 as a signal input to one of the remaining eight analog to digital converter channels. Thus, ASIC U2 offers a total of 16 A/D channels, of which eight are internal and eight are external. The irrigation valve control, or drive, signals developed by ASIC U2 are brought to terminal block J2. This terminal block J2 is brought out to plugjack 13 shown in FIGS. 1 and 2.

Referencing FIGS. 2f and 2h the ASIC U2 operates on firmware instructions, and on parameters, that are stored within both read only memory ROM U4 and in random access memory RAM U5. The ASIC U2 addresses both such memories through ADDRESS DECODER U7. The irrigation controller 1 is generally versatilely programmable, as well as parameterizable. Thus, many firmware instructions that ASIC U2 executes are present in RAM U5 and are loaded therein in accordance with user requirements. Other firmware instructions reside in ROM U4.

Figure 3H:
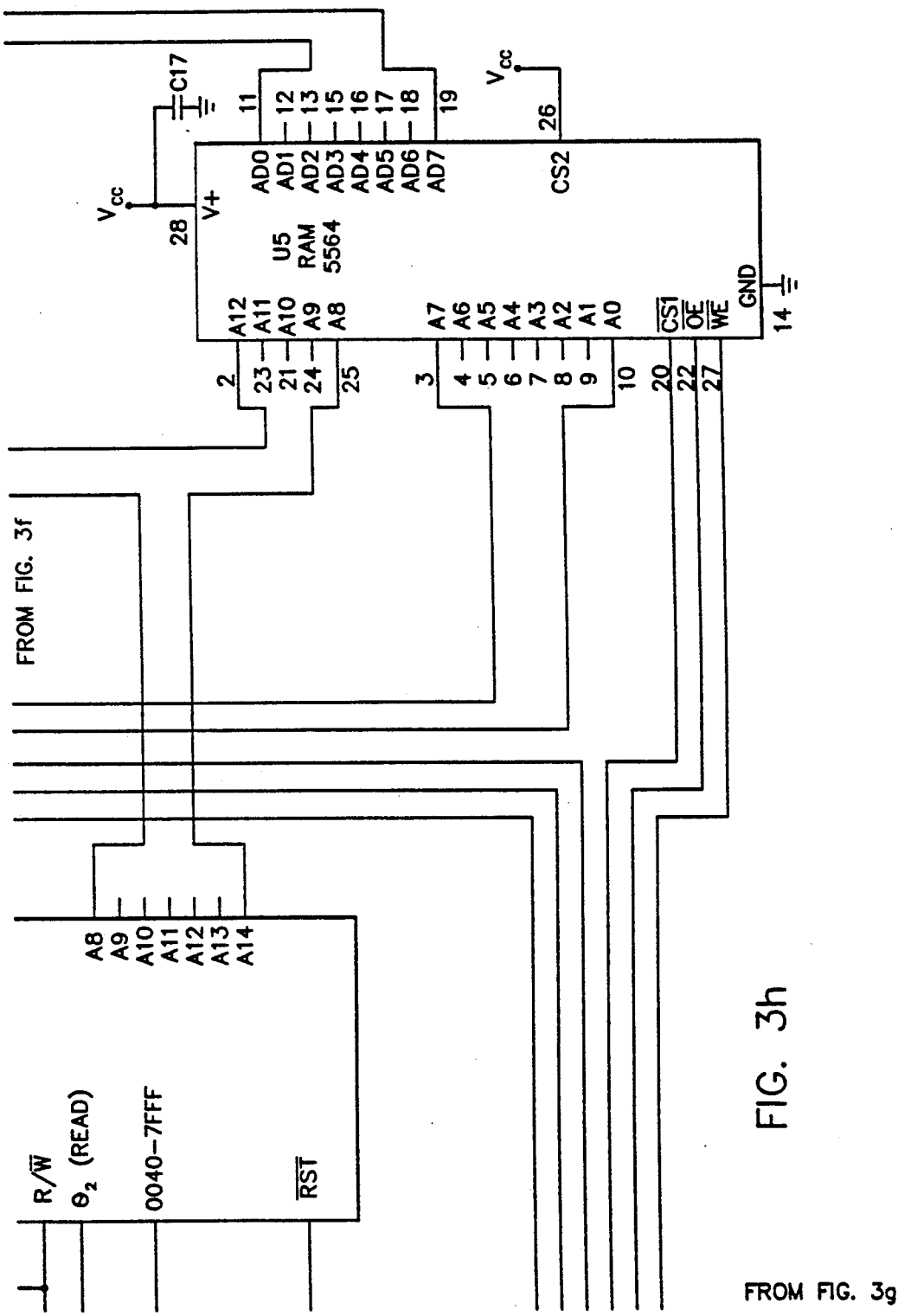

Referencing FIG. 3g, the irrigation controller 1 in accordance with the present invention connects to still another programmable memory other than RAM U5 (shown in FIG. 3h). This is Electrically Erasable (EE) 1024 bit serial memory U9. This EE memory is particularly distinguished in that it will retain its informational contents in the total absence of power (unlike RAM U5). Yet it is alterable in its contents, unlike non-votile ROM U4. The 1024 bit serial memory U9 permits the field programming of secret codes, vital set up information, and other information that is desirably user specified (unlike the factory-programmed informational contents of ROM U4), wherein this information will desirably not be lost during any interruption of power to the controller.

The complete firmware program, which is resident in memories U4, U5 and U9 and which is executed by the microprocessor contained in ASIC U2, is attached to this specification as Appendix A.

Circuits U6 (save for one unused spare gate shown in FIG. 3c), U7, and U8 form a control interface of a standard type from ASIC U2 to the 1024 bit serial EE memory U9. In the address bus between the ASIC U2 and the control interface circuit U8, address line AD0 powers up, address line AD1 selects, and address line AD2 clocks serial data present on line AD3 into, 1024 bit memory U9. The single, serial, data output bit D0 of 1024 bit memory U9 is amplified in non-inverting element U10 and communicated to ASIC U2 as bit AD0 upon its address bus.

The function of the circuits of irrigation controller 1, substantially contained in ASIC U1 and U2, to manage irrigation control will become increasingly clear upon the detailed discussion of such ASIC U1s and U2 in respective following sections 4 and 5, and by reference to the complete firmware program attached to the present specification as Appendix A.

4.0 FUNCTIONAL DESCRIPTION OF THE U1 ASIC DEVICE

The block diagram of FIG. 4 shows the overall architecture of the first, U1, Application Specific Integrated Circuit (ASIC) used within the preferred embodiment of the irrigation controller in accordance with the present invention. The detail function of ASIC U1 is essentially unimportant for the purposes of the present invention, and is included within this specification only for purposes of completeness. The photovoltaic module (PVM, shown in FIG. 3a), SUPERCAPS C1 and C2 (shown in FIG. 3a) and ASIC U1 (shown in FIG. 3a) may be considered to simply be the implementation of a special form of a light-energized power supply. The general implementation of an a.c. or battery source power supply is, of course, routine in the electrical arts.

The U1 ASIC device is used to generate a 5 volt power supply using power from a photovoltaic modult or battery. Power is stored by charging very large supercapacitors ("SUPERCAPS") to 10.8 volts. The stored energy is then used for operation during dark periods. Because the energy stored in the SUPERCAPS = ½ $CV_{cap}^2$, the run time duration of the controller during conditions of darkness is greatly affected by how closely the maximum charge voltage can be brought to the maximum tolerable voltage for the SUPERCAP components. Therefore, to increase the dark run time, the "SUPERCAPS" are very carefully monitored, so that they may be charged to a maximum value without being over-charged.

The U1 ASIC device is designed to use minimal power while providing five (5) functions:

First, it monitors SUPERCAP voltages and shunts the charging current if they are over-charged. The monitoring holds this voltage to within +/−1.75%.

Second, it provides a 5 volt +/−2.5%, 0-65 mA output voltage to power other electronics.

Third, it provides status signals indicating the condition of the power supply.

Fourth, it provides a 2 kHz, 30 us pulse for use as a time base.

Fifth, it steps up a 9 volt battery to 17 volts to charge the SUPERCAPS and provide current during programming of other electronics. (Power consumption is less of a concern in this mode.)

Sampling capacitors are used to monitor the various capacitor and power supply voltages, allowing the use of only one comparator to conserve current. CrSi 100 kΩ/ resistors are used to minimize analog currents.

The voltage reference is trimmed using on-chip metal fuses.

There are 3 potential 'most positive' voltages and two potential 'most negative' voltages, making substrate connections difficult. This is handled by using bipolar junction isolation that employs the isolated n- regions as separate CMOS substrates. This allows the CMOS circuitry to operate from several supplies, any one of which could be at the highest potential at different times.

The logic generally runs from VSS1 (OV) to VDD2 (0-5 V), level shifting where required. Analog references run from VSS1 to VDD1 (0-11 V). Switching regulator components run from VSS2 (−0.7 to +5.5 V) to VBAT (0 to 15 V). The upper shunt transistor is connected to a voltage which can range from 0 to VDD1 +0.7 V.

4.1 VREF1 Voltage Reference

The VREF1 circuit X4 is a voltage reference for monitoring supercaps, system low, and system very low. The circuit requires no op-amps, reducing offset error. NMOS transistors at collectors of non bandgap transistors are used to eliminate early voltage effects. The circuit has a buffered output which multiplies the bandgap voltage and is trimmed to 1.50 volts. This trimming is with on-chip metal fuses. The trim range is approximately 1.5 +/−0.1 volts with minimum steps of 3 mV. An extra +/−1 LSB is provided in case original trim is incorrect. The circuit temperature coefficient is 60 ppm/°C. typical, 150 ppm/°C. worst case.

4.2 IBIAS & XTAL BIAS Bias Current Generator

The IBIAS & XTAL BIAS circuit X1 generates 20 nA bias currents for other cells, and 100 nA bias (voltage) for xtal oscillator. It generates buffered 2 Vth voltage "VLOW" used to run the xtal oscillator and high-order dividers at low current. CrSi and p-resistors are combined to match TC of Vbe. The bias varies approximately +/−28% over all parameters.

4.3 XTAL OSC & HIGH ORDER DIVIDERS

The XTAL & 2 kHz DIVIDERS circuit X2 generates a clock for capacitor switch sequencing. It uses a low current oscillator (CASC1 from TCJ) running from the second Vth supply voltage called VLOW. Internal trim capacitors are added to the crystal pins and are metal mask trimmable. Dividers to 2 kHz run from VLOW, then are level shifted to VSS1, VDD2 (0 to 5 V). This avoids level shifting at 32 kHz, conserving current.

Circuit input PULSE receives a 2 kHz 30 microsecond pulse used for on and off chip timing. Circuit input NSTROBE receives a 2 kHz, 15 us negative pulse occurring 60 us after PULSE and is used for on chip timing. The level shifters use approx 30 nA each at 2 kHz.

4.4 SAMPLING SWITCH DECODE

The SS DECODE circuit X3 is clocked by input PULSE. A one-shot is used to effectively generate a non-overlapped clock for the switch output signals. All switch signals are disabled (by inputs E and NE) for 0.6 to 4 us after each clock.

Switch sequencing samples the upper supercap, lower supercap, system low, and system very low in that order. Inputs NSC1, NSC2, NSSL, NSSVL define which voltage is being sampled. Each voltage is sampled once every 7.8 ms.

Input NCMP_CLK is the comparator clock. Input NCMP_ON powers down the comparator during unused periods.

4.5 SAMPLING CAP ARRAY & SWITCHES

The CAP ARRAY & SWITCHES circuit X5 contains sampling capacitors that are basically unit sizes. Due to the variety of voltages sampled, fractions of units are required. Poly etch tolerance can cause approximately 0.2% ratio error.

Inputs S1, S2, S3, S8 and S9 require signals level shifted above VSS2 (the normal logic level is VSS1, VDD2). Inputs S1, S2, S3, S8, S9 must save bodies tied to VSS1 & VDD1. All other switches may be tied to VSS1, VDD2. Note that this includes p-channel bodies, since they are isolated from the substrate in this process.

Sampling occurs such that the node OUT should remain at the reference voltage level if the sampled voltage is at its exact trip point. This avoids parasitic capacitance effects at this high-impedance node.

100 mV of hysteresis is added to the SL and SVL tests by switching between two slightly different capacitor values.

Figure 5A:
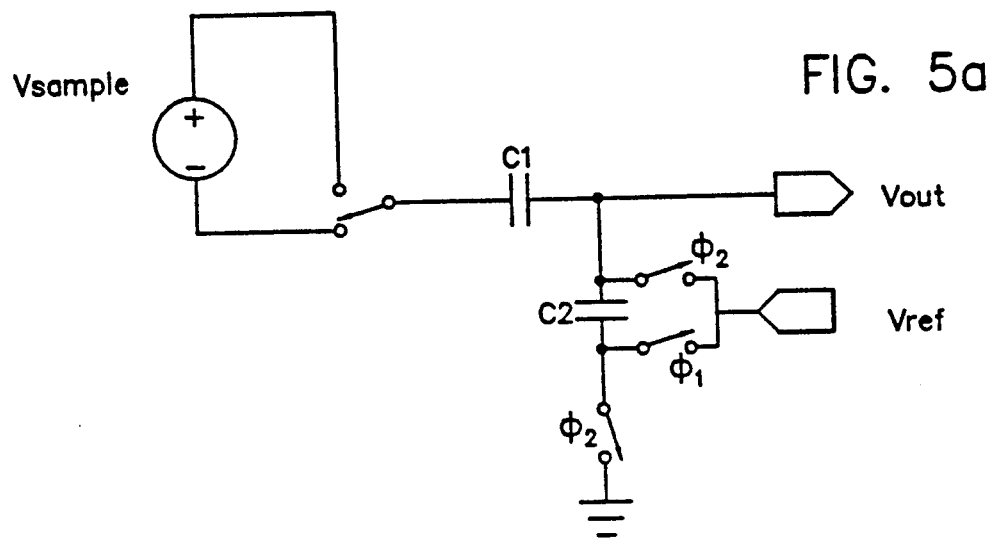
FIG. 5a is a simplified electrical schematic diagram of the sampling capacitor array and switches used in ASIC U1.

A simplified electrical schematic of the CAP ARRAY & SWITCHES circuit X5 illustrating its function is shown in FIG. 5a. In operation, $V_{OUT}=V_{REF}$ if $V_{SAMPLE} \cdot C1 = V_{REF} \cdot C2$.

4.6 SAMPLING COMPARATOR

The SCOMP circuit X7 compares output from the capacitor array to the reference voltage. It is inherently offset compensated. Its response time is less than 25 us.

Figure 5B:
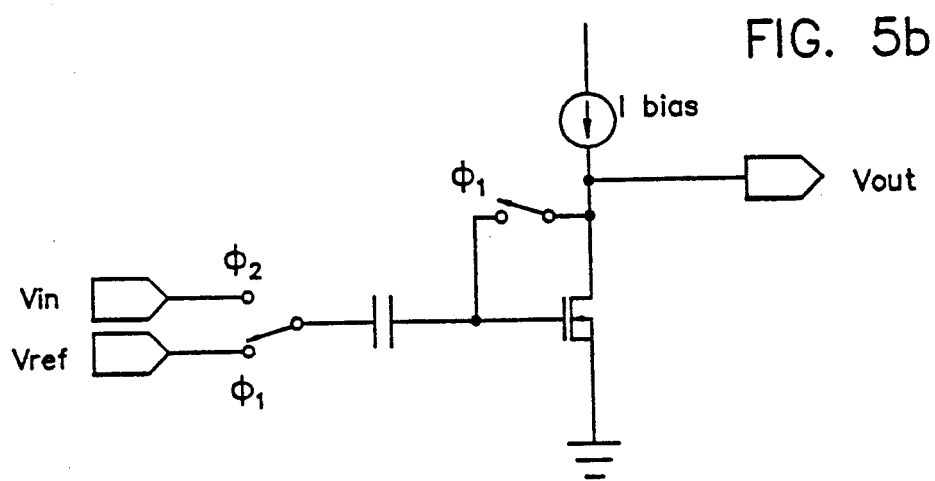
FIG. 5b is a simplified electrical schematic diagram of a sampling comparator used in ASIC U1.

A simplified electrical schematic of the SCOMP circuit X7 illustrating its function is shown in FIG. 5b. Phase 1 shorts the n-channel so that its gate voltage moves to the voltage where it carries exactly the current source current. The input capacitor is shorted to VREF and stores the difference between this gate voltage and VREF. Phase 2 opens the n-channel and connects the capacitor to the input voltage. If the input voltage is different from the reference, the gate is forced higher or lower, pulling the output of the current source down or allowing the current source to pull up.

4.7 COMPARATOR DATA LATCHES

The COMP DL circuit X11 stores the output of the comparator in the latch corresponding to the voltage being tested. It is clocked by input NSTROBE.

4.8 WAIT TIMERS

The WT TIMER circuit X12 is used as a "timed hysteresis" when the SUPERCAP voltages are sampled.

When near the trip voltage, the capacitors will tend to be above the trip voltage when charging, and immediately fall below the trip voltage when the charging current is shunted away. This is due to approximately 7 Ω internal resistance in the SUPERCAPS.

The SUPERCAPS are sampled every 7.8 ms, and under the above conditions would alternate charging- /discharging at a 50% duty cycle. A typical charge current of 20 mA would average 10 mA, while a typical load current is 12 mA continuous, resulting in a net energy loss. This would result in the capacitor charging to less than its maximum value by the internal I-R drop.

To avoid this situation, the comparator data latch is disabled for 3×7.8 ms after it comes out of a shunt mode. This results in a 3:1 charge to shunt ratio, ensuring that the net charge current is positive.

4.9 SHUNT TRANSISTORS

The SHUNT TRANSISTORS X10 shunt up to 70 mA away from the SUPERCAP when the maximum voltage is exceeded. The SHUNT TRANSISTORS X10 have a resistance of approximately 3.5 Ω.

4.10 SWITCHING REGULATOR

The SWITCHING REGULATOR circuit X9 provides 17 volts from a 9 volt battery. The inductor shorting transistor of the circuit is off-chip (the IC is not required to handle the 17 volts).

Output NBP signals the VDD2, VSS1 logic when a battery is attached to the BAT, VSS2 terminals.

Figure 5C:
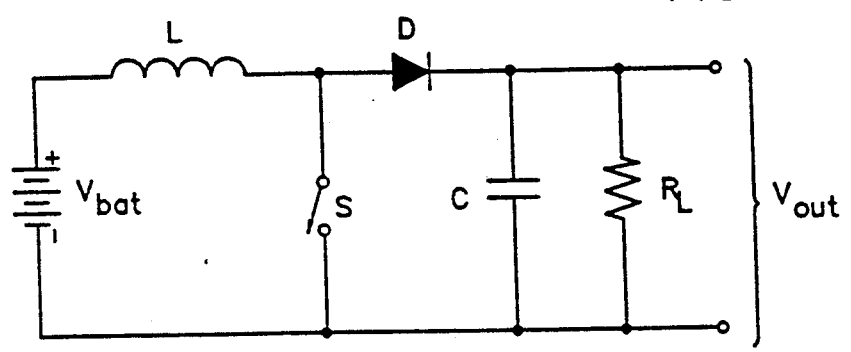
FIG. 5c is a simplified electrical schematic diagram of a step-up DC-to-DC Converter used in the switching regulator of ASIC U1.

A simplified electrical schematic of a step-up DC-to-DC Converter circuit used in SWITCHING REGULATOR circuit X9 and illustrating its function is shown in FIG. 5c. When switch S is closed the battery voltage is applied across the inductor L. Charging current flows through the inductor, building up a magnetic field, increasing as the switch is held closed. While the switch is closed, the diode D is reverse biased (open circuit) and current is supplied to the load by the capacitor C. Until the switch is opened the inductor current will increase linearly to a maximum value determined by the battery voltage, inductor value, and the amount of time the switch is held closed ($I_{PEAK} = V_{BAT}/L \times T_{ON}$). When the switch is opened, the magnetic field collapses, and the energy stored in the magnetic field is converted into a discharge current which flows through the inductor in the same direction as the charging current. Because there is no path for current to flow through the switch, the current must flow through the diode to supply the load and charge the output capacitor.

If the switch is opened and closed repeatedly, at a rate much greater than the time constant of the output RC, then a constant DC voltage will be produced at the output.

4.10.1 SWITCHING REGULATOR BIAS

The internal bias of SWITCHING REGULATOR circuit X9 is used only for biasing switching regulator components. The bias is provided by a Standard 5 uA bias cell type A54020. Its absolute value is not critical.

4.10.2 VREF2

The SWITCHING REGULATOR circuit X9 has an internal reference for monitoring switching regulator output voltage. The reference is provided by a standard cell reference type A53000 that is modified to use CrSi.

The reference circuit is chosen to keep non collectors at positive voltage. (Switching regulator can have voltages below the substrate voltage VSS1.)

The value and temperature coefficient of the circuit are not critical, and trim is not required.

4.10.3 RC OSC

The SWITCHING REGULATOR circuit X9 has an internal clock for switching the regulator at approx. 25 kHz. The clock is divided from 50 kHz to give a 50% duty cycle. It employs a standard cell reference type A55010 that is modified for CrSi. An approximate 150 kΩ external resistor is required.

4.10.4 SWITCHING REGULATOR COMPARATOR

The SWITCHING REGULATOR circuit X9 has a comparator that uses positive feedback for an improved response time of 3.5 us maximum.

4.11 VREG

The 5 V REGULATOR circuit X6 provides a 5 volt +/−2.5% regulated output for external electronics as well as VDD2 for internal logic. An external NPN is used to avoid thermal effects on the IC.

4.12 LOW VOLTAGE RESET

The LOW RESET circuit X8 resets the entire U1 ASIC. The power supply can (under various light conditions) take minutes to hours for power up, which eliminates normal power-on-reset circuits. This circuit must ensure that all outputs are valid until the analog circuits are operational.

The output holds all latches in reset until the bias, reference, and regulator circuits are all running at levels acceptable for operation.

4.13 Preferred Technology for the U1 ASIC

The U1 ASIC is suitably implemented in BIPOLAR-CMOS technology available from several semiconductor foundaries. It is typically implemented in the BI-CMOS process of Micro-Rel Division of Medtronic, Inc., 2343 W. 10th Place, Tempe, Ariz. 85281.

5.0 FUNCTIONAL DESCRIPTION OF THE U2 ASIC DEVICE

Figure 6A:
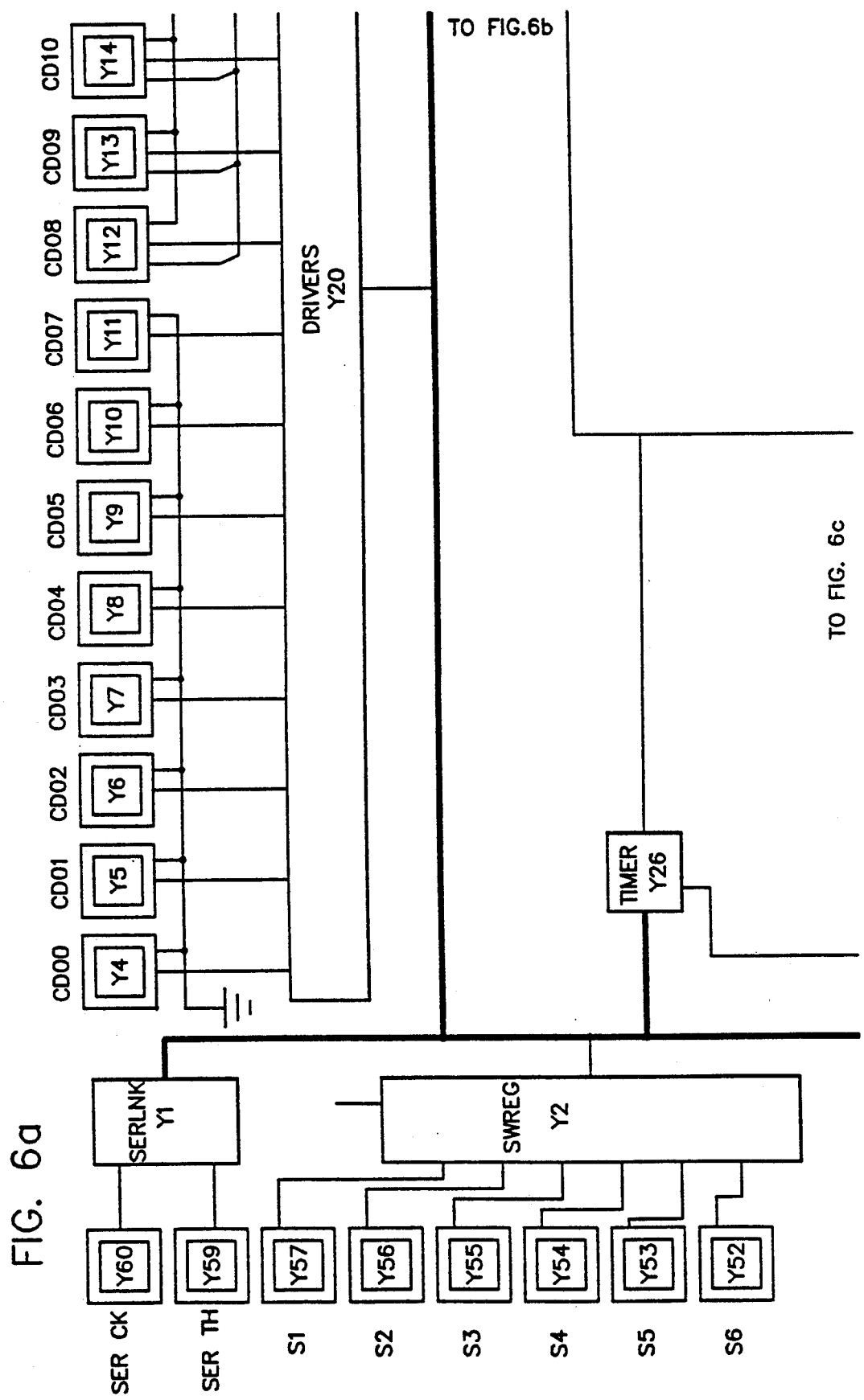
FIG. 6, consisting of FIG. 6a through FIG. 6d, is a block diagram of a second, U2, Application Specific Integrated Circuit (ASIC) used in the preferred embodiment of an irrigation controller in accordance with the present invention.

The block diagram of FIG. 6, consisting of FIG. 6a through FIG. 6f, shows the overall architecture of the second, U2, Application Specific Integrated Circuit (ASIC) used within the preferred embodiment of the irrigation controller in accordance with the present invention.

The U2 ASIC device is concerned with calculation, command, and control. It is primarily digital in operation, and may be considered to be a specialized microprocessor with substantial analog as well as digital I/O capabilities. The diagram of the U2 ASIC device shows the detailed interconnection of the various functional blocks.

5.1 U2 ASIC Device Architecture

5.1.1 Microprocessor

The central microprocessor Y31 of the U2 ASIC device is a NCR 65CX02 macrocell. It employs an 8-bit datapath structure controlled by an internal programmable logic array (PLA) using 8-bit instructions and having a 16-bit addressing capability. Importantly, all circuitry internal to the microprocessor is completely static and complementary so that the clock signal may be frozen and only leakage current will be consumed. It has a clock speed of 455 KHz and a 2.2 microsecond cycle time.

The microprocessor Y31 executes the instruction repertoire of commercially available microprocessor type 6502. The mnemonic codes for the instructions of this repertoire, such mnemonic codes as appear with the firmware program listing attached as Appendix A to this specification, are commonly recognized mnemonics, and a complete description of the microprocessor type 6502 instruction repertoire, are contained, among numerous other places, in the book "6502 Assembly Language Programming" by Lance A. Leventhal, published in 1979 by Osborne/McGraw Hill, 630 Bancroft Way, Berkeley, Calif. 94710. It will be recognized that, consonant with the modest computational requirements of an irrigation controller, the relatively simple 6502 microprocessor macrocell is not the sole type that could be employed, and that many microprocessors including types commonly incorporated in ASICs are suitable for use within the irrigation controller in accordance with the present invention.

The firmware instructions executed by microprocessor Y31 occupy memory addresses in accordance with the following memory map table:

| | |
|---|---|
| 00-3F | I/O Parts |
| 40-7FFF | RAM Memory U5 (shown in FIG. 3h) |
| 8000-FFFF | ROM Memory U4 (shown in FIG. 3f) |

The operand fields of the firmware instructions are interpretable in accordance with the following memory map table:

| | |
|---|---|
| 00 | O Microprocessor power off |
| 01 | O RTC counter clear |
| 02 | O A/D power, 1=on, 0=off |
| 03 | O A/D interface, 1=enable, 0=disable |
| 04 | O LCD power, 1=on, 0=off |
| 05 | O LCD interface, 1=enable, 0=disable |
| 06 | O Valve select byte |
| | bits 0-2 - valve #, + side |
| | bits 3-5 - valve #, − side |
| | bit 6 - polarity, 0=normal |
| 1=reversed 07 | O Valve enable, 1=on, 0=off |
| 08 | O TIMER hi byte latch |
| 09 | O TIMER lo byte latch |
| 0A | O TIMER control, 1=on, 0=off |
| 0B | O RTC, 1=10 seconds, 0=1 minute |
| 0C | O Serial clock |
| 0D | O TIMER load |
| 0E | O Write serial data out |
| 0F | O Serial output ready |
| 10 | I RTC counter hi byte |
| 11 | I RTC counter lo byte |
| 12 | I Status register 1 |
| | bit 0 - 0=external battery present |
| | bit 1 - 1=watchdog timeout |
| | bit 2 - 0=system power low |
| | bit 3 - 0=system power very low |
| | bit 4 - 0=RTC pulse |
| | bit 5 - 1=battery low or caps charging |
| | bit 6 - 1=serial data link present |
| | bit 7 - 0=serial data link ready |
| 13 | I Status register 2 |
| | bit 0 - Switch 1, 1=pressed STOP |
| | bit 1 - Switch 2 |
| | bit 2 - Switch 3 |
| | bit 3 - Switch 4 HELP |
| | bit 4 - Switch 5 NO |
| | bit 5 - Switch 6 OK |
| | bit 6 - |
| | bit 7 - 0=A/D end of conversion |
| 14 | I Read serial data in |
| 15 | I Read A/D converter |
| 16 | I Load serial shift register |
| 17 | I Clear input ready latch |
| 18 | I LCD busy flag & address counter (RS=0) |
| | bit 7 - 1=busy |
| | O LCD instruction register (RS=0) |
| 19 | I LCD read data (RS=1) |
| | O LCD write data (RS=1) |
| 1A | O LCD contrast select (0-7) |

-continued

| | |
|---|---|
| 1B | O Clear watchdog timer |
| 1C | O Clock RTC counter |
| 1D | I/O EEPROM |
| 1E | O Coil test drivers |
| 1F | O Sensor test drivers |
| 20 | O Start A/D channel 0, sensor 1 |
| 21 | O Start A/D channel 1, sensor 2 |
| 22 | O Start A/D channel 2, sensor 3 |
| 23 | O Start A/D channel 3, sensor 4 |
| 24 | O Start A/D channel 4, sensor 5 |
| 25 | O Start A/D channel 5, sensor 6 |
| 26 | O Start A/D channel 6, sensor 7 |
| 27 | O Start A/D channel 7, sensor 8 |
| 28 | O Start A/D channel 8, valve 1 |
| 29 | O Start A/D channel 9, valve 2 |
| 2A | O Start A/D channel 10, valve 3 |
| 2B | O Start A/D channel 11, valve 4 |
| 2C | O Start A/D channel 12, valve 5 |
| 2D | O Start A/D channel 13, valve 6 |
| 2E | O Start A/D channel 14, valve 7 |
| 2F | O Start A/D channel 15, valve 8 |
| 30-3F | |
| 40-FF | Zero page variables, pointers, and tables |
| 100-1FF | Stack |
| 200-3FF | Program variables |
| 8000 | ROM start |
| FFFA-FFFB | NMI vector |
| FFFC-FFFD | RESET vector |
| FFFE-FFFF | IRQ vector |

5.1.2 Drivers

The coil drivers Y20 work in pairs to supply relatively large bidirectional current pulses to operate electromagnetically actuated valves. Only one pair of coil drivers is active at a time, as specified by the contents of the data bus. Additionally, the output (coil) drivers have the capability to sink a regulated current for testing and programming purposes.

5.1.3 Timer

The timer Y26 consists of two 8-bit latches on the data bus and a 16-bit down counter which is clocked at 2 kHz. Loading of the counter and latches is under the control of the processor. When the counter reaches zero, a processor interrupt is generated.

5.1.4 ADC

The Analog-to-digital converter Y43 receives signals from external sensors and from the valves, a total of 16 channels in all, which are converted to digital information and placed on the data bus. The selection of the channel to be digitized is made on the basis of the contents of the address bus. The converted data is expressed as an eight-bit fraction. For the eight channels originating at the sensors and for the eight channels originating at the coils, this fraction is the ratio of the input voltage to the full power supply. All 16 ADC inputs may be pulled to ground through a poly resistor and an n-channel switch which together constitute a nominal 330 ohm resistance. The resistors associated with the eight channels originating at the sensors are enabled individually (as determined by the contents of the data bus) upon command of the processor. The performance specifications of the Analog-to-digital (A/D) Converter are as follows:

| | |
|---|---|
| a. Resolution/Accuracy | - 8 bits ± one-half LSB for $V_{IN} = 1$ (Vd) |
| | - 8 bits ± one LSB for $V_{IN} = \frac{1}{2}$ (Vd) |

-continued

| b. | Conversion Time | - $\frac{8}{f_{osc}} \times n$ where n = 8 or 9 depending upon whether the conversion is full scale or half scale. |
|---|---|---|
| c. | Operating Current | - 3 mA maximum |
| d. | Analog Reference | - Digital Supply Voltage (Vd) |
| e. | Analog Inputs (Vin) | - Each input voltage is ratiometric with the digital supply voltage (Vd) where: |
| | Vin for full scale | = ½ (Vd) for A/D channels 1 through 8 |
| | Vin for full scale | = 1 (Vd) for A/D channels 9 through 16 |

5.1.5 Clock/Calendar

This clock/calendar Y22 provides several timing functions. It generates a 2 second timing tick at 10 second or 1 minute intervals.

It keeps watch on the status of the programmer battery by generating a "Battery Low" status bit if either of two "Supercap Shunt" signals are absent for more than 64 second during programming activity.

It counts up to 65535 ticks while the processor is in a low voltage shutdown mode so as to provide calendar memory. The calendar contents may be placed on the data bus.

It maintains a 128 second dead-man timer which can generate a hardware reset if the processor fails.

5.1.6 Switch Register

The switch register Y2 acts as an interface between six external configuration switches and the data bus. An additional input is the end-of-conversion signal from the analog-to-digital converter.

5.1.7 Status Register

The status register Y3 makes the following internal flags available to the processor as data on the data bus: Battery Present, Dead-man timeout, System Low, System Very Low, Real Time Clock Tick, Battery Low, Serial Data Link Present, and External Ready.

5.1.8 Serial Data Link

The serial data link Y1 provides high speed synchronous two-way communication between the device and a remote data transceiver. Data is loaded or retrieved via the data bus under control of the processor. Transmission of serial data is also directly controlled by the processor.

5.1.9 Ready

These circuits Y23 provide handshaking between the processor and an external device (such as a serial data link) through the status register and data bus.

5.1.10 Wakeup

The wakeup circuit Y27, upon stimulation by either the Serial Data Link Present or the clock/calendar time-tic or the Battery Present signals, starts the main system oscillator and then after a 500 microsecond delay, removes the system reset. Upon stimulation by the System Very Low signal or by the processor, the wakeup circuit immediately causes the system to be reset. The dead-man timeout signal will cause a 30 microsecond reset pulse to occur at two second intervals until the processor resets it.

5.1.11 Main Oscillator

The main oscillator Y25 uses an external capacitor and a charge-discharge scheme to produce a high-speed clock for the processor. This oscillator can be shut down to conserve power. It will restart immediately upon command. The frequency of oscillations is determined by the size of the external capacitor. The relationship between capacitor size and frequency, as well as the frequency stability over changes in operating environment, may be tailored in consideration of the operational environment within which the irrigation controller is used.

5.1.12 LCD Interface

The LCD interface Y29 consists of a latch on the data bus and the control circuitry needed to operate an external liquid crystal display and the DAC. The LCD interface can be configured to function as the 6502 Data I/O port. The interface is configured in this way only during a special test mode. Under processor control, a flip flop is set which alters the internal logic paths so that the LCD bus will be configured as a 6502 Data I/O port. This special test feature allows the 6502 to be tested independently of the peripheral logic.

5.1.13 DAC

The four bit digital-to-analog converter Y32 provides a voltage, as specified by the contents of the data bus, through the LCD interface for contrast control of the external liquid crystal display.

The performance specification of the DAC are as follows:
a. Resolution: 4 bits
b. Accuracy: ±½ LSB for all voltage steps
c. Vout=n(0.147) where $0 \leq n \leq 15$
d. Io (min)=500 uA sink for Vout=OV±50 mV
e. Vo (max)=±50 mV for Io=500 uA for the DAC setting D3=D2=D1=D0=0

5.1.14 Address Decoding

The address decoder circuit Y38 uniquely maps all internal functions into page zero of the processor's memory space. The decoder produces timing and control signals for these internal circuits as well as for reading and writing of external memory.

5.1.15 Power Switching

The power switch circuit Y28 controls the power for the external ROM and display as well as the internal analog functions in order to conserve power and to permit the irrigation controller to enter a "sleep" mode.

5.1.16 Resistor Control

The resistor control circuit U42 permits reconfiguration of the sensor and coil interfaces to enable communication upon each of the A/D channel lines so that integrity of both valve coils and moisture elements may be self-tested. This is accomplished by selectively switching a low value resistor between the channel signal line and ground.

5.2 U2 ASIC Input/Output Description

5.2.1 CD0 - CD15 - Coil Driver Outputs

These pins operate in pairs, one pair at a time, when driving the coils of the electromagnetically actuated valves. One pin of the pair goes high while the other goes low in order to provide bidirectional current. Inactive coil driver pairs assume a high impedance state. When the coil is deenergized the driver circuitry must absorb the energy of the collapsing field. CD8-CD15 also function as analog inputs to the ADC. These pins have the additional capability of sinking a regulated current for testing and programming purposes.

5.2.2 ADC0 - ADC15 Analog Inputs to the ADC

These pins provide information from the coils and sensors whose integrity the processor must evaluate. ADC8-ADC15 are shared with the 8 valve lines CD8-CD15. ADC0-ADC7 are shared with the 8 sensor lines. All these 166 lines have the capability of sinking a regulated current for testing purposes.

5.2.3 SL - System Low

An active low input indicates that the condition of the power supply is such that further operation will soon be impossible. The processor, upon receiving this signal, will immediately turn off all valves in anticipation of approaching shutdown.

5.2.4 SVL - System Very Low

An active low signal indicates that the condition of the power supply is such that further operation is impossible. Upon receiving this signal the processor will immediately go into hibernation. After approximately 100 milliseconds, a hardware system reset will occur independently of the processor.

5.2.5 SH0, SH1 - Supercap Shunt Signals

If either of these signals persists in the high state for longer than 64 seconds, a Battery Low status will be generated.

5.2.6 BPR - Battery Present

An active low signal indicates that a battery is connected to the power supply so that the processor may run continuously.

5.2.7 S1 - S6 - Switch Inputs

Active high inputs with internal pulldowns go directly to the switch register.

5.2.8 A0 - A14 - Address Outputs

The external RAM and ROM are addressed by these pins. A0-A7 in conjunction with ALE also functions as D0-D7.

5.2.9 D0 - D7 Bidirectional Data Bus

The external RAM and ROM use these lines for transferring data to and from the device. The lower address bits are multiplexed with the data on these lines in conjunction with the ALE signal.

5.2.10 ALE - Address Latch Enable

When this signal is high, data transfers may take place on the D0-D7 pins. When this signal is low, these same pins are used as A0-A7 outputs.

5.2.11 RDYIN - Ready Input

This signal appears as one of the bits of the status register. RDYIN provides handshaking protocol from a distant serial data link. A low-to-high transition of this signal sets the Serial Data Link Present status bit low. The signal is provided with an internal pulldown.

5.2.12 RDYOUT - Ready Output

This signal passes the contents of data bus bit zero out of the device under control of the processor to provide handshaking protocol to a distant serial data link.

5.2.13 CEROM - ROM Chip Enable

This signal is used to enable the outputs of the external ROM onto the D0-D7 pins.

5.2.14 LCD0 - LCD7 - Liquid Crystal Data

These bidirectional signals transfer data to and from the external liquid crystal display. They are provided with internal pulldowns.

5.2.15 LCDEN - LCD Enable

This output signal enables the external liquid crystal display. This output signal can be made to exhibit high impedance with an internal pulldown.

5.2.16 LCDRS - LCD Register Select

This output signal informs the external LCD module that either data or command appears on the data inputs. This output signal can be made high impedance with an internal pulldown.

5.2.17 LCDRD - LCD Read

This output signal controls the direction of data flow to or from the external liquid crystal display. This output signal can be made to exhibit high impedance with an internal pulldown.

5.2.18 VLCD - Analog Output From the DAC to the External Liquid Crystal Display This analog output signal is used to control the display contrast.

5.2.19 VL - Switched Power to the External Liquid Crystal Display

When this signal is switched on it provides current from the device power input VDD. When it is switched off, it sinks current into the device power return VSS.

5.2.20 VA - Switched Power to the External Sensors

When this signal is switched on, it provides current from the device power input VDD. When it is switched off, it sinks current into the device power return VSS.

5.2.21 VP - Switched Power to the External ROM

When this signal is switched on, it provides current from the device power input VDD. When it is switched off, it sinks current into the device power return VSS.

5.2.22 Serial Clock - Clock Input/Output for Serial Data Transfer

When driven by the device for outward data transmission, this signal alternatively assumes a low impedance high state and a low impedance low state. If the low state persists for more than 20 to 40 nanoseconds then the signal remains at a high impedance with an internal pulldown. In this last state, the pin may be driven by an external source for inward data transfer (reception). The clocks generated by this pin may have a rate of up to 32,000 Hertz. This pin may be loaded with up to 300 picofarads capacitance.

5.2.23 Serial Data - Data Input/Output for Serial Data Transfer

When driven by the device for outward data transmission, this signal assumes a low impedance state whenever the Serial Clock is high, and then, if the clock low state persists for more than 20 to 40 nanoseconds, a high impedance with an internal pulldown. In this last state, the pin may be driven by an external source for inward data transfer (reception). The data generated by this pin may have a rate of up to 32,000 bits per second. This pin may be loaded with up to 300 picofarads.

5.2.24 C01, C02 - Capacitor Connections

Provides a connection for a capacitor whose value determines the frequency of the Main Oscillator.

5.2.25 READ (WRITENOT) - R/W Signal From the Processor

Indicates whether a memory read or memory write cycle is in progress.

5.2.26 PH 12 - Processor Clock

This signal is high during the active portion of the processor's operation. When low, the processor is precharging its internal busses. This signal must logically combine with Read and the appropriate address decode to create the control signals to apply to external memory.

5.2.27 CSE2 - EEEPROM Chip Select

This signal is used in conjunction with READ and PH12 for external EEPROM operations.

5.2.28 RSTB - Processor Reset

This active-low signal indicates that the processor is shut down and may be used to initialize external circuitry to the correct state for processor startup.

5.2.29 PAGE0 - Page Zero

This pin goes high when the address bus is in address area 0040H through 7FFFH inclusive.

5.2.30

VDD - Device positive supply.

5.2.31

VSS - Device negative supply.

5.2.32 CK - Real-Time Clock Input for Clock Calendar Timer

The frequency is nominally 2 Khz with a 30 u second high-going pulse.

5.2.33 SPSEL

When SPSEL=1, the chip requires a 32 Khz time based on the CK input. When SPSEL=0, the chip requires a 2 Khz time base on the CK input.

5.3 ASIC U2 Power Supply Requirements

| Parameter | Symbol | Min | Max | Units |
| --- | --- | --- | --- | --- |
| Power supply All circuitry active | VDD A | 4.5 | 5.5 | V |
| Power Supply | VDD B | 2.00 | 5.5 | V |

Real time clock, interrupt, and battery low detection circuitry operative. All other circuits are at a static, defined logic level (therefore, not being clocked).

| Active Supply Current | Ia | | 6.0 | mA |
| --- | --- | --- | --- | --- |

VDD = 5.5 v, 2 Khz Real time clock running, main oscillator running, processor, ADC, LCD interface logic running (only), DAC running, coil drivers in high-impedance state, external interface circuitry to EEPROM, ROM and RAM is active, however, the active current of the EEPROM, ROM and RAM is not included.

| Quiescent Supply Current | Iq | | 1.5 | uA |
| --- | --- | --- | --- | --- |

VDD = 5.5 v, Real time clock running, main oscillator stopped, processor stopped, coil drivers in high-impedance state, ADC, LCD, DAC are all powered off. External EEPROM and ROM are powered off. External RAM is at a static, defined logic level (therefore, not being clocked). The quiescent current of the RAM is not included in Iq.

5.4 ASIC U2 Signal Pin Requirements

Unless otherwise stated, the following characteristics apply over the applicable operating power supply range as specified above. All pins are protected against electrostatic discharge.

| Parameter | Symbol | Min | Max | Unit |
| --- | --- | --- | --- | --- |
| Capacitance of Inputs | Ci | | 10 | pF |
| Capacitance of Outputs | Co | | 10 | pF |
| Capacitance of Tristate | Ct | | 10 | pF |
| Input Leakage Current | Iil | −1 | +1 | uA |
| Tristate Leakage Current | Itl | −1 | +1 | uA |
| Passive Pulldown Current (@ Vih = VDD) | Ipd | −1 | −30 | uA |
| Active Pulldown Current (@ Vi = 2.5 v) | Irpd | −4 | −12 | mA |
| VA, VL, VP Output High Voltage | Voh | VDD − 0.3 | VDD + 0.3 | V |
| Output Low Voltage | Vol | −0.3 | +0.4 | V |
| Output High Current (@ Voh = VDD − 0.3 V) | Ioh | −6.0 | | mA |
| Output Low Current | Iol | 6.0 | | mA |
| Output Voltage Range | Volcd | 0.0 | 2.2 | V |
| Output Current (@ Vol = 0.05 V) Coil Driver Pins | Ioled | +0.5 | | mA |
| Input Voltage Range | See ADC8 - ADC15 below | | | |
| Output Pair Drop (@ I = 45 mA, Vdd = 4.5 v) ADC0 - ADC15 | Vdr | 0.0 | 1.0 | V |
| Input resistance | Rin | 10 Meg | | Ohm |

-continued

| Parameter | Symbol | Min | Max | Unit |
|---|---|---|---|---|
| Input Voltage Range C01, C02 | Vina | −0.0 | VDD | V |
| Output High Voltage | Voh | 0.5 | VDD + 0.3 | V |
| Output Low Voltage | Vol | −0.3 | 0.4 | V |
| Output High Current (@ Voh = 2.5 V) | Ioh | −4.0 | −12.0 | mA |
| Output Low Current (@ Vol = 0.4 V) | Iol | 4.0 | | mA |
| All Other Pins | | | | |
| Input High Voltage | Vih | 2.0 | VDD + 0.3 | V |
| Input Low Voltage | Vil | −0.3 | 0.8 | V |
| Output High Voltage | Voh | VDD − 0.5 | VDD + 0.3 | V |
| Output Low Voltage | Vol | −0.3 | +0.4 | V |
| Output High Current (@ Voh - VDD − 0.5 V) | Ioh | −2.0 | | mA |
| Output Low Current (@ Vol = 4.0 V) | Iol | 4.0 | | mA |

5.5 ASIC U2 Mechanical Characteristics

5.5.1 Package Requirements

The device is packaged in an 84-pin plastic leaded chip carrier. The package life exceeds 20 years.

5.5.2 Environmental Requirements

The limits below represent the environmental limits to which the device will ordinarily be subjected.

| Rating | Value | Unit |
|---|---|---|
| Storage Temperature | −40 to +85 | deg C. |
| Operating Temperature | −10 to +70 | deg C. |
| Lead Temperature (4 min soldering) | 250 | deg C. |
| Humidity | 85/85 | deg C./percents |

5.6 Preferred Technology for Implementation of the U2 ASIC

The preferred embodiment of ASIC U2 is preferably implemented in the CMOS technology of NCR Corporation, Dayton, Ohio. This technology, and the design rules and standard cells therein, is discussed in the "NCR ASIC Data Book" for January, 1987. The equivalent technologies of other manufacturers will be realized to be equally suitable. It will be understood that the irrigation system of FIG. 2 could also be implemented using standard integrated circuit and microprocessor components in combination with a control program corresponding to that of attachment A. Such a system could be used alternately to implement the present method.

6.0 Variations and Adaptations of the Invention

Although the present invention has been taught in the context of electrical circuits that are fairly sophisticated for employing both a predominantly digital ASIC (ASIC U2), it should be understood that the functionality of the preferred embodiment of an irrigation controller in accordance with the present invention is readily realizable by diverse alternative designs. In particular, the core microprocessor of the preferred embodiment of the invention is 100% compatible with industry standard type 6502. All firmware appended to this specification will execute on a 6502 microprocessor, and is readily convertible to alternative microinstruction repertoires executing on alternative microprocessors. The circuits by which data is manually input to the microprocessor and displayed, and the control of irrigation valves, are, in the preferred embodiment of the invention, powered and sequenced to states of activity in a highly unique manner. Nonetheless, it will be recognized that alternative implementations of these circuits, particularly as consume higher power and/or operate at higher or continuous duty cycles, are readily realizable by a practitioner of the electrical design arts. Accordingly, the present invention should be considered in terms of the functions that it performs, and not solely in terms of any particular embodiment for realizing these functions.

Considering these functions performed, the present invention will be recognized to be embodied in methods and in an apparatus for controlling irrigation at one or more watering stations. In accordance with the invention irrigation parameters selected from one or more of; soil type, irrigation head type, terrain type, total irrigation time per watering station, exclusionary periods, water budgeting information, deep soak cycles, and syringe cycles preentered into an irrigation controller. A maximum on time for an individual irrigation cycle and a minimum off time between irrigation cycles are determined in response to and as a function of selected ones of the entered irrigation parameters. The irrigation cycles for each watering station are scheduled in accordance with and as a function of at least some of the entered irrigation parameters as well as the determined on and off times. Each watering station is controlled in accordance with its respective scheduled irrigation cycles.

In accordance with these and other aspects and attributes of the present invention, the invention should be determined by the scope of the following claims, only, and not solely in accordance with those particular embodiments within which the invention has been taught.

APPENDIX A

IRRIGATION CONTROLLER FIRMWARE
PROGRAM LISTING

```
2500 A.D. 6502 Macro Assembler  -  Version 4.01b
------------------------------------------------

Input Filename : leit.asm
          Output Filename : leit.obj
```

```
  1                       TITLE   'Controller Firmware, Version 2.09'
  2
  3               ;       by Dennis Kaiser
  4               ;       SOLATROL, Inc.
  5               ;       San Diego, CA,  1 Sep 88
  6
  7               ;       Code for the 65C02 processor
  8               ;       Clock speed 455 KHz, cycle time 2.2 microseconds
  9
 10  0000                 CHIP         65C02
 11                       MACLIST      OFF
 12                       ASCLIST      OFF
 13  0000                 INCLUDE      EQUATES.ASM
 14               ;------------------------------------------------
 15               ;       MEMORY MAP
 16               ;------------------------------------------------
 17
 18               ;00-3F       I/O
 19               ;40-7FFF     RAM
 20               ;8000-FFFF   ROM
 21
 22               ;00          O Microprocessor power off
 23               ;01          O RTC counter clear
 24               ;02          O A/D power, 1=on, 0=off
 25               ;03          O A/D interface, 1=enable, 0=disable
 26               ;04          O LCD power, 1=on, 0=off
 27               ;05          O LCD interface, 1=enable, 0=disable
 28               ;06          O Valve select byte
 29               ;                    bits 0-2 - valve #, + side
 30               ;                    bits 3-5 - valve #, - side
 31               ;                    bit 6 - polarity, 0=normal, 1=reversed
 32               ;07          O Valve enable, 1=on, 0=off
 33               ;08          O TIMER hi byte latch
 34               ;09          O TIMER lo byte latch
 35               ;0A          O TIMER control, 1=on, 0=off
 36               ;0B          O RTC, 1=10 seconds, 0=1 minute
 37               ;0C          O Serial clock
 38               ;0D          O TIMER load
 39               ;0E          O Write serial data out
 40               ;0F          O Serial output ready
 41               ;10          I RTC counter hi byte
 42               ;11          I RTC counter lo byte
 43               ;12          I Status register 1
 44               ;                    bit 0 - 0=external battery present
 45               ;                    bit 1 - 1=watchdog timeout
 46               ;                    bit 2 - 0=system power low
 47               ;                    bit 3 - 0=system power very low
 48               ;                    bit 4 - 0=RTC pulse
 49               ;                    bit 5 - 1=battery low or caps charging
 50               ;                    bit 6 - 1=serial data link present
 51               ;                    bit 7 - 0=serial data link ready
 52               ;13          I Status register 2
 53               ;                    bit 0 - Switch 1, 1=pressed STOP
 54               ;                    bit 1 - Switch 2
```

```
55      ;                       bit 2 - Switch 3
56      ;                       bit 3 - Switch 4 HELP
57      ;                       bit 4 - Switch 5 NO
58      ;                       bit 5 - Switch 6 OK
59      ;                       bit 6 -
60      ;                       bit 7 - 0=A/D end of conversion
61      ;14            I  Read serial data in
62      ;15            I  Read A/D converter
63      ;16            I  Load serial shift register
64      ;17            I  Clear input ready latch
65      ;18            I  LCD busy flag & address counter (RS=0)
66      ;                       bit 7 - 1=busy
67      ;              O  LCD instruction register (RS=0)
68      ;19            I  LCD read data (RS=1)
69      ;              O  LCD write data (RS=1)
70      ;1A            O  LCD contrast select (0-7)
71      ;1B            O  Clear watchdog timer
72      ;1C            O  Clock RTC counter
73      ;1D            IO EEPROM
74      ;1E            O  Coil test drivers
75      ;1F            O  Sensor test drivers
76      ;20            O  Start A/D channel 0, sensor 1
77      ;21            O  Start A/D channel 1, sensor 2
78      ;22            O  Start A/D channel 2, sensor 3
79      ;23            O  Start A/D channel 3, sensor 4
80      ;24            O  Start A/D channel 4, sensor 5
81      ;25            O  Start A/D channel 5, sensor 6
82      ;26            O  Start A/D channel 6, sensor 7
83      ;27            O  Start A/D channel 7, sensor 8
84      ;28            O  Start A/D channel 8, valve 1
85      ;29            O  Start A/D channel 9, valve 2
86      ;2A            O  Start A/D channel 10, valve 3
87      ;2B            O  Start A/D channel 11, valve 4
88      ;2C            O  Start A/D channel 12, valve 5
89      ;2D            O  Start A/D channel 13, valve 6
90      ;2E            O  Start A/D channel 14, valve 7
91      ;2F            O  Start A/D channel 15, valve 8
92      ;30-3F
93      ;40-FF         Zero page variables, pointers, and tables
94      ;100-1FF       Stack
95      ;200-3FF       Program variables
96      ;8000          ROM start
97      ;FFFA-FFFB     NMI vector
98      ;FFFC-FFFD     RESET vector
99      ;FFFE-FFFF     IRQ vector
100
101
102     ;------------------------------------
103     ;      VARIABLES, ZERO PAGE
104     ;------------------------------------
105
106             ;RAM LOCATIONS
107 0000                PAGE0
108 0040                ORG     $40
109 0040        CKSUM   DS      1       ;checksum value
110 0041        LSB     DS      1       ;general purpose register
111 0042        MSB     DS      1       ;general purpose register
112 0043        MSGPTR  DS      2       ;16 bit message pointer
113 0045        ADCHANNEL DS    1       ;A/D channel number
114 0046        TIMCTR  DS      1       ;down counter for TIMER int
115 0047        TIMCTR2 DS      1       ;another one
116 0048        CURSOR  DS      1       ;LCD cursor address
117 0049        VALVE   DS      1       ;valve number
118 004A        SENSOR  DS      1       ;sensor number
119 004B        E2WR    DS      1       ;byte to send to EEPROM
120 004C        E2MASK  DS      1       ;byte to EEPROM interface
121 004D        E2ADDR  DS      1       ;address in EEPROM (0-3FH)
122 004E        MULTIPLIER DS   1       ;math variables
```

```
123  004F              MULTIPLICAND  DS   1
124  0050              PRODUCT       DS   2
125  0052              DIVIDEND      DS   2
126  0054              DIVISOR       DS   2
127  0056              QUOTIENT      DS   2
128  0058              MODE          DS   2    ;present menu selection
129  005A              MENUPTR       DS   2    ;menu info ptr
130
131  005C              KEYREG        DS   1    ;the present key
132  005D              KEYPRESS      DS   1    ;a good key
133  005E              KEYMASK       DS   1    ;keyboard enable mask
134  005F              REPCTR        DS   1    ;repeat counter
135  0060              REPEAT_MASK   DS   1    ;which keys to repeat
136  0061              IBFR          DS   10   ;input buffer
137  006B              INTCTR        DS   1    ;counts INTs for scrolling or blinking
138  006C              BLINK         DS   1    ;tells INT to blink or scroll
139  006D              FLAGS         DS   1    ;bit 0 - 1=power key in
140                                            ;bit 1 - 1=serial data link
141                                            ;bit 2 - 1=SL
142                                            ;bit 3 - 1=help in progress
143                                            ;bit 4 -
144                                            ;bit 5 -
145                                            ;bit 6 - 1=cursor on
146                                            ;bit 7 - toggle for blinking "?"
147  006E              REPEAT_RATE   DS   1    ;rep rate for repeat key
148  006F              DIGIT         DS   3    ;3 digits ASCII to display
149  0072              HELPNUM       DS   1    ;index into scrolling msgs
150  0073              CTR           DS   2    ;16 bit counter
151  0075              SRCPTR        DS   2    ;source pointer
152  0077              DESTPTR       DS   2    ;destination pointer
153  0079              ERROR         DS   1    ;passing errors from subroutines
154  007A              STARTCTR      DS   1    ;the current start
155  007B              STARTPTR      DS   2    ;pointer to start times in object pgm
156  007D              VCTR          DS   18   ;duration down counters
157  008F              TR            DS   18   ;time remaining for watering
158  00A1              SECCTR        DS   2    ;counts seconds
159  00A3              HPTR          DS   18   ;history pointers for valve starts
160  00B5              HREAD         DS   2    ;read pointer in history
161  00B7              HWRITE        DS   2    ;write pointer in history
162  00B9              HDATE         DS   2    ;date of last history entry
163  00BB              SOURCE        DS   1    ;the setup in use
164  00BC              R1            DS   1    ;local use registers
165  00BD              R2            DS   1
166  00BE              R3            DS   1
167  00BF              R4            DS   1
168  00C0              TARGET        DS   9    ;target soil moistures
169  00C9              DEFAULT       DS   6    ;storage for defaults
170  00CF              OFFSET        DS   4    ;next available start time
171  00D3              SECRET        DS   1    ;secret code type
172  00D4              CONTRAST      DS   1    ;LCD contrast
173  00D5              SCREENS       DS   1    ;how many screens to display
174  00D6              SCREEN        DS   1    ;the current screen displayed
175  00D7              SUB           DS   1    ;which sub source in use
176  00D8              ALTCLK        DS   2    ;clock for semi-auto to use
177  00DA              EMCLK         DS   2    ;clock for emulation to use
178  00DC              WATERCLK      DS   2    ;actual clock in use
179  00DE              POSITION      DS   1    ;valve/sensor connector location
180  00DF              ADDATA        DS   2    ;AD reading
181  00E1              R5            DS   1
182  00E2              INTCMD        DS   1    ;command for interrupt (send NO keys)
183  00E3              CMDCTR        DS   1    ;repeat counter for auto NO key
184  00E4              STTS          DS   1    ;status byte at reset
185  00E5              R6            DS   1
186
```

```
187             ;------------------------------------
188             ;     VARIABLES, NON ZERO-PAGE
189             ;------------------------------------
190
191  0000                        DATA
192  0200                        ORG      $0200
193  0200        CKDATA          DS       16      ;checksum data
194  0210        AD              DS       16      ;16 bytes of AD readings
195  0220        TIMEON          DS       18      ;how long valve was on
196  0232        S               DS       2       ;start time for valve
197  0234        E               DS       2       ;end time for valve
198  0236        WT              DS       2       ;watering time for valve
199  0238        NXTTIME         DS       18      ;next watering time while generating
200  024A        BASETYPE        DS       9       ;0=base watering, 2=soak
201  0253        SNUM            DS       1       ;number of syringes (end-start / how often)
202  0254        NSPLIT          DS       9       ;# of starts generated for each valve
203  025D        SL              DS       1       ;1=System Low flag
204  025E        IDBFR           DS       9       ;bfr to edit valve/sensor IDs
205  0267        CHKFLAG         DS       1       ;flag to generator
206  0268        VSYR            DS       9       ;number of syringes displayed
207  0271        NSYR            DS       1       ;total number of syringes
208  0272        REVIEW          DS       1       ;new, review, or modify schedules
209  0273        SEL1            DS       1       ;temp storage in select routines
210  0274        SEL2            DS       1
211  0275        CHARGING        DS       1       ;contrast for charging msg
212
213             ;------------------------------------
214             ;     SYSTEM BLOCK
215             ;------------------------------------
216
217  0276        SYSTEM_BLOCK:
218
219  0276        HOUR            DS       1       ;real time clock
220  0277        MINUTE          DS       1
221  0278        DOW             DS       1
222  0279        MONTH           DS       1
223  027A        DAY             DS       1
224  027B        YEAR            DS       1
225  027C        DIM             DS       1       ;number of days in the month
226  027D        VS              DS       9       ;valve status
227                                               ;bit 7 - 0=no ID
228                                               ;bit 6 - 0=disabled
229                                               ;bit 5 - 1=master valve
230                                               ;bit 4 - 0=off, 1=on
231                                               ;bit 3-0 - station type
232  0286        SS              DS       9       ;sensor status
233  028F        DRY_LEVEL       DS       9
234  0298        SOAK_LEVEL      DS       9
235  02A1        RAIN            DS       1       ;rain sensor, 0=disabled
236  02A2        CODES           DS       1       ;0=secret codes disabled
237  02A3        CODE1           DS       4       ;4 ASCII bytes
238  02A7        CODE2           DS       4
239  02AB        CODE3           DS       4
240  02AF        CID             DS       6       ;controller ID
241  02B5        FAILSAFE        DS       4       ;hour, minute, duration(2) for backup pgm
242  02B9        VALVEID         DS       9       ;valve position and polarity
243  02C2        SENSORID        DS       9       ;same deal for sensors
244  02CB        TERRAIN         DS       9       ;terrain
245  02D4        SPRINKLER       DS       9       ;sprinkler type
246  02DD                        DS       9       ;spares
247  02E6                        DS       20      ;spares
248                                               ;end of SYSTEM SETTINGS
249             ;                        -----------
250             ;        total            132
251
```

```
252                 ;----------------------------------
253                 ;      RUN BLOCK
254                 ;----------------------------------
255
256   02FA          RUN_BLOCK:
257
258   02FA          SETUPS        DS     3      ;which setups to run
259   02FD          RAIN_DELAY    DS     1      ;# of days to wait before run
260   02FE          GLOBAL        DS     1      ;% of watering
261   02FF          BUDGET        DS     9      ;individual budgeting
262   0308                        DS     18     ;spares
263   031A          DAYNUM        DS     4      ;day to generate
264                                             ;byte 0-1=day # or wk #, byte 2=specific days
265   031E          WCLK          DS     1      ;which clk to use
266                                             ;0=RTC, 1=Altclk, 2=Emclk
267                                             ;end of RUN SETTINGS
268   031F          RUNNING       DS     1      ;condition of RUN
269                                             ;0 = no watering
270                                             ;1 = ready to run when key out
271                                             ;2 = start or resume watering
272                                             ;3 = running
273                                             ;4 = waiting for midnite
274                                             ;5 = halted by menu, can resume
275                                             ;6 = halted by SL, must start new
276                 ;                   ----------
277                 ;      total        38
278
279                 ;----------------------------------
280                 ;      SOURCE STORAGE
281                 ;----------------------------------
282
283   0900                        ORG    $0900
284   0900          SRC1          DS     172    ;Mini set up
285   09AC          SRC2          DS     172    ;Auto-split set up
286   0A58          SRC3          DS     172    ;Ration set up
287   0B04          SRC4          DS     172    ;ISC set up
288   0BB0          SRC5          DS     172    ;One time set up
289   0C5C          SRC6          DS     172    ;Special set up
290   0D08          SRC7          DS     4      ;Failsafe setup
291   0D0C          SRC8          DS     1024   ;ISC starts
292   110C          SRC9          DS     1024   ;Special starts
293                 ;                   ----------
294                 ;      total        3084
295
296                 ;----------------------------------
297                 ;      OBJECT STORAGE
298                 ;----------------------------------
299
300                                             ;this is the source currently in use
301   1540                        ORG    $1540
302   1540          OBJBASE:
303   1540          SOURCE_TYPE   DS     1      ;source type
304   1541          CYCLE_TYPE    DS     1      ;0=so many, 1=specific, 2=odd, 3=even
305   1542          MAXON         DS     9      ;maximum on time
306   154B          MINOFF        DS     9      ;minimum off time for splits
307   1554          XFROM         DS     2      ;excluded time, from-to
308   1556          XTO           DS     2
309   1558
310   1558          DUR1          DS     18     ;base durations
311   156A          CYCLE1        DS     18     ;base cycles
312   157C          BASE_START    DS     2      ;time of first start
313
314   157E          DUR2          DS     18     ;syringe durations
315   1590          CYCLE2        DS     18     ;cycles (daily if syringe)
316   15A2          ACTIVE_MONTH  DS     13     ;months to syringe
317   15AF          SYRINGE_START DS     2      ;time to start syringing
318   15B1          SYRINGE_END   DS     2      ;time to end syringes
```

```
319  15B3                SOFTEN       DS     2      ;how often to syringe
320  15B5                DUR3         DS     18     ;soak durations
321  15C7                CYCLE3       DS     18     ;soak cycles
322  15D9                             DS     19     ;spares
323                  ;                       ----------
324                  ;       total           172
325
326  15EC                NSTARTS      DS     1      ;number of starts
327  15ED                GENTIME      DS     2      ;time to generate a new schedule
328  15EF                DONETIME     DS     2      ;end of watering for the day
329  15F1                STARTS       DS     1024   ;128 starts @ 8 bytes each
330                                                 ;END OF OBJECT STORAGE
331                  ;------------------------------------
332                  ;       OTHER RAM STORAGE
333                  ;------------------------------------
334
335  1A00                             ORG    $1A00
336  1A00                BFR          DS     512    ;serial interface bfr
337  1C00                HISTORY      DS     1016   ;127 history entries @ 8 bytes each
338  1FF8                HEND         DS     8      ;end of history buffer
339
340                  ;------------------------------------
341                  ;       CONSTANTS
342                  ;------------------------------------
343
344                  ;I/O ADDRESSES
345  00E6                             PAGE0
346        0000       POWER_OFF    EQU    0      ;processor power off
347        0001       RTC_CLR      EQU    1      ;clear RTC counter
348        0002       AD_POWER     EQU    2      ;A/D power
349        0003       AD_ENABLE    EQU    3      ;A/D enable
350        0004       LCD_POWER    EQU    4      ;LCD power
351        0005       LCD_ENABLE   EQU    5      ;LCD enable
352        0006       VALVE_SETUP  EQU    6      ;valve select
353        0007       VALVE_ENABLE EQU    7      ;valve enable
354        0008       TIMER_MSB    EQU    8      ;TIMER hi byte
355        0009       TIMER_LSB    EQU    9      ;TIMER lo byte
356        000A       TIMER        EQU    $0A    ;TIMER on/off
357        000B       RTC          EQU    $0B    ;Real time clock
358        000C       SERIAL_CLK   EQU    $0C    ;Serial interface clock
359        000D       TIMER_LOAD   EQU    $0D    ;load TIMER msb,lsb into TIMER
360        000E       SERIAL_OUT   EQU    $0E    ;output serial data
361        000F       SO_RDY       EQU    $0F    ;serial output ready
362        0010       RTC_MSB      EQU    $10    ;RTC counter hi byte
363        0011       RTC_LSB      EQU    $11    ;RTC counter lo byte
364        0012       STATUS1      EQU    $12    ;1st status byte
365        0013       STATUS2      EQU    $13    ;2nd status byte
366        0014       SERIAL_IN    EQU    $14    ;serail data in
367        0015       AD_DATA      EQU    $15    ;read A/D data
368        0016       SO_LOAD      EQU    $16    ;load serial shift register
369        0017       SI_CLR       EQU    $17    ;clear serial in ready
370        0018       LCD_STATUS   EQU    $18    ;LCD register 0
371        0018       LCD_CMD      EQU    $18
372        0019       LCD_DATA     EQU    $19    ;LCD register 1
373        001A       LCD_CONTRAST EQU    $1A    ;LCD contrast
374        001B       WATCHDOG     EQU    $1B    ;Watchdog timer
375        001C       RTC_TEST     EQU    $1C    ;RTC counter clock
376        001D       E2           EQU    $1D    ;EEPROM
377        001E       WCVALVES     EQU    $1E    ;Wire check drivers for valves
378        001F       WCSENSORS    EQU    $1F    ;Wire check drivers for sensors
379        0020       ADBASE       EQU    $20    ;A/D base address
380
381
382                  ;OTHER CONSTANTS
383
384        0040       NEG          EQU    01000000B
385        0000       POS          EQU    0
386        0040       SI_PRESENT   EQU    01000000B    ;serial device plugged in
```

```
387    0002        E2CS        EQU    2                  ;bit for EEPROM chip select
388    0001        E2SK        EQU    1                  ;bit for EEPROM serial clock
389    0080        E2READ_CMD  EQU    10000000B          ;EEPROM read command
390    0040        E2WRITE_CMD EQU    01000000B          ;EEPROM write command
391    00C0        E2ERASE_CMD EQU    11000000B          ;EEPROM erase command
392    0030        E2EWEN_CMD  EQU    00110000B          ;EEPROM erase/write enable cmd
393    0019        PERSEC      EQU    25                 ;how many INTs per second
394    000A        SLOW_REPEAT EQU    10                 ;how many INT routines to repeat key
395    0006        BLINK_RATE  EQU    6                  ;to blink
396    0007        SRATE1      EQU    7                  ;scrolling blank time
397    003E        SRATE2      EQU    62                 ;scroll msg time
398    0078        SRATE3      EQU    120                ;last msg time
399    0064        SRATE4      EQU    100                ;self test msg time
400    0003        FAST_REPEAT EQU    3                  ;fast time set up repeat
401    0020        OKKEY       EQU    00100000B          ;switch 6
402    0010        NOKEY       EQU    00010000B          ;switch 5
403    0008        HELPKEY     EQU    00001000B          ;switch 4
404    0001        STOPKEY     EQU    00000001B          ;switch 1
405    0040        LINE2       EQU    $40                ;cursor addr for display line 2
406    0030        ASCMASK     EQU    00110000B          ;change 0-9 to ASCII
407    0080        VID         EQU    10000000B          ;valve ID bit in VS
408    0040        VEN         EQU    01000000B          ;enable bit in VS
409    0032        ADWAIT      EQU    50                 ;ms to wait before read (coil test)
410
411    0000        RREVIEW     EQU    0                  ;review byte in schedule setup
412    0001        RMODIFY     EQU    1
413    0002        RNEW        EQU    2
414
415    2000                    DATA                      ;16 bit constants
416
417                ;----------------------------------
418                ;   MACROS
419                ;----------------------------------
420
421                DBLW:  MACRO   A0                     ;multiply word by 2
422                       CLC
423                       ROL     A0
424                       ROL     A0+1
425                       ENDM
426
427                DBL:   MACRO   A0                     ;multiply byte by 2
428                       CLC
429                       ROL     A0
430                       ENDM
431
432                DBLX:  MACRO                          ;multiply index by 2
433                       PHA
434                       CLC
435                       TXA
436                       ROL     A
437                       TAX
438                       PLA
439                       ENDM
440
441                RTC10: MACRO                          ;set up RTC for 10 seconds
442                       LDA     #1
443                       STA     RTC
444                       ENDM
445
446                RTC60: MACRO                          ;set up RTC for 60 seconds
447                       LDA     #0
448                       STA     RTC
449                       ENDM
450
451                RTC_PULSE: MACRO                      ;check for RTC timeout
452                       LDA     STATUS1
453                       AND     00001000B
454                       ENDM
```

```
455
456     SET:       MACRO   A0              ;store a 1 to memory
457                LDA     #1
458                STA     A0
459                ENDM
460
461     MESSAGE:   MACRO   A0              ;display msg
462                LDX     #A0
463                JSR     DISPLAY_MSG
464                ENDM
465
466     CURSOR_OFF: MACRO                  ;display on, no cursor or blink
467                LDX     #5
468                JSR     CMD
469                ENDM
470
471     CURSOR_ON: MACRO                   ;display on, show cursor
472                LDX     #3
473                JSR     CMD
474                ENDM
475
476     SET_CURSOR: MACRO   A0             ;move cursor to address
477                LDA     #A0
478                JSR     LCD_ADDR
479                ENDM
480
481     BACKUP:    MACRO   A0              ;backup cursor
482                LDA     #A0
483                JSR     DEC_LCD_ADDR
484                ENDM
485
486     SKIP:      MACRO   A0              ;move cursor ahead
487                LDA     #A0
488                JSR     INC_LCD_ADDR
489                ENDM
490
491     BLT:       MACRO   A0              ;branch if A<M
492                BCC     A0
493                ENDM
494
495     BGE:       MACRO   A0              ;branch if A>=M
496                BCS     A0
497                ENDM
498
499     ADD16:     MACRO   A0,A1,A2        ;A2=A0+A1, 16 bits
500                CLC
501                LDA     A0
502                ADC     A1
503                STA     A2
504                LDA     A0+1
505                ADC     A1+1
506                STA     A2+1
507                ENDM
508
509     INC16:     MACRO   A0              ;increment a 16 bit number
510                CLC
511                LDA     A0
512                ADC     #1
513                STA     A0
514                LDA     A0+1
515                ADC     #0
516                STA     A0+1
517                ENDM
518
519     MOV16:     MACRO   A0,A1           ;move 16 bits from A0 to A1
520                LDA     A0
521                STA     A1
522                LDA     A0+1
```

```
523             STA     A1+1
524             ENDM
525
526     LDW:    MACRO   A0,A1           ;load 16 bits of immediate data
527             LDA     #<A1
528             STA     A0
529             LDA     #>A1
530             STA     A0+1
531             ENDM
532
533     SLOW:   MACRO   A0              ;repeat a key slowly
534             LDA     #SLOW_REPEAT
535             STA     REPEAT_RATE
536             LDA     #A0
537             STA     REPEAT_MASK
538             ENDM
539
540     FAST:   MACRO   A0              ;repeat a key quickly
541             LDA     #FAST_REPEAT
542             STA     REPEAT_RATE
543             LDA     #A0
544             STA     REPEAT_MASK
545             ENDM
546
547     HELP:   MACRO   A0              ;do scrolling message
548             LDA     #A0             ;and ask for repeat
549             STA     HELPNUM
550             JSR     HELP_MSG
551             ENDM
552
553     SCROLL: MACRO   A0              ;do scrolling message
554             LDA     #A0
555             STA     HELPNUM
556             JSR     SCROLL_MSG
557             ENDM
558
559     SELECT: MACRO   A0,A1           ;set up for get number
560             STA     IBFR            ;selection in A
561             LDA     #A0
562             STA     IBFR+1
563             LDA     #A1
564             STA     IBFR+2
565             JSR     GETNUM
566             ENDM
567
568     SELECT_MUL: MACRO A0,A1,A2      ;select msg, medium speed, underline
569             STA     IBFR
570             LDA     #A0
571             STA     IBFR+1
572             LDA     #A1
573             STA     IBFR+2
574             LDA     #A2
575             STA     IBFR+3
576             JSR     GETMUL
577             ENDM
578
579     SELECT_SOK: MACRO A0,A1,A2      ;select msg, slow speed, OK char
580             STA     IBFR
581             LDA     #A0
582             STA     IBFR+1
583             LDA     #A1
584             STA     IBFR+2
585             LDA     #A2
586             STA     IBFR+3
587             JSR     GETSOK
588             ENDM
589
590     SELECT_MOK: MACRO A0,A1,A2      ;select msg, medium speed, OK char
591             STA     IBFR
```

```
592                     LDA     #A0
593                     STA     IBFR+1
594                     LDA     #A1
595                     STA     IBFR+2
596                     LDA     #A2
597                     STA     IBFR+3
598                     JSR     GETMOK
599                     ENDM
600
601         UL:         MACRO                   ;turn on blinking underline
602                     SET     BLINK
603                     STZ     INTCTR
604                     ENDM
605
606         QM:         MACRO                   ;turn on blinking question mark
607                     LDA     #2
608                     STA     BLINK
609                     STZ     INTCTR
610                     ENDM
611
612         OK:         MACRO                   ;turn on blinking OK char
613                     LDA     #5
614                     STA     BLINK
615                     STZ     INTCTR
616                     ENDM
617
618         NOBLINK:    MACRO                   ;kill all blinking
619                     STZ     BLINK
620                     STZ     INTCTR
621                     ENDM
622
623         SHR16:      MACRO   A0              ;shift 16 bits right (divide by 2)
624                     CLC
625                     ROR     A0+1
626                     ROR     A0
627                     ENDM
628
629         ANSLOW:     MACRO                   ;auto NO key on slow
630                     LDA     #1
631                     STA     INTCMD
632                     ENDM
633
634         ANMED:      MACRO                   ;auto NO key on medium
635                     LDA     #2
636                     STA     INTCMD
637                     ENDM
638
639         ANFAST:     MACRO                   ;auto NO key on fast
640                     LDA     #3
641                     STA     INTCMD
642                     ENDM
643
644         ANOFF:      MACRO                   ;auto NO key off
645                     STZ     INTCMD
646                     ENDM
647
648
649
650
651
652  2000               INCLUDE  CYCLE.ASM
653               ;---------------------------------------
654               ;       START OF CODE
655               ;---------------------------------------
656  0000               CODE
657  8000               ORG      $8000
658
```

```
659                         ;----------------------------------
660                         ;      POWER ON
661                         ;----------------------------------
662
663   8000  A2 FF   RESET:  LDX   #$FF              ;init stack pointer
664   8002  9A              TXS
665   8003  78              SEI
666   8004  64 6D            STZ   FLAGS
667   8006  A5 12            LDA   STATUS1           ;save status
668   8008  85 E4            STA   STTS
669   800A  29 0B            AND   #00001000B        ;if SVL, then forget everything
670   800C  D0 03            BNE   RS0
671   800E  4C CB 81         JMP   DEATH
672   8011  85 1B   RS0:    STA   WATCHDOG          ;clear the dog
673   8013  20 CB A2         JSR   CALCSUM           ;if RAM OK, then not first time on
674   8016  C5 40            CMP   CKSUM
675   8018  D0 03            BNE   RAMNG
676   801A  4C A0 80         JMP   RAMOK
677
678   801D  A5 E4   RAMNG:  LDA   STTS              ;RAM no good, must be first time on
679   801F  29 01            AND   #00000001B        ;can't do anything until
680   8021  F0 03            BEQ   RS2
681   8023  4C CB 81         JMP   DEATH
682   8026  A5 E4   RS2:    LDA   STTS              ;Battery is present!
683   8028  29 20            AND   #00100000B        ;now wait until BATT LOW gone
684   802A  F0 03            BEQ   INITIALIZE
685                                                   ;(future flash message here)
686   802C  4C CB 81         JMP   DEATH
687
688                 INITIALIZE:                       ;fully charged, let's go
689                                                   ;(ignore EEPROM for now)
690
691                                                   ;cold start
692   802F  A2 0F            LDX   #15               ;store checksum data bytes
693   8031  64 40            STZ   CKSUM
694   8033  18               CLC
695   8034  8A      NIT1:   TXA
696   8035  9D 00 02         STA   CKDATA,X
697   8038  65 40            ADC   CKSUM
698   803A  85 40            STA   CKSUM
699   803C  CA               DEX
700   803D  D0 F5            BNE   NIT1
701
702   803F  A2 00            LDX   #0                ;init system block
703   8041  BD 8D F7 NIT2:   LDA   SSTBL,X           ;from default table
704   8044  9D 76 02         STA   HOUR,X
705   8047  E8               INX
706   8048  E0 67            CPX   #$03
707   804A  D0 F5            BNE   NIT2
708   804C  A2 00            LDX   #0                ;init run block
709   804E  BD F4 F7 NIT7:   LDA   RUNTBL,X          ;from default table
710   8051  9D FA 02         STA   SETUPS,X
711   8054  E8               INX
712   8055  E0 0E            CPX   #14
713   8057  D0 F5            BNE   NIT7
714   8059  9C 1F 03         STZ   RUNNING
715   805C  9C 5D 02         STZ   SL                ;clear SL flag
716   805F            RTC60
720   8063  85 01            STA   RTC_CLR           ;clear RTC counter
721   8065  64 A1            STZ   SECCTR
722   8067  64 A2            STZ   SECCTR+1          ;seconds counter
723   8069  64 E2            STZ   INTCMD
724   806B  A9 09            LDA   #$09              ;clear out source RAM area ($0900-$153F)
725   806D  85 78            STA   DESTPTR+1
726   806F  64 77            STZ   DESTPTR
727   8071  A0 00            LDY   #0
728   8073  A9 00   NIT4:   LDA   #0
729   8075  91 77   NIT5:   STA   (DESTPTR),Y
```

```
730  8077  C8                     INY
731  8078  D0 FB                  BNE    NIT5
732  807A  E6 78                  INC    DESTPTR+1
733  807C  A5 78                  LDA    DESTPTR+1
734  807E  C9 15                  CMP    #$15
735  8080  D0 F1                  BNE    NIT4
736  8082  91 77         NIT6:    STA    (DESTPTR),Y
737  8084  C8                     INY
738  8085  C0 28                  CPY    #40
739  8087  D0 F9                  BNE    NIT6
740
741  8089                         LDW    HWRITE,HISTORY    ;init history pointer
742  808D  A9 00         NIT3:    LDA    #0                ;clear all entries
743  808F  92 77                  STA    (HWRITE)
744  8093  20 12 AA               JSR    INC_HWRITE
745  8095  90 F7                  BCC    NIT3
751  809A  20 7! AA               JSR    HOPEND            ;store the default date
752  809D  4C AD 83               JMP    PROGIN
753
754
755                      RAMOK:                            ;wakeup, not the first time on
756  86A0  64 E2                  STZ    INTCMD
757  80A2  20 D5 A4               JSR    READ_RTC          ;if more than 1 RTC, then SVL happened
758  80A5  A5 42                  LDA    MSB
759  80A7  D0 0D                  BNE    RS21
760  80A9  A5 41                  LDA    LSB
761  80AB  C9 02                  CMP    #2
762  80AD                         BGE    RS21
765  80AF  F0 2F                  BEQ    RS22              ;no minutes passed
766  80B1  20 EF A4               JSR    UPDATE_CLOCK      ;else inc clock by 1 min.
767  80B4  80 26                  BRA    RS22
768
769  80B6  A9 01         RS21:    LDA    #$01              ;tell history about SVL
770  80B8  2C CE AA               JSR    HOPENF
771  80BB  20 F9 A4               JSR    CLR_RTC
772  80BE  A5 42         RS23:    LDA    MSB               ;while RTC>60,
773  80C0  D0 08                  BNE    RS24
774  80C2  A5 41                  LDA    LSB
775  80C4  F0 1A                  BEQ    RS22
776  80C6  C9 3C                  CMP    #60
777  80C8                         BLT    RS25
780  80CA  A9 3C         RS24:    LDA    #60               ;update clock in <=60 min. chunks
781  80CC  85 61         RS25:    STA    IBFR
782  80CE  20 00 A5               JSR    BUMP_CLOCK
783  80D1  38                     SEC
784  80D2  A5 41                  LDA    LSB
785  80D4  E5 61                  SBC    IBFR
786  80D6  85 41                  STA    LSB
787  80D8  A5 42                  LDA    MSB
788  80DA  E9 00                  SBC    #0
789  80DC  85 42                  STA    MSB
790  80DE  80 DE                  BRA    RS23
791
792  80E0  A5 E4         RS22:    LDA    STTS
793  80E2  29 04                  AND    #00000100B        ;if SL,
794  80E4  D0 1F                  BNE    RS10
795  80E6  AD 5D 02               LDA    SL
796  80E9  D0 17                  BNE    RS16
797  80EB  20 CB AD               JSR    ISRUNNING         ;if running,
798  80EE  90 0B                  BCC    RS2A
799  80F0  20 34 83               JSR    HALT_RUN          ;then suspend watering
800  80F3  A9 06                  LDA    #6
801  80F5  8D 1F 03               STA    RUNNING
802  80F8  A9 00         RS2A:    LDA    #$00
803  80FA  20 CE AA               JSR    HOPENF            ;tell history (only once)
804  80FD                         SET    SL
808  8102  4C CB 81      RS10:    JMP    DEATH
809
```

```
810  8105  AD 5D 02   RS10:    LDA     SL              ;no SL now
811  8108  F0 15               BEQ     RS17
812  810A  9C 5D 02            STZ     SL              ;but there was one, recover
813  810D  AD 1F 03            LDA     RUNNING         ;if running was halted,
814  8110  C9 06               CMP     #6
815  8112  D0 0B               BNE     RS17
816  8114  9C 1A 03            STZ     DAYNUM          ;then start over
817  8117  9C 1B 03            STZ     DAYNUM+1
818  811A  A9 02               LDA     #2
819  811C  8D 1F 03            STA     RUNNING
820
821  811F  A5 E4      RS17:    LDA     STTS
822  8121  29 40               AND     #SI_PRESENT
823  8123  D0 0A               BNE     RS15
824  8125  A5 E4               LDA     STTS            ;serial link present
825  8127  A5 E4               LDA     STTS
826  8129  29 80               AND     #10000000B      ;if ready
827  812B  F0 00               BEQ     RS14
828                                                    ;serivce serial port
829  812D  A5 17      RS14:    LDA     SI_CLR          ;else clear it
830
831  812F  A5 E4      RS15:    LDA     STTS
832  8131  29 01               AND     #00000001B
833  8133  D0 43               BNE     RS11
834  8135  A5 E4               LDA     STTS            ;battery is present
835  8137  29 20               AND     #00100000B
836  8139  D0 03               BNE     RS12
837  813B  4C AD 83            JMP     PROGIN          ;and fully charged
838                   RS12:                            ;batt is low
839  813E  EE 75 02            INC     CHARGING        ;change contrast
840  8141  AD 75 02            LDA     CHARGING
841  8144  C9 0B               CMP     #11
842  8146                      BLT     RS1A
845  8148                      SET     CHARGING
849  814D  AD 75 02   RS1A:    LDA     CHARGING
850  8150  4A                  LSR     A
851  8151  B0 22               BCS     RS1B
852  8153  20 32 A3            JSR     LCD_ON
853  8156  20 40 A3            JSR     DISPLAY_ON
854  8159  20 85 A3            JSR     DISPLAY_CLR
855  815C                      MESSAGE 8               ;& say so
859  8161  AD 75 02            LDA     CHARGING
860  8164  4A                  LSR     A
861  8165  AA                  TAX
862  8166  BD 86 F8            LDA     CONTRAST_TBL,X
863  8169  85 1A               STA     LCD_CONTRAST
864  816B  A0 FA               LDY     #250            ;give user time to see msg
865  816D  20 C0 A2            JSR     WAITMS
866  8170  A0 FA               LDY     #250
867  8172  20 C0 A2            JSR     WAITMS
868  8175  4C BA 81   RS1B:    JMP     SHUT_DOWN
869
870                   RS11:                            ;woke up by RTC
871  8178  4C CB 81   RS13:    JMP     DEATH           ;or watchdog
872
873                            ;---------------------------------
874                            ;       ORDERLY SHUT-DOWN
875                            ;---------------------------------
876
877                   BATT_LOW:                        ;battery is low
878  817B  20 39 A4            JSR     TIMER_OFF
879  817E  20 82 A3            JSR     DKCLR
880  8181                      MESSAGE 72              ;alert the user
884  8186  20 F3 85            JSR     SLFWAIT
885  8189  20 82 A3            JSR     DKCLR
886  818C  20 E5 9F            JSR     FLASH
887  818F                      MESSAGE 90
891  8194  20 F3 85            JSR     SLFWAIT
```

```
C?2  8197   A9 02              LDA    #$02
893  8199   20 CE AA            JSR    HOPENF
894  819C   20 F3 85            JSR    SLFWAIT
895  819F   80 19               BRA    SHUT_DOWN
896
897                 NO_BATT:                          ;battery removed
898  81A1   A9 03              LDA    #$03           ;tell history
899  81A3   20 CE AA            JSR    HOPENF
900  81A6   AD 1F 03            LDA    RUNNING
901  81A9   C9 01              CMP    #1             ;if ready to run
902  81AB   D0 0D              BNE    SHUT_DOWN
903  81AD   20 39 A4            JSR    TIMER_OFF
904  81B0   A9 02              LDA    #2             ;give it the go ahead
905  81B2   8D 1F 03            STA    RUNNING
906  81B5   A9 05              LDA    #$05           ;tell history start watering
907  81B7   20 CE AA            JSR    HOPENF
908
909                 SHUT_DOWN:                        ;nite nite
910  81BA   20 39 A4            JSR    TIMER_OFF
911  81BD   20 7D A3            JSR    DISPLAY_OFF
912  81C0   20 23 A4            JSR    AD_OFF
913  81C3   20 CB AD            JSR    ISRUNNING      ;if not running,
914  81C6   B0 03              BCS    DEATH
915  81C8   20 9D A4            JSR    ALL_VALVES_OFF ;then kill valves
916  81CB   85 00     DEATH:   STA    0              ;processor power off
917  81CD   80 FC              BRA    DEATH          ;shouldn't get here
918
919                 ;---------------------------------
920                 ;     WATERING ROUTINE
921                 ;---------------------------------
922
923
924  81CF   20 CB AD   WATER:  JSR    ISRUNNING      ;Service starts in OBJECT
925  81D2   B0 03              BCS    CY20           ;if watering,
926  81D4   4C AA 82            JMP    CY99
927
928                 ;Y0:    LDA    WCLK           ;which mode?
929                 ;       CMP    #1
930                 ;       BNE    CY20
931                 ;
932                 ;Y10:   INC16  ALTCLK         ;SEMI-AUTO MODE
933                 ;       MOV16  ALTCLK,WATERCLK
934                 ;
935                 ;       LDA    DAYNUM         ;if daynum=0
936                 ;       ORA    DAYNUM+1
937                 ;       BNE    CY15
938                 ;       JSR    INCDAYNUM      ;then start watering now
939                 ;       JSR    GENERATE
940                 ;       LDA    GENTIME
941                 ;       STA    WATERCLK
942                 ;       STA    ALTCLK
943                 ;       LDA    GENTIME+1
944                 ;       STA    WATERCLK+1
945                 ;       STA    ALTCLK+1
946                 ;
947                 ;Y15:   LDA    DONETIME       ;if watering done
948                 ;       CMP    WATERCLK
949                 ;       BNE    CY30
950                 ;       LDA    DONETIME+1
951                 ;       CMP    WATERCLK+1
952                 ;       BNE    CY30
953                 ;       STZ    WCLK           ;then change to auto mode
954                 ;       LDA    NSTARTS        ;wait for next base start
955                 ;       STA    STARTCTR
956                 ;
957                 CY20:                             ;AUTO MODE
958  81D7                      MOV16  HOUR,IBFR+4    ;use real time
964  81E1   20 83 A6           JSR    HM2MIN
```

```
965   81E4                        MOV16   OFFSET,WATERCLK
971   81EC  AD 1F 03              LDA     RUNNING
972   81EF  C9 02                 CMP     #2
973   81F1  D0 3E                 BNE     CY2A
974                                                       ;running=2
975   81F3  AD FD 02              LDA     RAIN_DELAY     ;dec rain delay if any
976   81F6  F0 11                 BEQ     CY2D
977   81F8  A5 DC                 LDA     WATERCLK        ;if midnight
978   81FA  05 DD                 ORA     WATERCLK+1
979   81FC  D0 08                 BNE     CY2E
980   81FE  CE FD 02              DEC     RAIN_DELAY
981   8201  AD FD 02              LDA     RAIN_DELAY
982   8204  F0 03                 BEQ     CY2D
983   8206  4C AA 82      CY2E:   JMP     CY99
984   8209  AD 1A 03      CY2D:   LDA     DAYNUM
985   820C  0D 1B 03              ORA     DAYNUM+1
986   820F  F0 0A                 BEQ     CY2B
987
988   8211  20 DE AD              JSR     GENERATE        ;resume previous run
989   8214  A9 03                 LDA     #3
990   8216  8D 1F 03              STA     RUNNING
991   8219  80 16                 BRA     CY2A
992
993   821B  20 5B 83      CY2B:   JSR     INCDAYNUM       ;new run, day=1
994   821E  20 DE AD              JSR     GENERATE
995   8221  A5 7A                 LDA     STARTCTR        ;if 1st start passed,
996   8223  F0 07                 BEQ     CY2C
997   8225  A9 04                 LDA     #4              ;then wait till next midnight
998   8227  8D 1F 03              STA     RUNNING
999   822A  80 05                 BRA     CY2A
1000  822C  A9 03         CY2C:   LDA     #3              ;otherwise get going now
1001  822E  8D 1F 03              STA     RUNNING
1002
1003                      CY2A:                           ;running=3 or 4
1004  8231  A5 DC                 LDA     WATERCLK
1005  8233  05 DD                 ORA     WATERCLK+1
1006  8235  D0 0B                 BNE     CY29
1007                                                      ;it's midnight
1008  8237  20 5B 83      CY25:   JSR     INCDAYNUM       ;it's a new day
1009  823A  20 DE AD              JSR     GENERATE
1010  823D  A9 03                 LDA     #3
1011  823F  8D 1F 03              STA     RUNNING
1012
1013                      CY29:                           ;service valves
1014  8242  AD 1F 03              LDA     RUNNING         ;if not waiting
1015  8245  C9 04                 CMP     #4
1016  8247  F0 61                 BEQ     CY99
1017
1018  8249                CY30:   SET     VALVE           ;1st service active valves
1022  824D  A6 49         CY31:   LDX     VALVE
1023  824F  BD 7D 02              LDA     VS,X
1024  8252  29 10                 AND     #00010000B
1025  8254  F0 28                 BEQ     CY35            ;valve is not on, try next
1026  8256  A6 49                 LDX     VALVE           ;valve is on
1027  8258                        DBLX
1035  825E  FE 20 02              INC     TIMEON,X        ;inc time on
1036  8261  D0 03                 BNE     CY32
1037  8263  FE 21 02              INC     TIMEON+1,X
1038  8266  38            CY32:   SEC                     ;dec time remaining
1039  8267  B5 8F                 LDA     TR,X
1040  8269  E9 01                 SBC     #1
1041  826B  95 8F                 STA     TR,X
1042  826D  B5 90                 LDA     TR+1,X
1043  826F  E9 00                 SBC     #0
1044  8271  95 90                 STA     TR+1,X
1045  8273  B5 8F                 LDA     TR,X            ;if no time remaining, then done
1046  8275  15 90                 ORA     TR+1,X
1047  8277  F0 02                 BEQ     CY34
```

```
1048  8279  80 03              BRA    CY35            ;check for sensor limit here
1049  827B  20 12 83   CY34:   JSR    VALVEOFF        ;so turn this one off
1050  827E  E6 49      CY35:   INC    VALVE           ;check the next valve
1051  8280  A5 49              LDA    VALVE
1052  8282  C9 09              CMP    #9
1053  8284  D0 C7              BNE    CY31
1054
1055  8286  AD EC 15   CY40:   LDA    NSTARTS         ;2nd, service new starts
1056  8289  C5 7A              CMP    STARTCTR
1057  828B  F0 1D              BEQ    CY70            ;no more to do
1058
1059  828D  B2 7B      CY41:   LDA    (STARTPTR)      ;see if time to do next start
1060  828F  C5 DC              CMP    WATERCLK
1061  8291  D0 17              BNE    CY70
1062  8293  A0 01              LDY    #1
1063  8295  B1 7B              LDA    (STARTPTR),Y
1064  8297  C5 DD              CMP    WATERCLK+1
1065  8299  D0 0F              BNE    CY70            ;nope, nothing to do yet
1066                                                  ;time is now
1067                                                  ;check if sensors allow turn on
1068  829B  A0 02              LDY    #2              ;turn valve on
1069  829D  B1 7B              LDA    (STARTPTR),Y
1070  829F  85 49              STA    VALVE
1071  82A1  20 AB 82           JSR    VALVEON
1072  82A4  20 F7 A9   CY50:   JSR    NEXTSTART       ;go to the next start
1073  82A7  4C 86 82           JMP    CY40            ;see if that one is for now
1074
1075                   CY70:                          ;3rd, service master valve(s)
1076
1077  82AA  60         CY99:   RTS
1078
1079                           ;------------------------------------
1080                           ;     VALVE MANAGEMENT
1081                           ;------------------------------------
1082
1083                   VALVEON:                       ;start up a valve start
1084  82AB  A6 49              LDX    VALVE           ;clear time on
1085  82AD                     DBLX
1093  82B3  9E 20 02           STZ    TIMEON,X
1094  82B6  9E 21 02           STZ    TIMEON+1,X
1095  82B9  A0 04              LDY    #4              ;set up duration
1096  82BB  B1 7B              LDA    (STARTPTR),Y
1097  82BD  95 8F              STA    TR,X
1098  82BF  C8                 INY
1099  82C0  B1 7B              LDA    (STARTPTR),Y
1100  82C2  95 90              STA    TR+1,X
1101
1102                   HOPENV:                        ;open history for a valve start
1103  82C4  AD 7A 02           LDA    DAY             ;stamp date if needed
1104  82C7  C5 BA              CMP    HDATE+1
1105  82C9  D0 07              BNE    H04
1106  82CB  AD 79 02           LDA    MONTH
1107  82CE  C5 B9              CMP    HDATE
1108  82D0  F0 03              BEQ    H05
1109  82D2  20 71 AA   H04:    JSR    HOPEND
1110  82D5  A6 49      H05:    LDX    VALVE
1111  82D7                     DBLX
1119  82DD  A5 B7              LDA    HWRITE
1120  82DF  95 A3              STA    HPTR,X          ;save the addr
1121  82E1  A5 B8              LDA    HWRITE+1
1122  82E3  95 A4              STA    HPTR+1,X
1123  82E5  20 60 AA           JSR    GETHPTR         ;access the entry with HPTR
1124  82E8  A5 49              LDA    VALVE
1125  82EA  09 20              ORA    #00100000B
1126  82EC  92 A3              STA    (HPTR)          ;key= valve# open
1127  82EE  A0 01              LDY    #1
1128  82F0  AD 76 02           LDA    HOUR
1129  82F3  91 A3              STA    (HPTR),Y
```

```
1130  82F5  C8                     INY
1131  82F6  AD 77 02               LDA    MINUTE
1132  82F9  91 A3                  STA    (HPTR),Y
1133  82FB  C8                     INY
1134  82FC  A9 80                  LDA    #$80           ;soil moisture at start
1135  82FE  91 A3                  STA    (HPTR),Y
1136  8300  C8                     INY
1137  8301  A9 00                  LDA    #0             ;time on
1138  8303  91 A3                  STA    (HPTR),Y
1139  8305  C8                     INY
1140  8306  91 A3                  STA    (HPTR),Y
1141  8308  C8                     INY
1142  8309  91 A3                  STA    (HPTR),Y       ;soil moisture at stop
1143  830B  20 12 AA               JSR    INC_HWRITE     ;move write ptr to next entry
1144                                                     ;if sensors, get reading
1145                                                     ;write it to history
1146  830E  20 59 A4               JSR    VON            ;then turn the selected valve on
1147  8311  60                     RTS
1148
1149               VALVEOFF:                             ;finish a valve start
1150  8312  20 8C A4               JSR    VOFF           ;turn the valve off
1151  8315  20 60 AA               JSR    GETHPTR
1152                                                     ;if sensors, get reading
1153                                                     ;write it to history
1154  8318  A6 49                  LDX    VALVE          ;write actual watering time to history
1155  831A                         DBLX
1163  8320  A0 04                  LDY    #4
1164  8322  BD 20 02               LDA    TIMEON,X
1165  8325  91 A3                  STA    (HPTR),Y
1166  8327  C8                     INY
1167  8328  BD 21 02               LDA    TIMEON+1,X
1168  832B  91 A3                  STA    (HPTR),Y
1169
1170  832D  B2 A3                  LDA    (HPTR)         ;close history entry
1171  832F  29 DF                  AND    #%11011111B
1172  8331  92 A3                  STA    (HPTR)
1173  8333  60                     RTS
1174
1175               HALT_RUN:                             ;SL entry
1176  8334  20 39 A4               JSR    TIMER_OFF      ;no INT
1177  8337                         SET    VALVE
1181  833B  A6 49       STR1:      LDX    VALVE          ;turn off all valves with history
1182  833D  BD 7D 02               LDA    V5,X
1183  8340  29 10                  AND    #%00010000B
1184  8342  F0 03                  BEQ    STR2
1185  8344  20 12 83               JSR    VALVEOFF
1186  8347  E6 49       STR2:      INC    VALVE
1187  8349  A5 49                  LDA    VALVE
1188  834B  C9 09                  CMP    #9
1189  834D  D0 EC                  BNE    STR1
1190  834F  60                     RTS
1191
1192               INCDAYNUM:                            ;move DAYNUM array to next day
1193  8350  AD 1A 03               LDA    DAYNUM         ;if 0, init array
1194  8353  0D 1B 03               ORA    DAYNUM+1
1195  8356  F0 3E                  BEQ    FIRSTDAY
1196  8358  AD 41 15               LDA    CYCLE_TYPE
1197  835B  D0 12                  BNE    IDN1
1198  835D                         INC16  DAYNUM         ;so many days
1207  836E  60                     RTS
1208  836F  EE 1D 03    IDN1:      INC    DAYNUM+3       ;specific days
1209  8372  AD 1D 03               LDA    DAYNUM+3
1210  8375  C9 08                  CMP    #8
1211  8377  D0 16                  BNE    IDN3
1212  8379                         SET    DAYNUM+3       ;a new week
1216  837E                         INC16  DAYNUM
1225  838F  AD 78 02    IDN3:      LDA    DOW            ;save today's day of week
```

```
1226  8392  8D 1C 03              STA     DAYNUM+2
1227  8395  60                    RTS
1228
1229               FIRSTDAY:                        ;init DAYNUM array
1230  8396  AD 41 15              LDA     CYCLE_TYPE
1231  8399  D0 06                 BNE     FD1
1232  839B                        SET     DAYNUM      ;so many days
1236  83A0  60                    RTS
1237               FD1:                             ;specific days
1238  83A1                        SET     DAYNUM+3    ;today becomes the first day of the week
1242  83A6                        SET     DAYNUM      ;of the first week
1246  83AB  80 E2                 BRA     IDN3
1247
1248
1249
1250
1251  83AD                        INCLUDE   PWRKEY.ASM
1252
1253                    ;------------------------------------
1254                    ;      POWER KEY INSTALLED
1255                    ;------------------------------------
1256
1257  83AD  A5 6D    PROGIN: LDA    FLAGS       ;Power key is in, system charged
1258  83AF  09 01            ORA    #00000001B
1259  83B1  85 6D            STA    FLAGS
1260                                             ;init key manager
1261  83B3  A9 20            LDA    #00100000B  ;enable only OK key
1262  83B5  85 5E            STA    KEYMASK
1263  83B7  64 5C            STZ    KEYREG      ;no key in process
1264  83B9  20 92 A3         JSR    KEY_RESET   ;no blinking or repeats
1265
1266  83BC  64 D3    PG0:    STZ    SECRET      ;no secret code entered yet
1267  83BE  20 28 A4         JSR    TIMERON     ;enable INT
1268  83C1  A9 04            LDA    #$04        ;tell history key is in
1269  83C3  20 CE AA         JSR    HOPENF
1270
1271  83C6  20 32 A3 PG1:    JSR    LCD_ON      ;fire LCD up
1272  83C9  20 40 A3         JSR    DISPLAY_ON
1273  83CC  20 85 A3         JSR    DISPLAY_CLR ;select contrast
1274  83CF                   MESSAGE 0
1278  83D4  A9 01    PG4:    LDA    #1
1279  83D6  85 D4            STA    CONTRAST    ;start with default contrast
1280  83D8  A6 D4    PG2:    LDX    CONTRAST
1281  83DA  BD 86 F8         LDA    CONTRAST_TBL,X ;send contrast to LCD
1282  83DD  85 1A            STA    LCD_CONTRAST
1283  83DF                   SET_CURSOR LINE2+14
1287  83E4  A5 D4            LDA    CONTRAST
1288  83E6  20 9C A6         JSR    D2D
1289  83E9  A9 19            LDA    #PERSEC
1290  83EB  85 46            STA    TIMCTR      ;wait 1 sec. between contrasts
1291  83ED  20 06 AB PG3:    JSR    GETKEY
1292  83F0  C9 20            CMP    #OKKEY
1293  83F2  F0 0E            BEQ    PG10        ;OK key
1294  83F4  A5 46            LDA    TIMCTR
1295  83F6  D0 F5            BNE    PG3
1296  83F8  E6 D4            INC    CONTRAST
1297  83FA  A5 D4            LDA    CONTRAST
1298  83FC  C9 06            CMP    #6
1299  83FE                   BGE    PG4
1302  8400  80 D6            BRA    PG2
1303
1304
1305                    ;------------------------------------
1306                    ;     DIRECTIONS
1307                    ;------------------------------------
1308
1309  8402  20 92 A3 PG10:   JSR    KEY_RESET   ;Want directions?
1310  8405  A9 39            LDA    #00111001B  ;enable all keys
```

```
1311  8407  85 5E              STA   KEYMASK
1312  8409  A9 0A              LDA   #10
1313  840B  85 72              STA   HELPNUM
1314  840D  20 22 AB           JSR   SCROLL_MSG
1315  8410  B0 29              BCS   SELFTEST      ;key pressed, abort
1316  8412              SET_CURSOR  15
1320  8417                     OM
1325  841D  20 9F AB    PG12:  JSR   GETHKEY
1326  8420  C9 10              CMP   #NOKEY
1327  8422  F0 17              BEQ   SELFTEST
1328  8424  C9 20              CMP   #OKKEY
1329  8426  D0 F5              BNE   PG12
1330  8428  A9 0B              LDA   #11
1331  842A  85 72              STA   HELPNUM
1332  842C  20 74 AB    PG11:  JSR   HELP_MSG      ;show new msg at HELPNUM
1333                                                ;returns when msg read
1334  842F  B0 D1              BCS   PG10          ;end directions if aborted
1335  8431  A5 72              LDA   HELPNUM       ;do next message
1336  8433  C9 17              CMP   #23           ;until last msg
1337  8435  F0 CB              BEQ   PG10
1338  8437  E6 72              INC   HELPNUM
1339  8439  80 F1              BRA   PG11
1340
1341
1342                     ;----------------------------------
1343                     ;     SELF TEST
1344                     ;----------------------------------
1345
1346                     SELFTEST:                  ;do system self test
1347  843B  20 82 A3            JSR   DKCLR
1348  843E              MESSAGE 124
1352  8443              SET_CURSOR  LINE2+14
1356  8448                      OM
1361  844E  20 9F AB    SLF0:  JSR   GETHKEY
1362  8451  C9 10              CMP   #NOKEY
1363  8453  D0 03              BNE   SLF6
1364  8455  4C 29 86           JMP   SECRET_CODE   ;don't want test
1365  8458  C9 20       SLF6:  CMP   #OKKEY
1366  845A  F0 0D              BEQ   SLF
1367  845C  C9 08              CMP   #HELPKEY
1368  845E  D0 EE              BNE   SLF0
1369  8460                     HELP  24
1374  8467  80 D2              BRA   SELFTEST
1375
1376                                                ;test valve wiring
1377                                                ;IBFR=opens, IBFR+1=shorts,
1378                                                ;IBFR+2=not assigned
1379  8469  20 82 A3    SLF:   JSR   DKCLR
1380  846C  20 39 A4           JSR   TIMER_OFF     ;disable INT
1381  846F              MESSAGE 114
1385  8474  20 0E A4           JSR   AD_ON
1386  8477                     SET   MCVALVES      ;drivers on
1390  847B                     SET   VALVE         ;start at valve 1, A/D channel 0
1394              SLF5:                            ;test valve if assigned
1395  847F  A6 49              LDX   VALVE         ;update assignment byte
1396  8481  BD 7D 02           LDA   VS,X
1397  8484  89 80              BIT   #VID
1398  8486  F0 05              BEQ   SLF10
1399  8488  18                 CLC                 ;assigned,
1400  8489  66 63              ROR   IBFR+2
1401  848B  80 09              BRA   SLF7          ;go test it
1402  848D  38          SLF10: SEC                 ;not assigned,
1403  848E  66 63              ROR   IBFR+2
1404  8490  A9 C8              LDA   #200          ;pretend a good coil
1405  8492  85 41              STA   LSB
1406  8494  80 1B              BRA   SLF8
1407
```

```
1408  8496  BD B9 02     SLF7:   LDA    VALVEID,X        ;use AD channel based on position
1409  8499  29 07                AND    00000111B
1410  849B  09 08                ORA    00001000B
1411  849D  85 45                STA    ADCHANNEL
1412  849F  BD B9 02             LDA    VALVEID,X
1413  84A2  20 C7 A4             JSR    VHI              ;bring valve line high based on position
1414  84A5  A0 32                LDY    #ADWAIT          ;settle
1415  84A7  20 C0 A2             JSR    WAITMS
1416  84AA  20 3D A4             JSR    READ             ;let's see what's out there
1417  84AD  85 41                STA    LSB
1418  84AF  64 07                STZ    VALVE_ENABLE     ;valve line dismissed
1419  84B1  A5 41        SLF8:   LDA    LSB
1420  84B3  C9 A8                CMP    #168             ;if <=3.3 volts
1421  84B5                       BGE    SLF1
1424  84B7  38                   SEC                     ;then line open
1425  84B8  80 01                BRA    SLF2
1426  84BA  18           SLF1:   CLC                     ;not open
1427  84BB  66 61        SLF2:   ROR    IBFR
1428  84BD  A5 41                LDA    LSB
1429  84BF  C9 E6                CMP    #230             ;if >4.5 volts
1430  84C1                       BLT    SLF3
1433  84C3  38                   SEC                     ;then line shorted
1434  84C4  80 01                BRA    SLF4
1435  84C6  18           SLF3:   CLC                     ;not shorted
1436  84C7  66 62        SLF4:   ROR    IBFR+1
1437                                                     ;otherwise coil is present
1438  84C9  E6 49                INC    VALVE            ;do all 8 valves
1439  84CB  A5 49                LDA    VALVE
1440  84CD  C9 09                CMP    #9
1441  84CF  D0 AE                BNE    SLF5
1442  84D1  64 1E                STZ    WCVALVES         ;drivers off
 443  84D3  20 23 A4             JSR    AD_OFF
 444  84D6  20 2B A4             JSR    TIMERON          ;enable INT
1445
1446  84D9  20 F3 85             JSR    SLFWAIT
1447  84DC  20 82 A3             JSR    DKCLR
1448  84DF  B2 5A                LDA    (MENUPTR)        ;show current mode
1449  84E1  C9 02                CMP    #2
1450  84E3  D0 19                BNE    SLF22            ;running
1451  84E5  20 9F A1             JSR    DISP_SOURCE
1452  84E8                       BACKUP 1
1456  84ED  A9 20                LDA    #' '
1457  84EF  20 10 A3             JSR    DCHAR
1458  84F2                       SET_CURSOR LINE2
1462  84F7                       MESSAGE 70
1466  84FC  80 05                BRA    SLF23
1467  84FE          SLF22:       MESSAGE 71              ;or idle
1471  8503  20 F3 85 SLF23: JSR   SLFWAIT
1472
1473  8506  A5 61        SLF30:  LDA    IBFR             ;if no shorts or opens,
1474  8508  05 62                ORA    IBFR+1
1475  850A  D0 0E                BNE    SLF35
1476  850C  20 82 A3             JSR    DKCLR
1477  850F                       MESSAGE 106             ;then show good status
1481  8514  20 F3 85             JSR    SLFWAIT
1482  8517  4C A4 85             JMP    SLF60
1483
1484  851A  20 39 A4     SLF35:  JSR    TIMER_OFF
1485  851D  A5 61                LDA    IBFR             ;if any opens
1486  851F  F0 3E                BEQ    SLF40
1487  8521  20 82 A3             JSR    DKCLR
1488  8524                       SET    VALVE            ;then show them
1492  8528                       MESSAGE 107
1496  852D                       SET_CURSOR LINE2
1500  8532  A9 23                LDA    #'0'
1501  8534  20 10 A3             JSR    DCHAR
1502  8537  66 61        SLF36:  ROR    IBFR
1503  8539  90 0C                BCC    SLF37
```

```
1504  853B  A5 49            LDA    VALVE
1505  853D  09 30            ORA    #ASCMASK
1506  853F  20 10 A3          JSR    DCHAR
1507  8542  A9 2C            LDA    #','
1508  8544  20 10 A3          JSR    DCHAR
1509  8547  E6 49       SLF37: INC   VALVE
1510  8549  A5 49            LDA    VALVE
1511  854B  C9 09            CMP    #9
1512  854D  D0 E8            BNE    SLF36
1513  854F                   BACKUP 1
1517  8554  A9 20            LDA    #' '
1518  8556  20 10 A3          JSR    DCHAR
1519  8559  20 28 A4          JSR    TIMERON
1520  855C  20 F3 85          JSR    SLFWAIT
1521
1522  855F  20 39 A4    SLF40: JSR   TIMER_OFF
1523  8562  A5 62            LDA    IBFR+1         ;if any shorts
1524  8564  F0 3E            BEQ    SLF60
1525  8566  20 82 A3          JSR    DKCLR
1526  8569                   SET    VALVE          ;then show them
1530  856D                   MESSAGE 108
1534  8572                   SET_CURSOR LINE2
1538  8577  A9 23            LDA    #'#'
1539  8579  20 10 A3          JSR    DCHAR
1540  857C  66 62       SLF46: ROR   IBFR+1
1541  857E  90 0C            BCC    SLF47
1542  8580  A5 49            LDA    VALVE
1543  8582  09 30            ORA    #ASCMASK
1544  8584  20 10 A3          JSR    DCHAR
1545  8587  A9 2C            LDA    #','
1546  8589  20 10 A3          JSR    DCHAR
1547  858C  E6 49       SLF47: INC   VALVE
1548  858E  A5 49            LDA    VALVE
1549  8590  C9 09            CMP    #9
1550  8592  D0 E8            BNE    SLF46
1551  8594                   BACKUP 1
1555  8599  A9 20            LDA    #' '
1556  859B  20 10 A3          JSR    DCHAR
1557  859E  20 28 A4          JSR    TIMERON
1558  85A1  20 F3 85          JSR    SLFWAIT
1559
1560  85A4              SLF60:
1561  85A4  20 39 A4    SLF70: JSR   TIMER_OFF
1562  85A7  20 82 A3          JSR    DKCLR          ;show system time and version
1563  85AA  A2 05            LDX    #5
1564  85AC  BD 76 02    SLF71: LDA   HOUR,X         ;move current time to working area
1565  85AF  95 65            STA    IBFR+4,X
1566  85B1  CA              DEX
1567  85B2  10 F8            BPL    SLF71
1568  85B4  20 BE A5          JSR    DISPTIME
1569  85B7                   SKIP   1
1573  85BC                   MESSAGE 110
1577  85C1                   SET_CURSOR LINE2
1581  85C6  20 7A A5          JSR    DISPLAY_DOW
1582  85C9                   SKIP   2
1586  85CE  20 84 A5          JSR    DISPLAY_DATE
1587  85D1  20 28 A4          JSR    TIMERON
1588  85D4  20 F3 85          JSR    SLFWAIT
1589
1590  85D7  20 82 A3          JSR    DKCLR
1591  85DA                   MESSAGE 113            ;or repeat self test?
1595  85DF                   OM
1600  85E5  20 9F AB    SLF80: JSR   GETHKEY
1601  85E8  C9 10            CMP    #NOKEY
1602  85EA  F0 3D            BEQ    SECRET_CODE
1603  85EC  C9 20            CMP    #OKKEY
1604  85EE  D0 F5            BNE    SLF80
1605  85F0  4C 69 84          JMP    SLF
```

```
1606
1607                            SLFWAIT:                        ;wait the normal scroll time
1608   85F3   A9 64                     LDA    #SRATE4
1609   85F5   85 BD                     STA    R2
1610   85F7   A0 28            SLFW0:   LDY    #40
1611   85F9   20 C8 A2                  JSR    WAITMS
1612   85FC   20 9F AB                  JSR    GETHKEY
1613   85FF   C6 BD                     DEC    R2
1614   8601   D0 F4                     BNE    SLFW0
1615   8603   60                        RTS
1616
1617                            ISVALVE:                        ;test valve POSITION
1618                                                            ;in: AD and WCVALVES must be on
1619                                                            ;out: LSB have reading, carry set if valve
1620   8604   A5 DE                     LDA    POSITION
1621   8606   29 07                     AND    #00000111B
1622   8608   09 08                     ORA    #00001000B
1623   860A   85 45                     STA    ADCHANNEL
1624   860C   A5 DE                     LDA    POSITION
1625   860E   20 C7 A4                  JSR    VHI
1626   8611   A0 32                     LDY    #ADWAIT         ;settle
1627   8613   20 C8 A2                  JSR    WAITMS
1628   8616   78                        SEI
1629   8617   20 3D A4                  JSR    READ            ;let's see what's out there
1630   861A   64 07                     STZ    VALVE_ENABLE    ;valve line dismissed
1631   861C   58                        CLI
1632   861D   C9 A8                     CMP    #168            ;if <3.3 volts
1633   861F                             BLT    ISV2            ;then line open
1636   8621   C9 E6            ISV0:    CMP    #230            ;if >=4.5 volts
1637   8623                             BGE    ISV2            ;then line shorted
1640   8625   38               ISV1:    SEC                    ;otherwise valve is present
1641   8626   60                        RTS
1642   8627   18               ISV2:    CLC                    ;no valve
1643   8628   60                        RTS
1644
1645
1646                            ;-----------------------------------
1647                            ;     SECRET CODE
1648                            ;-----------------------------------
1649
1650                            SECRET_CODE:                    ;enter secret code
1651
1652   8629   20 CB AD                  JSR    ISRUNNING       ;if running,
1653   862C   90 18                     BCC    FSTOP
1654   862E   20 82 A3         PROG10:  JSR    DKCLR
1655   8631                             MESSAGE 181            ;verify that user wants to STOP
1659   8636   20 06 AB         PROG11:  JSR    GETKEY
1660   8639   C9 08                     CMP    #HELPKEY
1661   863B   D0 F9                     BNE    PROG11
1662   863D                             HELP   24
1667   8644   80 E8                     BRA    PROG10
1668
1669
1670
1671
1672   8646                             INCLUDE MENU.ASM
1673                            ;-----------------------------------
1674                            ;     MAIN MENU SCREEN
1675                            ;-----------------------------------
1676
1677                            FSTOP:                          ;exit from some mode or entry via key in
1678   8646   A2 FF                     LDX    #$FF            ;re-init stack
1679   8648   9A                        TXS
1680   8649   20 82 A3                  JSR    DKCLR           ;restore display and keys
1681   864C   58                        CLI                    ;enable interrupts
1682   864D   64 07                     STZ    VALVE_ENABLE
1683   864F   20 23 A4                  JSR    AD_OFF
1684   8652   20 9D A4                  JSR    ALL_VALVES_OFF
```

```
1723  869D  C9 20              CMP     #OKKEY
1724  869F  F0 0D              BEQ     MS10
1725  86A1  C9 08                      BCS  #HELPKEY
1726  86A3  D0 F5                      BNE  MS9
1727  86A5                     HELP    13
1732  86AC  80 D4              BRA     MAIN_MENU
1733  86AE              MS10:  SET     MODE
1737  86B2  64 59              STZ     MODE+1
1738  86B4  4C 8E AC           JMP     GETMENU
1739
1740                    ;--------------------------------
1741                    ;    MAIN MENU - IDLE
1742                    ;--------------------------------
1743
1744                    IDLE_MODE:              ;do nothing mode
1745  86B7  20 82 A3           JSR     DKCLR
1746  86BA                     MESSAGE 4
1750  86BF  A9 3A              LDA     #':'
1751  86C1  20 10 A3           JSR     DCHAR
1752  86C4                     SET_CURSOR LINE2
1756  86C9  A9 01              LDA     #1
1757  86CB                     SELECT_SOK 1,2,104
1767  86DC  B0 19              BCS     IM4
1768  86DE  C9 02              CMP     #2
1769  86E0  D0 03              BNE     IM1
1770  86E2  4C 46 86           JMP     FSTOP
1771
1772  86E5  20 82 A3    IM1:   JSR     DKCLR
1773  86E8                     MESSAGE 99              ;wait for power key gone
1777  86ED  9C 1F 03           STZ     RUNNING
1778  86F0  20 06 AB    IM0:   JSR     GETKEY          ;or STOP
1779  86F3  C9 08              CMP     #HELPKEY
1000  8708  CA                 DEX
1809  8709  10 F8              BPL     STI0
1810  870B  58                 CLI
1811  870C  20 82 A3    STI1:  JSR     DKCLR           ;show working time and date
1812  870F                     MESSAGE 89
1816  8714  20 BE A5           JSR     DISPTIME
1817  8717                     SET_CURSOR LINE2
1821  871C  20 7A A5           JSR     DISPLAY_DOW
1822  871F                     SKIP    2
1826  8724  20 84 A5           JSR     DISPLAY_DATE
1827  8727                     OK
1832  872D  20 06 AB    STI2:  JSR     GETKEY          ;wait for an answer
1833  8730  F0 FB              BEQ     STI2
1834  8732  C9 20              CMP     #OKKEY
1835  8734  F0 0D              BEQ     STIOK           ;time good, exit
1836  8736  C9 10              CMP     #NOKEY
1837  8738  F0 21              BEQ     STI10           ;change time
1838  873A                     HELP    39
1843  8741  80 C9              BRA     STI1
1844  8743  78          STIOK: SEI
1845  8744  A2 05              LDX     #5              ;OK key, keep time as displayed
1846  8746  B5 65       ST9:   LDA     IBFR+4,X
1847  8748  9D 76 02           STA     HOUR,X
1848  874B  CA                 DEX
1849  874C  10 F8              BPL     ST9
1850  874E  AE 79 02           LDX     MONTH
1851  8751  BD 88 F7           LDA     DAYTBL,X
1852  8754  8D 7C 02           STA     DIM
1853  8757  58                 CLI
1854  8758  4C 8E AC           JMP     GETMENU
1855
1856  875B  20 82 A3    STI10: JSR     DKCLR           ;change time
1857  875E                     MESSAGE 89
1861  8763                     SET_CURSOR 8            ;get time
1865  8768  20 7C A7           JSR     GETTIME
1866  876B  90 89              BCC     STI12
1867  876D              STIH:  HELP    39
```

```
1872  8774  80 E5                BRA      STI10
1873  8776              STI12:   SET_CURSOR LINE2        ;get day of week
1877  877B  A5 67                LDA      IBFR+6
1878  877D                       SELECT_MUL 1,7,91
1888  878E  B0 DD                BCS      STIH
1889  8790  85 67                STA      IBFR+6
1890
1891  8792              STI30:   NOBLINK                 ;input the date
1895  8796                       SET_CURSOR LINE2+5
1899  879B  A5 68                LDA      IBFR+7
1900  879D                       SELECT_MUL 1,12,77
1910  87AE  B0 BD                BCS      STIH
1911  87B0  85 68     STI33:     STA      IBFR+7         ;keep selection
1912  87B2                       SET_CURSOR LINE2+9
1916  87B7                       NOBLINK
1920  87BB                       SET      IBFR+1         ;select day based on days in month
1924  87BF  A6 68                LDX      IBFR+7
1925  87C1  BD 80 F7             LDA      DAYTBL,X
1926  87C4  85 63                STA      IBFR+2
1927  87C6  A5 69                LDA      IBFR+8         ;default=present day,
1928  87C8  85 61                STA      IBFR
1929  87CA  DD 80 F7             CMP      DAYTBL,X       ;unless > present day,
1930  87CD  F0 06                BEQ      STI35
1931  87CF                       BLT      STI35
1934  87D1                       SET      IBFR           ;then start at day=1
1938  87D5  20 F9 AB  STI35:     JSR      GETNUM
1939  87D8  90 03                BCC      STI36
1940  87DA  4C 6D 87             JMP      STIH
1941  87DD  85 69     STI36:     STA      IBFR+8         ;keep day
1942  87DF                       NOBLINK
1946  87E3                       SET_CURSOR LINE2+11
1950  87E8  A9 2C                LDA      #','
1951  87EA  20 10 A3             JSR      DCHAR
1952  87ED  A9 27                LDA      #$27
1953  87EF  20 10 A3             JSR      DCHAR
1954  87F2  A5 6A                LDA      IBFR+9
1955  87F4                       SELECT   0,99           ;select year
1963  8801  90 03                BCC      STI34
1964  8803  4C 6D 87             JMP      STIH
1965  8806  85 6A     STI34:     STA      IBFR+9         ;keep year
1966  8808  4C 0C 87             JMP      STI1           ;verify
1967
1968                             ;--------------------------------
1969                             ;    set site info
1970                             ;--------------------------------
1971
1972                    SET_SITE:                        ;set up site parameters
1973
1974
1975  880B  64 49                STZ      VALVE
1976  880D  20 A7 9E  S2SKIP:    JSR      NITVALVE
1977  8810  90 03                BCC      S2NEXT
1978  8812  4C F4 88             JMP      S2END
1979  8815              S2NEXT:
1980  8815  A6 49                LDX      VALVE          ;start with existing site info
1981  8817  BD CB 02             LDA      TERRAIN,X
1982  881A  85 CB                STA      DEFAULT+2
1983  881C  BD D4 02             LDA      SPRINKLER,X
1984  881F  85 CC                STA      DEFAULT+3
1985  8821  4C 94 88             JMP      S2CONFIRM
1986
1987              S2ENTRY:                               ;enter new site info
1988  8824  20 82 A3             JSR      DKCLR
1989  8827  20 4E A1             JSR      DSTA
1990  882A  A9 3A                LDA      #':'
1991  882C  20 10 A3             JSR      DCHAR
1992  882F                       MESSAGE  213
1996  8834                       SET_CURSOR LINE2
```

```
2000  8335  A5 CB              LDA       DEFAULT+2
2001  8338                     SELECT_SOK  1,6,215     ;select terrain
2011  884C  90 09               BCC       SS2G
2012  884E                      HELP      36
2017  8855  80 CD               BRA       S2ENTRY
2018  8857  A5 61      SS2G:    LDA       IBFR
2019  8859  85 CB               STA       DEFAULT+2
2020  885B  20 82 A3            JSR       DKCLR
2021  885E  20 4E A1            JSR       DSTA
2022  8861  A9 3A               LDA       #':'
2023  8863  20 10 A3            JSR       DCHAR
2024  8866                      MESSAGE   213
2028  886B                      SET_CURSOR LINE2
2032  8870  A5 CC               LDA       DEFAULT+3
2033  8872                      SELECT_SOK  1,7,221    ;select sprinkler type
2043  8883  90 09               BCC       SS2H
2044  8885                      HELP      36
2049  888C  80 96               BRA       S2ENTRY
2050  888E  A5 61      SS2H:    LDA       IBFR
2051  8890  85 CC               STA       DEFAULT+3
2052  8892  80 00               BRA       S2CONFIRM
2053
2054                  S2CONFIRM:                       ;show default and confirm
2055  8894  20 82 A3            JSR       DKCLR
2056  8897  20 E5 9F            JSR       FLASH
2057  889A  20 4E A1            JSR       DSTA
2058  889D  A9 3A               LDA       #':'
2059  889F  20 10 A3            JSR       DCHAR
2060  88A2  A5 CB               LDA       DEFAULT+2
2061  88A4  18                  CLC
2062  88A5  69 D6               ADC       #214
2063  88A7  AA                  TAX
2064  88A8  20 D7 A2            JSR       DISPLAY_MSG
2065  88AB                      BACKUP    1
2069  88B0  A9 2C               LDA       #','
2070  88B2  20 10 A3            JSR       DCHAR
2071  88B5                      SET_CURSOR LINE2
2075  88BA  A5 CC               LDA       DEFAULT+3
2076  88BC  18                  CLC
2077  88BD  69 DC               ADC       #220
2078  88BF  AA                  TAX
2079  88C0  20 D7 A2            JSR       DISPLAY_MSG
2080  88C3                      OK
2085  88C9  20 06 AB   S2C:     JSR       GETKEY
2086  88CC  C9 20               CMP       #OKKEY
2087  88CE  F0 15               BEQ       S2OK
2088  88D0  C9 18               CMP       #NOKEY
2089  88D2  D0 03               BNE       S2P
2090  88D4  4C 24 8B            JMP       S2ENTRY
2091  88D7  C9 08      S2P:     CMP       #HELPKEY
2092  88D9  D0 EE               BNE       S2C
2093  88DB                      HELP      76
2098  88E2  4C 94 8B            JMP       S2CONFIRM
2099
2100  88E5  A6 49      S2OK:    LDX       VALVE        ;default is confirmed
2101  88E7  A5 CB               LDA       DEFAULT+2
2102  88E9  9D CB 02            STA       TERRAIN,X
2103  88EC  A5 CC               LDA       DEFAULT+3
2104  88EE  9D D4 02            STA       SPRINKLER,X
2105  88F1  4C 0D 88            JMP       S2SKIP
2106
2107  88F4  4C BE AC   S2END:   JMP       GETMENU
2108
2109                  ;--------------------------------
2110                  ;      wire checking
2111                  ;--------------------------------
2112
2113  88F7              WIRE_CHECK:
```

```
2114  88F7                 WIRE_CHECKV:
2115  88F7  20 82 A3                JSR     DKCLR           ;part 1, fix all shorts
2116  88FA                          MESSAGE 152
2120  88FF  20 8E A4                JSR     AD_ON
2121  8902                          SET     NCVALVES        ;drivers on
2125  8906  64 61                   STZ     IBFR            ;IBFR=which positions have valves
2126  8908                          OK
2131  890E                 LV30:    SET_CURSOR 8
2135  8913  64 DE                   STZ     POSITION        ;start at top position
2136  8915  64 BE                   STZ     R3              ;no shorts yet
2137  8917  64 62                   STZ     IBFR+1
2138
2139  8919  20 04 86       LV35:    JSR     ISVALVE         ;check AD line
2140  891C  C9 A8                   CMP     #168            ;if <=3.3 volts
2141  891E  B0 07                   BCS     LV31
2142  8920  18                      CLC                     ;then line open
2143  8921  66 62                   ROR     IBFR+1
2144  8923  A9 6F                   LDA     #'o'
2145  8925  80 14                   BRA     LV33
2146  8927  C9 E6          LV31:    CMP     #230            ;if >4.5 volts
2147  8929  90 0B                   BCC     LV32
2148  892B                          SET     R3              ;then line shorted
2152  892F  18                      CLC
2153  8930  66 62                   ROR     IBFR+1
2154  8932  A9 78                   LDA     #'x'
2155  8934  80 05                   BRA     LV33
2156  8936  38             LV32:    SEC                     ;otherwise coil is present
2157  8937  66 62                   ROR     IBFR+1
2158  8939  A9 56                   LDA     #'V'
2159  893B  20 10 A3       LV33:    JSR     DCHAR
2160  893E  A0 64                   LDY     #100            ;1/10 duty cycle to avoid power drain
2161  8940  20 C0 A2                JSR     WAITMS
2162  8943  20 06 AB       LV36:    JSR     GETKEY          ;check keyboard after each read
2163  8946  C9 20                   CMP     #OKKEY
2164  8948  F0 1B                   BEQ     LV40
2165  894A  C9 08                   CMP     #HELPKEY
2166  894C  D0 09                   BNE     LV37
2167  894E                          HELP    109
2172  8955  80 A0                   BRA     WIRE_CHECKV
2173  8957  E6 DE          LV37:    INC     POSITION
2174  8959  A5 DE                   LDA     POSITION
2175  895B  C9 08                   CMP     #8              ;do all 8 valves
2176  895D  D0 BA                   BNE     LV35
2177  895F  A5 62                   LDA     IBFR+1
2178  8961  85 61                   STA     IBFR
2179  8963  80 A9                   BRA     LV30
2180
2181  8965  64 1E          LV40:    STZ     NCVALVES        ;drivers off
2182  8967  20 23 A4                JSR     AD_OFF
2183  896A  4C 8E AC                JMP     GETMENU
2184
2185                       ;---------------------------------
2186                       ;       station set up
2187                       ;---------------------------------
2188
2189  896D                 STATION_SETUP:
2190
2191                       VASSIGN:                          ;assign valve IDs
2192  896D  20 82 A3       LV50:    JSR     DKCLR           ;view current ID?
2193  8970                          MESSAGE 171
2197  8975                          ON
2202  897B  20 06 AB       LV51:    JSR     GETKEY
2203  897E  C9 20                   CMP     #OKKEY
2204  8980  F0 11                   BEQ     LV60
2205  8982  C9 10                   CMP     #NOKEY
2206  8984  F0 39                   BEQ     LV70
2207  8986  C9 08                   CMP     #HELPKEY
2208  8988  D0 F1                   BNE     LV51
```

```
2209  898A                            HELP      110
2214  8991   80 DA                    BRA       LV50
2215
2216  8993   20 82 A3   LV60:         JSR       DKCLR         ;show the current IDs
2217  8996                            MESSAGE   173
2221  899B   20 4B AC                 JSR       VID2BFR
2222  899E   20 6A AC                 JSR       DISPID
2223  89A1                            OK
2228  89A7   20 06 AB   LV61:         JSR       GETKEY        ;wait for key
2229  89AA   C9 20                    CMP       #OKKEY
2230  89AC   F0 11                    BEQ       LV70
2231  89AE   C9 10                    CMP       #NOKEY
2232  89B0   F0 0D                    BEQ       LV70
2233  89B2   C9 0B                    CMP       #HELPKEY
2234  89B4   D0 F1                    BNE       LV61
2235  89B6                            HELP      110
2240  89BD   80 D4                    BRA       LV60
2241
2242  89BF   20 82 A3   LV70:         JSR       DKCLR         ;enter new ID?
2243  89C2                            MESSAGE   172
2247  89C7                            OM
2252  89CD   20 06 AB   LV71:         JSR       GETKEY
2253  89D0   C9 20                    CMP       #OKKEY
2254  89D2   F0 14                    BEQ       LV75
2255  89D4   C9 10                    CMP       #NOKEY
2256  89D6   D0 03                    BNE       LV7B
2257  89D8   4C 8E AC                 JMP       GETMENU
2258  89DB   C9 0B      LV7B:         CMP       #HELPKEY
2259  89DD   D0 EE                    BNE       LV71
2260  89DF                            HELP      111
2265  89E6   80 D7                    BRA       LV70
2266
2267  89E8              LV75:         SET       VALVE         ;enter new ID
2271  89EC   20 85 AC                 JSR       CLR_IDBFR
2272
2273  89EF   20 0E A4                 JSR       AD_ON
2274  89F2                            SET       WCVALVES      ;drivers on
2278  89F6   64 DE                    STZ       POSITION      ;find which positions have valves
2279  89F8   64 66                    STZ       IBFR+5
2280  89FA   20 04 B6   LV80:         JSR       ISVALVE
2281  89FD   66 66                    ROR       IBFR+5        ;set bit in IBFR+5 if valve present
2282  89FF   E6 DE                    INC       POSITION
2283  8A01   A5 DE                    LDA       POSITION
2284  8A03   C9 08                    CMP       #8
2285  8A05   D0 F3                    BNE       LV80
2286
2287  8A07   64 E1                    STZ       R5            ;R5 = how many stations present
2288  8A09   A5 66                    LDA       IBFR+5
2289  8A0B   A2 08                    LDX       #8
2290  8A0D   6A         LV7J:         ROR       A
2291  8A0E   90 02                    BCC       LV7K
2292  8A10   E6 E1                    INC       R5
2293  8A12   CA         LV7K:         DEX
2294  8A13   D0 F8                    BNE       LV7J
2295
2296  8A15   A5 E1                    LDA       R5
2297  8A17   D0 09                    BNE       LV7C
2298  8A19                            HELP      34            ;no stations
2303  8A20   80 9D                    BRA       LV70
2304  8A22   20 82 A3   LV7C:         JSR       DKCLR         ;ID all?
2305  8A25   A5 E1                    LDA       R5
2306  8A27   09 30                    ORA       #ASCMASK
2307  8A29   20 10 A3                 JSR       DCHAR
2308  8A2C                            MESSAGE   27
2312  8A31   A5 E1                    LDA       R5
2313  8A33   09 30                    ORA       #ASCMASK
2314  8A35   20 10 A3                 JSR       DCHAR
2315  8A38                            OM
```

```
2320  8A3E  20 06 AB   LV7D:  JSR    GETKEY
2321  8A41  C9 20             CMP    #OKKEY
2322  8A43  F0 3C             BEQ    LV7G
2323  8A45  C9 10             CMP    #NOKEY
2324  8A47  F0 0D             BEQ    LV76
2325  8A49  C9 0B             CMP    #HELPKEY
2326  8A4B  D0 F1             BNE    LV7D
2327  8A4D                    HELP   112
2332  8A54  80 CC             BRA    LV7C
2333
2334  8A56  A5 E1      LV76:  LDA    R5              ;don't ID all
2335  8A58  C9 01             CMP    #1
2336  8A5A  D0 03             BNE    LV7L
2337  8A5C  4C BF 89          JMP    LV70
2338  8A5F  20 82 A3   LV7L:  JSR    DKCLR
2339  8A62                    MESSAGE 199            ;how many to ID then?.
2343  8A67  A9 01             LDA    #1
2344  8A69  85 61             STA    IBFR
2345  8A6B  85 62             STA    IBFR+1
2346  8A6D  A5 E1             LDA    R5              ;must be <= valves present
2347  8A6F  85 63             STA    IBFR+2
2348  8A71  20 F9 A8          JSR    GETNUM
2349  8A74  90 09             BCC    LV7A
2350  8A76                    HELP   112
2355  8A7D  80 D7             BRA    LV76
2356  8A7F  85 E1      LV7A:  STA    R5              ;in R5
2357
2358  8A81  A5 66      LV7G:  LDA    IBFR+5
2359  8A83  85 61             STA    IBFR
2360
2361  8A85  A5 61      LV81:  LDA    IBFR            ;IBFR=which positions have valves to ID
2362  8A87  F0 09             BEQ    LV8A            ;done when all positions are IDed
2363  8A89  A5 49             LDA    VALVE           ;or # of stations IDed
2364  8A8B  38                SEC
2365  8A8C  E9 01             SBC    #1
2366  8A8E  C5 E1             CMP    R5
2367  8A90  D0 03             BNE    LV7H
2368  8A92  4C 8D 8B   LV8A:  JMP    LV90
2369  8A95  20 82 A3   LV7H:  JSR    DKCLR           ;show current status
2370  8A98                    MESSAGE 174
2374  8A9D                    SET_CURSOR LINE2+8
2378  8AA2  20 61 A1          JSR    DVALVE
2379  8AA5                    SET_CURSOR 8
2383  8AAA  20 6A AC          JSR    DISPID
2384  8AAD  A5 61      LV82:  LDA    IBFR            ;look for a valve open
2385  8AAF  85 62             STA    IBFR+1
2386  8AB1  A9 0B             LDA    #8
2387  8AB3  85 45             STA    ADCHANNEL
2388  8AB5  64 DE             STZ    POSITION
2389  8AB7  66 62      LV83:  ROR    IBFR+1          ;if position has a valve,
2390  8AB9  90 46             BCC    LV88
2391  8ABB  64 BE             STZ    R3
2392
2393  8ABD  A5 BE      LVLP:  LDA    R3
2394  8ABF  D0 0B             BNE    LVL1
2395  8AC1  20 04 86          JSR    ISVALVE         ;1st look for open
2396  8AC4  B0 1F             BCS    LV87            ;nope
2397  8AC6                    SET    R3              ;yes
2401  8ACA  80 19             BRA    LV87
2402  8ACC  20 04 86   LVL1:  JSR    ISVALVE         ;then look for valve present again
2403  8ACF  90 14             BCC    LV87
2404
2405  8AD1  A6 DE      LV86:  LDX    POSITION        ;valve returns
2406  8AD3  A5 49             LDA    VALVE
2407  8AD5  9D 5E 02          STA    IDBFR,X         ;store it's position
2408  8AD8  A6 DE             LDX    POSITION        ;remove bit from IBFR
```

```
2409  8ADA  A5 61              LDA    IBFR
2410  8ADC  3D 76 F8            AND    BITOFF,X
2411  8ADF  85 61              STA    IBFR
2412  8AE1  E6 49              INC    VALVE           ;look for next valve
2413  8AE3  80 A8              BRA    LV81            ;after updating display
2414
2415  8AE5  20 06 AB   LV87:   JSR    GETKEY          ;check for key pressed
2416  8AE8  C9 08              CMP    #HELPKEY
2417  8AEA  D0 0A              BNE    LV89
2418  8AEC                     HELP   113
2423  8AF3  4C 85 8A           JMP    LV81
2424  8AF6  A0 64      LV89:   LDY    #100            ;wait for power to recover
2425  8AF8  20 C8 A2           JSR    WAITMS
2426  8AFB  A5 BE              LDA    R3
2427  8AFD  F0 02              BEQ    LV88            ;no open, try next position
2428  8AFF  80 BC              BRA    LVLP            ;keep waiting for valve
2429
2430                   LV88:                          ;next position
2431  8B01  E6 45              INC    ADCHANNEL
2432  8B03  E6 DE              INC    POSITION
2433  8B05  A5 DE              LDA    POSITION
2434  8B07  C9 08              CMP    #8
2435  8B09  D0 AC              BNE    LV83
2436  8B0B  80 A8              BRA    LV82
2437
2438  8B0D  64 1E      LV90:   STZ    WCVALVES        ;ID done
2439  8B0F  20 23 A4           JSR    AD_OFF
2440  8B12  20 82 A3           JSR    DKCLR
2441  8B15                     MESSAGE 175
2445  8B1A                     SET_CURSOR 8
2449  8B1F  20 6A AC           JSR    DISPID
2450  8B22                     SET_CURSOR LINE2+8
2454  8B27                     OK
2459  8B2D  20 06 AB   LV91:   JSR    GETKEY
2460  8B30  C9 10              CMP    #NOKEY          ;reject it and do over
2461  8B32  D0 03              BNE    LV93
2462  8B34  4C BF 89           JMP    LV70
2463  8B37  C9 20      LV93:   CMP    #OKKEY          ;or accept it
2464  8B39  F0 0D              BEQ    LV95
2465  8B3B  C9 08      LV92:   CMP    #HELPKEY
2466  8B3D  D0 EE              BNE    LV91
2467  8B3F                     HELP   114
2472  8B46  80 C5              BRA    LV90
2473
2474             LV95:                                ;save new ID, enable all IDed valves
2475  8B48  20 16 AC           JSR    BFR2VID
2476  8B4B  4C BE AC           JMP    GETMENU
2477
2478                   ;--------------------------------
2479                   ;  sensor set up
2480                   ;--------------------------------
2481
2482
2483                   ;--------------------------------
2484                   ;  secret codes
2485                   ;--------------------------------
2486
2487  8B4E             SET_CODES:
2488  8B4E  20 82 A3           JSR    DKCLR           ;temporary code to reset RAM
2489  8B51                     MESSAGE 170
2493  8B56  20 06 AB   SC01:   JSR    GETKEY          ;allow for STOP key
2494  8B59  A5 13              LDA    STATUS2
2495  8B5B  29 38              AND    #00111000B      ;look for HELP-NO-OK
2496  8B5D  C9 38              CMP    #00111000B
2497  8B5F  D0 F5              BNE    SC01
2498  8B61  A5 13      SC02:   LDA    STATUS2         ;wait for keys released
2499  8B63  D0 FC              BNE    SC02
2500  8B65  20 39 A4           JSR    TIMER_OFF
```

```
2501  8B68  20 7D A3              JSR     DISPLAY_OFF
2502  8B6B  64 40                 STZ     CKSUM
2503  8B6D  4C 00 80              JMP     RESET
2504
2505
2506                          ;--------------------------------
2507                          ;       HISTORY
2508                          ;--------------------------------
2509
2510                          HIST:                   ;history display
2511                                                  ;KEY (1st byte):
2512                                                  ;00IVVVVV   Valve start
2513                                                  ;01MMMMMM   Menu start
2514                                                  ;11IMMMMM   Function start
2515                                                  ;10XXXXXX   Time & Date stamp
2516
2517  8B70  20 82 A3              JSR     DKCLR       ;welcome msg
2518  8B73                        MESSAGE 100
2522  8B7B                        OK
2527  8B7E  20 06 AB      HIB:    JSR     GETKEY
2528  8B81  C9 20                 CMP     #OKKEY
2529  8B83  F0 0D                 BEQ     HIA
2530  8B85  C9 0B                 CMP     #HELPKEY
2531  8B87  D0 F5                 BNE     HIB
2532  8B89                        HELP    7
2537  8B90  80 DE                 BRA     HIST
2538
2539  8B92                HIA:    MOV16   HWRITE,HREAD
2545  8B9A  20 3C AA      HI0:    JSR     INC_HREAD   ;find oldest entry
2546  8B9D  B2 B5                 LDA     (HREAD)
2547  8B9F  F0 F9                 BEQ     HI0
2548  8BA1  64 41                 STZ     LSB
2549
2550  8BA3  20 82 A3      HI2:    JSR     DKCLR       ;show a new history screen
2551  8BA6  E6 41                 INC     LSB
2552  8BA8  A5 41                 LDA     LSB
2553  8BAA  20 85 A6              JSR     D3D
2554  8BAD  A9 29                 LDA     #')'
2555  8BAF  20 10 A3              JSR     DCHAR
2556  8BB2  B2 B5                 LDA     (HREAD)
2557  8BB4  29 C0                 AND     #11000000B
2558  8BB6  F0 11                 BEQ     DH1         ;valve entry
2559  8BB8  C9 C0                 CMP     #11000000B
2560  8BBA  D0 03                 BNE     HI1
2561  8BBC  4C 2A 8C              JMP     DH20        ;function entry
2562  8BBF  C9 80         HI1:    CMP     #10000000B
2563  8BC1  D0 03                 BNE     HI3
2564  8BC3  4C B6 8C              JMP     DH30        ;date and time entry
2565  8BC6  4C CF 8C      HI3:    JMP     DH50        ;menu entry
2566
2567  8BC9  A9 56         DH1:    LDA     #'V'        ;valve entry
2568  8BCB  20 10 A3              JSR     DCHAR       ;show valve
2569  8BCE  B2 B5                 LDA     (HREAD)
2570  8BD0  29 0F                 AND     #00001111B
2571  8BD2  09 30                 ORA     #ASCMASK
2572  8BD4  20 10 A3              JSR     DCHAR
2573  8BD7  A9 3A                 LDA     #':'
2574  8BD9  20 10 A3              JSR     DCHAR
2575  8BDC                        SKIP    1
2579  8BE1  A0 01                 LDY     #1          ;show time valve started
2580  8BE3  B1 B5                 LDA     (HREAD),Y
2581  8BE5  85 65                 STA     IBFR+4
2582  8BE7  C8                    INY
2583  8BE8  B1 B5                 LDA     (HREAD),Y
2584  8BEA  85 66                 STA     IBFR+5
2585  8BEC  20 BE A5              JSR     DISPTIME
2586  8BEF                        SET_CURSOR LINE2
2590  8BF4  A0 04                 LDY     #4          ;show duration
```

```
2591   8BF6   B1 B5              LDA     (HREAD),Y
2592   8BF8   85 CF              STA     OFFSET
2593   8BFA   C8                 INY
2594   8BFB   B1 B5              LDA     (HREAD),Y
2595   8BFD   85 D0              STA     OFFSET+1
2596   8BFF   20 CF AB           JSR     MIN2HM
2597   8C02   20 F3 A5           JSR     DISPDURATION
2598   8C05                      OK
2603   8C0B   20 06 AB    DH14:  JSR     GETKEY
2604   8C0E   C9 20              CMP     #OKKEY
2605   8C10   D0 03              BNE     DH15
2606   8C12   4C 09 8D           JMP     DH90
2607   8C15   C9 10       DH15:  CMP     #NOKEY
2608   8C17   D0 03              BNE     DH16
2609   8C19   4C 13 8D           JMP     DH99
2610   8C1C   C9 08       DH16:  CMP     #HELPKEY
2611   8C1E   D0 EB              BNE     DH14
2612   8C20                      HELP    64
2617   8C27   4C A3 8B           JMP     HI2
2618
2619                      DH20:                          ;function entry
2620   8C2A   A0 01              LDY     #1
2621   8C2C   B1 B5              LDA     (HREAD),Y      ;hour
2622   8C2E   85 65              STA     IBFR+4
2623   8C30   C8                 INY
2624   8C31   B1 B5              LDA     (HREAD),Y      ;minute
2625   8C33   85 66              STA     IBFR+5
2626   8C35   20 BE A5           JSR     DISPTIME
2627   8C38                      SET_CURSOR LINE2
2631   8C3D   B2 B5              LDA     (HREAD)        ;mode
2632   8C3F   29 0F              AND     #00001111B
2633   8C41   18                 CLC                    ;show function 0-F
2634   8C42   69 A3              ADC     #163
2635   8C44   AA                 TAX
2636   8C45   20 D7 A2           JSR     DISPLAY_MSG
2637   8C48   B2 B5              LDA     (HREAD)        ;show dead time if SVL
2638   8C4A   29 0F              AND     #00001111B
2639   8C4C   C9 01              CMP     #1
2640   8C4E   D0 11              BNE     DH23
2641   8C50   A0 04              LDY     #4
2642   8C52   B1 B5              LDA     (HREAD),Y
2643   8C54   85 CF              STA     OFFSET
2644   8C56   C8                 INY
2645   8C57   B1 B5              LDA     (HREAD),Y
2646   8C59   85 D0              STA     OFFSET+1
2647   8C5B   20 CF AB           JSR     MIN2HM
2648   8C5E   20 F3 A5           JSR     DISPDURATION
2649   8C61              DH23:   OK
2654   8C67   20 06 AB    DH24:  JSR     GETKEY
2655   8C6A   C9 20              CMP     #OKKEY
2656   8C6C   D0 03              BNE     DH25
2657   8C6E   4C 09 8D           JMP     DH90
2658   8C71   C9 10       DH25:  CMP     #NOKEY
2659   8C73   D0 03              BNE     DH26
2660   8C75   4C 13 8D           JMP     DH99
2661   8C78   C9 08       DH26:  CMP     #HELPKEY
2662   8C7A   D0 EB              BNE     DH24
2663   8C7C                      HELP    66
2668   8C83   4C A3 8B           JMP     HI2
2669
2670   8C86              DH30:   MESSAGE 100            ;time and date stamp
2674   8C8B                      SET_CURSOR LINE2
2678   8C90   A0 01              LDY     #1
2679   8C92   B1 B5              LDA     (HREAD),Y      ;day of week
2680   8C94   85 67              STA     IBFR+6
2681   8C96   C8                 INY
2682   8C97   B1 B5              LDA     (HREAD),Y      ;month
2683   8C99   85 68              STA     IBFR+7
```

```
2684  8C9B  C8                      INY
2685  8C9C  B1 B5                   LDA     (HREAD),Y       ;day
2686  8C9E  85 69                   STA     IBFR+8
2687  8CA0  C8                      INY
2688  8CA1  B1 B5                   LDA     (HREAD),Y       ;year
2689  8CA3  85 6A                   STA     IBFR+9
2690  8CA5  20 7A A5                JSR     DISPLAY_DOW
2691  8CA8                          SKIP    2
2695  8CAD  20 84 A5                JSR     DISPLAY_DATE
2696  8CB0                          OK
2701  8CB6  20 86 AB        DH31:   JSR     GETKEY
2702  8CB9  C9 20                   CMP     #OKKEY
2703  8CBB  F0 4C                   BEQ     DH90
2704  8CBD  C9 10                   CMP     #NOKEY
2705  8CBF  F0 52                   BEQ     DH99
2706  8CC1  C9 08                   CMP     #HELPKEY
2707  8CC3  D0 F1                   BNE     DH31
2708  8CC5                          HELP    65
2713  8CCC  4C A3 BB                JMP     HI2
2714
2715                        DH50:                           ;menu entry
2716  8CCF  A0 01                   LDY     #1
2717  8CD1  B1 B5                   LDA     (HREAD),Y       ;hour
2718  8CD3  85 65                   STA     IBFR+4
.
3089  8F16  80 02                   BRA     MMV2
3090  8F18  A9 2D           MMV1:   LDA     #'-'            ;valve off, show -
3091  8F1A  20 10 A3        MMV2:   JSR     DCHAR
3092  8F1D  E8                      INX                     ;do all 8
3093  8F1E  E0 09                   CPX     #9
3094  8F20  D0 EA                   BNE     MMV3
3095  8F22  60                      RTS
3096
3097                        ;--------------------------------
3098                        ;       manual test sequence
3099                        ;--------------------------------
3100
3101  8F23  20 82 A3        MMT:    JSR     DKCLR           ;Test sequence for valves
3102  8F26                          MESSAGE 117
3106  8F2B                          SET_CURSOR LINE2
3110  8F30  A9 02                   LDA     #2              ;get duration, default=2
3111  8F32                          SELECT  1,30
3119  8F3F  90 09                   BCC     MMT1
3120  8F41                          HELP    27              ;no help yet
3125  8F48  80 D9                   BRA     MMT
3126  8F4A                  MMT1:   SET     VALVE           ;start with valve 1
3130  8F4E  20 82 A3        MMT2:   JSR     DKCLR
3131  8F51                          MESSAGE 118
3135  8F56  20 5C A1                JSR     DVALVEMSG       ;show valve # and status
3136  8F59                          SET_CURSOR LINE2
3140  8F5E  A6 49                   LDX     VALVE
3141  8F60  BD 7D 02                LDA     VS,X
3142  8F63  89 80                   BIT     #VID
3143  8F65  F0 02                   BEQ     MMT3
3144  8F67  80 0C                   BRA     MMT10
3145
3146  8F69  A2 77           MMT3:   LDX     #119            ;no ID
3147  8F6B  80 02                   BRA     MMT6
3148  8F6D  A2 79           MMT5:   LDX     #121            ;master valve
3149  8F6F  20 07 A2        MMT6:   JSR     DISPLAY_MSG
3150  8F72  4C C3 8F                JMP     MMTNEXT
3151
3152  8F75  20 59 A4        MMT10:  JSR     VON             ;a good valve, turn it on
3153  8F78  A5 61                   LDA     IBFR            ;start countdown
3154  8F7A  85 42                   STA     MSB
3155  8F7C  64 A1                   STZ     SECCTR
3156  8F7E  64 41                   STZ     LSB
3157  8F80                          MESSAGE 122             ;show that valve is on
3161  8F85                  MMT11:  SET_CURSOR LINE2+4      ;show time remaining
```

```
3165  8F8A  A5 42            LDA   MSB
3166  8F8C  20 C2 A6          JSR   D2NS
3167  8F8F  A9 3A            LDA   #':'
3168  8F91  20 10 A3          JSR   DCHAR
3169  8F94  A5 41            LDA   LSB
3170  8F96  20 C2 A6          JSR   D2NS
3171  8F99  A5 A1      MMT12: LDA   SECCTR       ;if new second, show it
3172  8F9B  C5 41            CMP   LSB
3173  8F9D  F0 10            BEQ   MMT15
3174  8F9F  85 41            STA   LSB
3175  8FA1  A5 41            LDA   LSB          ;if new minute, dec minute
3176  8FA3  10 E0            BPL   MMT11
3177  8FA5  C6 42            DEC   MSB
2719  8CD5  C8               INY
2720  8CD6  B1 B5            LDA   (HREAD),Y    ;minute
2721  8CD8  85 66            STA   IBFR+5
2722  8CDA  20 BE A5          JSR   DISPTIME
2723  8CDD                  SET_CURSOR LINE2
2727  8CE2  A0 04            LDY   #4
2728  8CE4  B1 B5            LDA   (HREAD),Y    ;show msg #
2729  8CE6  AA               TAX
2730  8CE7  20 D7 A2          JSR   DISPLAY_MSG
2731  8CEA                  OK
2736  8CF0  20 06 AB    DH54: JSR   GETKEY
2737  8CF3  C9 20            CMP   #OKKEY
2738  8CF5  F0 12            BEQ   DH98
2739  8CF7  C9 10            CMP   #NOKEY
2740  8CF9  F0 1B            BEQ   DH99
2741  8CFB  C9 08            CMP   #HELPKEY
2742  8CFD  D0 F1            BNE   DH54
2743  8CFF                  HELP  66
2748  8D06  4C A3 8B          JMP   HI2
2749
2750  8D09  20 3C AA    DH98: JSR   INC_HREAD    ;OK key
2751  8D0C  B2 B5            LDA   (HREAD)
2752  8D0E  F0 03            BEQ   DH99         ;zero key means HWRITE has been reached
2753  8D10  4C A3 8B          JMP   HI2
2754
2755  8D13  20 82 A3    DH99: JSR   DKCLR        ;end of history
2756  8D16                  MESSAGE 50
2760  8D1B  20 A7 AB          JSR   MSGWAIT
2761  8D1E  20 A7 AB          JSR   MSGWAIT
2762  8D21  4C 8E AC          JMP   GETMENU
2763
2764                  ;--------------------------------
2765                  ;    SEMI-AUTO RUN
2766                  ;--------------------------------
2767
2768  8D24        SEMI_MODE:
2769  8D24                  HELP  0
2774  8D2B  4C 8E AC          JMP   GETMENU
2775                  ;       STZ   RAIN_DELAY
2776                  ;       SET   WCLK
2777                  ;       JMP   RM20
2778
2779                  ;--------------------------------
2780                  ;    AUTOMATIC RUN
2781                  ;--------------------------------
2782
2783              AUTO_MODE:                    ;start watering
2784  8D2E  9C 1E 03          STZ   WCLK
2785  8D31  9C FD 02          STZ   RAIN_DELAY
2786  8D34  20 82 A3          JSR   DKCLR        ;want to delay?
2787  8D37                  MESSAGE 130
2791  8D3C                  ON
2796  8D42  20 06 AB    RM0:  JSR   GETKEY
2797  8D45  C9 10            CMP   #NOKEY
2798  8D47  F0 3B            BEQ   RM20
2799  8D49  C9 20            CMP   #OKKEY
2800  8D4B  F0 0D            BEQ   RM1
```

```
2801  8D4D  C9 08              CMP     #HELPKEY
2802  8D4F  90 F1              BNE     RM0
2803  8D51                     HELP    116
2808  8D58  80 D4              BRA     AUTO_MODE
2809  8D5A  20 82 A3   RM1:    JSR     DKCLR          ;yes, select delay
2810  8D5D                     MESSAGE 131
2814  8D62                     SET_CURSOR LINE2+4
2818  8D67  A9 01              LDA     #1
2819  8D69                     SELECT  1,14
2827  8D76  90 09              BCC     RM2
2828  8D78                     HELP    116
2833  8D7F  80 AD              BRA     AUTO_MODE
2834  8D81  8D FD 82   RM2:    STA     RAIN_DELAY
2835
2836  8D84  20 D4 8F   RM20:   JSR     EDVALVE        ;any valves to disable?
2837
2838                   RM25:                          ;ask if continue previous run
2839                                                  ;(if object area unchanged)
2840                                                  ;save daynum
2841
2842                   RM30:                          ;select base set up
2843  8D87  20 82 A3           JSR     DKCLR
2844  8D8A  A0 01              LDY     #1
2845  8D8C  B1 5A              LDA     (MENUPTR),Y
2846  8D8E  C9 10              CMP     #$10
2847  8D90  D0 07              BNE     RM31
2848  8D92                     MESSAGE 17             ;auto
2852  8D97  80 05              BRA     RM32
2853  8D99              RM31:  MESSAGE 18             ;semi-auto
2857  8D9E  A9 3A      RM32:   LDA     #':'
2858  8DA0  20 10 A3           JSR     DCHAR
2859  8DA3                     SET_CURSOR LINE2
2863  8DA8  A9 01              LDA     #1
2864  8DAA                     SELECT_SOK 1,8,203
2874  8DBB  90 09              BCC     RM33
2875  8DBD                     HELP    118
2880  8DC4  80 C1              BRA     RM30
2881  8DC6  C9 08      RM33:   CMP     #8
2882  8DC8  D0 03              BNE     RM39
2883  8DCA  4C 46 86           JMP     FSTOP
2884  8DCD  85 BB      RM39:   STA     SOURCE
2885  8DCF  20 B3 A1           JSR     ISSOURCE       ;error if empty setup
2886  8DD2  B0 09              BCS     RM36
2887  8DD4                     HELP    71
2892  8DDB  80 AA              BRA     RM30
2893  8DDD  20 F6 A6   RM36:   JSR     OBJCLEAR       ;move source to object area
2894  8DE0  20 07 A7           JSR     S20
2895  8DE3  A0 01              LDY     #1             ;error if semi-auto and specific days
2896  8DE5  B1 5A              LDA     (MENUPTR),Y
2897  8DE7  29 F0              AND     #01111000B
2898  8DE9  C9 10              CMP     #00010000B
2899  8DEB  F0 0F              BEQ     RM40
2900  8DED  AD 41 15           LDA     CYCLE_TYPE
2901  8DF0  F0 0A              BEQ     RM40
2902  8DF2                     HELP    108
2907  8DF9  4C 87 8D           JMP     RM30
2908
2909                   RM40:                          ;select add-on one-time
2910
2911                   RM50:                          ;select add-on special
2912
2913  8DFC  20 2E A0   RM60:   JSR     ENTER_GLOBAL   ;enter budget
2914
2915  8DFF  20 DE AD   RM70:   JSR     GENERATE       ;check out selected setup at budget
2916  8E02  90 0C              BCC     RM80
2917  8E04  18                 CLC
2918  8E05  A5 79              LDA     ERROR          ;no good, show error
2919  8E07  69 49              ADC     #73
```

```
2920  8E39  85 72            STA     HELPNUM
2921  8E8B  20 74 AB         JSR     HELP_MSG
2922  8E0E  80 EC            BRA     RM60
2923
2924  8E10           RM80:
2925  8E10  9C 1A 03          STZ    DAYNUM           ;do new watering
2926  8E13  9C 1B 03          STZ    DAYNUM+1
2927
2928  8E16  20 82 A3   RM90:  JSR    DKCLR            ;give programmer out msg
2929  8E19                    MESSAGE 116
2933  8E1E                    SET    RUNNING          ;we're ready to run
2937  8E23  20 06 AB   RM95:  JSR    GETKEY
2938  8E26  C9 0B             CMP    #HELPKEY
2939  8E28  D0 F9             BNE    RM95             ;wait for programmer removed or STOP
2240  8E2A  A0 01             LDY    #1
2941  8F2C  B2 5A             LDA    (MENUPTR)
2942  8E2E  29 F0             AND    #11110000B
2943  8E30  C9 10             CMP    #00010000B
2944  8E32  F0 09             BEQ    RM96
2945  8E34                    HELP   120              ;SEMI-AUTO mode
2950  8E3B  80 D9             BRA    RM90
2951  8E3D           RM96:    HELP   119              ;AUTO mode
2956  8E44  80 D0            BRA    RM90
2957
2958
2959
2960                   ;-------------------------------
2961                   ;     manual valves
2962                   ;-------------------------------
2963
2964  8E46           MMV:     SET    VALVE            ;Manual Mode - Valves
2968  8E4A  20 82 A3           JSR    DKCLR
2969  8E4D                     ANSLOW
2973  8E51  20 85 A3   MMV0:  JSR    DISPLAY_CLR
2974  8E54  20 05 8F          JSR    DISPV5
2975  8E57                    SET_CURSOR LINE2        ;show second line
2979  8E5C  A6 49             LDX    VALVE
2980  8E5E  BD 7D 02          LDA    VS,X
2981  8E61  89 10             BIT    #00010000B
2982  8E63  D0 07             BNE    MM8
2983  8E65                    MESSAGE 201
2987  8E6A  80 05             BRA    MM6
2988  8E6C           MM8:     MESSAGE 200
2992  8E71           MM6:     SET_CURSOR LINE2+7
2996  8E76  20 6A A1          JSR    DV
2997  8E79                    SET_CURSOR LINE2+13
3001  8E7E                    OK
3006  8E84  20 06 AB   MM7:   JSR    GETKEY
3007  8E87  C9 20             CMP    #OKKEY
3008  8E89  F0 11             BEQ    MM10
3009  8E8B  C9 10             CMP    #NOKEY
3010  8E8D  F0 23             BEQ    MM20
3011  8E8F  C9 0B             CMP    #HELPKEY
3012  8E91  D0 F1             BNE    MM7
3013  8E93                    HELP   63
3018  8E9A  80 AA             BRA    MMV
3019  8E9C
3020  8E9C  A6 49     MM10:   LDX    VALVE            ;OK key, toggle ON/OFF
3021  8E9E  BD 7D 02          LDA    VS,X
3022  8EA1  89 10             BIT    #00010000B
3023  8EA3  F0 05             BEQ    MM12
3024  8EA5  20 BC A4          JSR    VOFF
3025  8EA8  80 08             BRA    MM20
3026  8EAA  20 59 A4   MM12:  JSR    VON
3027  8EAD  64 E3             STZ    CMDCTR           ;auto MC does initial delay again
3028  8EAF  4C 51 8E          JMP    MMV0
3029
3030  8EB2  A5 49     MM20:   LDA    VALVE            ;do next valve?
```

```
3031  8EB4  85 E1              STA     R5
3032  8EB6  20 A7 9E           JSR     INITVALVE
3033  8EB9  90 04              BCC     MM22
3034  8EBB                     SET     VALVE          ;start over
3038  8EBF  20 85 A3    MM22:  JSR     DISPLAY_CLR
3039  8EC2  20 05 8F           JSR     DISPVS
3040  8EC5                     SET_CURSOR LINE2
3044  8ECA                     MESSAGE 202
3048  8ECF                     BACKUP  2
3052  8ED4  20 6A A1           JSR     IV
3053  8ED7                     OK
3058  8EDD  20 06 AB    MM21:  JSR     GETKEY
3059  8EE0  C9 20              CMP     #OKKEY
3060  8EE2  D0 05              BNE     MM24
3061  8EE4  64 E3              STZ     CNDCTR         ;yes, init auto NO
3062  8EE6  4C 51 8E           JMP     MMV0
3063  8EE9  C9 10       MM24:  CMP     #NOKEY
3064  8EEB  D0 0A              BNE     MM23
3065  8EED  A5 E1              LDA     R5
3066  8EEF  85 49              STA     VALVE          ;no, back to previous valve
3067  8EF1  20 98 AD           JSR     ISEXIT         ;see if want out
3068  8EF4  4C 51 8E           JMP     MMV0           ;no
3069  8EF7  C9 08       MM23:  CMP     #HELPKEY
3070  8EF9  D0 E2              BNE     MM21
3071  8EFB                     HELP    63
3076  8F02  4C 46 8E           JMP     MMV 3078                    DISPVS:                        ;display valve status line
3079  8F05                     MESSAGE 61
3083  8F0A  A2 01              LDX     #1
3084  8F0C  BD 7D 02    MMV3:  LDA     VS,X
3085  8F0F  B9 10              BIT     #%00010000
3086  8F11  F0 05              BEQ     MMV1
3087  8F13  8A                 TXA                    ;valve is on, show valve #
3088  8F14  09 30              ORA     #ASCMASK
3178  8FA7  A9 3B              LDA     #59
3179  8FA9  85 41              STA     LSD
3180  8FAB  85 A1              STA     SECCTR
3181  8FAD  80 06              BRA     MM.11
3182  8FAF  20 06 AB    MMT15: JSR     GETKEY         ;wait until STOP key
3183  8FB2  A5 42              LDA     H.0            ;or no more time
3184  8FB4  05 41              ORA     LSD
3185  8FB6  D0 E1              BNE     MMT12
3186  8FB8  20 8C A4           JSR     VOFF           ;then valve off
3187  8FBB  20 C8 A3           JSR     CLR_LINE2
3188  8FBE                     MESSAGE 123
3192
3193  8FC3  20 A7 AB    MMTNEXT: JSR   MSGWAIT        ;leave msg on a bit
3194  8FC6  E6 49              INC     VALVE
3195  8FC8  A5 49              LDA     VALVE
3196  8FCA  C9 09              CMP     #9
3197  8FCC  F0 03              BEQ     MMTX
3198  8FCE  4C 4E 8F           JMP     MMT2
3199  8FD1  4C 8E AC    MMTX:  JMP     GETMENU
3200
3201
3202                           ;----------------------------
3203                           ;   SUBROUTINES
3204                           ;----------------------------
3205
3206
3207                    EDVALVE:                       ;subroutine to enable/disable valves
3208  8FD4  20 82 A3           JSR     DKCLR
3209  8FD7                     MESSAGE 132
3213  8FDC                     OH
3218  8FE2  20 06 AB    EDV1:  JSR     GETKEY
3219  8FE5  C9 10              CMP     #NOKEY
3220  8FE7  D0 01              BNE     EDV2
```

```
3221  8FE9  60                    RTS
3222  8FEA  C9 20      EDV2:  CMP    #OKKEY
3223  8FEC  F0 0D             BEQ    EDV3
3224  8FEE  C9 08             CMP    #HELPKEY
3225  8FF0  D0 F0             BNE    EDV1
3226  8FF2                    HELP   50
3231  8FF9  80 D9             BRA    EDVALVE
3232
3233  8FFB  A2 08      EDV3:  LDX    #8          ;move current valve status to bfr
3234  8FFD  BD 7D 02   SVA:   LDA    VS,X
3235  9000  9D 5E 02          STA    IDBFR,X
3236  9003  CA                DEX
3237  9004  D0 F7             BNE    SVA
3238  9006  20 82 A3   SV0:   JSR    OKCLR       ;verify current status
3239  9009  20 A3 90          JSR    DISPEV
3240  900C                    SET_CURSOR LINE2
3244  9011                    MESSAGE 128
3248  9016                    ON
3253  901C  20 06 A8   SV4:   JSR    GETKEY
3254  901F  C9 20             CMP    #OKKEY
3255  9021  D0 0C             BNE    SV5
3256  9023  A2 08             LDX    #8          ;ok, save IDBFR to VS
3257  9025  BD 5E 02   SVB:   LDA    IDBFR,X
3258  9028  9D 7D 02          STA    VS,X
3259  902B  CA                DEX
3260  902C  D0 F7             BNE    SVB
3261  902E  60                RTS
3262  902F  C9 10      SV5:   CMP    #NOKEY
3263  9031  F0 0D             BEQ    SV10        ;no, modify
3264  9033  C9 08             CMP    #HELPKEY
3265  9035  D0 E5             BNE    SV4
3266  9037                    HELP   53
3271  903E  80 DC             BRA    SV4
3272  9040
3273  9040  20 C9 90   SV10:  JSR    ALL_DISABLE
3274  9043  64 49             STZ    VALVE
3275  9045  20 82 A3          JSR    OKCLR
3276  9048                    MSLOW
3280  904C  80 4D             BRA    SV20
3281  904E  20 85 A3   SV13:  JSR    DSPLAY_CLR  ;use this station?
3282  9051  20 A3 90          JSR    DISPEV
3283  9054                    SET_CURSOR LINE2
3287  9059                    MESSAGE 129
3291  905E  20 3D A1          JSR    RSTAS
3292  9061  A9 3F             LDA    #'?'
3293  9063  20 10 A3          JSR    OCHAR
3294  9066                    OK
3299  906C  20 06 A8   SV11:  JSR    GETKEY
3300  906F  C9 10             CMP    #NOKEY
3301  9071  F0 12             BEQ    SV12
3302  9073  C9 20             CMP    #OKKEY
3303  9075  F0 1A             BEQ    SV15
3304  9077  C9 08             CMP    #HELPKEY
3305  9079  D0 F1             BNE    SV11
3306  907B                    HELP   60
3311  9082  4C 04 8F          JMP    EDVALVE
3312  9085  A6 49      SV12:  LDX    VALVE       ;disable valve
3313  9087  BD 5E 02          LDA    IDBFR,X
3314  908A  29 BF             AND    #10111111B
3315  908C  9D 5E 02          STA    IDBFR,X
3316  908F  80 0A             BRA    SV20
3317  9091  A6 49      SV15:  LDX    VALVE       ;enable valve
3318  9093  BD 5E 02          LDA    IDBFR,X
3319  9096  09 40             ORA    #01000000B
3320  9098  9D 5E 02          STA    IDBFR,X
3321  909B  20 A7 9E   SV20:  JSR    NXTVALVE    ;next valve
3322  909E  90 AE             BCC    SV13
3323  90A0  4C 06 90          JMP    SV0
```

```
3324
3325                     DISPEV:              ;display enabled valves
3326    90A3                     MESSAGE 127
3330    90A8                     SET     LSB
3334    90AC    A6 41    SV1:    LDX     LSB
3335    90AE    BD 5E 02         LDA     IDBFR,X
3336    90B1    89 40            BIT     #EVEN
3337    90B3    F0 06            BEQ     SV2
3338    90B5    A5 41            LDA     LSB
3339    90B7    09 30            ORA     #ASCMASK
3340    90B9    80 02            BRA     SV3
3341    90BB    A9 2D    SV2:    LDA     #'-'
3342    90BD    20 10 A3 SV3:    JSR     DCHAR
3343    90C0    E6 41            INC     LSB
3344    90C2    A5 41            LDA     LSB
3345    90C4    C9 09            CMP     #9
3346    90C6    D0 E4            BNE     SV1
3347    90C8    60               RTS
3348
3349                     ALL_DISABLE:         ;disable valve bfr
3350    90C9                     SET     VALVE
3354    90CD    A6 49    ADI1:   LDX     VALVE
3355    90CF    BD 5E 02         LDA     IDBFR,X
3356    90D2    29 BF            AND     #10111111B
3357    90D4    9D 5E 02         STA     IDBFR,X
3358    90D7    E6 49            INC     VALVE
3359    90D9    A5 49            LDA     VALVE
3360    90DB    C9 09            CMP     #9
3361    90DD    D0 EE            BNE     ADI1
3362    90DF    60               RTS
3363
3364                     ALL_ENABLE:          ;enable all valves
3365    90E0                     SET     VALVE
3369    90E4    A6 49    AEN1:   LDX     VALVE
3370    90E6    BD 7D 02         LDA     VS,X
3371    90E9    09 40            ORA     #01000000B
3372    90EB    9D 7D 02         STA     VS,X
3373    90EE    E6 49            INC     VALVE
3374    90F0    A5 49            LDA     VALVE
3375    90F2    C9 09            CMP     #9
3376    90F4    D0 EE            BNE     AEN1
3377    90F6    60               RTS
3378
3379                     ;-------------------------------------------------------
3380
3381
3382    90F7    20 82 A3 ID10:   JSR     DKCLR       ;show the current IDs
3383    90FA                     MESSAGE 173
3387    90FF    20 48 AC         JSR     VID2BFR
3388    9102    20 6A AC         JSR     DISPID
3389    9105    20 06 AB ID11:   JSR     GETKEY      ;wait for key
3390    9108    C9 20            CMP     #OKKEY
3391    910A    F0 11            BEQ     ID12
3392    910C    C9 10            CMP     #NOKEY
3393    910E    F0 0D            BEQ     ID12
3394    9110    C9 08            CMP     #HELPKEY
3395    9112    D0 F1            BNE     ID11
3396    9114                     HELP    113
3401    911B    80 DA            BRA     ID10
3402    911D    4C 46 86 ID12:   JMP     FSTOP
3403
3404                     ;-------------------------------------------------------
3405
3406
3407
3408
3409    9120                     INCLUDE     SCHED.ASM
3410                     ;--------------------------------
3411                     ;   SETUP SCHEDULES
3412                     ;--------------------------------
```

```
3413
3414                    SETUP_SCHEDULES:        ;set up programs
3415                                            ;SOURCE  1=Mini
3416                                            ;        2=Autosplit
3417                                            ;        3=Ration
3418                                            ;        4=ISC
3419                                            ;        5=One Time
3420                                            ;        6=Special
3421                                            ;        7=Failsafe
3422
3423                    GETREVIEW:              ;find out if new, modify or review
3424   9120  A0 01              LDY     #1
3425   9122  B1 5A              LDA     (MENUPTR),Y     ;get source from MENUPTR
3426   9124  29 0F              AND     #00001111B
3427   9126  85 BB              STA     SOURCE
3428   9128  A9 02              LDA     #RNEW
3429   912A  8D 72 02           STA     REVIEW          ;0=review, 1=modify, 2=new, 3=exit
3430   912D  20 F6 A6           JSR     OBJCLEAR        ;clear object area
3431   9130  20 B3 A1           JSR     ISSOURCE        ;if source exits,
3432   9133  90 36              BCC     GETR4
3433   9135  20 07 A7           JSR     S20             ;move saved source to object area
3434   9138  20 82 A3   GETR2:  JSR     OKCLR           ;get review type
3435   913B  20 9F A1           JSR     DISP_SOURCE
3436   913E                     SET_CURSOR LINE2
3440   9143  A9 00              LDA     #0
3441   9145                     SELECT_SOK 0,3,135
3451   9156  90 09      GETR3:  BCC     GETR1
3452   9158                     HELP    83
3457   915F  80 D7              BRA     GETR2
3458   9161  C9 03      GETR1:  CMP     #3
3459   9163  D0 03              BNE     GETR5
3460   9165  4C 46 86           JMP     FSTOP
3461   9168  8D 72 02   GETR5:  STA     REVIEW
3462   916B  60         GETR4:  RTS
3463
3464   916C  A5 79      VSUERR: LDA     ERROR           ;error in valve set up
3465   916E  18                 CLC                     ;explain it
3466   916F  69 49              ADC     #73
3467   9171  85 72              STA     HELPNUM
3468   9173  20 74 AB           JSR     HELP_MSG
3469   9176  60                 RTS
3470
3471
3472                    ;---------------------------------
3473                    ;    ration schedule
3474                    ;---------------------------------
3475
3476
3477                    ;---------------------------------
3478                    ;    isc schedule
3479                    ;---------------------------------
3480
3481
3482                    ;---------------------------------
3483                    ;    mini schedule
3484                    ;---------------------------------
3485                    ;---------------------------------
3486                    ;    auto-split schedule
3487                    ;---------------------------------
3488
3489   9177            VM0:  SET     DAYNUM          ;init day # for review
3493   917C  9C 1B 03         STZ     DAYNUM+1
3494   917F  9C 1C 03         STZ     DAYNUM+2
3495
3496   9182  20 20 91   VM1:   JSR     GETREVIEW       ;new, review, or modify?
3497
3498   9185  AD 72 02          LDA     REVIEW
3499   9188  C9 02             CMP     #RNEW
```

```
3500  918A  F0 0B              BEQ       VM20
3501  918C  20 9E 92            JSR       ISBASICR
3502  918F  B0 03               BCS       VM20
3503  9191  4C B3 91            JMP       VM25
3504
3505  9194  20 45 94    VM20:   JSR       BLOCK1            ;enter durations
3506
3507  9197  A5 BB               LDA       SOURCE            ;enter split criteria
3508  9199  C9 02               CMP       #2                ;if auto-split
3509  919B  D0 03               BNE       VM22
3510  919D  20 18 95            JSR       BLOCK2            ;get split info
3511
3512  91A0  AD 72 02    VM22:   LDA       REVIEW            ;if new, then get cycle type
3513  91A3  C9 02               CMP       #RNEW
3514  91A5  D0 03               BNE       VM21
3515  91A7  20 76 9E            JSR       ENTER_CYCLE_TYPE
3516
3517  91AA  20 78 96    VM21:   JSR       BLOCK3            ;enter base cycles
3518  91AD  20 84 98            JSR       BLOCK4            ;enter excluded time
3519  91B0  20 DE 99            JSR       BLOCK5            ;enter starting time
3520
3521  91B3  A5 BB       VM25:   LDA       SOURCE
3522  91B5  C9 02               CMP       #2                ;if auto-split
3523  91B7  D0 15               BNE       VM90
3524  91B9  AD 72 02            LDA       REVIEW
3525  91BC  C9 02               CMP       #RNEW
3526  91BE  F0 08               BEQ       VM30
3527  91C0  20 47 92            JSR       ISSOAKR
3528  91C3  B0 03               BCS       VM30
3529  91C5  4C CE 91            JMP       VM90
3530
3531  91C8  20 6C 9A    VM30:   JSR       BLOCK10           ;enter soak durations
3532  91CB  20 7C 96            JSR       BLOCK11           ;enter soak cycles
3533
3534  91CE  AD 72 02    VM90:   LDA       REVIEW            ;if new or modified,
3535  91D1  C9 08               CMP       #RREVIEW
3536  91D3  F0 2C               BEQ       VM100
3537  91D5  20 13 B3            JSR       CHECK             ;check for errors
3538  91D8  90 06               BCC       VM91
3539  91DA  20 6C 91            JSR       VSUERR            ;show error
3540  91DD  4C 01 92            JMP       VM100
3541              VM91:                                     ;else store away good setup
3542  91E0  20 82 A3            JSR       DKCLR
3543  91E3  20 9F A1            JSR       DISP_SOURCE
3544  91E6                      SET_CURSOR LINE2
3548  91EB                      MESSAGE   179
3552  91F0  20 A7 AB            JSR       MSGWAIT
3553  91F3  20 A7 AB            JSR       MSGWAIT
3554  91F6  A5 BB               LDA       SOURCE
3555  91F8  8D 40 15            STA       OBJBASE
3556  91FB  20 31 A7            JSR       O2S
3557  91FE  4C 82 91            JMP       VM1
3558
3559  9201  AD 72 02    VM100:  LDA       REVIEW            ;if review
3560  9204  C9 08               CMP       #RREVIEW
3561  9206  D0 03               BNE       VM199
3562  9208  20 7C 92            JSR       DAILY             ;review daily schedule
3563  920B  4C 82 91    VM199:  JMP       VM1
3564
3565
3566                    ;------------------------------------
3567                    ;     review routines
3568                    ;------------------------------------
3569
3570              ISBASICR:                                 ;Review or Modify basic setup?
3571  920E  20 82 A3            JSR       DKCLR             ;return carry set if yes
3572  9211  AD 72 02            LDA       REVIEW
3573  9214  18                  CLC
```

```
3574  9215  69 9C              ADC     #156
3575  9217  AA                 TAX
3576  9218  20 D7 A2           JSR     DISPLAY_MSG
3577  921B                     SET_CURSOR LINE2
3581  9220                     MESSAGE 158
3585  9225                     QM
3590  922B  20 86 AB    RE10:  JSR     GETKEY
3591  922E  C9 20              CMP     #OKKEY
3592  9230  F0 13              BEQ     REYES
3593  9232  C9 10              CMP     #NOKEY
3594  9234  F0 0D              BEQ     RENO
3595  9236  C9 08              CMP     #HELPKEY
3596  9238  D0 F1              BNE     RE10
3597  923A                     HELP    84
3602  9241  80 CB              BRA     ISBASICR
3603  9243  18          RENO:  CLC
3604  9244  60                 RTS
3605  9245  38          REYES: SEC
3606  9246  60                 RTS
3607
3608                    ISSOAKR:                   ;Review or Modify soak setup?
3609  9247  20 82 A3           JSR     OKCLR       ;return carry set if yes
3610  924A  AD 72 02           LDA     REVIEW
3611  924D  18                 CLC
3612  924E  69 9C              ADC     #156
3613  9250  AA                 TAX
3614  9251  20 D7 A2           JSR     DISPLAY_MSG
3615  9254                     SET_CURSOR LINE2
3619  9259                     MESSAGE 160
3623  925E                     QM
3628  9264  20 86 AB    RSK0:  JSR     GETKEY
3629  9267  C9 20              CMP     #OKKEY
3630  9269  F0 DA              BEQ     REYES
3631  926B  C9 10              CMP     #NOKEY
3632  926D  F0 D4              BEQ     RENO
3633  926F  C9 08              CMP     #HELPKEY
3634  9271  D0 F1              BNE     RSK0
3635  9273                     HELP    76
3640  927A  80 CB              BRA     ISSOAKR
3641
3642                    DAILY:                     ;review daily schedule
3643  927C  20 82 A3           JSR     OKCLR
3644  927F                     MESSAGE 154
3648  9284                     QM
3653  928A  20 86 AB    RE21:  JSR     GETKEY
3654  928D  C9 20              CMP     #OKKEY
3655  928F  F0 14              BEQ     RE20
3656  9291  C9 10              CMP     #NOKEY
3657  9293  D0 03              BNE     RE22
3658  9295  4C 44 94           JMP     RE199
3659  9298  C9 08       RE22:  CMP     #HELPKEY
3660  929A  D0 EE              BNE     RE21
3661  929C                     HELP    90
3666  92A3  80 D7              BRA     DAILY
3667
3668  92A5  20 2E A0    RE20:  JSR     ENTER_GLOBAL ;enter budget settings
3669                    RE90:                       ;enter day to review
3670  92A8  20 82 A3           JSR     OKCLR
3671  92AB  64 49              STZ     VALVE
3672  92AD                     MESSAGE 142
3676  92B2  AD 41 15           LDA     CYCLE_TYPE
3677  92B5  D0 26              BNE     RE91
3678  92B7  AD 1A 03           LDA     DAYNUM       ;enter so many days
3679  92BA                     SELECT  1,99
3687  92C7  90 09              BCC     RE92
3688  92C9                     HELP    94
3693  92D0  80 D6              BRA     RE90
3694  92D2  8D 1A 03    RE92:  STA     DAYNUM
```

```
3695  92D5  9C 1B 03              STZ    DAYNUM+1
3696  92D8  9C 1C 03              STZ    DAYNUM+2
3697  92DB  80 64                 BRA    RE120
3698  92DD           RE91:        BACKUP 1              ;enter specific day
3702  92E2  AD 1C 03              LDA    DAYNUM+2
3703  92E5                        SELECT_NOK 1,7,91
3713  92F6  90 09                 BCC    RE93
3714  92F8                        HELP   92
3719  92FF  80 A7                 BRA    RE90
3720  9301  8D 1C 03   RE93:      STA    DAYNUM+2
3721
3722  9304  20 82 A3              JSR    DKCLR           ;enter which week
3723  9307                        MESSAGE 143
3727  930C                        SET_CURSOR 11
3731  9311  A5 61                 LDA    IBFR
3732  9313  18                    CLC
3733  9314  69 5A                 ADC    #90
3734  9316  AA                    TAX
3735  9317  20 D7 A2              JSR    DISPLAY_MSG
3736  931A                        SET_CURSOR LINE2+11
3740  931F  AD 1A 03              LDA    DAYNUM
3741  9322                        SELECT 1,10
3749  932F  90 0A                 BCC    RE94
3750  9331                        HELP   93
3755  9338  4C AB 92              JMP    RE90
3756  933B  8D 1A 03   RE94:      STA    DAYNUM
3757  933E  9C 1B 03              STZ    DAYNUM+1
3758
3759           RE120:                                    ;generate schedule
3760  9341  64 49                 STZ    VALVE
3761  9343  20 DE AD              JSR    GENERATE
3762  9346  90 0D                 BCC    RE30
3763  9348  A5 79                 LDA    ERROR           ;error in valve set up
3764  934A  18                    CLC                   ;explain it
3765  934B  69 49                 ADC    #73
3766  934D  85 72                 STA    HELPNUM
3767  934F  20 74 AB              JSR    HELP_MSG
3768  9352  4C 44 94              JMP    RE199
3769
3770  9355  20 82 A3   RE30:      JSR    DKCLR           ;press OK msg
3771  9358  64 49                 STZ    VALVE
3772  935A                        MESSAGE 153
3776  935F                        OK
3781  9365  20 06 AB   RE31:      JSR    GETKEY
3782  9368  C9 20                 CMP    #OKKEY
3783  936A  F0 14                 BEQ    RE122
3784  936C  C9 10                 CMP    #NOKEY
3785  936E  D0 03                 BNE    RE33
3786  9370  4C C9 93              JMP    RE100
3787  9373  C9 0B      RE33:      CMP    #HELPKEY
3788  9375  D0 EE                 BNE    RE31
3789  9377                        HELP   107
3794  937E  80 D5                 BRA    RE30
3795
3796  9380  AD EC 15   RE122:     LDA    NSTARTS         ;show ending time
3797  9383  D0 0A                 BNE    RE125           ;if any starts to show
3798  9385                        HELP   69
3803  938C  4C 44 94              JMP    RE199
3804  938F  20 82 A3   RE125:     JSR    DKCLR
3805  9392                        MESSAGE 182
3809  9397                        MOV16  DONETIME,OFFSET
3815  93A1  20 CF AB              JSR    MIN2HM
3816  93A4  20 BE A5              JSR    DISPTIME
3817  93A7                        OK
3822  93AD  20 06 AB   RE123:     JSR    GETKEY
3823  93B0  C9 20                 CMP    #OKKEY
3824  93B2  F0 15                 BEQ    RE100
3825  93B4  C9 10                 CMP    #NOKEY
```

```
3826  93B6  D0 03              BNE      RE124
3827  93B8  4C 44 94           JMP      RE199
3828  93BB  C9 08       RE124: CMP      #HELPKEY
3829  93BD  D0 EE              BNE      RE123
3830  93BF                     HELP     107
3835  93C6  4C 41 93           JMP      RE120
3836
3837               RE100:                      ;review starts
3838  93C9  20 82 A3    RE102: JSR      OKCLR  ;press OK msg
3839  93CC  64 49              STZ      VALVE
3840  93CE                     MESSAGE  161
3844  93D3                     OK
3849  93D9  20 06 AB    RE101: JSR      GETKEY
3850  93DC  C9 20              CMP      #OKKEY
3851  93DE  F0 14              BEQ      RE110
3852  93E0  C9 10              CMP      #NOKEY
3853  93E2  D0 03              BNE      RE103
3854  93E4  4C 44 94           JMP      RE199
3855  93E7  C9 08       RE103: CMP      #HELPKEY
3856  93E9  D0 EE              BNE      RE101
3857  93EB                     HELP     95
3862  93F2  80 D5              BRA      RE102
3863
3864               RE110:                      ;show the starts
3865  93F4  20 07 AA           JSR      FIRSTSTART  ;init STARTPTR
3866  93F7  AD EC 15           LDA      NSTARTS
3867  93FA  D0 0A              BNE      RE112
3868  93FC                     HELP     69
3873  9403  4C 44 94           JMP      RE199
3874  9406  85 73       RE112: STA      CTR
3875  9408  A2 08              LDX      #8
3876  940A  74 7D       RE113: STZ      VCTR,X  ;clear valve counters
3877  940C  9E 68 02           STZ      VSYR,X
3878  940F  CA                 DEX              ;(# of starts for each valve)
3879  9410  D0 F8              BNE      RE113
3880  9412  A5 73       RE111: LDA      CTR
3881  9414  D0 03              BNE      RE117
3882  9416  4C 44 94           JMP      RE199
3883  9419  20 4F 9F    RE117: JSR      SHOW_START
3884  941C                     OK
3889  9422  20 06 AB    RE114: JSR      GETKEY
3890  9425  C9 20              CMP      #OKKEY
3891  9427  F0 14              BEQ      RE115
3892  9429  C9 10              CMP      #NOKEY
3893  942B  D0 03              BNE      RE116
3894  942D  4C 44 94           JMP      RE199
3895  9430  C9 08       RE116: CMP      #HELPKEY
3896  9432  D0 EE              BNE      RE114
3897  9434                     HELP     95
3902  943B  80 BC              BRA      RE102
3903  943D  20 F7 A9    RE115: JSR      NEXTSTART
3904  9440  C6 73              DEC      CTR
3905  9442  80 CE              BRA      RE111
3906
3907  9444  60          RE199: RTS
3908
3909                     ;------------------------------------
3910                     ;    schedule entry blocks
3911                     ;------------------------------------
3912
3913               BLOCK1:                      ;enter 100% durations for all valves
3914  9445  64 49              STZ      VALVE
3915  9447  20 A7 9E    B1SKIP: JSR     NXTVALVE
3916  944A  90 03              BCC      B1NEXT
3917  944C  4C 17 95           JMP      B1END
3918  944F  AD 72 02    B1NEXT: LDA     REVIEW
3919  9452  C9 02              CMP      #RNEW
3920  9454  D0 06              BNE      B1E
```

```
3921  9456  64 C9              STZ    DEFAULT         ;new input
3922  9458  64 CA              STZ    DEFAULT+1
3923  945A  80 14              BRA    B1ENTRY
3924  945C  A6 49       B1E:   LDX    VALVE           ;modify or review input
3925  945E              DBLX
3933  9464  BD 58 15           LDA    DUR1,X
3934  9467  85 C9              STA    DEFAULT
3935  9469  BD 59 15           LDA    DUR1+1,X
3936  946C  85 CA              STA    DEFAULT+1
3937  946E  80 31              BRA    B1CONFIRM
3938
3939              B1ENTRY:                            ;enter a new duration
3940  9470  20 82 A3           JSR    DKCLR
3941  9473  20 3D A1           JSR    DSTA#
3942  9476              MESSAGE 37
3946  947B              MOV16  DEFAULT,OFFSET
3952  9483  20 CF AB           JSR    MIN2HM
3953  9486  20 45 A8           JSR    GETDURATION     ;get it in hours, minutes format
3954  9489  B0 0D              BCS    B1F
3955  948B  20 B3 AB           JSR    HM2MIN
3956  948E              MOV16  OFFSET,DEFAULT
3962  9496  80 09              BRA    B1CONFIRM
3963  9498              B1F:   HELP   54
3968  949F  80 CF              BRA    B1ENTRY
3969
3970              B1CONFIRM:                          ;show default and confirm
3971  94A1  20 82 A3           JSR    DKCLR
3972  94A4  A5 C9              LDA    DEFAULT
3973  94A6  05 CA              ORA    DEFAULT+1
3974  94A8  F0 18              BEQ    B1A
3975  94AA  20 3D A1           JSR    DSTA#
3976  94AD              MESSAGE 37
3980  94B2              MOV16  DEFAULT,OFFSET
3986  94BA  20 CF AB           JSR    MIN2HM
3987  94BD  20 F3 A5           JSR    DISPDURATION
3988  94C0  80 0D              BRA    B1B
3989  94C2       B1A    MESSAGE 147                   ;no watering
3993  94C7              SET_CURSOR LINE2
3997  94CC  20 55 A1           JSR    DSTATION#
3998  94CF  20 E4 A1    B1B:   JSR    CONFIRM_BLINK
3399  94D2  20 86 AB    B1C:   JSR    GETKEY
4000  94D5  C9 20              CMP    #OKKEY
4001  94D7  F0 16              BEQ    B10K
4002  94D9  C9 10              CMP    #NOKEY
4003  94DB  D0 09              BNE    B11
4004  94DD  AD 72 02           LDA    REVIEW          ;no key ends review
4005  94E0  C9 00              CMP    #RREVIEW
4006  94E2  D0 8C              BNE    B1ENTRY
4007  94E4  80 31              BRA    B1END
4008  94E6  C9 08       B11:   CMP    #HELPKEY
4009  94E8  D0 E8              BNE    B1C
4010  94EA  20 CD A1           JSR    CONFIRM_HELP
4011  94ED  80 B2              BRA    B1CONFIRM
4012
4013  94EF  A6 49       B10K:  LDX    VALVE           ;default is confirmed
4014  94F1              DBLX
4022  94F7  A5 C9              LDA    DEFAULT
4023  94F9  9D 58 15           STA    DUR1,X
4024  94FC  A5 CA              LDA    DEFAULT+1
4025  94FE  9D 59 15           STA    DUR1+1,X
4026  9501  20 A7 9E           JSR    NXTVALVE
4027  9504  90 02              BCC    B1D
4028  9506  80 0F              BRA    B1END           ;next valve if any
4029  9508  AD 72 02    B1D:   LDA    REVIEW          ;if new,
4030  950B  C9 02              CMP    #RNEW
4031  950D  D0 05              BNE    B1Z
4032  950F  20 72 A1           JSR    ISCOPY          ;copy to next valve?
4033  9512  B0 8D              BCS    B1CONFIRM       ;yes
```

```
4034  9514  4C 4F 94          B1Z:    JMP     B1NEXT          ;no
4035
4036  9517  60                B1END:  RTS                     ⌐
4037
4038                                  ;----------------------------------
4039
4040                          BLOCK2:                         ;enter split criteria
4041  9518  AD 72 02                  LDA     REVIEW
4042  951B  C9 02                     CMP     #RNEW
4043  951D  D0 26                     BNE     BK2C
4044  951F  20 82 A3                  JSR     OKCLR           ;press OK to split
4045  9522                            MESSAGE 214
4049  9527                            OK
4054  952D  20 06 AB          BK2A:   JSR     GETKEY
4055  9530  C9 20                     CMP     #OKKEY
4056  9532  F0 11                     BEQ     BK2C
4057  9534  C9 10                     CMP     #NOKEY
4058  9536  F0 04                     BEQ     BK2B
4059  9538  C9 08                     CMP     #HELPKEY
4060  953A  D0 F1                     BNE     BK2A
4061  953C                    BK2B:   HELP    61
4066  9543  80 D3                     BRA     BLOCK2
4067
4068
4069  9545  64 49             BK2C:   STZ     VALVE           ;entry of MAXON/MINOFF
4070  9547  20 A7 9E          B2SKIP: JSR     NXTVALVE
4071  954A  90 03                     BCC     B2NEXT
4072  954C  4C 77 96                  JMP     B2END
4073
4074  954F  A6 49             B2NEXT: LDX     VALVE           ;skip valves with 0 duration
4075  9551                            DBLX
4083  9557  BD 58 15                  LDA     DUR1,X
4084  955A  1D 59 15                  ORA     DUR1+1,X
4085  955D  F0 E8                     BEQ     B2SKIP
4086  955F  AD 72 02                  LDA     REVIEW
4087  9562  C9 02                     CMP     #RNEW
4088  9564  D0 20                     BNE     B2E
4089
4090                            ;     JSR     USESPLIT        ;split this station?
4091                            ;     BCC     B2NO
4092  9566  20 4A A2                  JSR     SHOW_SITE       ;new input, show site info
4093  9569  A6 49                     LDX     VALVE
4094  956B  BD CB 02                  LDA     TERRAIN,X
4095  956E  85 CB                     STA     DEFAULT+2       ;terrain
4096  9570  BD D4 02                  LDA     SPRINKLER,X
4097  9573  85 CC                     STA     DEFAULT+3       ;sprinkler type
4098  9575  20 F9 A1                  JSR     GETONOFF        ;get ON/OFF from tables
4099  9578  20 82 A3                  JSR     OKCLR
4100  957B                            MESSAGE 228
4104  9580  20 A7 AB                  JSR     MSGWAIT
4105  9583  4C FB 95                  JMP     B2CONFIRM
4106
4107  9586  A6 49             B2E:    LDX     VALVE           ;modify or review input
4108  9588  BD 42 15                  LDA     MAXON,X
4109  958B  85 C9                     STA     DEFAULT
4110  958D  BD 4B 15                  LDA     MINOFF,X
4111  9590  85 CA                     STA     DEFAULT+1
4112  9592  4C FB 95                  JMP     B2CONFIRM
4113
4114                          B2ENTRY:                        ;enter new splits
4115                            ;     JSR     USESPLIT        ;use splits for this valve?
4116                            ;     BCS     B2YES
4117                            ;B2NO: STZ    DEFAULT         ;no splits for this station
4118                            ;     STZ     DEFAULT+1
4119                            ;     JMP     B2CONFIRM
4120
```

```
4121  9595  20 82 A3   B2YES:   JSR     DKCLR           ;User entry of ON/OFF
4122  9598  20 4E A1            JSR     DSTA
4123  959B                      MESSAGE 28
4127  95A0  64 D7               STZ     SUB
4128  95A2  20 BA 9E            JSR     SHOW_DUR
4129  95A5                      SET_CURSOR LINE2
4133  95AA                      MESSAGE 31
4137  95AF                      SET_CURSOR LINE2+8
4141  95B4  A5 CA               LDA     DEFAULT+1
4142  95B6  20 9C A6            JSR     B2D
4143  95B9                      SET_CURSOR LINE2+1
4147  95BE  A5 C9               LDA     DEFAULT         ;select MAXON
4148  95C0                      SELECT  1,60
4156  95CD  90 09               BCC     B2S
4157  95CF                      HELP    77
4162  95D6  80 BD               BRA     B2YES
4163  95D8  85 C9      B2S:     STA     DEFAULT
4164
4165                   B2D:                             ;select MINOFF
4166  95DA                      SET_CURSOR LINE2+8
4170  95DF  A5 CA               LDA     DEFAULT+1
4171  95E1                      SELECT  1,60
4179  95EE  90 09               BCC     B2R
4180  95F0                      HELP    78
4185  95F7  80 9C               BRA     B2YES
4186  95F9  85 CA      B2R:     STA     DEFAULT+1
4187
4188                   B2CONFIRM:                       ;show default and confirm
4189  95FB  20 82 A3            JSR     DKCLR
4190  95FE  A5 C9               LDA     DEFAULT
4191                   ;        BEQ     B2A
4192  9600  A6 49               LDX     VALVE
4193  9602  9D 42 15            STA     MAXON,X
4194  9605  64 D7               STZ     SUB
4195  9607  20 6B A0            JSR     HOWMANY
4196                   ;        BEQ     B2A
4197  960A  20 4E A1            JSR     DSTA
4198  960D  A9 3A               LDA     #':'
4199  960F  20 10 A3            JSR     DCHAR
4200  9612                      SKIP    1
4204  9617  A5 56               LDA     QUOTIENT
4205  9619  20 85 A6            JSR     B3D
4206  961C                      MESSAGE 25
4210  9621                      SET_CURSOR LINE2
4214  9626                      MESSAGE 31
4218  962B                      SET_CURSOR LINE2+1
4222  9630  A5 C9               LDA     DEFAULT
4223  9632  20 9C A6            JSR     B2D
4224  9635                      SET_CURSOR LINE2+8
4228  963A  A5 CA               LDA     DEFAULT+1
4229  963C  20 9C A6            JSR     B2D
4230  963F                      SET_CURSOR LINE2+15
4234  9644  80 00               BRA     B2B
4235                   ;B2A:    JSR     DSTA            ;no MAXON = no splits
4236                   ;        MESSAGE 155
4237  9646  20 E4 A1   B2B:     JSR     CONFIRM_BLINK
4238  9649  20 06 AB   B2C:     JSR     GETKEY
4239  964C  C9 20               CMP     #OKKEY
4240  964E  F0 18               BEQ     B20K
4241  9650  C9 10               CMP     #NOKEY
4242  9652  D0 0A               BNE     B2P
4243  9654  AD 72 02            LDA     REVIEW          ;no key ends review
4244  9657  C9 00               CMP     #RREVIEW
4245  9659  F0 1C               BEQ     B2END
4246  965B  4C 95 95            JMP     B2ENTRY
4247  965E  C9 08      B2P:     CMP     #HELPKEY
4248  9660  D0 E7               BNE     B2C
4249  9662  20 CD A1            JSR     CONFIRM_HELP
```

```
4250  9665  4C FB 95              JMP     B2CONFIRM
4251
4252  9668  A6 49         B20K:   LDX     VALVE       ;default is confirmed
4253  966A  A5 C9                 LDA     DEFAULT
4254  966C  9D 42 15              STA     MAXON,X
4255  966F  A5 CA                 LDA     DEFAULT+1
4256  9671  9D 48 15              STA     MINOFF,X
4257  9674  4C 47 95              JMP     B2SKIP
4258
4259  9677  60            B2END:  RTS
4260
4261                      ;USESPLIT:
4262                      ;       JSR     DKCLR       ;use splits for this valve?
4263                      ;       JSR     DSTA
4264                      ;       MESSAGE 30
4265                      ;       SET_CURSOR LINE2+7
4266                      ;       STZ     SUB
4267                      ;       JSR     SHOW_DUR
4268                      ;       SET_CURSOR 15
4269                      ;       ON
4270                      ;B2K:   JSR     GETKEY
4271                      ;       CMP     #OKKEY
4272                      ;       BEQ     B2M
4273                      ;       CMP     #NOKEY
4274                      ;       BEQ     B2L
4275                      ;       CMP     #HELPKEY
4276                      ;       BNE     B2K
4277                      ;       HELP    61
4278                      ;       BRA     USESPLIT
4279                      ;B2M:   SEC                 ;return carry set to use split
4280                      ;       RTS
4281                      ;B2L:   CLC                 ;carry clear to skip split
4282                      ;       RTS
4283                      ;
4284
4285                      ;--------------------------------
4286
4287                      BLOCK3:                     ;enter base cycles
4288  9678  64 D7                 STZ     SUB
4289  967A  80 04                 BRA     B311
4290
4291                      BLOCK11:                    ;enter soak cycles
4292  967C  A9 02                 LDA     #2
4293  967E  85 D7                 STA     SUB
4294
4295  9680  64 49         B311:   STZ     VALVE
4296  9682  64 E5                 STZ     R6          ;1st station flag
4297  9684  20 A7 9E      B3SKIP: JSR    NXTVALVE
4298  9687  90 03                 BCC     B3NEXT
4299  9689  4C 83 98              JMP     B3END
4300  968C  A6 49         B3NEXT: LDX    VALVE       ;skip valves with 0 duration
4301  968E                        DBLX
4309  9694  A5 D7                 LDA     SUB
4310  9696  F0 08                 BEQ     B11A
4311  9698  BD B5 15              LDA     DUR3,X
4312  969B  1D B6 15              ORA     DUR3+1,X
4313  969E  80 06                 BRA     B11B
4314  96A0  BD 58 15      B11A:   LDA     DUR1,X
4315  96A3  1D 59 15              ORA     DUR1+1,X
4316  96A6  F0 DC         B11B:   BEQ     B3SKIP
4317  96A8  AD 72 02              LDA     REVIEW
4318  96AB  C9 02                 CMP     #RNEW
4319  96AD  D0 1C                 BNE     B3E
4320
4321  96AF  A5 E5                 LDA     R6          ;new input
4322  96B1  D0 06                 BNE     B3AA        ;if not 1st valve,
4323  96B3                        SET     R6
4327  96B7  80 08                 BRA     B3BB
```

```
4328  96B9  20 72 A1       B3AA:    JSR     ISCOPY          ;see if want to copy
4329  968C  90 03                   BCC     B3BB
4330  96BE  4C 14 98                JMP     B3CONFIRM
4331
4332  96C1  A9 01          B3BB:    LDA     #1              ;day or wk cycle
4333  96C3  85 C9                   STA     DEFAULT
4334  96C5  A9 7F                   LDA     #01111111B      ;specific days
4335  96C7  85 CA                   STA     DEFAULT+1
4336  96C9  80 26                   BRA     B3ENTRY
4337  96CB  A6 49          B3E:     LDX     VALVE           ;modify or review input
4338  96CD                          DBLX
4346  96D3  A5 D7                   LDA     SUB
4347  96D5  F0 0D                   BEQ     B3CC
4348  96D7  BD C7 15                LDA     CYCLE3,X
4349  96DA  85 C9                   STA     DEFAULT
4350  96DC  BD C8 15                LDA     CYCLE3+1,X
4351  96DF  85 CA                   STA     DEFAULT+1
4352  96E1  4C 14 98                JMP     B3CONFIRM
4353  96E4  BD 6A 15       B3CC:    LDA     CYCLE1,X
4354  96E7  85 C9                   STA     DEFAULT
4355  96E9  BD 6B 15                LDA     CYCLE1+1,X
4356  96EC  85 CA                   STA     DEFAULT+1
4357  96EE  4C 14 98                JMP     B3CONFIRM
4358
4359                       B3ENTRY:                         ;enter new cycle
4360  96F1  AD 41 15                LDA     CYCLE_TYPE
4361  96F4  D0 4D                   BNE     B3T
4362  96F6  20 82 A3                JSR     DKCLR           ;show duration
4363  96F9  20 4E A1                JSR     DSTA
4364  96FC  A5 D7                   LDA     SUB
4365  96FE  F0 07                   BEQ     B11F
4366  9700                          MESSAGE 186
4370  9705  80 05                   BRA     B116
4371  9707           B11F:    MESSAGE 28
4375  970C  20 BA 9E       B116:    JSR     SHOW_DUR
4376  970F                          SET_CURSOR LINE2
4380  9714                          MOV16   DEFAULT,IBFR
4386  971C  20 0F A6                JSR     DISPCYCLE       ;enter so many days
4387  971F                          SET_CURSOR LINE2+6
4391  9724  A5 C9                   LDA     DEFAULT
4392  9726                          SELECT  1,90
4400  9733  90 09                   BCC     B3U
4401  9735                          HELP    55
4406  973C  80 83                   BRA     B3ENTRY
4407  973E  85 C9          B3U:     STA     DEFAULT
4408  9740  4C 14 98                JMP     B3CONFIRM
4409
4410  9743                 B3T:     SET     IBFR+6          ;enter specific days
4414  9747  64 CA                   STZ     DEFAULT+1
4415  9749                          SET     DEFAULT
4419  974D  20 82 A3                JSR     DKCLR
4420  9750                          ANMED
4424  9754  20 85 A3       B3V:     JSR     DISPLAY_CLR
4425  9757  20 4E A1                JSR     DSTA
4426  975A                          MESSAGE 29
4430  975F  A9 3A                   LDA     #':'
4431  9761  20 10 A3                JSR     DCHAR
4432  9764                          SKIP    1
4436  9769  A5 CA                   LDA     DEFAULT+1       ;show days selected so far on line1
4437  976B  85 62                   STA     IBFR+1
4438  976D  A9 08                   LDA     #8
4439  976F  38                      SEC
4440  9770  E5 67                   SBC     IBFR+6
4441  9772  AA                      TAX
4442  9773  18             B3A:     CLC
4443  9774  26 62                   ROL     IBFR+1
4444  9776  CA                      DEX
4445  9777  D0 FA                   BNE     B3A
```

```
4446  9779  20 69 A6          JSR     DSP
4447  977C                    SET_CURSOR LINE2
4451  9781                    MESSAGE 26
4455                                                   ;show day of week in IBFR+6
4456  9786  20 7A A5          JSR     DISPLAY_DOW
4457  9789                    SKIP    1
4461  978E  A9 3F             LDA     #'?'
4462  9790  20 10 A3          JSR     DCHAR
4463  9793                    OK
4468  9799  20 06 A8   B3F:   JSR     GETKEY
4469  979C  C9 20             CMP     #OKKEY
4470  979E  F0 15             BEQ     B3G
4471  97A0  C9 10             CMP     #NOKEY
4472  97A2  F0 0E             BEQ     B3W
4473  97A4  C9 08             CMP     #HELPKEY
4474  97A6  D0 F1             BNE     B3F
4475  97A8                    HELP    72
4480  97AF  4C F1 96          JMP     B3ENTRY
4481  97B2  18         B3W:   CLC
4482  97B3  80 01             BRA     B3J
4483  97B5  38         B3G:   SEC                     ;bit set if watering day
4484  97B6  26 CA      B3J:   ROL     DEFAULT+1
4485  97B8  E6 67             INC     IBFR+6
4486  97BA  A5 67             LDA     IBFR+6          ;do all 7 days
4487  97BC  C9 0B             CMP     #8
4488  97BE  D0 94             BNE     B3V
4489  97C0                    ANOFF
4492  97C2  A2 01             LDX     #1
4493  97C4  BD 5B F8   B3X:   LDA     CBTBL,X         ;if not one specific day,
4494  97C7  C5 CA             CMP     DEFAULT+1
4495  97C9  F0 0B             BEQ     B3Y
4496  97CB  E8                INX
4497  97CC  E0 08             CPX     #8
4498  97CE  D0 F4             BNE     B3X
4499  97D0  4C 14 98          JMP     B3CONFIRM       ;then leave it a weekly cycle
4500
4501  97D3  86 67      B3Y:   STX     IBFR+6          ;else select # of weeks
4502  97D5  20 C8 A3          JSR     CLR_LINE2
4503  97D8  20 7A A5          JSR     DISPLAY_DOW
4504  97DB                    SKIP    1
4508  97E0                    MESSAGE 38
4512  97E5                    SET_CURSOR LINE2+11
4516  97EA                    MESSAGE 35
4520  97EF                    SET_CURSOR LINE2+10
4524  97F4  A5 C9             LDA     DEFAULT
4525  97F6                    SELECT  1,9
4533  9803  90 0A             BCC     B3Z
4534  9805                    HELP    72
4539  980C  4C F1 96          JMP     B3ENTRY
4540  980F  85 C9      B3Z:   STA     DEFAULT
4541  9811  4C 14 98          JMP     B3CONFIRM
4542
4543                   B3CONFIRM:                     ;show default and confirm
4544  9814  20 82 A3          JSR     DKCLR           ;show duration
4545  9817  20 4E A1          JSR     DSTA
4546  981A  A5 07             LDA     SUB
4547  981C  F0 07             BEQ     B11J
4548  981E                    MESSAGE 186
4552  9823  80 05             BRA     B11K
4553  9825             B11J:  MESSAGE 28
4557  982A  20 BA 9E   B11K:  JSR     SHOW_DUR
4558  982D                    SET_CURSOR LINE2
4562  9832                    MOV16   DEFAULT,IBFR
4568  983A  20 0F A6          JSR     DISPCYCLE
4569  983D  20 E4 A1   B3B:   JSR     CONFIRM_BLINK
4570  9840  20 06 A8   B3C:   JSR     GETKEY
4571  9843  C9 20             CMP     #OKKEY
4572  9845  F0 17             BEQ     B3OK
4573  9847  C9 10             CMP     #NOKEY
```

```
4574  9849  D0 0A              BNE    B3P
4575  984B  AD 72 02           LDA    REVIEW      ;no key ends review
4576  984E  C9 00               CMP   #RREVIEW
4577  9850  F0 31               BEQ   B3END
4578  9852  4C F1 96            JMP   B3ENTRY
4579  9855  C9 0B        B3P:   CMP   #HELPKEY
4580  9857  D0 E7               BNE   B3C
4581  9859  20 CD A1            JSR   CONFIRM_HELP
4582  985C  80 B6               BRA   B3CONFIRM
4583
4584  985E  A6 49        B3OK:  LDX   VALVE       ;default is confirmed
4585  9860               DBLX
4593  9866  A5 D7               LDA   SUB
4594  9868  F0 0C               BEQ   B11C
4595  986A  A5 C9               LDA   DEFAULT
4596  986C  9D C7 15            STA   CYCLE3,X
4597  986F  A5 CA               LDA   DEFAULT+1
4598  9871  9D C8 15            STA   CYCLE3+1,X
4599  9874  80 0A               BRA   B11D
4600  9876  A5 C9        B11C:  LDA   DEFAULT
4601  9878  9D 6A 15            STA   CYCLE1,X
4602  987B  A5 CA               LDA   DEFAULT+1
4603  987D  9D 6B 15            STA   CYCLE1+1,X
4604  9880  4C 84 96     B11D:  JMP   B3SKIP
4605
4606  9883  60           B3END: RTS
4607
4608                            ;----------------------------------
4609
4610                     BLOCK4:                   ;enter excluded time
4611  9884  AD 72 02            LDA   REVIEW
4612  9887  C9 02               CMP   #RNEW
4613  9889  D0 0A               BNE   B4E
4614  988B  64 C9               STZ   DEFAULT     ;new input
4615  988D  64 CA               STZ   DEFAULT+1
4616  988F  64 CB               STZ   DEFAULT+2
4617  9891  64 CC               STZ   DEFAULT+3
4618  9893  80 17               BRA   B4ENTRY
4619                     B4E:                     ;modify or review input
4620  9895               MOV16    XFROM,DEFAULT
4626  989F               MOV16    XTO,DEFAULT+2
4632  98A9  4C 62 99            JMP   B4CONFIRM
4633
4634                     B4ENTRY:                  ;enter excluded time
4635  98AC  20 82 A3            JSR   DKCLR       ;want excluded time?
4636  98AF               MESSAGE 49
4640  98B4               ON
4645  98BA  20 06 AB     B4K:   JSR   GETKEY
4646  98BD  C9 20               CMP   #OKKEY
4647  98BF  F0 1C               BEQ   B4L
4648  98C1  C9 10               CMP   #NOKEY
4649  98C3  D0 0B               BNE   B4M
4650  98C5  64 C9               STZ   DEFAULT     ;no excluded time
4651  98C7  64 CA               STZ   DEFAULT+1
4652  98C9  64 CB               STZ   DEFAULT+2
4653  98CB  64 CC               STZ   DEFAULT+3
4654  98CD  4C C2 99            JMP   B4OK
4655  98D0  C9 0B        B4M:   CMP   #HELPKEY
4656  98D2  D0 E6               BNE   B4K
4657  98D4               HELP    80
4662  98DB  80 CF               BRA   B4ENTRY
4663
4664  98DD  20 82 A3     B4L:   JSR   DKCLR       ;yes, enter FROM time
4665  98E0               MESSAGE 48
4669  98E5               SET_CURSOR LINE2
4673  98EA               MOV16   DEFAULT,OFFSET
4679  98F2  20 CF AB            JSR   MIN2HM
4680  98F5  20 7C A7            JSR   GETTIME
4681  98F8  90 0A               BCC   B4N
```

```
4682  98FA                          HELP      81
4687  9901  4C AC 98                JMP       B4ENTRY
4688  9904  20 B3 AB       B4N:     JSR       HM2MIN      ;save entered time
4689  9907                          MOV16     OFFSET,DEFAULT
4695  990F                          SET_CURSOR LINE2+7
4699  9914  A9 2D                   LDA       #'-'
4700  9916  20 10 A3                JSR       DCHAR
4701                                                      ;enter TO time
4702  9919                          MOV16     DEFAULT,DEFAULT+2
4708  9921                          MOV16     DEFAULT+2,OFFSET
4714  9929  20 CF AB                JSR       MIN2HM
4715  992C  20 7C A7                JSR       GETTIME
4716  992F  90 0A                   BCC       B4O
4717  9931                          HELP      82
4722  9938  4C AC 98                JMP       B4ENTRY
4723  993B  20 B3 AB       B4O:     JSR       HM2MIN      ;save entered time
4724  993E                          MOV16     OFFSET,DEFAULT+2
4730  9946  A5 CA                   LDA       DEFAULT+1   ;if FROM>=UNTIL then error
4731  9948  C5 CC                   CMP       DEFAULT+3
4732  994A  F0 04                   BEQ       B4P
4733  994C                          BLT       B4CONFIRM
4736  994E  80 08                   BRA       B4Q
4737  9950  A5 C9          B4P:     LDA       DEFAULT
4738  9952  C5 CB                   CMP       DEFAULT+2
4739  9954  F0 02                   BEQ       B4Q
4740  9956                          BLT       B4CONFIRM
4743  9958                 B4Q:     HELP      68
4748  995F  4C AC 98                JMP       B4ENTRY
4749
4750                       B4CONFIRM:                     ;show default and confirm
4751  9962  20 82 A3                JSR       DKCLR
4752  9965                          MESSAGE   48
4756  996A                          SET_CURSOR LINE2
4760  996F  A5 C9                   LDA       DEFAULT     ;no watering time if all 0
4761  9971  05 CA                   ORA       DEFAULT+1
4762  9973  05 CB                   ORA       DEFAULT+2
4763  9975  05 CC                   ORA       DEFAULT+3
4764  9977  F0 23                   BEQ       B4G
4765  9979                          MOV16     DEFAULT,OFFSET
4771  9981  20 CF AB                JSR       MIN2HM
4772  9984  20 BE A5                JSR       DISPTIME
4773  9987  A9 2D                   LDA       #'-'
4774  9989  20 10 A3                JSR       DCHAR
4775  998C                          MOV16     DEFAULT+2,OFFSET
4781  9994  20 CF AB                JSR       MIN2HM
4782  9997  20 BE A5                JSR       DISPTIME
4783  999A  80 05                   BRA       B4F
4784  999C                 B4G:     MESSAGE   162
4788  99A1  20 E4 A1       B4F:     JSR       CONFIRM_BLINK
4789  99A4  20 86 AB       B4C:     JSR       GETKEY
4790  99A7  C9 20                   CMP       #OKKEY
4791  99A9  F0 17                   BEQ       B4OK
4792  99AB  C9 10                   CMP       #NOKEY
4793  99AD  D0 0A                   BNE       B4X
4794  99AF  AD 72 02                LDA       REVIEW      ;no key ends review
4795  99B2  C9 00                   CMP       #RREVIEW
4796  99B4  F0 27                   BEQ       B4END
4797  99B6  4C AC 98                JMP       B4ENTRY
4798  99B9  C9 08          B4X:     CMP       #HELPKEY
4799  99BB  D0 E7                   BNE       B4C
4800  99BD  20 CD A1                JSR       CONFIRM_HELP
4801  99C0  80 A0                   BRA       B4CONFIRM
4802
4803  99C2  AD 72 02       B4OK:    LDA       REVIEW      ;default is confirmed
4804  99C5  C9 00                   CMP       #RREVIEW    ;next one if review
4805  99C7  F0 14                   BEQ       B4END
4806  99C9                          MOV16     DEFAULT,XFROM
4812  99D3                          MOV16     DEFAULT+2,XTO
4818  99D0  60             B4END:   RTS
```

```
4819
4820                    ;----------------------------------
4821
4822            BLOCK5:                          ;enter start time
4823  99DE  AD 72 02         LDA    REVIEW
4824  99E1  C9 02            CMP    #RNEW
4825  99E3  D0 06            BNE    B5E
4826  99E5  64 C9            STZ    DEFAULT       ;new input
4827  99E7  64 CA            STZ    DEFAULT+1
4828  99E9  80 0C            BRA    B5ENTRY
4829            B5E:                             ;modify or review input
4830  99EB              MOV16  BASE_START,DEFAULT
4836  99F5  80 2D            BRA    B5CONFIRM
4837
4838            B5ENTRY:                         ;enter a new start time
4839  99F7  20 82 A3         JSR    DKCLR
4840  99FA              MESSAGE 36
4844  99FF              MOV16  DEFAULT,OFFSET
4850  9A07  20 CF AB         JSR    MIN2HM
4851  9A0A  20 7C A7         JSR    GETTIME
4852  9A0D  90 0A            BCC    B5K
4853  9A0F              HELP   53
4858  9A16  4C F7 99         JMP    B5ENTRY
4859  9A19  20 B3 AB  B5K:   JSR    HM2MIN        ;save entered time
4860  9A1C              MOV16  OFFSET,DEFAULT
4866
4867            B5CONFIRM:                       ;show default and confirm
4868  9A24  20 82 A3         JSR    DKCLR
4869  9A27              MESSAGE 36
4873  9A2C              MOV16  DEFAULT,OFFSET
4879  9A34  20 CF AB         JSR    MIN2HM
4880  9A37  20 BE A5         JSR    DISPTIME
4881  9A3A  20 E4 A1         JSR    CONFIRM_BLINK
4882  9A3D  20 06 AB  B5C:   JSR    GETKEY
4883  9A40  C9 20            CMP    #OKKEY
4884  9A42  F0 16            BEQ    B5OK
4885  9A44  C9 10            CMP    #NOKEY
4886  9A46  D0 09            BNE    B5I
4887  9A48  AD 72 02         LDA    REVIEW        ;no key ends review
4888  9A4B  C9 00            CMP    #RREVIEW
4889  9A4D  F0 1C            BEQ    B5END
4890  9A4F  80 A6            BRA    B5ENTRY
4891  9A51  C9 08     B5I:   CMP    #HELPKEY
4892  9A53  D0 E8            BNE    B5C
4893  9A55  20 CD A1         JSR    CONFIRM_HELP
4894  9A58  80 CA            BRA    B5CONFIRM
4895
4896  9A5A  AD 72 02  B5OK:  LDA    REVIEW        ;default is confirmed
4897  9A5D  C9 00            CMP    #RREVIEW      ;next one if review
4898  9A5F  F0 0A            BEQ    B5END
4899  9A61              MOV16  DEFAULT,BASE_START
4905
4906  9A6B  60        B5END: RTS
4907
4908                    ;----------------------------------
4909
4910            BLOCK10:                         ;soak criteria
4911  9A6C  AD 72 02         LDA    REVIEW
4912  9A6F  C9 02            CMP    #RNEW
4913  9A71  D0 31            BNE    BK10C
4914  9A73  20 82 A3         JSR    DKCLR         ;want soaks?
4915  9A76              MESSAGE 141
4919  9A7B              ON
4924  9A81  20 06 AB  BK10A: JSR    GETKEY
4925  9A84  C9 20            CMP    #OKKEY
4926  9A86  F0 1C            BEQ    BK10C
4927  9A88  C9 10            CMP    #NOKEY
4928  9A8A  D0 0B            BNE    BK10B
4929  9A8C  A2 11            LDX    #17           ;clear soak durations
4930  9A8E  9E B5 15  B10AA: STZ    DUR3,X
```

```
4931  9A91  CA                      DEX
4932  9A92  10 FA                   BPL      BK10AA
4933  9A94  4C 06 9C                JMP      B10END
4934  9A97  C9 08        BK10B:     CMP      #HELPKEY
4935  9A99  D0 E6                   BNE      BK10A
4936  9A9B                          HELP     121
4941  9AA2  80 CB                   BRA      BLOCK10
4942
4943
4944  9AA4  64 49        BK10C:     STZ      VALVE         ;entry of soak duration
4945  9AA6  20 A7 9E     B10SKIP:   JSR      INITVALVE
4946  9AA9  90 03                   BCC      B10NEXT
4947  9AAB  4C 06 9C                JMP      B10END
4948  9AAE               B10NEXT:
4949  9AAE  A6 49                   LDX      VALVE         ;skip if no base dur
4950  9AB0                          DBLX
4958  9AB6  BD 58 15                LDA      DUR1,X
4959  9AB9  1D 59 15                ORA      DUR1+1,X
4960  9ABC  F0 E8                   BEQ      B10SKIP
4961  9ABE  AD 72 02                LDA      REVIEW
4962  9AC1  C9 02                   CMP      #RNEW
4963  9AC3  D0 22                   BNE      B10E
4964  9AC5  20 07 9C                JSR      USESOAK       ;new input
4965  9AC8  90 37                   BCC      B10NO
4966  9ACA  20 82 A3                JSR      DKCLR
4967  9ACD                          MESSAGE  229           ;use site info to calculate
4971  9AD2  20 A7 AB                JSR      MSGWAIT
4972  9AD5  A6 49                   LDX      VALVE
4973  9AD7  BD CB 02                LDA      TERRAIN,X
4974  9ADA  85 CB                   STA      DEFAULT+2
4975  9ADC  BD D4 02                LDA      SPRINKLER,X
4976  9ADF  85 CC                   STA      DEFAULT+3
4977  9AE1  20 20 A2                JSR      GETSOAKDUR
4978  9AE4  4C 51 9B                JMP      B10CONFIRM
4979  9AE7  A6 49        B10E:      LDX      VALVE         ;modify or review input
4980  9AE9                          DBLX
4988  9AEF  BD B5 15                LDA      DUR3,X
4989  9AF2  85 C9                   STA      DEFAULT
4990  9AF4  BD B6 15                LDA      DUR3+1,X
4991  9AF7  85 CA                   STA      DEFAULT+1
4992  9AF9  4C 51 9B                JMP      B10CONFIRM
4993
4994               B10ENTRY:                               ;enter new soaks
4995  9AFC  20 07 9C                JSR      USESOAK       ;do soak?
4996  9AFF  B0 07                   BCS      B10YES
4997  9B01  64 C9        B10NO:     STZ      DEFAULT       ;no soak for this station
4998  9B03  64 CA                   STZ      DEFAULT+1
4999  9B05  4C 51 9B                JMP      B10CONFIRM
5000  9B08  20 82 A3     B10YES:    JSR      DKCLR
5001  9B0B  20 4E A1                JSR      DSTA
5002  9B0E                          SKIP     1
5006  9B13                          MESSAGE  28
5010  9B18  64 D7                   STZ      SUB
5011  9B1A  20 BA 9E                JSR      SHOW_DUR
5012  9B1D                          SET_CURSOR LINE2
5016  9B22                          MESSAGE  183
5020  9B27  A9 02                   LDA      #2
5021  9B29  85 D7                   STA      SUB
5022  9B2B                          MOV16    DEFAULT,OFFSET
5028  9B33  20 CF AB                JSR      MIN2HM
5029  9B36  20 3F AB                JSR      GETDUR8
5030  9B39  B0 0D                   BCS      B10S
5031  9B3B  20 B3 AB                JSR      HM2MIN
5032  9B3E                          MOV16    OFFSET,DEFAULT
5038  9B46  80 09                   BRA      B10CONFIRM
5039  9B48               B10S:      HELP     54
5044  9B4F  80 AB                   BRA      B10ENTRY
5045
5046               B10CONFIRM:                             ;show default and confirm
```

```
5047  9B51  A5 C9              LDA    DEFAULT
5048  9B53  05 CA              ORA    DEFAULT+1
5049  9B55  F0 66              BEQ    B10A
5050  9B57  20 82 A3           JSR    BKCLR
5051  9B5A  20 4E A1           JSR    BSTA
5052  9B5D                     MESSAGE 186
5056  9B62                     MOV16  DEFAULT,OFFSET
5062  9B6A  20 CF AB           JSR    MIN2HM
5063  9B6D  20 F3 A5           JSR    DISPDURATION
5064  9B70                     SET_CURSOR LINE2
5068  9B75  A6 49              LDX    VALVE
5069  9B77  BD 42 15           LDA    MAXON,X
5070  9B7A  D0 07              BNE    B10Z
5071  9B7C                     MESSAGE 230           ;no splits
5075  9B81  80 45              BRA    B10B
5076  9B83             B10Z:   MESSAGE 184
5080  9B88                     SET_CURSOR LINE2+5
5084  9B8D  A9 02              LDA    #2
5085  9B8F  85 D7              STA    SUB
5086  9B91  A6 49              LDX    VALVE
5087  9B93                     DBLX
5095  9B99  A5 C9              LDA    DEFAULT
5096  9B9B  9D 85 15           STA    DUR3,X
5097  9B9E  A5 CA              LDA    DEFAULT+1
5098  9BA0  9D 86 15           STA    DUR3+1,X
5099  9BA3  20 6B A8           JSR    HOWMANY
5100  9BA6  20 9C A6           JSR    B2D
5101  9BA9                     SKIP   1
5105  9BAE  A6 49              LDX    VALVE
5106  9BB0  BD 42 15           LDA    MAXON,X
5107  9BB3  20 9C A6           JSR    B2D
5108  9BB6                     SET_CURSOR LINE2+15
5112  9BBB  80 0B              BRA    B10B
5113  9BBD  20 82 A3   B10A:   JSR    BKCLR
5114  9BC0                     MESSAGE 185           ;no soak
5118  9BC5  20 55 A1           JSR    BSTATION0
5119  9BC8  20 E4 A1   B10B:   JSR    CONFIRM_BLINK
5120  9BCB  20 06 AB   B10C:   JSR    GETKEY
5121  9BCE  C9 20              CMP    #OKKEY
5122  9BD0  F0 18              BEQ    B10OK
5123  9BD2  C9 10              CMP    #NOKEY
5124  9BD4  D0 0A              BNE    B10P
5125  9BD6  AD 72 02           LDA    REVIEW          ;no key ends review
5126  9BD9  C9 00              CMP    #RREVIEW
5127  9BDB  F0 29              BEQ    B10END
5128  9BDD  4C FC 9A           JMP    B10ENTRY
5129  9BE0  C9 08      B10P:   CMP    #HELPKEY
5130  9BE2  D0 E7              BNE    B10C
5131  9BE4  20 CD A1           JSR    CONFIRM_HELP
5132  9BE7  4C 51 9B           JMP    B10CONFIRM
5133
5134  9BEA  A6 49      B10OK:  LDX    VALVE           ;default is confirmed
5135  9BEC                     DBLX
5143  9BF2  A5 C9              LDA    DEFAULT
5144  9BF4  9D 85 15           STA    DUR3,X
5145  9BF7  A5 CA              LDA    DEFAULT+1
5146  9BF9  9D 86 15           STA    DUR3+1,X
5147  9BFC  20 A7 9E           JSR    NXTVALVE
5148  9BFF  90 02              BCC    B10D
5149  9C01  80 03              BRA    B10END          ;next valve if any
5150                   B10D:  ;LDA    REVIEW          ;if new,
5151                          ;CMP    #RNEW
5152                          ;BNE    B10Q
5153                          ;JSR    ISCOPY          ;copy to next valve?
5154                          ;BCC    B10Q
5155                          ;JMP    B10CONFIRM      ;yes
5156  9C03  4C AE 9A   B10Q:   JMP    B10NEXT         ;no
5157
5158  9C06  60         B10END: RTS
5159
```

```
5160   9C07                USESOAK:
5161   9C07   20 82 A3             JSR     DKCLR           ;use soaks for this valve?
5162   9C0A   20 4E A1             JSR     BSTA
5163   9C0D                        MESSAGE 146
5167   9C12                        SET_CURSOR LINE2
5171   9C17   A9 28                LDA     #'('
5172   9C19   20 10 A3             JSR     DCHAR
5173   9C1C                        MESSAGE 28
5177   9C21   64 D7                STZ     SUB
5178   9C23   20 BA 9E             JSR     SHOW_DUR
5179   9C26   A9 29                LDA     #')'
5180   9C28   20 10 A3             JSR     DCHAR
5181   9C2B                        SET_CURSOR 14
5185   9C30                        QM
5190   9C36   20 06 AB    USO1:    JSR     GETKEY
5191   9C39   C9 20                CMP     #OKKEY
5192   9C3B   F0 11                BEQ     USO2
5193   9C3D   C9 10                CMP     #NOKEY
5194   9C3F   F0 0F                BEQ     USO3
5195   9C41   C9 08                CMP     #HELPKEY
5196   9C43   D0 F1                BNE     USO1
5197   9C45                        HELP    61
5202   9C4C   80 B9                BRA     USESOAK
5203   9C4E   38          USO2:    SEC                     ;return carry set to use soak
5204   9C4F   60                   RTS
5205   9C50   18          USO3:    CLC                     ;carry clear for no soak
5206   9C51   60                   RTS
5207
5208                               ;-------------------------------
5209
5210   9C52                VA90:
5211                       VA60:                            ;WANT SYRINGES?
5212   9C52   20 82 A3             JSR     DKCLR
5213   9C55                        MESSAGE 65
5217   9C5A                        QM
5222   9C60   20 06 AB    VA61:    JSR     GETKEY
5223   9C63   C9 20                CMP     #OKKEY
5224   9C65   F0 14                BEQ     VA62
5225   9C67   C9 10                CMP     #NOKEY
5226   9C69   D0 03                BNE     VA6A
5227   9C6B   4C 52 9C             JMP     VA90
5228   9C6E   C9 08       VA6A:    CMP     #HELPKEY
5229   9C70   D0 EE                BNE     VA61
5230   9C72                        HELP    73
5235   9C79   80 D7                BRA     VA60
5236
5237   9C7B   4C 21 9D    VA62:    JMP     VA70            ;SKIP THIS FOR NOW
5238   9C7E   A9 01                LDA     #1              ;enter syringe active months
5239   9C80   A2 0C                LDX     #12             ;start off with all active
5240   9C82   9D A2 15    VA6B:    STA     ACTIVE_MONTH,X
5241   9C85   CA                   DEX
5242   9C86   D0 FA                BNE     VA6B
5243   9C88   20 C4 AB    VA65:    JSR     SHOW_MONTHS     ;show active months
5244   9C8B                        SKIP    1
5248   9C90                        QM                      ;then confirm
5253   9C96   20 06 AB    VA6F:    JSR     GETKEY
5254   9C99   C9 20                CMP     #OKKEY
5255   9C9B   D0 03                BNE     VA6G
5256   9C9D   4C 21 9D             JMP     VA70            ;ok
5257   9CA0   C9 10       VA6G:    CMP     #NOKEY
5258   9CA2   F0 0D                BEQ     VA63
5259   9CA4   C9 08                CMP     #HELPKEY
5260   9CA6   D0 EE                BNE     VA6F
5261   9CA8                        HELP    73
5266   9CAF   80 CA                BRA     VA62
5267   9CB1   64 49       VA63:    STZ     VALVE           ;no, enter new active months
5268   9CB3   20 82 A3             JSR     DKCLR
5269   9CB6                        MESSAGE 190
5273   9CBB                        SET_CURSOR LINE2
```

```
5277  9CC0  64 41              STZ    LSB
5278  9CC2  E6 41      VA64:   INC    LSB
5279  9CC4  A5 41              LDA    LSB
5280  9CC6  C9 0D              CMP    #13
5281  9CC8  F0 BE              BEQ    VA65
5282  9CCA                     SKIP   1
5286  9CCF  A6 41              LDX    LSB
5287  9CD1  A9 01              LDA    #1
5288  9CD3  9D A2 15            STA    ACTIVE_MONTH,X
5289  9CD6  20 92 A3   VA6H:   JSR    KEY_RESET       ;show current month
5290  9CD9  A6 41              LDX    LSB
5291  9CDB  BD A2 15           LDA    ACTIVE_MONTH,X
5292  9CDE  F0 05              BEQ    VA6I
5293  9CE0  BD 4B FB           LDA    MONTBL,X
5294  9CE3  80 02              BRA    VA6J
5295  9CE5  A9 2D      VA6I:   LDA    #'-'
5296  9CE7  20 10 A3   VA6J:   JSR    DCHAR
5297  9CEA                     BACKUP 1
5301  9CEF                     SLOW   NOKEY
5307  9CF7                     UL
5314  9CFD  20 06 AB   VA6K:   JSR    GETKEY          ;select on/off
5315  9D00  C9 20              CMP    #OKKEY
5316  9D02  F0 BE              BEQ    VA64            ;ok, do next month
5317  9D04  C9 10              CMP    #NOKEY
5318  9D06  F0 0D              BEQ    VA6L
5319  9D08  C9 0B              CMP    #HELPKEY
5320  9D0A  D0 F1              BNE    VA6K
5321  9D0C                     HELP   73
5326  9D13  80 9C              BRA    VA63
5327  9D15  A6 41      VA6L:   LDX    LSB             ;no, toggle month
5328  9D17  BD A2 15           LDA    ACTIVE_MONTH,X
5329  9D1A  49 01              EOR    #00000001B
5330  9D1C  9D A2 15           STA    ACTIVE_MONTH,X
5331  9D1F  80 B5              BRA    VA6H
5332
5333  9D21  64 49      VA70:   STZ    VALVE           ;enter syringe durations
5334  9D23  64 C9              STZ    DEFAULT
5335  9D25  20 A7 9E   VA7A:   JSR    NXTVALVE
5336  9D28  90 03              BCC    VA7B
5337  9D2A  4C 6F 9D           JMP    VA75
5338  9D2D  20 82 A3   VA7B:   JSR    BKCLR           ;show default duration and get new one
5339  9D30  20 E5 9F           JSR    FLASH
5340  9D33                     MESSAGE 191
5344  9D3B                     SET_CURSOR LINE2+11
5348  9D3D  A5 C9              LDA    DEFAULT
5349  9D3F                     SELECT 0,15
5357  9D4C  90 09              BCC    VA7C
5358  9D4E                     HELP   73              ;help requested
5363  9D55  80 D6              BRA    VA7B
5364  9D57  A6 49      VA7C:   LDX    VALVE           ;store the entered value
5365  9D59                     DBLX
5373  9D5F  9E 7F 15           STZ    DUR2+1,X
5374  9D62  A5 61              LDA    IBFR
5375  9D64  9D 7E 15           STA    DUR2,X
5376  9D67  85 C9              STA    DEFAULT
5377  9D69  D0 BA              BNE    VA7A            ;if 0 entered,
5378                           JSR    ENTER_SKIP2     ;then verify to skip valve
5379  9D6B  90 BB              BCC    VA7A
5380  9D6D  80 BE              BRA    VA7B
5381
5382  9D6F  20 82 A3   VA75:   JSR    BKCLR           ;enter syringe from-to
5383  9D72  64 49              STZ    VALVE
5384  9D74                     MESSAGE 193
5388  9D79  64 65              STZ    IBFR+4          ;from
5389  9D7B  64 66              STZ    IBFR+5
5390  9D7D                     SET_CURSOR LINE2
5394  9D82  20 7C A7           JSR    GETTIME
5395  9D85  90 0A              BCC    VA7D
5396  9D87                     HELP   73
```

```
5401  9D8E  4C 6F 9D              JMP     VA75
5402  9D91  20 B3 AB      VA7D:   JSR     HM2MIN          ;save entered time
5403  9D94                        MOV16   OFFSET,SYRINGE_START
5409  9D9E                        SET_CURSOR LINE2+9      ;to
5413  9DA3  20 7C A7              JSR     GETTIME
5414  9DA6  90 0A                 BCC     VA7E
5415  9DA8                        HELP    73
5420  9DAF  4C 6F 9D              JMP     VA75
5421  9DB2  20 B3 AB      VA7E:   JSR     HM2MIN          ;save entered time
5422  9DB5                        MOV16   OFFSET,SYRINGE_END
5428
5429  9DBF  AD B0 15              LDA     SYRINGE_START+1  ;if FROM>TO then error
5430  9DC2  CD B2 15              CMP     SYRINGE_END+1
5431  9DC5  F0 04                 BEQ     VA7F
5432  9DC7                        BLT     VA88
5435  9DC9  80 0A                 BRA     VA76
5436  9DCB  AD AF 15      VA7F:   LDA     SYRINGE_START
5437  9DCE  CD B1 15              CMP     SYRINGE_END
5438  9DD1                        BLT     VA88
5441  9DD3  F0 0A                 BEQ     VA7H
5442  9DD5                VA76:   HELP    68
5447  9DDC  4C 6F 9D              JMP     VA75
5448  9DDF  9C B4 15      VA7H:   STZ     SOFTEN+1        ;FROM=TO, do one syringe,
5449  9DE2                        SET     SOFTEN          ;don't ask for interval
5453  9DE7  80 6A                 BRA     VA85
5454
5455  9DE9  20 82 A3      VA88:   JSR     DKCLR           ;get how often to syringe
5456  9DEC  64 49                 STZ     VALVE
5457  9DEE                        MESSAGE 139
5461  9DF3  64 CF                 STZ     OFFSET
5462  9DF5  64 D0                 STZ     OFFSET+1
5463  9DF7  20 CF AB              JSR     MIN2HM
5464  9DFA  20 45 AB              JSR     GETDURATION
5465  9DFD  90 02                 BCC     VA81
5466  9DFF  80 0D                 BRA     VA82
5467  9E01  20 B3 AB      VA81:   JSR     HM2MIN
5468  9E04                        MOV16   OFFSET,SOFTEN
5474
5475  9E0E  64 41         VA82:   STZ     LSB             ;check input
5476  9E10  64 42                 STZ     MSB
5477  9E12                        SET     VALVE
5481  9E16  A6 49         VA8A:   LDX     VALVE           ;if SOFTEN
5482  9E18                        DBLX
5490  9E1E  18                    CLC
5491  9E1F  A5 41                 LDA     LSB
5492  9E21  7D 7E 15              ADC     DUR2,X
5493  9E24  85 41                 STA     LSB
5494  9E26  A5 42                 LDA     MSB
5495  9E28  7D 7F 15              ADC     DUR2+1,X
5496  9E2B  85 42                 STA     MSB
5497  9E2D  E6 49                 INC     VALVE
5498  9E2F  A5 49                 LDA     VALVE
5499  9E31  C9 09                 CMP     #9
5500  9E33  D0 E1                 BNE     VA8A
5501  9E35  AD B4 15              LDA     SOFTEN+1        ;< sum of syringe durations,
5502  9E38  C5 42                 CMP     MSB
5503  9E3A                        BLT     VA8C
5506  9E3C  F0 02                 BEQ     VA8B
5507  9E3E  80 13                 BRA     VA85
5508  9E40  AD B3 15      VA8B:   LDA     SOFTEN
5509  9E43  C5 41                 CMP     LSB
5510  9E45                        BLT     VA8C
5513  9E47  80 0A                 BRA     VA85
5514  9E49                VA8C:   HELP    73              ;then error
5519  9E50  4C 21 9D              JMP     VA70
5520
5521  9E53  20 F1 AB      VA85:   JSR     SHOW_SYRCYC     ;confirm number of syringes
5522  9E56                        OK
5527  9E5C  20 86 AB      VA8D:   JSR     GETKEY
```

```
5528  9E5F  C9 20                CMP     #OKKEY
5529                     ;       BEQ     VA98
5530  9E61  C9 10                CMP     #NOKEY
5531  9E63  D0 03                BNE     VA8E
5532  9E65  4C 6F 9D             JMP     VA75
5533  9E68  C9 08        VA8E:   CMP     #HELPKEY
5534  9E6A  D0 F8                BNE     VA8D
5535  9E6C                       HELP    73
5540  9E73  4C 6F 9D             JMP     VA75
5541
5542
5543                     ;---------------------------------
5544                     ;       schedule entry subs
5545                     ;---------------------------------
5546
5547
5548                     ENTER_CYCLE_TYPE:          ;input specific or so many days
5549  9E76  20 82 A3             JSR     DKCLR
5550  9E79                       MESSAGE 51
5554  9E7E                       SET_CURSOR LINE2
5558  9E83  A9 00                LDA     #0
5559  9E85                       SELECT_SOK 0,1,52   ;select type
5569  9E96  90 09                BCC     EC0
5570  9E98                       HELP    56
5575  9E9F  80 D5                BRA     ENTER_CYCLE_TYPE
5576  9EA1  A5 61        EC0:    LDA     IBFR
5577  9EA3  8D 41 15             STA     CYCLE_TYPE
5578  9EA6  60                   RTS
5579
5580                     NXTVALVE:                  ;out: the next valid valve in VALVE
5581                                                ;   carry set if no more valves
5582  9EA7  E6 49                INC     VALVE
5583  9EA9  A6 49                LDX     VALVE
5584  9EAB  E0 09                CPX     #9
5585  9EAD  F0 09                BEQ     NV1
5586  9EAF  BD 7D 02             LDA     VS,X
5587  9EB2  29 80                AND     #VID
5588  9EB4  F0 F1                BEQ     NXTVALVE    ;valve must have ID
5589  9EB6  18                   CLC
5590  9EB7  60                   RTS
5591  9EB8  38           NV1:    SEC
5592  9EB9  60                   RTS
5593
5594                     SHOW_DUR:                  ;show the duration for VALVE
5595                                                ;in: VALVE, SUB
5596  9EBA  A5 D7                LDA     SUB         ;which duration to show?
5597  9EBC  F0 06                BEQ     SHD1
5598  9EBE  C9 01                CMP     #1
5599  9EC0  F0 16                BEQ     SHD2
5600  9EC2  80 28                BRA     SHD3
5601  9EC4  A6 49        SHD1:   LDX     VALVE       ;show DUR1
5602  9EC6                       DBLX
5610  9ECC  BD 58 15             LDA     DUR1,X
5611  9ECF  85 CF                STA     OFFSET
5612  9ED1  BD 59 15             LDA     DUR1+1,X
5613  9ED4  85 D0                STA     OFFSET+1
5614  9ED6  80 28                BRA     SHD4
5615  9ED8  A6 49        SHD2:   LDX     VALVE       ;show DUR2
5616  9EDA                       DBLX
5624  9EE0  BD 7E 15             LDA     DUR2,X
5625  9EE3  85 CF                STA     OFFSET
5626  9EE5  BD 7F 15             LDA     DUR2+1,X
5627  9EE8  85 D0                STA     OFFSET+1
5628  9EEA  80 14                BRA     SHD4
5629  9EEC  A6 49        SHD3:   LDX     VALVE       ;show DUR3
5630  9EEE                       DBLX
5638  9EF4  BD 85 15             LDA     DUR3,X
5639  9EF7  85 CF                STA     OFFSET
5640  9EF9  BD 86 15             LDA     DUR3+1,X
```

```
5641   9EFC   85 D8                STA    OFFSET+1
5642   9EFE   80 08                BRA    SHD4
5643   9F00   20 CF AB     SHD4:   JSR    MIN2HM
5644   9F03   20 F3 A5             JSR    DISPDURATION
5645   9F06   60                   RTS
5646
5647                       SHOW_CYCLE:                 ;show the cycle for valve
5648                                                   ;in: VALVE,SUB
5649   9F07   A5 D7                LDA    SUB          ;which cycle to show?
5650   9F09   F0 06                BEQ    SHC1
5651   9F0B   C9 01                CMP    #1
5652   9F0D   F0 16                BEQ    SHC2
5653   9F0F   80 28                BRA    SHC3
5654   9F11   A6 49        SHC1:   LDX    VALVE        ;show CYCLE1
5655   9F13                        DBLX
5663   9F19   BD 6A 15             LDA    CYCLE1,X
5664   9F1C   85 61                STA    IBFR
5665   9F1E   BD 6B 15             LDA    CYCLE1+1,X
5666   9F21   85 62                STA    IBFR+1
5667   9F23   80 26                BRA    SHC4
5668   9F25   A6 49        SHC2:   LDX    VALVE        ;show CYCLE2
5669   9F27                        DBLX
5677   9F2D   BD 90 15             LDA    CYCLE2,X
5678   9F30   85 61                STA    IBFR
5679   9F32   BD 91 15             LDA    CYCLE2+1,X
5680   9F35   85 62                STA    IBFR+1
5681   9F37   80 12                BRA    SHC4
5682   9F39   A6 49        SHC3:   LDX    VALVE        ;show CYCLE3
5683   9F3B                        DBLX
5691   9F41   BD C7 15             LDA    CYCLE3,X
5692   9F44   85 61                STA    IBFR
5693   9F46   BD C8 15             LDA    CYCLE3+1,X
5694   9F49   85 62                STA    IBFR+1
5695   9F4B   20 0F A6     SHC4:   JSR    DISPCYCLE
5696   9F4E   60                   RTS
5697
5698                       SHOW_START:                 ;show the duration, cycle, and time
5699                                                   ;in: NSPLIT(), out: VCTR() incremented
5700   9F4F   20 82 A3             JSR    DKCLR
5701   9F52   20 E5 9F             JSR    FLASH
5702   9F55   A0 02                LDY    #2
5703   9F57   B1 7B                LDA    (STARTPTR),Y
5704   9F59   85 49                STA    VALVE
5705   9F5B   20 4E A1             JSR    DSTA
5706   9F5E   A0 03                LDY    #3
5707   9F60   B1 7B                LDA    (STARTPTR),Y
5708   9F62   29 70                AND    #00111000B
5709   9F64   6A                   ROR    A
5710   9F65   6A                   ROR    A
5711   9F66   6A                   ROR    A
5712   9F67   6A                   ROR    A
5713   9F68   85 41                STA    LSB
5714   9F6A   18                   CLC
5715   9F6B   69 94                ADC    #148
5716   9F6D   AA                   TAX
5717   9F6E   20 D7 A2             JSR    DISPLAY_MSG          ;show type
5718   9F71   A6 49                LDX    VALVE
5719   9F73   A5 41                LDA    LSB
5720   9F75   C9 01                CMP    #1
5721   9F77   D0 08                BNE    SST5
5722   9F79   FE 68 02             INC    VSYR,X
5723   9F7C   BD 6B 02             LDA    VSYR,X
5724   9F7F   80 04                BRA    SST4
5725   9F81   F6 7D        SST5:   INC    VCTR,X
5726   9F83   B5 7D                LDA    VCTR,X
5727   9F85   C9 64        SST4:   CMP    #100
5728   9F87                        BLT    SST0
5731   9F89   20 85 A6             JSR    D3D
5732   9F8C   80 03                BRA    SST1
```

```
5733  9FBE  20 9C A6    SST0:        JSR    D2D
5734  9F91              SST1:        SET_CURSOR 11
5738  9F96  A9 6F                    LDA    #'o'
5739  9F98  20 10 A3                 JSR    DCHAR
5740  9F9B  A9 66                    LDA    #'f'
5741  9F9D  20 10 A3                 JSR    DCHAR
5742  9FA0  A6 49                    LDX    VALVE
5743  9FA2  A5 41                    LDA    LSB
5744  9FA4  C9 01                    CMP    #1
5745  9FA6  D0 05                    BNE    SST3
5746  9FA8  AD 71 02                 LDA    NSYR
5747  9FAB  80 03                    BRA    SST2
5748  9FAD  BD 54 02    SST3:        LDA    NSPLIT,X
5749  9FB0  20 85 A6    SST2:        JSR    D3D
5750  9FB3                           SET_CURSOR LINE2
5754  9FB8  A0 04                    LDY    #4
5755  9FBA  B1 7B                    LDA    (STARTPTR),Y
5756  9FBC  85 CF                    STA    OFFSET
5757  9FBE  C8                       INY
5758  9FBF  B1 7B                    LDA    (STARTPTR),Y
5759  9FC1  85 D0                    STA    OFFSET+1
5760  9FC3  20 CF AB                 JSR    MIN2HM
5761  9FC6  20 F3 A5                 JSR    DISPDURATION
5762  9FC9                           SET_CURSOR LINE2+7
5766  9FCE  A9 40                    LDA    #'@'
5767  9FD0  20 10 A3                 JSR    DCHAR
5768  9FD3  A0 00                    LDY    #0
5769  9FD5  B1 7B                    LDA    (STARTPTR),Y
5770  9FD7  85 CF                    STA    OFFSET
5771  9FD9  C8                       INY
5772  9FDA  B1 7B                    LDA    (STARTPTR),Y
5773  9FDC  85 D0                    STA    OFFSET+1
5774  9FDE  20 CF AB                 JSR    MIN2HM
5775  9FE1  20 8E A5                 JSR    DISPTIME
5776  9FE4  60                       RTS
5777
5778  9FE5  A0 32       FLASH:       LDY    #50           ;flash the screen
5779  9FE7  20 C0 A2                 JSR    WAITMS
5780  9FEA  60                       RTS
5781
5782              BUILD_START:                            ;generate a start at STARTPTR
5783                                                      ;from S,WT, VALVE, SOURCE, SUB
5784  9FEB  AD EC 15                 LDA    NSTARTS       ;return carry set if no more room
5785  9FEE  C9 80                    CMP    #128
5786  9FF0                           BLT    BS1
5789  9FF2  38                       SEC
5790  9FF3  60                       RTS
5791  9FF4  A0 00       BS1:         LDY    #0            ;build a start
5792  9FF6  AD 32 02                 LDA    S             ;start time
5793  9FF9  91 7B                    STA    (STARTPTR),Y
5794  9FFB  C8                       INY
5795  9FFC  AD 33 02                 LDA    S+1
5796  9FFF  91 7B                    STA    (STARTPTR),Y
5797  A001  C8                       INY
5798  A002  A5 49                    LDA    VALVE         ;valve
5799  A004  91 7B                    STA    (STARTPTR),Y
5800  A006  C8                       INY
5801  A007  A5 D7                    LDA    SUB           ;type byte
5802  A009  18                       CLC                  ;xsssSSSS, s=SUB, S=SOURCE
5803  A00A  2A                       ROL    A
5804  A00B  2A                       ROL    A
5805  A00C  2A                       ROL    A
5806  A00D  2A                       ROL    A
5807  A00E  05 BB                    ORA    SOURCE
5808  A010  91 7B                    STA    (STARTPTR),Y
5809  A012  C8                       INY
5810  A013  AD 36 02                 LDA    WT            ;duration
5811  A016  91 7B                    STA    (STARTPTR),Y
5812  A018  C8                       INY
```

```
5813  A019  AD 37 02           LDA   WT+1
5814  A01C  91 7B              STA   (STARTPTR),Y
5815  A01E  C8                 INY
5816  A01F  A9 00              LDA   #0              ;spares
5817  A021  91 7B              STA   (STARTPTR),Y
5818  A023  C8                 INY
5819  A024  91 7B              STA   (STARTPTR),Y
5820  A026  EE EC 15            INC   NSTARTS         ;one more start saved
5821  A029  20 F7 A9            JSR   NEXTSTART       ;move STARTPTR
5822  A02C  18                  CLC
5823  A02D  60                  RTS
5824
5825
5826
5827                    ENTER_GLOBAL:                 ;enter global budget
5828  A02E  20 82 A3            JSR   DKCLR
5829  A031  64 49               STZ   VALVE
5830  A033              MESSAGE 58
5834  A03B              SET_CURSOR LINE2+9
5838  A03D  AD FE 02            LDA   GLOBAL
5839  A040  85 61               STA   IBFR
5840  A042  A9 0A               LDA   #10
5841  A044  85 62               STA   IBFR+1
5842  A046  A9 C8               LDA   #200
5843  A048  85 63               STA   IBFR+2
5844  A04A  20 F3 A8            JSR   GETNUM10
5845  A04D  90 1B               BCC   EGL1
5846  A04F  B2 5A               LDA   (MENUPTR)
5847  A051  C9 01               CMP   #1
5848  A053  F0 09               BEQ   EGL2
5849  A055              HELP  58
5854  A05C  80 D0               BRA   ENTER_GLOBAL
5855  A05E        EGL2:   HELP  91
5860  A065  80 C7               BRA   ENTER_GLOBAL
5861  A067  8D FE 02   EGL1:    STA   GLOBAL
5862  A06A  60                  RTS
5863
5864                    HOWMANY:                      ;how many splits
5865                                                  ;in: VALVE, SUB, MAXON
5866                                                  ;out: QUOTIENT, A=DUR/MAXON
5867  A06B  A6 49              LDX   VALVE
5868  A06D  BD 42 15            LDA   MAXON,X
5869  A070  85 54               STA   DIVISOR
5870  A072  A5 D7               LDA   SUB
5871  A074  F0 12               BEQ   HOW0
5872  A076              DBLX                          ;soak duration
5880  A07C  BD B5 15            LDA   DUR3,X
5881  A07F  85 52               STA   DIVIDEND
5882  A081  BD B6 15            LDA   DUR3+1,X
5883  A084  85 53               STA   DIVIDEND+1
5884  A086  80 10               BRA   HOW2
5885  A088        HOW0:   DBLX                        ;base duration
5893  A08E  BD 58 15            LDA   DUR1,X
5894  A091  85 52               STA   DIVIDEND
5895  A093  BD 59 15            LDA   DUR1+1,X
5896  A096  85 53               STA   DIVIDEND+1
5897  A098  20 67 B3   HOW2:    JSR   DIVIDE
5898  A09B  AA                  TAX
5899  A09C  F0 02               BEQ   HOW1
5900  A09E  E6 56               INC   QUOTIENT
5901  A0A0  A5 56      HOW1:    LDA   QUOTIENT
5902  A0A2  60                  RTS
5903
5904                    CALCNSYR:                     ;out: QUOTIENT=
5905  A0A3  38                  SEC                   ;SYRINGE_END - SYRINGE_START / SOFTEN
5906  A0A4  AD B1 15            LDA   SYRINGE_END
5907  A0A7  ED AF 15            SBC   SYRINGE_START
5908  A0AA  85 52               STA   DIVIDEND
5909  A0AC  AD B2 15            LDA   SYRINGE_END+1
```

```
5910   A0AF   ED B0 15            SBC        SYRINGE_START+1
5911   A0B2   85 53               STA        DIVIDEND+1
5912   A0B4                       MOV16      SOFTEN,DIVISOR
5918   A0BE   20 7E B3            JSR        DIV16
5919   A0C1   E6 56               INC        QUOTIENT
5920   A0C3   60                  RTS
5921
5922                        SHOW_MONTHS:                ;display active months
5923   A0C4   64 49               STZ        VALVE
5924   A0C6   20 82 A3            JSR        BKCLR
5925   A0C9                       MESSAGE    190
5929   A0CE                       SET_CURSOR LINE2+1
5933   A0D3                       SET        LSB
5937   A0D7   A6 41        SMOC:  LDX        LSB
5938   A0D9   BD A2 15            LDA        ACTIVE_MONTH,X
5939   A0DC   F0 05               BEQ        SMOD
5940   A0DE   BD 4B F8            LDA        MONTBL,X
5941   A0E1   80 02               BRA        SMOE
5942   A0E3   A9 2D        SMOD:  LDA        #'-'
5943   A0E5   20 10 A3     SMOE:  JSR        DCHAR
5944   A0E8   E6 41               INC        LSB
5945   A0EA   A5 41               LDA        LSB
5946   A0EC   C9 0D               CMP        #13
5947   A0EE   D0 E7               BNE        SMOC
5948   A0F0   60                  RTS
5949
5950                        SHOW_SYRCYC:                ;show number of syringes and interval
5951   A0F1   20 A3 A8            JSR        CALCNSYR
5952   A0F4   20 82 A3            JSR        BKCLR
5953   A0F7   64 49               STZ        VALVE
5954   A0F9                       MESSAGE    140
5958   A0FE                       SET_CURSOR 3
5962   A103   A5 56               LDA        QUOTIENT
5963   A105   20 9C A6            JSR        D2D
5964   A108   A5 56               LDA        QUOTIENT
5965   A10A   C9 01               CMP        #1
5966   A10C   D0 14               BNE        SHSY1
5967   A10E   20 C8 A3            JSR        CLR_LINE2
5968   A111                       MOV16      SYRINGE_START,OFFSET
5974   A11B   20 CF AB            JSR        MIN2HM
5975   A11E   20 BE A5            JSR        DISPTIME
5976   A121   60                  RTS
5977   A122                SHSY1: SET_CURSOR LINE2
5981   A127                       MOV16      SOFTEN,OFFSET
5987   A131   20 CF AB            JSR        MIN2HM
5988   A134   20 F3 A5            JSR        DDUR
5989   A137                       SET_CURSOR LINE2+15
5993   A13C   60                  RTS
5994
5995   A13D                DSTA0: MESSAGE    73          ;display Sta #n
5999   A142                       SKIP       1
6003   A147   A9 23               LDA        #'#'
6004   A149   20 10 A3            JSR        DCHAR
6005   A14C   80 1C               BRA        DV
6006
6007   A14E                DSTA:  MESSAGE    73          ;display Stan
6011   A153   80 15               BRA        DV
6012
6013   A155                DSTATION0: MESSAGE 32         ;display Station #n
6017   A15A   80 0E               BRA        DV
6018
6019                        DVALVEMSG:                   ;display "Valve #n"
6020   A15C                       MESSAGE    126         ;in: VALVE
6024
6025   A161   20 6A A1     DVALVE: JSR       DV          ;display valve# and space
6026   A164   A9 20               LDA        #' '
6027   A166   20 10 A3            JSR        DCHAR
6028   A169   60                  RTS
6029
```

```
6030  A16A  A5 49         DV:      LDA    VALVE         ;display valve #
6031  A16C  09 30                  ORA    #ASCMASK
6032  A16E  20 10 A3               JSR    DCHAR
6033  A171  60                     RTS
6034
6035                      ISCOPY:                       ;show copy screen,
6036                                                    ;return carry set if copy requested
6037  A172  20 82 A2               JSR    DKCLR
6038  A175                         MESSAGE 34
6042  A17A  20 55 A1               JSR    DSTATIONS
6043  A17D                         ON
6048  A183  20 06 A2      ISC01:   JSR    GETKEY
6049  A186  C9 20                  CMP    #OKKEY
6050  A188  F0 11                  BEQ    ISC02
6051  A18A  C9 10                  CMP    #NOKEY
6052  A18C  F0 0F                  BEQ    ISC03
6053  A18E  C9 08                  CMP    #HELPKEY
6054  A190  D0 F1                  BNE    ISC01
6055  A192                         HELP   8
6060  A199  80 D7                  BRA    ISCOPY
6061  A19B  38            ISC02:   SEC
6062  A19C  60                     RTS
6063  A19D  18            ISC03:   CLC
6064  A19E  60                     RTS
6065
6066                      DISP_SOURCE:                  ;show the source
6067  A19F  A5 BB                  LDA    SOURCE
6068  A1A1  18                     CLC
6069  A1A2  69 CA                  ADC    #202
6070  A1A4  AA                     TAX
6071  A1A5  20 D7 A2               JSR    DISPLAY_MSG
6072  A1A8                         BACKUP 1
6076  A1AD  A9 3A                  LDA    #':'
6077  A1AF  20 10 A3               JSR    DCHAR
6078  A1B2  60                     RTS
6079
6080                      ISSOURCE:                     ;return carry set if source exists
6081  A1B3  A6 BB                  LDX    SOURCE
6082  A1B5                         DBLX
6090  A1B8  BD 02 F8               LDA    SOURCEADDR,X
6091  A1BE  85 75                  STA    SRCPTR
6092  A1C0  BD 03 F8               LDA    SOURCEADDR+1,X
6093  A1C3  85 76                  STA    SRCPTR+1
6094  A1C5  B2 75                  LDA    (SRCPTR)
6095  A1C7  F0 02                  BEQ    ISS0
6096  A1C9  38                     SEC
6097  A1CA  60                     RTS
6098  A1CB  18            ISS0:    CLC
6099  A1CC  60                     RTS
6100
6101                      CONFIRM_HELP:                 ;help screen for all confirm screens
6102  A1CD  AD 72 02               LDA    REVIEW
6103  A1D0  C9 BB                  CMP    #RREVIEW
6104  A1D2  D0 08                  BNE    CHE1
6105  A1D4                         HELP   7
6110  A1DB  60                     RTS
6111  A1DC          CHE1:          HELP   6
6116  A1E3  60                     RTS
6117
6118                      CONFIRM_BLINK:                ;use ? for modify, OK for review
6119  A1E4  AD 72 02               LDA    REVIEW
6120  A1E7  C9 01                  CMP    #RMODIFY
6121  A1E9  D0 07                  BNE    CHE2
6122  A1EB                         QM
6127  A1F1  60                     RTS
6128  A1F2          CHE2:          OK
6133  A1F8  60                     RTS
6134
6135                      GETONOFF:                     ;retrieve MAXON/MINOFF from tables
```

```
6136                                            ;DEFAULT+2=terrain, +3=sprinkler type
6137                                            ;out: DEFAULT= MAXON, +1= MINOFF
6138  A1F9  A6 CB           LDX   DEFAULT+2    ;find MINOFF
6139  A1FB  CA              DEX
6140  A1FC  BD 8C F8        LDA   MINOFFTBL,X  ;index = terrain-1
6141  A1FF  85 CA           STA   DEFAULT+1
6142  A201  A6 CC           LDX   DEFAULT+3    ;find MAXON
6143  A203  CA              DEX
6144  A204  86 BC           STX   R1
6145  A206  8A              TXA
6146  A207  18              CLC                ;index = 6*(sprinkler type-1) + (terrain-1)
6147  A208  65 BC           ADC   R1
6148  A20A  65 BC           ADC   R1
6149  A20C  65 BC           ADC   R1
6150  A20E  65 BC           ADC   R1
6151  A210  65 BC           ADC   R1
6152  A212  A6 CB           LDX   DEFAULT+2
6153  A214  CA              DEX
6154  A215  86 BC           STX   R1
6155  A217  65 BC           ADC   R1
6156  A219  AA              TAX
6157  A21A  BD 92 F8        LDA   MAXONTBL,X
6158  A21D  85 C9           STA   DEFAULT
6159  A21F  60              RTS
6160
6161                GETSOAKDUR:                 ;retrieve Soak duration from table
6162                                            ;in: DEFAULT+2=terrain, +3=sprinkler type
6163                                            ;out: DEFAULT,+1= Soak dur
6164  A220  A6 CC           LDX   DEFAULT+3
6165  A222  CA              DEX
6166  A223  86 BC           STX   R1
6167  A225  8A              TXA
6168  A226  18              CLC                ;index = 6*(sprinkler type-1) + (terrain-1)
6169  A227  65 BC           ADC   R1
6170  A229  65 BC           ADC   R1
6171  A22B  65 BC           ADC   R1
6172  A22D  65 BC           ADC   R1
6173  A22F  65 BC           ADC   R1
6174  A231  A6 CB           LDX   DEFAULT+2
6175  A233  CA              DEX
6176  A234  86 BC           STX   R1
6177  A236  65 BC           ADC   R1
6178  A238  AA              TAX
6179  A239                  DBLX               ;double it to get words
6187  A23F  BD BC F8        LDA   SOAKDURTBL,X
6188  A242  85 C9           STA   DEFAULT
6189  A244  BD BD F8        LDA   SOAKDURTBL+1,X
6190  A247  85 CA           STA   DEFAULT+1
6191  A249  60              RTS
6192
6193                SHOW_SITE:                  ;show current site info
6194                                            ;in: VALVE
6195  A24A  20 B2 A3        JSR   DKCLR
6196  A24D  20 4E A1        JSR   DSTA
6197  A250                  MESSAGE 109         ;want to see it?
6201  A255                  ON
6206  A25B  20 06 AB  SSI4: JSR   GETKEY
6207  A25E  C9 20           CMP   #OKKEY
6208  A260  F0 0C           BEQ   SSI0
6209  A262  C9 10           CMP   #NOKEY
6210  A264  D0 01           BNE   SSI5
6211  A266  60              RTS
6212  A267  C9 08     SSI5: CMP   #HELPKEY
6213  A269  D0 F0           BNE   SSI4
6214  A26B  4C B5 A2        JMP   SSI2
6215
6216  A26E  20 B2 A3  SSI0: JSR   DKCLR        ;show site info
6217  A271  20 4E A1        JSR   DSTA
6218  A274  A9 3A           LDA   #':'
```

```
6219  A276  20 10 A3           JSR    DCHAR
6220  A279  A6 49              LDX    VALVE
6221  A27B  BD CB 02           LDA    TERRAIN,X
6222  A27E  18                 CLC
6223  A27F  69 06              ADC    #214
6224  A281  AA                 TAX
6225  A282  20 D7 A2           JSR    DISPLAY_MSG
6226  A285                     BACKUP 1
6230  A28A  A9 2C              LDA    #','
6231  A28C  20 10 A3           JSR    DCHAR
6232  A28F                     SET_CURSOR LINE2
6236  A294  A6 49              LDX    VALVE
6237  A296  BD D4 02           LDA    SPRINKLER,X
6238  A299  18                 CLC
6239  A29A  69 DC              ADC    #220
6240  A29C  AA                 TAX
6241  A29D  20 D7 A2           JSR    DISPLAY_MSG
6242  A2A0                     OK
6247  A2A6  20 06 AB    SSI1:  JSR    GETKEY
6248  A2A9  C9 20              CMP    #OKKEY
6249  A2AB  F0 12              BEQ    SSI3
6250  A2AD  C9 10              CMP    #NOKEY
6251  A2AF  F0 04              BEQ    SSI2
6252  A2B1  C9 0B              CMP    #HELPKEY
6253  A2B3  D0 F1              BNE    SSI1
6254  A2B5         SSI2:       HELP   76
6259  A2BC  4C 4F 9F           JMP    SHOW_START
6260  A2BF  60    SSI3:        RTS
6261
6262
6263
6264
6265
6266  A2C0                     INCLUDE    SUBS.ASM
6267                     ;------------------------------------
6268                     ;    SUBROUTINES
6269                     ;------------------------------------
6270
6271  A2C0  DA          WAITMS: PHX                 ;wait 1 ms. * Y
6272  A2C1  A2 5A       WA0:    LDX    #90
6273  A2C3  CA          WA1:    DEX
6274  A2C4  D0 FD               BNE    WA1
6275  A2C6  88                  DEY
6276  A2C7  D0 F8               BNE    WA0
6277  A2C9  FA                  PLX
6278  A2CA  60                  RTS
6279
6280                   CALCSUM:                    ;read checksum data into A
6281  A2CB  A2 0F              LDX    #15
6282  A2CD  18                 CLC
6283  A2CE  A9 00              LDA    #0
6284  A2D0  7D 0B 02   CS1:    ADC    CKDATA,X
6285  A2D3  CA                 DEX
6286  A2D4  D0 FA              BNE    CS1
6287  A2D6  60                 RTS
6288
6289                   DISPLAY_MSG:                ;display message
6290                                               ;in: X=index of msg, CURSOR
6291                                               ;out: Y=length of msg, MSGPTR=next msg
6292  A2D7                     DBLX                ;get MSGPTR
6300  A2DD  90 0C              BCC    DMSG1
6301  A2DF  BD E1 F4           LDA    MSGTBL1,X    ;use bank 1
6302  A2E2  85 43              STA    MSGPTR
6303  A2E4  BD E2 F4           LDA    MSGTBL1+1,X
6304  A2E7  85 44              STA    MSGPTR+1
6305  A2E9  80 0A              BRA    DMSG
6306  A2EB  BD E1 F3   DMSG1:  LDA    MSGTBL,X     ;use bank 0
6307  A2EE  85 43              STA    MSGPTR
6308  A2F0  BD E2 F3           LDA    MSGTBL+1,X
```

| | | | | | | |
|---|---|---|---|---|---|---|
| 6309 | A2F3 | 85 44 | | STA | MSGPTR+1 | |
| 6310 | A2F5 | A0 00 | DMSG: | LDY | #0 | ;show msg at MSGPTR |
| 6311 | A2F7 | B1 43 | | LDA | (MSGPTR),Y | ;get length of msg |
| 6312 | A2F9 | AA | | TAX | | |
| 6313 | A2FA | C8 | M1: | INY | | |
| 6314 | A2FB | B1 43 | | LDA | (MSGPTR),Y | ;get byte |
| 6315 | A2FD | 20 10 A3 | | JSR | DCHAR | ;display it |
| 6316 | A300 | CA | | DEX | | ;until done |
| 6317 | A301 | D0 F7 | | BNE | M1 | |
| 6318 | A303 | 98 | | TYA | | ;point MSGPTR to next msg |
| 6319 | A304 | 38 | | SEC | | |
| 6320 | A305 | 65 43 | | ADC | MSGPTR | |
| 6321 | A307 | 85 43 | | STA | MSGPTR | |
| 6322 | A309 | A5 44 | | LDA | MSGPTR+1 | |
| 6323 | A30B | 69 00 | | ADC | #0 | |
| 6324 | A30D | 85 44 | | STA | MSGPTR+1 | |
| 6325 | A30F | 60 | | RTS | | |
| 6326 | | | | | | |
| 6327 | | | | | | |
| 6328 | A310 | 5A | DCHAR: | PHY | | ;display character in A |
| 6329 | A311 | DA | | PHX | | |
| 6330 | A312 | A6 18 | DC0: | LDX | LCD_STATUS | ;wait for LCD ready |
| 6331 | A314 | 30 FC | | BMI | DC0 | |
| 6332 | A316 | 85 19 | | STA | LCD_DATA | ;give LCD the data |
| 6333 | A318 | E6 48 | | INC | CURSOR | |
| 6334 | A31A | A5 48 | | LDA | CURSOR | |
| 6335 | A31C | C9 10 | | CMP | #$10 | ;if 2nd line, |
| 6336 | A31E | D0 05 | | BNE | DC1 | |
| 6337 | A320 | | | SET_CURSOR LINE2 | | ;then move cursor there |
| 6341 | A325 | FA | DC1: | PLX | | |
| 6342 | A326 | 7A | | PLY | | |
| 6343 | A327 | 60 | | RTS | | |
| 6344 | | | | | | |
| 6345 | | | | | | |
| 6346 | A328 | A4 18 | CMD: | LDY | LCD_STATUS | ;send cmd, X=index |
| 6347 | A32A | 30 FC | | BMI | CMD | ;wait for ready |
| 6348 | A32C | BD CD F3 | CMDNR: | LDA | LCDTBL,X | ;get cmd from table |
| 6349 | A32F | 85 18 | | STA | LCD_CMD | ;send cmd in A |
| 6350 | A331 | 60 | | RTS | | |
| 6351 | | | | | | |
| 6352 | A332 | | LCD_ON: | SET | LCD_POWER | |
| 6356 | A336 | A0 32 | | LDY | #$50 | ;power on, wait |
| 6357 | A338 | 20 C0 A2 | | JSR | WAITMS | |
| 6358 | A33B | | | SET | LCD_ENABLE | ;enable interface |
| 6362 | A33F | 60 | | RTS | | |
| 6363 | | | | | | |
| 6364 | | | DISPLAY_ON: | | | ;initialize LCD |
| 6365 | A340 | A2 09 | | LDX | #9 | ;function set, wait |
| 6366 | A342 | 20 2C A3 | | JSR | CMDNR | |
| 6367 | A345 | A0 0A | | LDY | #10 | |
| 6368 | A347 | 20 C0 A2 | | JSR | WAITMS | |
| 6369 | A34A | A2 09 | | LDX | #9 | ;function set, wait |
| 6370 | A34C | 20 2C A3 | | JSR | CMDNR | |
| 6371 | A34F | A0 0A | | LDY | #10 | |
| 6372 | A351 | 20 C0 A2 | | JSR | WAITMS | |
| 6373 | A354 | A2 05 | | LDX | #5 | ;display on, no cursor |
| 6374 | A356 | 20 28 A3 | | JSR | CMD | |
| 6375 | A359 | A2 02 | | LDX | #2 | ;entry mode set |
| 6376 | A35B | 20 28 A3 | | JSR | CMD | |
| 6377 | A35E | A2 01 | | LDX | #1 | ;cursor home |
| 6378 | A360 | 20 28 A3 | | JSR | CMD | |
| 6379 | A363 | 64 48 | | STZ | CURSOR | |
| 6380 | | | | | | |
| 6381 | A365 | A2 0B | | LDX | #11 | ;make the custom char |
| 6382 | A367 | 20 28 A3 | | JSR | CMD | |
| 6383 | A36A | A2 00 | | LDX | #0 | |
| 6384 | A36C | BD D9 F3 | DON1: | LDA | CUSTOMTBL,X | |
| 6385 | A36F | 20 10 A3 | | JSR | DCHAR | |
| 6386 | A372 | E8 | | INX | | |

```
6387  A373  E0 08              CPX      #8
6388  A375  D0 F5              BNE      DON1
6389  A377                     SET_CURSOR 0
6393  A37C  60                 RTS
6394
6395              DISPLAY_OFF:                       ;turn LCD off
6396  A37D  64 04              STZ      LCD_POWER
6397  A37F  64 05              STZ      LCD_ENABLE
6398  A381  60                 RTS
6399
6400  A382  20 92 A3  DKCLR:   JSR      KEY_RESET    ;clear display and keys
6401
6402              DISPLAY_CLR:                       ;clear display, cursor at 0
6403  A385  A2 00              LDX      #0
6404  A387  20 28 A3           JSR      CMD
6405  A38A  64 48              STZ      CURSOR
6406  A38C  A2 00              LDX      #0           ;cmd twice, bug in LCD
6407  A38E  20 28 A3           JSR      CMD
6408  A391  60                 RTS
6409
6410  A392              KEY_RESET:
6411  A392  64 6C              STZ      BLINK
6412  A394  64 5D              STZ      KEYPRESS
6413  A396  64 6B              STZ      INTCTR
6414  A398  64 68              STZ      REPEAT_MASK
6415  A39A  64 E2              STZ      INTCMD
6416  A39C  64 E3              STZ      CMDCTR
6417  A39E  60                 RTS
6418
6419              INC_LCD_ADDR:                      ;move LCD addr ahead A chars
6420  A39F  18                 CLC
6421  A3A0  65 48              ADC      CURSOR
6422  A3A2  C9 10              CMP      #$10         ;if past line 1,
6423  A3A4                     BLT      LCD_ADDR
6426  A3A6  29 0F              AND      %00001111B   ;then make it line 2
6427  A3A8  09 40              ORA      %01000000B
6428  A3AA  80 10              BRA      LCD_ADDR
6429
6430              DEC_LCD_ADDR:                      ;move LCD addr back A chars
6431  A3AC  A8                 TAY
6432  A3AD  A5 48              LDA      CURSOR
6433  A3AF  84 48              STY      CURSOR
6434  A3B1  38                 SEC
6435  A3B2  E5 48              SBC      CURSOR
6436  A3B4  C9 40              CMP      #$40         ;if before line 2,
6437  A3B6                     BGE      LCD_ADDR
6440  A3B8  29 0F              AND      %00001111B   ;than make it line 1
6441  A3BA  80 00              BRA      LCD_ADDR
6442
6443              LCD_ADDR:                          ;set cursor address in A
6444  A3BC  A4 18              LDY      LCD_STATUS
6445  A3BE  30 FC              BMI      LCD_ADDR
6446  A3C0  85 48              STA      CURSOR
6447  A3C2  0D D7 F3           ORA      ADDR_CMD
6448  A3C5  85 18              STA      LCD_CMD
6449  A3C7  60                 RTS
6450
6451              CLR_LINE2:                         ;clear the second line of the display
6452  A3C8                     SET_CURSOR LINE2
6456  A3CD  A2 10              LDX      #16
6457  A3CF  20 C2 A0           JSR      SPACES
6458  A3D2                     SET_CURSOR LINE2
6462  A3D7  60                 RTS
6463
6464              DISPLAY_WORD:                      ;display MSB,LSB in hex
6465  A3D8  A5 42              LDA      MSB
6466  A3DA  6A                 ROR      A
6467  A3DB  6A                 ROR      A
6468  A3DC  6A                 ROR      A
```

```
6469  A3DD  6A                       ROR    A
6470  A3DE  20 01 A4                 JSR    AASC
6471  A3E1  20 10 A3                 JSR    DCHAR   ;hi nibble of MSB
6472  A3E4  A5 42                    LDA    MSB
6473  A3E6  20 01 A4                 JSR    AASC
6474  A3E9  20 10 A3                 JSR    DCHAR   ;lo nibble of MSB
6475
6476                  DISPLAY_BYTE:                 ;display LSB in hex
6477  A3EC  A5 41                    LDA    LSB
6478  A3EE  6A                       ROR    A
6479  A3EF  6A                       ROR    A
6480  A3F0  6A                       ROR    A
6481  A3F1  6A                       ROR    A
6482  A3F2  20 01 A4                 JSR    AASC
6483  A3F5  20 10 A3                 JSR    DCHAR   ;hi nibble of LSB
6484  A3F8  A5 41                    LDA    LSB
6485  A3FA  20 01 A4                 JSR    AASC
6486  A3FD  20 10 A3                 JSR    DCHAR   ;lo nibble of LSB
6487  A400  60                       RTS
6488
6489
6490  A401  29 0F        AASC:       AND    00001111B  ;convert low 4 bits of A to ASCII char
6491  A403  C9 0A                    CMP    #10        ;if A>=10 then add 7
6492  A405  90 03                    BCC    LS5
6493  A407  18                       CLC
6494  A408  69 07                    ADC    #7
6495  A40A  18           LS5:        CLC               ;add 30H to make ASCII
6496  A40B  69 30                    ADC    #30H
6497  A40D  60                       RTS
6498
6499
6500  A40E         AD_ON:    SET    AD_POWER    ;turn A/D on
6504  A412  A0 1E                    LDY    #30
6505  A414  20 C0 A2                 JSR    WAITMS
6506  A417                  SET    AD_ENABLE
6510  A41B  95 20                    STA    ADBASE,X    ;do dummy start to get EOC high
6511  A41D  A0 01                    LDY    #1
6512  A41F  20 C0 A2                 JSR    WAITMS
6513  A422  60                       RTS
6514
6515  A423  64 02        AD_OFF: STZ    AD_POWER    ;turn A/D off
6516  A425  64 03                    STZ    AD_ENABLE
6517  A427  60                       RTS
6518
6519  A428  78           TIMERON: SEI                ;TIMER counts system clock/16
6520                                                 ;= .000035 sec per count
6521  A429  A9 0A                    LDA    #10       ;set TIMER for 40 ms. interrupt
6522  A42B  85 08                    STA    TIMER_MSB ;.040/.000035=1143
6523  A42D  A9 72                    LDA    #114      ;so count 10 groups of 114
6524  A42F  85 09                    STA    TIMER_LSB
6525  A431  85 0D                    STA    TIMER_LOAD
6526  A433                  SET    TIMER
6530  A437  58                       CLI
6531  A438  60                       RTS
6532
6533                  TIMER_OFF:                     ;turn TIMER off
6534  A439  64 0A                    STZ    TIMER
6535  A43B  78                       SEI
6536  A43C  60                       RTS
6537
6538                  READ:                          ;Read A/D channel in ADCHANNEL (0-15)
6539                                                 ;NO INTERRUPTS are allowed!
6540  A43D  A6 45                    LDX    ADCHANNEL ;set up AD mux and start convert
6541  A43F  95 20                    STA    ADBASE,X
6542  A441  A0 64                    LDY    #100      ;software timeout after 2ms.
6543  A443  88           REA1:       DEY
6544  A444  F0 11                    BEQ    REA4
6545  A446  A5 13                    LDA    STATUS2   ;Wait for EOC high
6546  A448  10 F9                    BPL    REA1
6547  A44A  A0 64                    LDY    #100
```

```
6548  A44C  88           REA3:   DEY
6549  A44D  F0 08                BEQ    REA4
6550  A44F  A5 13                LDA    STATUS2        ;Wait for EOC low
6551  A451  30 F9                BMI    REA3
6552  A453  A5 15                LDA    AD_DATA        ;read data
6553  A455  18                   CLC                   ;return carry clear if ok
6554  A456  60                   RTS
6555  A457  38           REA4:   SEC                   ;carry set if timeout
6556  A458  60                   RTS
6557
6558
6559                     VON:                           ;turn valve # VALVE on
6560                                                    ;in: VALVE, VALVEID()
6561                                                    ;out: VS bit0 = 1
6562  A459  A6 49                LDX    VALVE
6563  A45B  BD 7D 02             LDA    VS,X
6564  A45E  09 10                ORA    #00010000B
6565  A460  9D 7D 02             STA    VS,X
6566  A463  BD 89 02             LDA    VALVEID,X      ;VALVEID contains the proper
6567  A466  85 06        V01:    STA    VALVE_SETUP    ;valve position (A-H) and polarity
6568  A468  A5 6D                LDA    FLAGS          ;if battery present,
6569  A46A  29 01                AND    #00000001B
6570  A46C  F0 0B                BEQ    V05
6571  A46E                       SET    VALVE_ENABLE
6575  A472  A0 38                LDY    #56            ;then wait via software loop
6576  A474  20 C0 A2             JSR    WAITMS
6577  A477  80 10                BRA    V04
6578  A479  64 46        V05:    STZ    TIMCTR         ;else wait via INT
6579  A47B                       SET    VALVE_ENABLE
6583  A47F  20 28 A4             JSR    TIMERON
6584  A482  A5 46        V02:    LDA    TIMCTR         ;wait for 40 ms. (one INT)
6585  A484  F0 FC                BEQ    V02
6586  A486  20 39 A4             JSR    TIMER_OFF
6587  A489  64 07        V04:    STZ    VALVE_ENABLE
6588  A48B  60                   RTS
6589
6590                     VOFF:                          ;turn valve # VALVE off
6591                                                    ;in: VALVE, VALVEID()
6592                                                    ;out: VS bit 0=0
6593  A48C  A6 49                LDX    VALVE
6594  A48E  BD 7D 02             LDA    VS,X
6595  A491  29 EF                AND    #11101111B
6596  A493  9D 7D 02             STA    VS,X
6597  A496  BD B9 02             LDA    VALVEID,X
6598  A499  49 40                EOR    #01000000B     ;reverse the polarity
6599  A49B  80 C9                BRA    V01
6600
6601                     ALL_VALVES_OFF:               ;turn all valves off that are on
6602                                                    ;carry set if any valves turned off
6603  A49D  9C 7D 02             STZ    VS
6604  A4A0  A9 08                LDA    #8
6605  A4A2  85 49                STA    VALVE
6606  A4A4  A6 49        AV0:    LDX    VALVE
6607  A4A6  BD 7D 02             LDA    VS,X
6608  A4A9  29 10                AND    #00010000B
6609  A4AB  F0 08                BEQ    AV1
6610  A4AD  20 8C A4             JSR    VOFF
6611  A4B0                       SET    VS
6615  A4B5  C6 49        AV1:    DEC    VALVE
6616  A4B7  D0 EB                BNE    AV0
6617  A4B9  AD 7D 02             LDA    VS
6618  A4BC  D0 02                BNE    AV2
6619  A4BE  18                   CLC
6620  A4BF  60                   RTS
6621  A4C0  38           AV2:    SEC
6622  A4C1  60                   RTS
6623
6624                     VALVE_HI:                     ;set VALVE +=hi, -=tristate
6625                                                    ;in: valve 1-8
```

```
6626  A4C2  A5 49               LDA    VALVE
6627  A4C4  38                  SEC
6628  A4C5  E9 01               SBC    #1
6629  A4C7  29 07        VH1:   AND    #00000111B    ;alt entry, position # in A
6630  A4C9  D0 02               BNE    VH0           ;- is set at position 0
6631  A4CB  09 38               ORA    #00111000B    ;if valve=0, then set - not position 0
6632  A4CD  09 00        VH0:   ORA    #POS
6633  A4CF  85 06               STA    VALVE_SETUP
6634  A4D1                      SET    VALVE_ENABLE
6638  A4D5  60                  RTS
6639
6640                     READ_RTC:                   ;read real time counter into MSB,LSB
6641  A4D6  A5 11               LDA    RTC_LSB       ;do it twice in case update in progress
6642  A4D8  85 41               STA    LSB
6643  A4DA  A5 11               LDA    RTC_LSB
6644  A4DC  C5 41               CMP    LSB
6645  A4DE  D0 F6               BNE    READ_RTC
6646  A4E0  A5 10        RR0:   LDA    RTC_MSB
6647  A4E2  85 42               STA    MSB
6648  A4E4  A5 10               LDA    RTC_MSB
6649  A4E6  C5 42               CMP    MSB
6650  A4E8  D0 EC               BNE    READ_RTC
6651  A4EA  A5 41               LDA    LSB           ;return Z flag if zero
6652  A4EC  05 42               ORA    MSB
6653  A4EE  60                  RTS
6654
6655                     UPDATE_CLOCK:               ;increment clock
6656  A4EF  20 00 A5            JSR    BUMP_CLOCK    ;read and reset counter
6657  A4F2  20 F9 A4            JSR    CLR_RTC
6658  A4F5  20 CF 81            JSR    WATER         ;do watering task
6659  A4F8  60                  RTS
6660
6661                     CLR_RTC:                    ;reset RTC counter to 0
6662  A4F9  64 01               STZ    RTC_CLR
6663  A4FB  A5 11               LDA    RTC_LSB
6664  A4FD  A5 10               LDA    RTC_MSB
6665  A4FF  60                  RTS
6666
6667                     BUMP_CLOCK:                 ;minutes in A   (<=60)
6668  A500  18                  CLC
6669  A501  6D 77 02            ADC    MINUTE
6670  A504  8D 77 02            STA    MINUTE
6671  A507  C9 3C               CMP    #60
6672  A509                      BLT    UC4
6675  A50B  38                  SEC                  ;if >=60 minutes,
6676  A50C  AD 77 02            LDA    MINUTE
6677  A50F  E9 3C               SBC    #60           ;then subtract 60 minutes
6678  A511  8D 77 02            STA    MINUTE
6679  A514  EE 76 02     UC1:   INC    HOUR          ;and add 1 hour
6680  A517  AD 76 02            LDA    HOUR
6681  A51A  C9 18               CMP    #24
6682  A51C                      BLT    UC4
6685  A51E  9C 76 02            STZ    HOUR          ;if midnight, then new day
6686  A521  EE 7A 02            INC    DAY
6687  A524  EE 7B 02            INC    DOW
6688  A527  AD 78 02            LDA    DOW           ;new day of the week
6689  A52A  C9 08               CMP    #8
6690  A52C  D0 08               BNE    UC2
6691  A52E                      SET    DOW
6695  A533  20 58 83            JSR    INCDAYNUM     ;new day number for watering
6696  A536  AD 7A 02     UC2:   LDA    DAY
6697  A539  CD 7C 02            CMP    DIM
6698  A53C  F0 3A               BEQ    UC4
6699  A53E                      BLT    UC4
6702  A540                      SET    DAY           ;new month, day=1
6706  A545  EE 79 02            INC    MONTH
6707  A548  AD 79 02            LDA    MONTH
6708  A54B  C9 0D               CMP    #13
6709  A54D                      BLT    UC3
```

```
6712  A54F                              SET     MONTH           ;new year, month=1
6716  A554  EE 7B 02                    INC     YEAR
6717  A557  AD 7B 02                    LDA     YEAR
6718  A55A  C9 64                       CMP     #100
6719  A55C  D0 03                       BNE     UC3
6720  A55E  9C 7B 02                    STZ     YEAR
6721  A561  AE 79 02        UC3:        LDX     MONTH           ;find # of days in month
6722  A564  BD 8B F7                    LDA     DAYTBL,X
6723  A567  8D 7C 02                    STA     DIM
6724  A56A  C9 02                       CMP     #2              ;if FEB
6725  A56C  D0 0A                       BNE     UC4
6726  A56E  AD 7B 02                    LDA     YEAR
6727  A571  29 03                       AND     #00000011B      ;and leap year
6728  A573  D0 03                       BNE     UC4
6729  A575  EE 7C 02                    INC     DIM             ;then add a day
6730  A578  38              UC4:        SEC
6731  A579  60                          RTS
6732
6733                        DISPLAY_DOW:                        ;display day of the week in IBFR+6
6734  A57A  A5 67                       LDA     IBFR+6
6735  A57C  18                          CLC
6736  A57D  69 5A                       ADC     #90
6737  A57F  AA                          TAX
6738  A580  20 07 A2                    JSR     DISPLAY_MSG
6739  A583  60                          RTS
6740
6741                        DISPLAY_DATE:                       ;display month, day, yr in IBFR+7
6742  A584  20 A1 A5                    JSR     DISPLAY_MONTH
6743  A587                              SKIP    1
6747  A58C  A5 69                       LDA     IBFR+8          ;day
6748  A58E  20 9C A6                    JSR     D2D
6749  A591  A9 2C                       LDA     #','
6750  A593  20 1B A3                    JSR     DCHAR
6751  A596  A9 27                       LDA     #$27
6752  A598  20 1B A3                    JSR     DCHAR
6753  A59B  A5 6A                       LDA     IBFR+9          ;year
6754  A59D  20 C2 A6                    JSR     D2NS
6755  A5A0  60                          RTS
6756
6757                        DISPLAY_MONTH:                      ;display the month in IBFR+7
6758  A5A1  A5 68                       LDA     IBFR+7
6759  A5A3  18                          CLC
6760  A5A4  69 4C                       ADC     #76
6761  A5A6  AA                          TAX
6762  A5A7  20 07 A2                    JSR     DISPLAY_MSG
6763  A5AA  60                          RTS
6764
6765  A5AB  A5 D7           DSUB:       LDA     SUB             ;show msg for which valve setup
6766  A5AD  18                          CLC
6767  A5AE  69 94                       ADC     #148
6768  A5B0  AA                          TAX
6769  A5B1  20 07 A2                    JSR     DISPLAY_MSG
6770  A5B4  60                          RTS
6771
6772                        DSTART:                             ;display the start time at
6773  A5B5  B1 75                       LDA     (SRCPTR),Y      ;(SRCPTR),Y
6774  A5B7  85 65                       STA     IBFR+4
6775  A5B9  C8                          INY
6776  A5BA  B1 75                       LDA     (SRCPTR),Y
6777  A5BC  85 66                       STA     IBFR+5          ;show it at CURSOR
6778
6779                        DISPTIME:                           ;display the hour and minute
6780                                                            ;IBFR+4= hour, minute
6781  A5BE  A5 65                       LDA     IBFR+4          ;show 12 if hour=0
6782  A5C0  F0 09                       BEQ     DT3
6783  A5C2  C9 0D                       CMP     #13
6784  A5C4                              BLT     DT0
6787  A5C6  38                          SEC                     ;if hour>12 then show hour-12
6788  A5C7  E9 0C                       SBC     #12
```

```
6789  A5C9  80 02              BRA     DT8
6790  A5CB  A9 0C        DT3:  LDA     #12
6791  A5CD  20 9C A6     DT8:  JSR     D2D
6792  A5D0  A9 3A              LDA     #':'
6793  A5D2  20 10 A3           JSR     DCHAR
6794  A5D5  A5 66              LDA     IBFR+5        ;show minute
6795  A5D7  20 C2 A6           JSR     D2NS          ;without suppressing leading 0
6796  A5DA  A5 65              LDA     IBFR+4
6797  A5DC  C9 00              CMP     #0
6798  A5DE  F0 08              BEQ     DT1
6799  A5E0  C9 0C              CMP     #12           ;show am or pm
6800  A5E2                     BLT     DT1
6803  A5E4  A9 70              LDA     #'p'
6804  A5E6  80 02              BRA     DT2
6805  A5E8  A9 61        DT1:  LDA     #'a'
6806  A5EA  20 10 A3     DT2:  JSR     DCHAR
6807  A5ED  A9 6D              LDA     #'m'
6808  A5EF  20 10 A3           JSR     DCHAR
6809  A5F2  60           DT10: RTS
6810
6811  A5F3               DDUR:
6812                     DISPDURATION:               ;display the hour and minute 0h+00m
6813                                                 ;IBFR+4= hour, minute
6814  A5F3  A5 65        DD1:  LDA     IBFR+4        ;show hour
6815  A5F5  09 30              ORA     #ASCMASK
6816  A5F7  20 10 A3           JSR     DCHAR
6817  A5FA  A9 68        DD0:  LDA     #'h'
6818  A5FC  20 10 A3           JSR     DCHAR
6819  A5FF  A9 2B        DD2:  LDA     #'+'
6820  A601  20 10 A3           JSR     DCHAR
6821  A604  A5 66              LDA     IBFR+5        ;show minute
6822  A606  20 9C A6           JSR     D2D           ;without suppressing leading 0
6823  A609  A9 6D              LDA     #'m'
6824  A60B  20 10 A3           JSR     DCHAR
6825  A60E  60           DD3:  RTS
6826
6827                     DISPCYCLE:                  ;show cycle info @ CURSOR
6828                                                 ;in: CYCLE_TYPE=0:
6829                                                 ;    IBFR= 1-90 days, IBFR+1=1
6830                                                 ;in: CYCLE_TYPE=1:
6831                                                 ;    IBFR= cycle in weeks (1-9)
6832                                                 ;    IBFR+1= the specific days (XMTWTFSS)
6833  A60F  AD 41 15           LDA     CYCLE_TYPE
6834  A612  D0 16              BNE     DMC5
6835  A614                     MESSAGE 38
6839  A619  A5 61              LDA     IBFR          ;XX days
6840  A61B  20 9C A6           JSR     D2D
6841  A61E                     MESSAGE 33
6845  A623                     SKIP    1
6849  A628  80 3E              BRA     DMC20
6850  A62A  A5 61        DMC5: LDA     IBFR
6851  A62C  C9 01              CMP     #1
6852  A62E  F0 2B              BEQ     DMC10
6853  A630  A5 62        DMC0: LDA     IBFR+1        ;cycle > 1 week
6854  A632  F0 19              BEQ     DMC2
6855  A634  18                 CLC
6856  A635  A2 01              LDX     #1
6857  A637  2A                 ROL     A
6858  A638  2A           DMC3: ROL     A
6859  A639  B0 03              BCS     DMC1
6860  A63B  E8                 INX
6861  A63C  80 FA              BRA     DMC3
6862  A63E  86 67        DMC1: STX     IBFR+6        ;show day of week
6863  A640  20 7A A5           JSR     DISPLAY_DOW
6864  A643                     SKIP    1
6868  A648                     MESSAGE 38
6872  A64D  A5 61        DMC2: LDA     IBFR          ;show how many weeks
6873  A64F  09 30              ORA     #ASCMASK
6874  A651  20 10 A3           JSR     DCHAR
```

```
6875  A654                              MESSAGE  35
6879  A659   80 0D                      BRA      DMC20
6880  A65B                     DMC10:   MESSAGE  38              ;weekly cycle
6884  A660   20 69 A6                   JSR      DSP
6885  A663                              SKIP     1
6889  A668   60              DMC20:     RTS
6890
6891                          DSP:                                ;show specific days
6892                                                              ;in: cycle byte in IBFR+1
6893  A669   A5 62                      LDA      IBFR+1           ;XMTWTFSS
6894  A66B   85 41                      STA      LSB
6895  A66D   A2 00                      LDX      #0
6896  A66F   26 41                      ROL      LSB
6897  A671   26 41           DP11:      ROL      LSB
6898  A673   90 05                      BCC      DP12
6899  A675   BD 44 FB                   LDA      SDTBL,X          ;day set, show first letter of day
6900  A678   80 02                      BRA      DP13
6901  A67A   A9 2D           DP12:      LDA      #'-'             ;day not set, show -
6902  A67C   20 10 A3        DP13:      JSR      DCHAR
6903  A67F   E8                         INX
6904  A680   E0 07                      CPX      #7
6905  A682   D0 ED                      BNE      DP11
6906  A684   60                         RTS
6907
6908
6909  A685   20 D8 A6        D3D:       JSR      BINDEC           ;display byte in A as 3 digits
6910  A688   A5 6F                      LDA      DIGIT
6911  A68A   C9 30                      CMP      #'0'
6912  A68C   D0 07                      BNE      D31
6913  A68E   A9 20                      LDA      #' '
6914  A690   20 10 A3                   JSR      DCHAR
6915  A693   80 1C                      BRA      D2D
6916  A695   A5 6F           D31:       LDA      DIGIT
6917  A697   20 10 A3                   JSR      DCHAR
6918  A69A   80 29                      BRA      D2N1
6919
6920  A69C   20 D8 A6        D2D:       JSR      BINDEC           ;dispay byte in A is 2 digits, 99 max.
6921  A69F   A5 6F                      LDA      DIGIT
6922  A6A1   C9 30                      CMP      #'0'
6923  A6A3   F0 0C                      BEQ      D20
6924  A6A5   A9 39                      LDA      #'9'
6925  A6A7   20 10 A3                   JSR      DCHAR
6926  A6AA   A9 39                      LDA      #'9'
6927  A6AC   20 10 A3                   JSR      DCHAR
6928  A6AF   80 10                      BRA      D21
6929  A6B1   A5 70           D20:       LDA      DIGIT+1
6930  A6B3   C9 30                      CMP      #'0'
6931  A6B5   D0 02                      BNE      D22
6932  A6B7   A9 20                      LDA      #' '
6933  A6B9   20 10 A3        D22:       JSR      DCHAR
6934  A6BC   A5 71           D23:       LDA      DIGIT+2
6935  A6BE   20 10 A3                   JSR      DCHAR
6936  A6C1   60              D21:       RTS
6937
6938  A6C2   20 D8 A6        D2NS:      JSR      BINDEC           ;display byte in A as 2 digits
6939  A6C5   A5 70           D2N1:      LDA      DIGIT+1          ;no leading 0 supression
6940  A6C7   20 10 A3                   JSR      DCHAR
6941  A6CA   A5 71                      LDA      DIGIT+2
6942  A6CC   20 10 A3                   JSR      DCHAR
6943  A6CF   60                         RTS
6944
6945  A6D0   AA              BINDEC:    TAX                       ;convert byte in A to 3 digits at DIGIT
6946  A6D1   A9 30                      LDA      #'0'
6947  A6D3   85 6F                      STA      DIGIT
6948  A6D5   85 70                      STA      DIGIT+1
6949  A6D7   85 71                      STA      DIGIT+2
6950  A6D9   8A              BD0:       TXA
6951  A6DA   38                         SEC
6952  A6DB   E9 64                      SBC      #100
```

```
6953  A6DD  90 05              BCC   DD1
6954  A6DF  AA                 TAX         ;if >=100, then inc DIGIT
6955  A6E0  E6 6F              INC   DIGIT
6956  A6E2  80 F5              BRA   DD0
6957  A6E4  8A        DD1:     TXA
6958  A6E5  38                 SEC
6959  A6E6  E9 0A              SBC   #10
6960  A6E8  90 05              BCC   DD2
6961  A6EA  AA                 TAX         ;if >=10, then inc DIGIT+1
6962  A6EB  E6 70              INC   DIGIT+1
6963  A6ED  80 F5              BRA   DD1
6964  A6EF  8A        DD2:     TXA         ;<10, add to DIGIT+2
6965  A6F0  18                 CLC
6966  A6F1  65 71              ADC   DIGIT+2
6967  A6F3  85 71              STA   DIGIT+2
6968  A6F5  60                 RTS
6969
6970            OBJCLEAR:                  ;clear the object area
6971  A6F6  A2 AB              LDX   #171  ;all 172 bytes
6972  A6F8  A9 00              LDA   #0
6973  A6FA  9D 40 15  OC1:     STA   OBJBASE,X
6974  A6FD  CA                 DEX
6975  A6FE  D0 FA              BNE   OC1
6976  A700  9C 40 15           STZ   OBJBASE
6977  A703  9C EC 15           STZ   NSTARTS
6978  A706  60                 RTS
6979
6980            S20:                       ;move source code to object area
6981                                       ;in: SOURCE
6982  A707  A6 BB              LDX   SOURCE
6983  A709            DBLX
6991  A70F  BD 02 F8           LDA   SOURCEADDR,X  ;move valve settings from source
6992  A712  85 75              STA   SRCPTR
6993  A714  BD 03 F8           LDA   SOURCEADDR+1,X
6994  A717  85 76              STA   SRCPTR+1
6995  A719  BD 1A F8           LDA   OBJECTADDR,X  ;to object
6996  A71C  85 77              STA   DESTPTR
6997  A71E  BD 1B F8           LDA   OBJECTADDR+1,X
6998  A721  85 78              STA   DESTPTR+1
6999  A723  BD 2C F8           LDA   SOURCELEN,X
7000  A726  85 73              STA   CTR
7001  A728  BD 2D F8           LDA   SOURCELEN+1,X
7002  A72B  85 74              STA   CTR+1
7003  A72D  20 5B A7           JSR   BLOCK_MOVE
7004  A730  60                 RTS
7005
7006            O2S:                       ;move object back to source
7007  A731  A6 BB              LDX   SOURCE
7008  A733            DBLX
7016  A739  BD 1A F8           LDA   OBJECTADDR,X  ;move valve settings from object
7017  A73C  85 75              STA   SRCPTR
7018  A73E  BD 1B F8           LDA   OBJECTADDR+1,X
7019  A741  85 76              STA   SRCPTR+1
7020  A743  BD 02 F8           LDA   SOURCEADDR,X  ;to source
7021  A746  85 77              STA   DESTPTR
7022  A748  BD 03 F8           LDA   SOURCEADDR+1,X
7023  A74B  85 78              STA   DESTPTR+1
7024  A74D  BD 2C F8           LDA   SOURCELEN,X
7025  A750  85 73              STA   CTR
7026  A752  BD 2D F8           LDA   SOURCELEN+1,X
7027  A755  85 74              STA   CTR+1
7028  A757  20 5B A7           JSR   BLOCK_MOVE
7029  A75A  60                 RTS
7030
7031
7032            BLOCK_MOVE:                ;move CTR bytes from SRCPTR to DESTPTR
7033  A75B  A5 73              LDA   CTR           ;while CTR <>0,
7034  A75D  05 74              ORA   CTR+1
7035  A75F  F0 1A              BEQ   BLDONE
```

```
7036  A761  B2 75              LDA   (SRCPTR)     ;move data
7037  A763  92 77              STA   (DESTPTR)
7038  A765  E6 75              INC   SRCPTR       ;inc source addr
7039  A767  D0 02              BNE   BL1
7040  A769  E6 76              INC   SRCPTR+1
7041  A76B  E6 77        BL1:  INC   DESTPTR      ;inc destination addr
7042  A76D  D0 02              BNE   BL2
7043  A76F  E6 78              INC   DESTPTR+1
7044  A771  A5 73        BL2:  LDA   CTR          ;dec 16 bit counter
7045  A773  D0 02              BNE   BL3
7046  A775  C6 74              DEC   CTR+1
7047  A777  C6 73        BL3:  DEC   CTR
7048  A779  80 EB              BRA   BLOCK_MOVE
7049  A77B  60           BLDONE: RTS
7050
7051
7052                    GETTIME:                  ;get time
7053                                              ;in: CURSOR, time in IBFR+4
7054                                              ;out: time in IBFR+4, carry set if HELP key
7055  A77C                     FAST  NOKEY
7061  A784              GT0:   NOBLINK            ;get hour
7065  A788                     ANFAST
7069  A78C  A5 65              LDA   IBFR+4       ;show selected hour
7070  A78E  F0 09              BEQ   GT5
7071  A790  C9 0D              CMP   #13
7072  A792                     BLT   GT6
7075  A794  38                 SEC
7076  A795  E9 0C              SBC   #12
7077  A797  80 02              BRA   GT6
7078  A799  A9 0C        GT5:  LDA   #12
7079  A79B  20 9C A6     GT6:  JSR   D2D
7080  A79E  A9 3A              LDA   #':'
7081  A7A0  20 18 A3           JSR   DCHAR
7082  A7A3  A5 65              LDA   IBFR+4
7083  A7A5  D0 07              BNE   GT1
7084  A7A7                     MESSAGE 144        ;midnite, hr=0
7088  A7AC  80 29              BRA   GT10
7089  A7AE  C9 0C        GT1:  CMP   #12
7090  A7B0  D0 07              BNE   GT2
7091  A7B2                     MESSAGE 145        ;noon, hr=12
7095  A7B7  80 1E              BRA   GT10
7096  A7B9  A9 20        GT2:  LDA   #' '
7097  A7BB  20 18 A3           JSR   DCHAR
7098  A7BE  A9 20              LDA   #' '
7099  A7C0  20 18 A3           JSR   DCHAR
7100  A7C3  A5 65              LDA   IBFR+4
7101  A7C5  C9 0C              CMP   #12
7102  A7C7                     BLT   GT3
7105  A7C9  A9 70              LDA   #'p'         ;pm, hr>12
7106  A7CB  80 02              BRA   GT4
7107  A7CD  A9 61        GT3:  LDA   #'a'         ;am, hr<12
7108  A7CF  20 18 A3     GT4:  JSR   DCHAR
7109  A7D2  A9 6D              LDA   #'m'
7110  A7D4  20 18 A3           JSR   DCHAR
7111  A7D7              GT10:  BACKUP 7
7115  A7DC                     UL                 ;use underline
7122  A7E2  20 06 AB     GT22: JSR   GETKEY       ;wait for an answer
7123  A7E5  C9 20              CMP   #OKKEY
7124  A7E7  F0 16              BEQ   GT25         ;ok
7125  A7E9  C9 18              CMP   #NOKEY
7126  A7EB  F0 06              BEQ   GT23         ;change
7127  A7ED  C9 0B              CMP   #HELPKEY
7128  A7EF  F0 4A              BEQ   GTHELP
7129  A7F1  80 EF              BRA   GT22
7130  A7F3  E6 65        GT23: INC   IBFR+4       ;next
7131  A7F5  A5 65              LDA   IBFR+4
7132  A7F7  C9 18              CMP   #24
7133  A7F9  D0 89              BNE   GT0
7134  A7FB  64 65              STZ   IBFR+4
```

```
7135  A7FD  80 85              BRA       GT0
7136  A7FF  20 BE A5   GT25:   JSR       DISPTIME      ;show selected hour in am/pm format
7137  A802                     BACKUP    4
7141
7142  A807              GT30:  NOBLINK                 ;get minute
7146  A80B  A5 66              LDA       IBFR+5
7147  A80D  20 C2 A6           JSR       D2NS
7148  A810                     BACKUP    2
7152  A815                     UL                      ;use underline
7159  A81B  20 06 A8   GT32:   JSR       GETKEY        ;wait for an answer
7160  A81E  C9 20              CMP       #OKKEY
7161  A820  F0 16              BEQ       GTOK          ;minute ok
7162  A822  C9 10              CMP       #NOKEY
7163  A824  F0 06              BEQ       GT33          ;change minute
7164  A826  C9 0B              CMP       #HELPKEY
7165  A828  F0 11              BEQ       GTHELP
7166  A82A  80 EF              BRA       GT32
7167  A82C  E6 66      GT33:   INC       IBFR+5        ;next minute
7168  A82E  A5 66              LDA       IBFR+5
7169  A830  C9 3C              CMP       #60
7170  A832  D0 D3              BNE       GT30
7171  A834  64 66              STZ       IBFR+5
7172  A836  80 CF              BRA       GT30
7173  A838  18         GTOK:   CLC
7174  A839  80 01              BRA       GT3A
7175  A83B  38         GTHELP: SEC
7176  A83C             GT3A:   ANOFF
7179  A83E  60                 RTS
7180
7181
7182             GETDURB:                              ;get duration, 8hr. max
7183  A83F  A9 08              LDA       #8
7184  A841  85 E1              STA       R5
7185  A843  80 04              BRA       GU0
7186
7187             GETDURATION:                          ;get duration in hr, min
7188                                                   ;in: CURSOR, time in IBFR+4
7189                                                   ;out: time in IBFR+4, carry set if HELP key
7190  A845  A9 04              LDA       #4
7191  A847  85 E1              STA       R5
7192  A849             GU0:    FAST      NOKEY
7198  A851             GU20:   NOBLINK                 ;get hour
7202  A855                     ANFAST
7206  A859  A5 65              LDA       IBFR+4
7207  A85B  09 30              ORA       #ASCMASK
7208  A85D  20 10 A3           JSR       DCHAR
7209  A860  A9 68              LDA       #'h'
7210  A862  20 10 A3           JSR       DCHAR
7211  A865  A9 2B              LDA       #'+'
7212  A867  20 10 A3           JSR       DCHAR
7213  A86A  A5 65              LDA       IBFR+4
7214  A86C  C5 E1              CMP       R5            ;if 4hr, show 4:00
7215  A86E  D0 07              BNE       GU10
7216  A870  A9 00              LDA       #0
7217  A872  20 C2 A6           JSR       D2NS
7218  A875  80 05              BRA       GU11
7219  A877  A5 66      GU10:   LDA       IBFR+5
7220  A879  20 9C A6           JSR       B2D
7221  A87C  A9 6D      GU11:   LDA       #'m'
7222  A87E  20 10 A3           JSR       DCHAR
7223  A881                     BACKUP    6
7227  A886                     UL                      ;use underline
7234  A88C  20 06 A8   GU22:   JSR       GETKEY        ;wait for an answer
7235  A88F  C9 20              CMP       #OKKEY
7236  A891  F0 19              BEQ       GU28          ;hour ok
7237  A893  C9 10              CMP       #NOKEY
7238  A895  F0 06              BEQ       GU23          ;change hour
7239  A897  C9 0B              CMP       #HELPKEY
7240  A899  F0 54              BEQ       GUHELP
```

```
7241  A89B  80 EF              BRA     GU22
7242  A89D  E6 65      GU23:   INC     IBFR+4          ;next hour
7243  A89F  A5 65              LDA     IBFR+4
7244  A8A1  38                 SEC
7245  A8A2  E9 01              SBC     #1
7246  A8A4  C5 E1              CMP     R5
7247  A8A6  D0 A9              BNE     GU28
7248  A8A8  64 65              STZ     IBFR+4
7249  A8AA  80 A5              BRA     GU28
7250  A8AC  A5 65      GU28:   LDA     IBFR+4
7251  A8AE  C5 E1              CMP     R5
7252  A8B0  D0 04              BNE     GU29
7253  A8B2  64 66              STZ     IBFR+5
7254  A8B4  80 36              BRA     GUOK
7255  A8B6             GU29:   SKIP    3
7259  A8BB             GU30:   NOBLINK                 ;get minute
7263  A8BF  A5 66              LDA     IBFR+5
7264  A8C1  20 9C A6           JSR     D2D
7265  A8C4                     BACKUP  2
7269  A8C9                     UL                      ;use underline
7276  A8CF  20 06 AB   GU32:   JSR     GETKEY          ;wait for an answer
7277  A8D2  C9 20              CMP     #OKKEY
7278  A8D4  F0 16              BEQ     GUOK            ;minute ok
7279  A8D6  C9 10              CMP     #NOKEY
7280  A8D8  F0 06              BEQ     GU33            ;change minute
7281  A8DA  C9 0B              CMP     #HELPKEY
7282  A8DC  F0 11              BEQ     GUHELP
7283  A8DE  80 EF              BRA     GU32
7284  A8E0  E6 66      GU33:   INC     IBFR+5          ;next minute
7285  A8E2  A5 66              LDA     IBFR+5
7286  A8E4  C9 3C              CMP     #60
7287  A8E6  D0 D3              BNE     GU30
7288  A8E8  64 66              STZ     IBFR+5
7289  A8EA  80 CF              BRA     GU30
7290  A8EC  18         GUOK:   CLC
7291  A8ED  80 01              BRA     GU3A
7292  A8EF  38         GUHELP: SEC
7293  A8F0             GU3A:   ANDFF
7296  A8F2  60                 RTS
7297
7298                   GETNUM10:                       ;increment by 10
7299  A8F3  A9 0A              LDA     #10
7300  A8F5  85 BF              STA     R4
7301  A8F7  80 04              BRA     GNUM
7302
7303
7304                   GETNUM:                         ;get a number from the user
7305                                                   ;in: IBFR=present number
7306                                                   ;    IBFR+1=lo limit
7307                                                   ;    IBFR+2=upper limit
7308                                                   ;    CURSOR
7309                                                   ;out: carry clear:
7310                                                   ;    IBFR,A = selected number
7311                                                   ;    carry set:
7312                                                   ;    HELP requested, IBFR=number
7313  A8F9                     SET     R4
7317  A8FD             GNUM:   FAST    NOKEY
7323  A905             GN0:    NOBLINK
7327  A909                     ANFAST
7331  A90D  A5 61              LDA     IBFR            ;if num>upper limit
7332  A90F  C5 63              CMP     IBFR+2
7333  A911                     BLT     GN1
7336  A913  F0 04              BEQ     GN1
7337  A915  A5 62              LDA     IBFR+1          ;then num=lo limit
7338  A917  85 61              STA     IBFR
7339  A919  A5 63      GN1:    LDA     IBFR+2          ;if num>=100
7340  A91B  C9 64              CMP     #100
7341  A91D                     BLT     GN2
7344  A91F  A5 61              LDA     IBFR            ;then display 3 digits
```

```
7345  A921  20 85 A6            JSR     D3D
7346  A924                      BACKUP  3
7350  A929  80 1C                BRA     GN4
7351  A92B  C9 0A       GN2:    CMP     #10           ;if num>=10
7352  A92D                      BLT     GN3
7355  A92F  A5 61                LDA     IBFR          ;then display 2 digits
7356  A931  20 9C A6             JSR     D2D
7357  A934                      BACKUP  2
7361  A939  80 0C                BRA     GN4
7362  A93B  A5 61       GN3:    LDA     IBFR
7363  A93D  09 30                ORA     #ASCMASK      ;else display 1 digit
7364  A93F  20 1D A3             JSR     DCHAR
7365  A942                      BACKUP  1
7369  A947        GN4:    UL
7376  A94D  20 06 AB    GN5:    JSR     GETKEY        ;wait for key
7377  A950  C9 20                CMP     #OKKEY
7378  A952  F0 11                BEQ     GNOK
7379  A954  C9 08                CMP     #HELPKEY
7380  A956  F0 12                BEQ     GNHELP
7381  A958  C9 10                CMP     #NOKEY
7382  A95A  D0 F1                BNE     GN5
7383  A95C  A5 61                LDA     IBFR          ;NO key, inc num
7384  A95E  18                   CLC
7385  A95F  65 BF                ADC     R4
7386  A961  85 61                STA     IBFR
7387  A963  80 A8                BRA     GN0
7388  A965  A5 61       GNOK:   LDA     IBFR          ;OK, return num and carry clear
7389  A967  18                   CLC
7390  A968  80 01                BRA     GN6
7391  A96A  38          GNHELP: SEC                   ;HELP, return carry set
7392  A96B              GN6:    ANOFF
7395  A96D  60                   RTS
7396
7397                           ;get a selection via messages with auto NO key
7398                           ;in: IBFR=present selection
7399                           ;     IBFR+1=lo limit
7400                           ;     IBFR+2=upper limit
7401                           ;     IBFR+3=msg number for lo limit
7402                           ;     (all messages must be same length)
7403                           ;     CURSOR
7404                           ;out: carry clear:
7405                           ;     IBFR,A = selected number
7406                           ;     carry set:
7407                           ;     HELP requested, IBFR=number
7408
7409  A96E  A9 01       GETMUL: LDA     #1            ;use medium speed and underline
7410  A970  8D 73 02             STA     SEL1
7411  A973  A9 02                LDA     #2
7412  A975  8D 74 02             STA     SEL2
7413  A978  80 18                BRA     GM
7414
7415  A97A  A9 05       GETSOK: LDA     #5            ;use slow speed and OK char
7416  A97C  8D 73 02             STA     SEL1
7417  A97F  A9 01                LDA     #1
7418  A981  8D 74 02             STA     SEL2
7419  A984  80 0C                BRA     GM
7420
7421  A986  A9 05       GETMOK: LDA     #5            ;use medium speed and OK char
7422  A988  8D 73 02             STA     SEL1
7423  A98B  A9 02                LDA     #2
7424  A98D  8D 74 02             STA     SEL2
7425  A990  80 00                BRA     GM
7426
7427  A992              GM:     SLOW    NOKEY
7433  A99A                      NOBLINK               ;turn off blinking char
7437  A99E  AD 74 02             LDA     SEL2          ;turn on auto NO key
7438  A9A1  85 E2                STA     INTCMD
7439  A9A3  A5 4B                LDA     CURSOR        ;save starting cursor location
7440  A9A5  8D 74 02             STA     SEL2
```

```
7441  A9A8  A5 61      GM0:    LDA     IBFR            ;if num>upper limit
7442  A9AA  C5 63              CMP     IBFR+2
7443  A9AC             BLT     GM1
7446  A9AE  F0 04              BEQ     GM1
7447  A9B0  A5 62              LDA     IBFR+1          ;then num=lo limit
7448  A9B2  85 61              STA     IBFR
7449  A9B4  A5 64      GM1:    LDA     IBFR+3          ;display msg for num
7450  A9B6  18                 CLC
7451  A9B7  65 61              ADC     IBFR
7452  A9B9  38                 SEC
7453  A9BA  E5 62              SBC     IBFR+1
7454  A9BC  AA                 TAX
7455  A9BD  20 D7 A2           JSR     DISPLAY_MSG
7456  A9C0  84 41              STY     LSB             ;save message length
7457  A9C2  AD 74 02           LDA     SEL2            ;put cursor at beginning of msg
7458  A9C5  20 BC A3           JSR     LCD_ADDR
7459  A9C8  AD 73 02           LDA     SEL1            ;turn on blinking char
7460  A9CB  85 6C              STA     BLINK
7461  A9CD  64 6B              STZ     INTCTR
7462  A9CF  20 06 AB   GM5:    JSR     GETKEY          ;wait for key
7463  A9D2  C9 20              CMP     #OKKEY
7464  A9D4  F0 17              BEQ     GMOK
7465  A9D6  C9 0B              CMP     #HELPKEY
7466  A9D8  F0 18              BEQ     GMHELP
7467  A9DA  C9 1D              CMP     #NOKEY
7468  A9DC  D0 F1              BNE     GM5
7469  A9DE  E6 61              INC     IBFR            ;NO key; inc num
7470  A9E0  A6 41              LDX     LSB             ;erase message
7471  A9E2  20 C2 AD           JSR     SPACES
7472  A9E5  AD 74 02           LDA     SEL2
7473  A9E8  20 BC A3           JSR     LCD_ADDR
7474  A9EB  80 BB              BRA     GM0
7475  A9ED  A5 61      GMOK:   LDA     IBFR            ;OK, return num and carry clear
7476  A9EF  18                 CLC
7477  A9F0  80 01              BRA     GM6
7478  A9F2  38         GMHELP: SEC                     ;HELP, return carry set
7479  A9F3  20 92 A3   GM6:    JSR     KEY_RESET       ;turn off auto keys
7480  A9F6  60                 RTS
7481
7482                   NEXTSTART:                      ;move STARTPTR to next start time
7483  A9F7  18                 CLC
7484  A9F8  A5 7B              LDA     STARTPTR
7485  A9FA  69 08              ADC     #8
7486  A9FC  85 7B              STA     STARTPTR
7487  A9FE  A5 7C              LDA     STARTPTR+1
7488  AA00  69 00              ADC     #0
7489  AA02  85 7C              STA     STARTPTR+1
7490  AA04  E6 7A              INC     STARTCTR
7491  AA06  60                 RTS
7492
7493                   FIRSTSTART:                     ;set pointers to beginning of obj starts
7494  AA07             LDW     STARTPTR,STARTS
7500  AA0F  64 7A              STZ     STARTCTR
7501  AA11  60                 RTS
7502
7503                   INC_HWRITE:                     ;point to next entry in history
7504                                                   ;out: carry set if wraparound
7505  AA12  A5 B7              LDA     HWRITE          ;if pointer = end,
7506  AA14  C9 F8              CMP     #<HEND
7507  AA16  D0 11              BNE     IH2
7508  AA18  A5 B8              LDA     HWRITE+1
7509  AA1A  C9 1F              CMP     #>HEND
7510  AA1C  D0 0B              BNE     IH2
7511  AA1E             LDW     HWRITE,HISTORY  ;then reset to beginning
7517  AA26  38                 SEC
7518  AA27  80 0E              BRA     IH3
7519  AA29  A5 B7      IH2:    LDA     HWRITE          ;else inc 16 bit pointer
7520  AA2B  18                 CLC
7521  AA2C  69 08              ADC     #8
```

```
7522  AA2E  85 B7              STA   HWRITE
7523  AA30  A5 B8              LDA   HWRITE+1
7524  AA32  69 00              ADC   #0
7525  AA34  85 B8              STA   HWRITE+1
7526  AA36  18                 CLC
7527  AA37  A9 00       IH3:   LDA   #0            ;mark entry as empty
7528  AA39  92 B7              STA   (HWRITE)
7529  AA3B  60                 RTS
7530
7531                    INC_HREAD:                  ;point to next entry in history
7532  AA3C  A5 B5              LDA   HREAD         ;if pointer = end,
7533  AA3E  C9 F8              CMP   #<HEND
7534  AA40  D0 10              BNE   IR2
7535  AA42  A5 B6              LDA   HREAD+1
7536  AA44  C9 1F              CMP   #>HEND
7537  AA46  D0 0A              BNE   IR2
7538  AA48                     LDW   HREAD,HISTORY ;then reset to beginning
7544  AA50  80 0D              BRA   IR3
7545  AA52  A5 B5       IR2:   LDA   HREAD         ;else inc 16 bit pointer
7546  AA54  18                 CLC
7547  AA55  69 08              ADC   #8
7548  AA57  85 B5              STA   HREAD
7549  AA59  A5 B6              LDA   HREAD+1
7550  AA5B  69 00              ADC   #0
7551  AA5D  85 B6              STA   HREAD+1
7552  AA5F  60          IR3:   RTS
7553
7554                    GETHPTR:                    ;move history ptr for valve
7555  AA60  A6 49              LDX   VALVE         ;to HPTR
7556  AA62                     DBLX
7564  AA6B  B5 A3              LDA   HPTR,X
7565  AA6A  85 A3              STA   HPTR
7566  AA6C  B5 A4              LDA   HPTR+1,X
7567  AA6E  85 A4              STA   HPTR+1
7568  AA70  60                 RTS
7569
7570
7571                    HOPEND:                     ;open a history entry for date stamp
7572  AA71  A9 80              LDA   #$80          ;key
7573  AA73  92 B7              STA   (HWRITE)
7574  AA75  A0 01              LDY   #1
7575  AA77  AD 78 02           LDA   DOW           ;day of week
7576  AA7A  91 B7              STA   (HWRITE),Y
7577  AA7C  C8                 INY
7578  AA7D  AD 79 02           LDA   MONTH         ;month
7579  AA80  91 B7              STA   (HWRITE),Y
7580  AA82  85 B9              STA   HDATE
7581  AA84  C8                 INY
7582  AA85  AD 7A 02           LDA   DAY           ;day
7583  AA88  91 B7              STA   (HWRITE),Y
7584  AA8A  85 BA              STA   HDATE+1
7585  AA8C  C8                 INY
7586  AA8D  AD 7B 02           LDA   YEAR          ;year
7587  AA90  91 B7              STA   (HWRITE),Y
7588  AA92  20 12 AA           JSR   INC_HWRITE
7589  AA95  60                 RTS
7590
7591                    HOPENM:                     ;open history for menu
7592  AA96  AD 7A 02           LDA   DAY           ;stamp date if needed
7593  AA99  C5 BA              CMP   HDATE+1
7594  AA9B  D0 07              BNE   HOP2
7595  AA9D  AD 79 02           LDA   MONTH
7596  AAA0  C5 B9              CMP   HDATE
7597  AAA2  F0 03              BEQ   HOP1
7598  AAA4  20 71 AA    HOP2:  JSR   HOPEND
7599  AAA7  B2 5A       HOP1:  LDA   (MENUPTR)
7600  AAA9  09 40              ORA   #00100000B    ;key=menu+MODE
7601  AAAB  92 B7              STA   (HWRITE)
7602  AAAD  A0 01              LDY   #1
```

```
7603  AAAF  AD 76 02            LDA    HOUR           ;hour
7604  AAB2  91 B7               STA    (HWRITE),Y
7605  AAB4  C8                  INY
7606  AAB5  AD 77 02            LDA    MINUTE         ;minute
7607  AAB8  91 B7               STA    (HWRITE),Y
7608  AABA  A0 01               LDY    #1
7609  AABC  B1 5A               LDA    (MENUPTR),Y    ;mode+1
7610  AABE  A0 03               LDY    #3
7611  AAC0  91 B7               STA    (HWRITE),Y
7612  AAC2  A0 03               LDY    #3
7613  AAC4  B1 5A               LDA    (MENUPTR),Y    ;msg #
7614  AAC6  A0 04               LDY    #4
7615  AAC8  91 B7               STA    (HWRITE),Y
7616  AACA  20 12 AA             JSR    INC_HWRITE
7617  AACD  60                  RTS
7618
7619              HOPENF:                             ;open history for function
7620                                                  ;in: A=function #
7621  AACE  48                  PHA
7622  AACF  AD 7A 02            LDA    DAY            ;stamp date if needed
7623  AAD2  C5 BA               CMP    HDATE+1
7624  AAD4  D0 07               BNE    H02
7625  AAD6  AD 79 02            LDA    MONTH
7626  AAD9  C5 B9               CMP    HDATE
7627  AADB  F0 03               BEQ    H01
7628  AADD  20 71 AA    H02:    JSR    HOPEND
7629  AAE0  68         H01:    PLA                   ;all functions
7630  AAE1  48                  PHA
7631  AAE2  09 C0               ORA    #11000000B     ;key=function
7632  AAE4  92 B7               STA    (HWRITE)
7633  AAE6  A0 01               LDY    #1
7634  AAE8  AD 76 02            LDA    HOUR           ;hour
7635  AAEB  91 B7               STA    (HWRITE),Y
7636  AAED  C8                  INY
7637  AAEE  AD 77 02            LDA    MINUTE         ;minute
7638  AAF1  91 B7               STA    (HWRITE),Y
7639  AAF3  68                  PLA
7640  AAF4  C9 01               CMP    #1             ;if SVL,
7641  AAF6  D0 0A               BNE    H03
7642  AAF8  A5 41               LDA    LSB            ;then store duration of SVL
7643  AAFA  C8                  INY
7644  AAFB  91 B7               STA    (HWRITE),Y
7645  AAFD  A5 42               LDA    MSB
7646  AAFF  C8                  INY
7647  AB00  91 B7               STA    (HWRITE),Y
7648  AB02  20 12 AA    H03:    JSR    INC_HWRITE
7649  AB05  60                  RTS
7650
7651              GETKEY:                             ;look for a key pressed or programmer
7652                                                  ;removed
7653                                                  ;out: key in A
7654  AB06  A5 5D               LDA    KEYPRESS       ;look for key
7655  AB08  F0 17               BEQ    GTK2
7656  AB0A  C9 01               CMP    #STOPKEY       ;if STOP key
7657  AB0C  D0 03               BNE    GTK0
7658  AB0E  4C 46 86            JMP    FSTOP          ;then go to function select
7659  AB11  C9 80      GTK0:    CMP    #10000000B     ;if power key removed
7660  AB13  D0 03               BNE    GTK1
7661  AB15  4C A1 81            JMP    NO_BATT        ;then do orderly shut down
7662  AB18  C9 81      GTK1:    CMP    #10000001B     ;if low-batt then deal with it
7663  AB1A  D0 03               BNE    GTK3
7664  AB1C  4C 7B 81            JMP    BATT_LOW
7665  AB1F  64 5D      GTK3:    STZ    KEYPRESS       ;otherwise get ready for next key
7666  AB21  60         GTK2:    RTS                   ;return the key pressed in A
7667
7668              SCROLL_MSG:                         ;scroll group of screens
7669                                                  ;in: HELPNUM=index into SCROLLTBL
7670                                                  ;out: return when NO key
7671  AB22  A9 03               LDA    #3
```

```
7672  AB24  48           SLL10: PHA
7673  AB25  20 82 A3            JSR    DKCLR           ;blink a blank screen
7674  AB28  A0 C8               LDY    #$C8
7675  AB2A  20 C0 A2            JSR    WAITMS
7676  AB2D  A6 72               LDX    HELPNUM
7677  AB2F                      DBLX
7685  AB35  90 0C               BCC    SLL11
7686  AB37  BD AD F6            LDA    SCROLLTBL1,X
7687  AB3A  85 43               STA    MSGPTR          ;MSGPTR points to msg
7688  AB3C  BD AE F6            LDA    SCROLLTBL1+1,X
7689  AB3F  85 44               STA    MSGPTR+1
7690  AB41  80 0A               BRA    SLL12
7691  AB43  BD AF F5     SLL11: LDA    SCROLLTBL,X
7692  AB46  85 43               STA    MSGPTR          ;MSGPTR points to msg
7693  AB48  BD B0 F5            LDA    SCROLLTBL+1,X
7694  AB4B  85 44               STA    MSGPTR+1
7695  AB4D  A0 00        SLL12: LDY    #0
7696  AB4F  B1 43               LDA    (MSGPTR),Y      ;set up number of screens
7697  AB51  85 D5               STA    SCREENS
7698  AB53  64 D6               STZ    SCREEN          ;start at the first
7699  AB55  64 6B               STZ    INTCTR
7700  AB57                      INC16  MSGPTR
7709  AB64  68                  PLA                    ;INT does it, BLINK=3 or 4
7710  AB65  85 6C               STA    BLINK
7711  AB67  20 9F AB     SLL0:  JSR    GETHKEY         ;stop scrolling if any key or done
7712  AB6A  F0 02               BEQ    SLL1
7713  AB6C  38                  SEC
7714  AB6D  60                  RTS                    ;set carry if NO key
7715  AB6E  A5 6C        SLL1:  LDA    BLINK
7716  AB70  D0 F5               BNE    SLL0
7717  AB72  18                  CLC                    ;carry clear if done
7718  AB73  60                  RTS
7719
7720                     HELP_MSG:                     ;do a scrolling msg, ask for repeat
                                LDA    KEYMASK
7721  AB74  A5 5E
7722  AB76  48                  PHA
7723  AB77  A9 39               LDA    #00111001B      ;any key stops help message
7724  AB79  85 5E               STA    KEYMASK
7725  AB7B  A9 04        SLL4:  LDA    #4
7726  AB7D  20 24 AB            JSR    SLL10
7727  AB80  B0 18               BCS    ENDX            ;scroll msg was aborted
7728  AB82                      OH
7733  AB88  20 9F AB     SLL5:  JSR    GETHKEY         ;repeat the message?
7734  AB8B  F0 FB               BEQ    SLL5
7735  AB8D  C9 20               CMP    #OKKEY
7736  AB8F  F0 EA               BEQ    SLL4            ;OK, repeat msg
7737  AB91  C9 01               CMP    #STOPKEY
7738  AB93  F0 05               BEQ    ENDX
7739  AB95  68           ENDH:  PLA                    ;any other key ends help
7740  AB96  85 5E               STA    KEYMASK
7741  AB98  18                  CLC
7742  AB99  60                  RTS
7743  AB9A  68           ENDX:  PLA                    ;aborted exit
7744  AB9B  85 5E               STA    KEYMASK
7745  AB9D  38                  SEC
7746  AB9E  60                  RTS
7747                     GETHKEY:                      ;out: key in A
7748  AB9F  A5 5D               LDA    KEYPRESS        ;look for key
7749  ABA1  F0 03               BEQ    GTH2            ;no key
7750  ABA3  4C 11 AB            JMP    GTK0            ;check if batt low or removed
7751  ABA6  60           GTH2:  RTS                    ;return the key pressed in A
7752
7753  ABA7  A9 3E        MSGWAIT: LDA  #SRATE2         ;wait while msg is being read
```

```
7754  ABA9  85 47              STA   TIMCTR2
7755  ABAB  20 86 AB    MSGW:  JSR   GETKEY      ;but allow STOP key
7756  ABAE  A5 47              LDA   TIMCTR2
7757  ABB0  D0 F9              BNE   MSGW
7758  ABB2  60                 RTS
7759
7760
7761              HM2MIN:                         ;convert hr, min to 16 bit minutes
7762                                              ;in: IBFR+4=hr, IBFR+5=min
7763                                              ;out: OFFSET= minutes
7764  ABB3  A6 65              LDX   IBFR+4
7765  ABB5  64 D0              STZ   OFFSET+1
7766  ABB7  A5 66              LDA   IBFR+5
7767  ABB9  85 CF              STA   OFFSET      ;leftover minutes
7768  ABBB  8A          HM0:   TXA
7769  ABBC  F0 10              BEQ   HM1
7770  ABBE  CA                 DEX
7771  ABBF  A5 CF              LDA   OFFSET      ;add 60 to minutes
7772  ABC1  18                 CLC
7773  ABC2  69 3C              ADC   #60
7774  ABC4  85 CF              STA   OFFSET
7775  ABC6  A5 D0              LDA   OFFSET+1
7776  ABC8  69 00              ADC   #0
7777  ABCA  85 D0              STA   OFFSET+1
7778  ABCC  80 ED              BRA   HM0         ;until no more hours
7779  ABCE  60          HM1:   RTS
7780
7781              MIN2HM:                         ;convert minutes to hr, min
7782                                              ;in: OFFSET= 16 bit minutes
7783                                              ;out: IBFR+4= hr, IBFR+5= min
7784  ABCF  64 65              STZ   IBFR+4
7785  ABD1  64 66              STZ   IBFR+5
7786  ABD3  A5 D0       HM2:   LDA   OFFSET+1
7787  ABD5  D0 06              BNE   HM3
7788  ABD7  A5 CF              LDA   OFFSET
7789  ABD9  C9 3C              CMP   #60
7790  ABDB                     BLT   HM4
7793  ABDD  A5 CF       HM3:   LDA   OFFSET      ;subtract 60 form total minutes
7794  ABDF  38                 SEC
7795  ABE0  E9 3C              SBC   #60
7796  ABE2  85 CF              STA   OFFSET
7797  ABE4  A5 D0              LDA   OFFSET+1
7798  ABE6  E9 00              SBC   #0
7799  ABE8  85 D0              STA   OFFSET+1
7800  ABEA  E6 65              INC   IBFR+4      ;and add 1 hr
7801  ABEC  80 E5              BRA   HM2
7802  ABEE  85 66       HM4:   STA   IBFR+5      ;remaining minutes
7803  ABF0  60                 RTS
7804
7805              INC_DAYCTR:                     ;move dayctr to next day
7806  ABF1  AD 41 15           LDA   CYCLE_TYPE
7807  ABF4  D0 12              BNE   IDA1
7808  ABF6              IDA2:  INC16 DAYNUM
7817  AC07  60          IDA3:  RTS
7818  AC08  AD 1C 03    IDA1:  LDA   DAYNUM+2    ;specific days
7819  AC0B  18                 CLC
7820  AC0C  6A                 ROR   A           ;inc day
7821  AC0D  90 F8              BCC   IDA3
7822  AC0F  A9 40              LDA   #010000000B ;a new week
7823  AC11  8D 1C 03           STA   DAYNUM+2
7824  AC14  80 E0              BRA   IDA2
7825
7826              BFR2VID:                        ;move ID bfr to valve ID
7827  AC16  A2 08              LDX   #8
7828  AC18  9E B9 02    BF0:   STZ   VALVEID,X   ;clear valve ID area
7829  AC1B  9E 7D 02           STZ   VS,X        ;and valve status
7830  AC1E  CA                 DEX
7831  AC1F  D0 F7              BNE   BF0
```

```
7832  AC21  64 DE              STZ   POSITION   ;for each position,
7833  AC23  A6 DE       BF1:   LDX   POSITION
7834  AC25  BD 5E 02           LDA   IDBFR,X    ;get the valve #
7835  AC28  F0 15              BEQ   BF2        ;if any
7836  AC2A  AA                 TAX
7837  AC2B  A5 DE              LDA   POSITION   ;store the position in valve ID
7838  AC2D  9D B9 02           STA   VALVEID,X
7839  AC30  18                 CLC              ;position duplicated in bits 3-5
7840  AC31  2A                 ROL   A
7841  AC32  2A                 ROL   A
7842  AC33  2A                 ROL   A
7843  AC34  1D B9 02           ORA   VALVEID,X
7844  AC37  9D B9 02           STA   VALVEID,X
7845  AC3A  A9 C0              LDA   #11000000B ;valve status=IDed and enabled
7846  AC3C  9D 7D 02           STA   VS,X
7847  AC3F  E6 DE       BF2:   INC   POSITION   ;until no more left
7848  AC41  A5 DE              LDA   POSITION
7849  AC43  C9 08              CMP   #8
7850  AC45  D0 DC              BNE   BF1
7851  AC47  60                 RTS
7852
7853                     VID2BFR:                ;move existing valve IDs to bfr area
7854  AC48  20 85 AC           JSR   CLR_IDBFR  ;clear bfr area
7855  AC4B                     SET   VALVE
7859  AC4F  A6 49       IB1:   LDX   VALVE      ;for each valve,
7860  AC51  BD 7D 02           LDA   VS,X       ;if there is a valid ID
7861  AC54  10 0B              BPL   IB2
7862  AC56  BD B9 02           LDA   VALVEID,X  ;move position to bfr
7863  AC59  29 07              AND   #00000111B
7864  AC5B  AA                 TAX
7865  AC5C  A5 49              LDA   VALVE
7866  AC5E  9D 5E 02           STA   IDBFR,X
7867  AC61  E6 49       IB2:   INC   VALVE      ;until no more
7868  AC63  A5 49              LDA   VALVE
7869  AC65  C9 09              CMP   #9
7870  AC67  D0 E6              BNE   IB1
7871  AC69  60                 RTS
7872
7873                     DISPID:                 ;display contents of ID bfr
7874  AC6A  64 DE              STZ   POSITION
7875  AC6C  A6 DE       DID0:  LDX   POSITION   ;in positional order (0-7)
7876  AC6E  BD 5E 02           LDA   IDBFR,X
7877  AC71  D0 04              BNE   DID1
7878  AC73  A9 2D              LDA   #'-'       ;if no valve, show special char
7879  AC75  80 02              BRA   DID2
7880  AC77  09 30       DID1:  ORA   #ASCMASK   ;else show valve #
7881  AC79  20 18 A3    DID2:  JSR   DCHAR
7882  AC7C  E6 DE              INC   POSITION
7883  AC7E  A5 DE              LDA   POSITION
7884  AC80  C9 08              CMP   #8
7885  AC82  D0 E8              BNE   DID0
7886  AC84  60                 RTS
7887
7888                     CLR_IDBFR:              ;store zeros in ID bfr
7889  AC85  A2 07              LDX   #7
7890  AC87  9E 5E 02    CI0:   STZ   IDBFR,X    ;clear bfr area
7891  AC8A  CA                 DEX
7892  AC8B  10 FA              BPL   CI0
7893  AC8D  60                 RTS
7894
7895                     ;------------------------------
7896                     ;    MENUING ROUTINES
7897                     ;------------------------------
7898
7899                     GETMENU:                ;manage program branching
7900                                             ;in: MODE, MODE+1
7901                                             ;out: branch to selected entry
7902  AC8E  A2 FF              LDX   #$FF
```

```
7903  AC9B  9A                    TXS
7904  AC91  20 82 A3              JSR   DKCLR
7905  AC94                  SLOW  NOKEY
7911  AC9C                  NOBLINK
7915  ACA8                  ANSLOW              ;use autoscroll
7919  ACA4  20 4C AD        GME0: JSR   FINDMENU ;get MENUPTR = table entry
7920  ACA7  B0 3E                 BCS   GME3     ;didn't find it
7921  ACA9  20 29 AD        GME1: JSR   SHOWMENU ;display menu screen
7922  ACAC                        OK             ;blink OK char
7927  ACB2  20 06 AB        GME7: JSR   GETKEY   ;see if key
7928  ACB5  C9 20                 CMP   #OKKEY
7929  ACB7  F0 0A                 BEQ   GMEOK
7930  ACB9  C9 0B                 CMP   #HELPKEY
7931  ACBB  F0 1A                 BEQ   GMEHELP
7932  ACBD  C9 10                 CMP   #NOKEY
7933  ACBF  F0 21                 BEQ   GME2
7934  ACC1  80 EF                 BRA   GME7
7935  ACC3  20 82 A3        GMEOK: JSR  DKCLR    ;OK, jump to selected entry
7936  ACC6  20 96 AA              JSR   HOPENM   ;tell history
7937  ACC9  A0 05                 LDY   #5
7938  ACCB  B1 5A                 LDA   (MENUPTR),Y
7939  ACCD  85 75                 STA   SRCPTR
7940  ACCF  C8                    INY
7941  ACD0  B1 5A                 LDA   (MENUPTR),Y
7942  ACD2  85 76                 STA   SRCPTR+1
7943  ACD4  6C 75 00              JMP   (SRCPTR)
7944                        GMEHELP:              ;HELP, return carry set
7945  ACD7  A0 04                 LDY   #4
7946  ACD9  B1 5A                 LDA   (MENUPTR),Y
7947  ACDB  85 72                 STA   HELPNUM
7948  ACDD  20 74 AB              JSR   HELP_MSG
7949  ACE0  80 AC                 BRA   GETMENU
7950  ACE2  20 0F AD        GME2: JSR   INCMENU  ;NO, goto next menu entry
7951  ACE5  80 BD                 BRA   GME0
7952  ACE7  A5 59           GME3: LDA   MODE+1   ;end of menu, reset to top
7953  ACE9  29 0F                 AND   #00001111B ;if lo nibble not 0,
7954  ACEB  F0 0A                 BEQ   GME5     ;(level 3 menu),
7955  ACED  A5 59                 LDA   MODE+1   ;set lo nibble to 1
7956  ACEF  29 F0                 AND   #11110000B
7957  ACF1  09 01                 ORA   #00000001B
7958  ACF3  85 59                 STA   MODE+1
7959  ACF5  80 12                 BRA   GME4
7960  ACF7  A5 59           GME5: LDA   MODE+1   ;if hi nibble not 0,
7961  ACF9  29 F0                 AND   #11110000B ;(level 2 menu),
7962  ACFB  F0 06                 BEQ   GME6
7963  ACFD  A9 10                 LDA   #$10     ;reset hi nibble to 1
7964  ACFF  85 59                 STA   MODE+1
7965  AD01  80 06                 BRA   GME4
7966  AD03                  GME6: SET   MODE     ;if main menu (level 1),
7970  AD07  80 9B                 BRA   GME0     ;reset to 1 and skip exit msg
7971  AD09  20 9B AD        GME4: JSR   ISEXIT   ;exit menu?
7972  AD0C  4C 8E AC              JMP   GETMENU
7973
7974                        INCMENU:              ;inc MODE, MODE+1
7975  AD0F  A5 59                 LDA   MODE+1   ;if lo nibble not 0,
7976  AD11  29 0F                 AND   #00001111B ;(level 3 menu),
7977  AD13  F0 03                 BEQ   IME0
7978  AD15  E6 59                 INC   MODE+1   ;inc lo nibble
7979  AD17  60                    RTS
7980  AD18  A5 59           IME0: LDA   MODE+1   ;if hi nibble not 0,
7981  AD1A  29 F0                 AND   #11110000B ;(level 2 menu),
7982  AD1C  F0 0B                 BEQ   IME1
7983  AD1E  A5 59                 LDA   MODE+1   ;inc hi nibble
7984  AD20  18                    CLC
7985  AD21  69 10                 ADC   #16
7986  AD23  85 59                 STA   MODE+1
7987  AD25  60                    RTS
7988  AD26  E6 58           IME1: INC   MODE     ;else inc main menu
```

```
7989  AD28  60              RTS
7990
7991              SHOWMENU:              ;show the screen defined by MENUPTR
7992  AD29  20 85 A3         JSR    DISPLAY_CLR
7993  AD2C  A0 02            LDY    #2
7994  AD2E  B1 5A            LDA    (MENUPTR),Y
7995  AD30  AA               TAX
7996  AD31  20 D7 A2         JSR    DISPLAY_MSG
7997  AD34  A9 3A            LDA    #':'
7998  AD36  20 10 A3         JSR    DCHAR
7999  AD39                   SET_CURSOR LINE2
8003  AD3E  A0 03            LDY    #3
8004  AD40  B1 5A            LDA    (MENUPTR),Y
8005  AD42  AA               TAX
8006  AD43  20 D7 A2         JSR    DISPLAY_MSG
8007  AD46  A9 3F            LDA    #'?'
8008  AD48  20 10 A3         JSR    DCHAR
8009  AD4B  60               RTS
8010
8011              FINDMENU:              ;in: MODE, MODE+1 out: MENUPTR
8012  AD4C  A9 AD            LDA    #<MENUTBL  ;start looking at top of table
8013  AD4E  85 5A            STA    MENUPTR
8014  AD50  A9 F6            LDA    #>MENUTBL
8015  AD52  85 5B            STA    MENUPTR+1
8016  AD54  B2 5A    FM1:    LDA    (MENUPTR)  ;if (MENUPTR)<>MODE then next
8017  AD56  C5 58            CMP    MODE
8018  AD58  D0 0A            BNE    FM2
8019  AD5A  A0 01            LDY    #1         ;if MENUPTR+1<>MODE+1 then next
8020  AD5C  B1 5A            LDA    (MENUPTR),Y
8021  AD5E  C5 59            CMP    MODE+1
8022  AD60  D0 02            BNE    FM2
8023  AD62  18               CLC               ;else found it
8024  AD63  60               RTS
8025  AD64  A5 5A    FM2:    LDA    MENUPTR    ;next menu table entry
8026  AD66  18               CLC
8027  AD67  69 07            ADC    #7
8028  AD69  85 5A            STA    MENUPTR
8029  AD6B  A5 5B            LDA    MENUPTR+1
8030  AD6D  69 00            ADC    #0
8031  AD6F  85 5B            STA    MENUPTR+1
8032  AD71  B2 5A            LDA    (MENUPTR)  ;if entry=$FF then end of table reached
8033  AD73  C9 FF            CMP    #$FF
8034  AD75  D0 DD            BNE    FM1
8035  AD77  38               SEC
8036  AD78  60               RTS
8037
8038              NA:                    ;menu selection not available
8039  AD79              HELP   0
8044  AD80  4C 8E AC         JMP    GETMENU
8045
8046              NEXTLEVEL:             ;move menu to next level down
8047  AD83  A5 59            LDA    MODE+1
8048  AD85  F0 0A            BEQ    GME1A
8049  AD87  A5 59            LDA    MODE+1     ;init level 3
8050  AD89  29 F0            AND    #11110000B
8051  AD8B  09 01            ORA    #00000001B
8052  AD8D  85 59            STA    MODE+1
8053  AD8F  80 04            BRA    GME1B
8054  AD91  A9 10    GME1A:  LDA    #$10       ;init level 2
8055  AD93  85 59            STA    MODE+1
8056  AD95  4C 8E AC GME1B:  JMP    GETMENU
8057
8058              ISEXIT:                ;go to main menu? on line 2
8059  AD98  20 C8 A3         JSR    CLR_LINE2
8060  AD9B                   MESSAGE 138
8064  ADA0                   OK
8069  ADA6  20 86 AB GME11:  JSR    GETKEY
8070  ADA9  C9 20            CMP    #OKKEY
```

```
8071  ADAB  D0 03                    BNE    GME12
8072  ADAD  4C 46 86                 JMP    FSTOP      ;yes, goto main menu
8073  ADB0  C9 10         GME12:     CMP    #NOKEY
8074  ADB2  D0 01                    BNE    GME13
8075  ADB4  60                       RTS               ;no, return
8076  ADB5  C9 08         GME13:     CMP    #HELPKEY
8077  ADB7  D0 ED                    BNE    GME11
8078  ADB9                           HELP   44
8083  ADC0  80 E4                    BRA    GME11
8084
8085  ADC2  A9 20         SPACES: LDA   #' '           ;display X spaces
8086  ADC4  20 10 A3                 JSR    DCHAR
8087  ADC7  CA                       DEX
8088  ADC8  D0 FB                    BNE    SPACES
8089  ADCA  60                       RTS
8090
8091                      ISRUNNING:                   ;return carry set if schedule is running
8092  ADCB  AD 1F 03                 LDA    RUNNING
8093  ADCE  C9 02                    CMP    #2
8094  ADD0  F0 0A                    BEQ    ISR0
8095  ADD2  C9 03                    CMP    #3
8096  ADD4  F0 06                    BEQ    ISR0
8097  ADD6  C9 04                    CMP    #4
8098  ADD8  F0 02                    BEQ    ISR0
8099  ADDA  18                       CLC
8100  ADDB  60                       RTS
8101  ADDC  38            ISR0:      SEC
8102  ADDD  60                       RTS
8103
8104
8105
8106
8107
8108
8109  ADDE                           INCLUDE    GEN.ASM
8110
8111                      ;------------------------------------
8112                      ;    PROGRAM GENERATOR
8113                      ;------------------------------------
8114
8115                      GENERATE:                    ;generate today's schedule
8116                                                   ;in: DAYNUM is the day to compile,
8117                                                   ;    setup is in object area
8118                                                   ;    WCLK=0 if AUTO, 1 if SEMI-AUTO
8119                                                   ;out: carry set and ERROR
8120                                                   ;    NSPLITS()=# of base or soak cycles
8121                                                   ;    GENTIME = starting time
8122                                                   ;    DONETIME = ending time
8123                                                   ;    NSTARTS = number of starts today
8124                                                   ;    STARTPTR points to next start to do
8125                                                   ;    STARTCTR=NSTARTS if all starts are past
8126  ADDE  9C 67 02                 STZ    CHKFLAG
8127  ADE1  A2 08         GE0:       LDX    #8         ;alt entry for checking of setup
8128  ADE3  9E 54 02      GE9:       STZ    NSPLIT,X
8129  ADE6  CA                       DEX
8130  ADE7  D0 FA                    BNE    GE9
8131  ADE9  9C 71 02                 STZ    NSYR
8132  ADEC                           SET    VALVE
8136  ADF0  A6 49         GE10:      LDX    VALVE      ;work with base water
8137  ADF2  9E 4A 02                 STZ    BASETYPE,X
8138  ADF5  BD 7D 02                 LDA    VS,X       ;ignore disabled valves
8139  ADF8  29 C0                    AND    #11000000B
8140  ADFA  C9 C0                    CMP    #11000000B
8141  ADFC  D0 2E                    BNE    GEN
8142                                                   ;DON'T FORGET TO IGNORE @ SOAK & SYRINGE
8143  ADFE  AD 41 15                 LDA    CYCLE_TYPE ;first see who's scheduled to water today
8144  AE01  D0 7B                    BNE    GE15
8145
8146  AE03  AD 1A 03      GE12:      LDA    DAYNUM     ;see if user cycle = current day or week
8147  AE06  85 52                    STA    DIVIDEND
```

| | | | | | | |
|---|---|---|---|---|---|---|
|8148|AE08|AD 1B 03| |LDA|DAYNUM+1| |
|8149|AE0B|85 53| |STA|DIVIDEND+1| |
|8150|AE0D|C6 52| |DEC|DIVIDEND|;if DAYNUM=1, (first day or week)|
|8151|AE0F|A5 52| |LDA|DIVIDEND|;everything is scheduled|
|8152|AE11|05 53| |ORA|DIVIDEND+1| |
|8153|AE13|F0 25| |BEQ|GEV| |
|8154|AE15|A6 49| |LDX|VALVE| |
|8155|AE17| | |DBLX| | |
|8163|AE1D|BD 6A 15| |LDA|CYCLE1,X| |
|8164|AE20|85 54| |STA|DIVISOR| |
|8165|AE22|C9 01| |CMP|#1|;if user cycle=1, always water|
|8166|AE24|F0 14| |BEQ|GEV| |
|8167|AE26|20 67 B3| |JSR|DIVIDE|;divide today by cycle|
|8168|AE29|AA| |TAX|  |;if no remainder, then water today|
|8169|AE2A|F0 0E| |BEQ|GEV| |
|8170| | | | | | |
|8171|AE2C|A6 49|GEN:|LDX|VALVE|;else no water today for this valve|
|8172|AE2E| | |DBLX| | |
|8180|AE34|74 8F| |STZ|TR,X| |
|8181|AE36|74 90| |STZ|TR+1,X| |
|8182|AE38|80 5C| |BRA|GE20| |
|8183| | | | | | |
|8184|AE3A|A6 49|GEV:|LDX|VALVE|;water with entered duration|
|8185|AE3C| | |DBLX| | |
|8193|AE42|BD 58 15| |LDA|DUR1,X| |
|8194|AE45|95 8F| |STA|TR,X| |
|8195|AE47|85 4E| |STA|MULTIPLIER| |
|8196|AE49|BD 59 15| |LDA|DUR1+1,X| |
|8197|AE4C|95 90| |STA|TR+1,X| |
|8198| | | | | |;modified by budget|
|8199|AE4E|AD 67 02| |LDA|CHKFLAG|;if not checking|
|8200|AE51|D0 43| |BNE|GE20| |
|8201|AE53|AD FE 02| |LDA|GLOBAL|;TR = TR * GLOBAL /100|
|8202|AE56|85 4F| |STA|MULTIPLICAND| |
|8203|AE58|20 4D B3| |JSR|MULT| |
|8204|AE5B| | |MOV16|PRODUCT,DIVIDEND| |
|8210|AE63|64 55| |STZ|DIVISOR+1| |
|8211|AE65|A9 64| |LDA|#100| |
|8212|AE67|85 54| |STA|DIVISOR| |
|8213|AE69|20 7E B3| |JSR|DIV16| |
|8214|AE6C|A6 49| |LDX|VALVE| |
|8215|AE6E| | |DBLX| | |
|8223|AE74|A5 56| |LDA|QUOTIENT| |
|8224|AE76|95 8F| |STA|TR,X| |
|8225|AE78|A5 57| |LDA|QUOTIENT+1| |
|8226|AE7A|95 90| |STA|TR+1,X| |
|8227|AE7C|80 1B| |BRA|GE20| |
|8228| | | | | | |
|8229|AE7E|A6 49|GE15:|LDX|VALVE|;specific days|
|8230|AE80| | |DBLX| | |
|8238|AE86|BD 6B 15| |LDA|CYCLE1+1,X|;see if day matches today|
|8239|AE89|2A| |ROL|A| |
|8240|AE8A|AE 1C 03| |LDX|DAYNUM+2| |
|8241|AE8D|2A|GE16:|ROL|A| |
|8242|AE8E|CA| |DEX| | |
|8243|AE8F|D0 FC| |BNE|GE16| |
|8244|AE91|90 99| |BCC|GEN|;not today|
|8245|AE93|4C 03 AE| |JMP|GE12|;now see if it's the right week|
|8246| | | | | | |
|8247|AE96|A6 49|GE20:|LDX|VALVE|;SEE IF SOAK DAY|
|8248|AE98|BD 7D 02| |LDA|VS,X| |
|8249|AE9B|29 C0| |AND|#11000000B| |
|8250|AE9D|C9 C0| |CMP|#11000000B| |
|8251|AE9F|D0 6F| |BNE|GE30|;ignore if valve disabled|
|8252|AEA1| | |DBLX| | |
|8260|AEA7|BD B5 15| |LDA|DUR3,X|;or if no soak duration|
|8261|AEAA|1D B6 15| |ORA|DUR3+1,X| |
|8262|AEAD|F0 61| |BEQ|GE30| |

```
8263   AE.F  AD 41 15              LDA   CYCLE_TYPE
8264   AE32  D0 44                 BNE   6E25
8265   AEB4  AD 1A 03     6E22:    LDA   DAYNUM              ;see if user cycle = current day or week
8266   AEB7  85 52                 STA   DIVIDEND
8267   AEB9  AD 1B 03              LDA   DAYNUM+1
8268   AEBC  85 53                 STA   DIVIDEND+1
8269   AEBE  C6 52                 DEC   DIVIDEND            ;if DAYNUM=1, (first day or week)
8270   AEC0  A5 52                 LDA   DIVIDEND            ;everything is scheduled
8271   AEC2  05 53                 ORA   DIVIDEND+1
8272   AEC4  F0 17                 BEQ   6E5
8273   AEC6  A6 49                 LDX   VALVE
8274   AEC8                        DBLX
8282   AECE  BD C7 15              LDA   CYCLE3,X
8283   AED1  85 54                 STA   DIVISOR
8284   AED3  C9 01                 CMP   #1                  ;if user cycle=1, always soak
8285   AED5  F0 06                 BEQ   6E5
8286   AED7  20 67 B3              JSR   DIVIDE              ;divide today by cycle
8287   AEDA  AA                    TAX                       ;if no remainder, then water today
8288   AEDB  D0 33                 BNE   6E30
8289
8290   AEDD  A6 49        6E5:     LDX   VALVE               ;water with entered duration
8291   AEDF  A9 02                 LDA   #2
8292   AEE1  9D 4A 02              STA   BASETYPE,X
8293   AEE4                        DBLX
8301   AEEA  BD B5 15              LDA   DUR3,X
8302   AEED  95 8F                 STA   TR,X
8303   AEEF  85 4E                 STA   MULTIPLIER
8304   AEF1  BD B6 15              LDA   DUR3+1,X
8305   AEF4  95 90                 STA   TR+1,X
8306   AEF6  80 18                 BRA   6E30
8307
8308   AEF8  A6 49        6E25:    LDX   VALVE               ;specific days
8309   AEFA                        DBLX
8317   AF00  BD CB 15              LDA   CYCLE3+1,X          ;see if day matches today
8318   AF03  2A                    ROL   A
8319   AF04  AE 1C 03              LDX   DAYNUM+2
8320   AF07  2A           6E26:    ROL   A
8321   AF08  CA                    DEX
8322   AF09  D0 FC                 BNE   6E26
8323   AF0B  90 03                 BCC   6E30                ;not today
8324   AF0D  4C B4 AE              JMP   6E22                ;now see if it's the right week
8325
8326   AF10  A6 49        6E30:    LDX   VALVE               ;if valve has time remaining today,
8327   AF12                        DBLX
8335   AF18  B5 8F                 LDA   TR,X
8336   AF1A  15 90                 ORA   TR+1,X
8337   AF1C  F0 0E                 BEQ   6E32
8338   AF1E  AD 7C 15              LDA   BASE_START
8339   AF21  9D 38 02              STA   NXTTIME,X           ;then set to start ASAP
8340   AF24  AD 7D 15              LDA   BASE_START+1
8341   AF27  9D 39 02              STA   NXTTIME+1,X
8342   AF2A  80 12                 BRA   6E35
8343   AF2C  A6 49        6E32:    LDX   VALVE               ;if no time entered
8344   AF2E                        DBLX                      ;don't water with valve
8352   AF34  A9 05                 LDA   ##5
8353   AF36  9D 39 02              STA   NXTTIME+1,X
8354   AF39  A9 A0                 LDA   #$A0
8355   AF3B  9D 38 02              STA   NXTTIME,X
8356   AF3E  E6 49        6E35:    INC   VALVE               ;do the next valve
8357   AF40  A5 49                 LDA   VALVE
8358   AF42  C9 09                 CMP   #9
8359   AF44  F0 03                 BEQ   6E40
8360   AF46  4C F0 AD              JMP   6E10
8361
8362   AF49  9C EC 15     6E40:    STZ   NSTARTS             ;prepare to generate starts
8363   AF4C                        MOV16 BASE_START,E
8369   AF58  20 07 AA              JSR   FIRSTSTART          ;init start pointer
8370   AF5B                        SET   VALVE               ;init NXTTIME for syringe
```

```
8374  AF5F  A6 49      6E4B:  LDX    VALVE
8375  AF61              DBLX
8383  AF67  BD 7E 15          LDA    DUR2,X
8384  AF6A  D0 12             BNE    6E4A
8385  AF6C  E6 49             INC    VALVE
8386  AF6E  A5 49             LDA    VALVE
8387  AF70  C9 09             CMP    #9
8388  AF72  D0 EB             BNE    6E4B
8389  AF74  A9 05             LDA    #$05            ;if no syringing, then SYRINGE_START=1440
8390  AF76  8D B0 15          STA    SYRINGE_START+1
8391  AF79  A9 A0             LDA    #$A0
8392  AF7B  8D AF 15          STA    SYRINGE_START
8393                                                  ;NXTTIME(0)=start of syringes
8394  AF7E             6E4A:  MOV16  SYRINGE_START,NXTTIME
8400
8401                   GENXT:                         ;OK, now we generate starts
8402  AFBA  A9 05             LDA    #$05            ;find next valve up
8403  AFBC  85 42             STA    MSB             ;it's the one with the lowest NXTTIME
8404  AFBE  A9 A0             LDA    #$A0
8405  AF90  85 41             STA    LSB             ;LSB holds lowest time so far
8406  AF92  A9 08             LDA    #8              ;if a tie, the lowest valve # wins
8407  AF94  85 BC             STA    R1
8408  AF96  85 49             STA    VALVE
8409  AF98  A6 BC      6E41:  LDX    R1              ;if NXTTIME <= lowest time,
8410  AF9A              DBLX
8418  AFA0  BD 39 02          LDA    NXTTIME+1,X
8419  AFA3  C5 42             CMP    MSB
8420  AFA5              BLT    6E44
8423  AFA7  F0 02             BEQ    6E42
8424  AFA9  80 21             BRA    6E45
8425  AFAB  BD 38 02   6E42:  LDA    NXTTIME,X
8426  AFAE  C5 41             CMP    LSB
8427  AFB0              BLT    6E44
8430  AFB2  F0 02             BEQ    6E44
8431  AFB4  80 16             BRA    6E45
8432  AFB6  A5 BC      6E44:  LDA    R1              ;then save that valve
8433  AFB8  85 49             STA    VALVE
8434  AFBA  A6 49             LDX    VALVE           ;and new lowest time
8435  AFBC              DBLX
8443  AFC2  BD 38 02          LDA    NXTTIME,X
8444  AFC5  85 41             STA    LSB
8445  AFC7  BD 39 02          LDA    NXTTIME+1,X
8446  AFCA  85 42             STA    MSB
8447  AFCC  C6 BC      6E45:  DEC    R1
8448  AFCE  D0 C8             BNE    6E41
8449
8450  AFD0  A6 49             LDX    VALVE           ;if time remaining is 0 for next valve,
8451  AFD2              DBLX
8459  AFD8  B5 8F             LDA    TR,X
8460  AFDA  15 90             ORA    TR+1,X
8461  AFDC  D0 03             BNE    6E50
8462  AFDE  4C 77 B0          JMP    6E65            ;that means no more watering left
8463
8464  AFE1             6E50:  MOV16  E,S             ;start at end of last watering
8470  AFED  A6 49             LDX    VALVE
8471  AFEF              DBLX
8479  AFF5  AD 33 02          LDA    S+1             ;if start before MINOFF,
8480  AFF8  DD 39 02          CMP    NXTTIME+1,X
8481  AFFB              BLT    6E52
8484  AFFD  F0 02             BEQ    6E51
8485  AFFF  80 1E             BRA    6E55
8486  B001  AD 32 02   6E51:  LDA    S
8487  B004  DD 38 02          CMP    NXTTIME,X
8488  B007              BLT    6E52
8491  B009  80 14             BRA    6E55
8492  B00B  A6 49      6E52:  LDX    VALVE           ;then move start to there
8493  B00D              DBLX
8501  B013  BD 38 02          LDA    NXTTIME,X
```

```
8502  0016  8D 32 02            STA    S
8503  0019  BD 39 02            LDA    NXTTIME+1,X
8504  001C  8D 33 02            STA    S+1
8505
8506              GE55:                              ;check if start is in syringe time
8507  001F  AD 33 02            LDA    S+1
8508  0022  CD 39 02            CMP    NXTTIME+1    ;if start >= NXTTIME(0)
8509  0025  F0 05               BEQ    GE56
8510  0027                      BLT    GE60
8513  0029  4C 5E B2            JMP    GSC
8514  002C  AD 32 02   GE56:    LDA    S
8515  002F  CD 38 02            CMP    NXTTIME
8516  0032                      BLT    GE60
8519  0034  4C 5E B2            JMP    GSC          ;then generate syringe cycles
8520
8521  0037  AD 1E 03   GE60:    LDA    WCLK         ;check if start is in xtime
8522  003A  C9 01               CMP    #1
8523  003C  F0 50               BEQ    GE70
8524  003E  AD 33 02            LDA    S+1
8525  0041  CD 55 15            CMP    XFROM+1      ;if start < XFROM
8526  0044                      BLT    GE70
8529  0046  F0 02               BEQ    GE61
8530  0048  80 08               BRA    GE62
8531  004A  AD 32 02   GE61:    LDA    S
8532  004D  CD 54 15            CMP    XFROM
8533  0050                      BLT    GE70
8536  0052  AD 33 02   GE62:    LDA    S+1          ;or if start >= XTO
8537  0055  CD 57 15            CMP    XTO+1
8538  0058                      BLT    GE64
8541  005A  F0 02               BEQ    GE63
8542  005C  80 30               BRA    GE70
8543  005E  AD 32 02   GE63:    LDA    S
8544  0061  CD 56 15            CMP    XTO
8545  0064                      BLT    GE64
8548  0066  80 26               BRA    GE70         ;then do nothing
8549  0068              GE64:   MOV16  XTO,E        ;else move to end of xtime
8555  0074  4C BA AF            JMP    GENXT
8556
8557  0077  AD 39 02   GE65:    LDA    NXTTIME+1    ;base watering done
8558  007A  C9 05               CMP    #$05         ;check if any more syringes
8559  007C  F0 0D               BEQ    GE6A
8560  007E  4C 5E B2            JMP    GSC          ;yes, generate syringe
8561  0081  AD 3B 02            LDA    NXTTIME
8562  0084  C9 A0               CMP    #$A0
8563  0086  F0 03               BEQ    GE6A
8564  0088  4C 5E B2            JMP    GSC
8565  008B  4C F4 B1   GE6A:    JMP    GE97         ;nope, all done
8566
8567  008E  A6 49      GE70:    LDX    VALVE        ;calculate watering time
8568  0090                      DBLX
8576  0096  B5 8F               LDA    TR,X         ;use all of the time remaining
8577  0098  8D 36 02            STA    WT
8578  009B  B5 90               LDA    TR+1,X
8579  009D  8D 37 02            STA    WT+1
8580  00A0  A6 49               LDX    VALVE
8581  00A2  BD 42 15            LDA    MAXON,X      ;unless limited by MAXON
8582  00A5  F0 1E               BEQ    GE75
8583  00A7  85 BC               STA    R1           ;if WT>MAXON then WT=MAXON
8584  00A9                      DBLX
8592  00AF  AD 37 02            LDA    WT+1
8593  00B2  D0 09               BNE    GE73
8594  00B4  AD 36 02            LDA    WT
8595  00B7  C5 BC               CMP    R1
8596  00B9                      BLT    GE75
8599  00BB  F0 0B               BEQ    GE75
8600  00BD  A5 BC      GE73:    LDA    R1
8601  00BF  8D 36 02            STA    WT
8602  00C2  9C 37 02            STZ    WT+1
8603  00C5
```

| | | | | | | |
|---|---|---|---|---|---|---|
|8604|00C5|64 0E|6E75:|STZ|R3|;init watering interrupted flag|
|8605|00C7| | |ADD16|S,WT,E|;end= start + watering time|
|8614| | | | | |;check for watering into syringe cycle|
|8615|00DA|AD 35 02| |LDA|E+1|;if end>NITTIME(0)|
|8616|00DD|CD 39 02| |CMP|NITTIME+1| |
|8617|00E0| | |BLT|6E80| |
|8620|00E2|F0 02| |BEQ|6E7B| |
|8621|00E4|80 0A| |BRA|6E7A| |
|8622|00E6|AD 34 02|6E7B:|LDA|E| |
|8623|00E9|CD 38 02| |CMP|NITTIME| |
|8624|00EC| | |BLT|6E80| |
|8627|00EE|F0 15| |BEQ|6E80| |
|8628|00F0|38|6E7A:|SEC| |;then stop watering at beginning|
|8629|00F1|AD 38 02| |LDA|NITTIME|;of syringe cycle|
|8630|00F4|ED 32 02| |SBC|S| |
|8631|00F7|8D 36 02| |STA|WT| |
|8632|00FA|AD 39 02| |LDA|NITTIME+1| |
|8633|00FD|ED 33 02| |SBC|S+1| |
|8634|0100|8D 37 02| |STA|WT+1| |
|8635|0103|80 48| |BRA|6E8A| |
|8636| | | | | | |
|8637|0105|AD 1E 03|6E80:|LDA|WCLK|;check for watering into xtime|
|8638|0108|C9 01| |CMP|#1|;skip check if semi-auto|
|8639|010A|F0 2C| |BEQ|6E83| |
|8640|010C|AD 33 02| |LDA|S+1| |
|8641|010F|CD 57 15| |CMP|XTO+1|;if start >= XTO|
|8642|0112| | |BLT|6E77| |
|8645|0114|F0 02| |BEQ|6E81| |
|8646|0116|80 20| |BRA|6E83| |
|8647|0118|AD 32 02|6E81:|LDA|S| |
|8648|011B|CD 56 15| |CMP|XTO| |
|8649|011E| | |BGE|6E83| |
|8652|0120|AD 35 02|6E77:|LDA|E+1|;or if end<=XFROM|
|8653|0123|CD 55 15| |CMP|XFROM+1| |
|8654|0126| | |BLT|6E83| |
|8657|0128|F0 02| |BEQ|6E82| |
|8658|012A|80 0E| |BRA|6E84| |
|8659|012C|AD 34 02|6E82:|LDA|E| |
|8660|012F|CD 54 15| |CMP|XFROM| |
|8661|0132| | |BLT|6E83| |
|8664|0134|F0 02| |BEQ|6E83| |
|8665|0136|80 02| |BRA|6E84| |
|8666|0138|80 2A|6E83:|BRA|6E85|;then leave end alone|
|8667| | | | | | |
|8668|013A|38|6E84:|SEC| |;else stop watering at beginning|
|8669|013B|AD 54 15| |LDA|XFROM|;of Xtime|
|8670|013E|ED 32 02| |SBC|S| |
|8671|0141|8D 36 02| |STA|WT| |
|8672|0144|AD 55 15| |LDA|XFROM+1| |
|8673|0147|ED 33 02| |SBC|S+1| |
|8674|014A|8D 37 02| |STA|WT+1| |
|8675|014D| |6E8A:|ADD16|S,WT,E|;calculate new end|
|8684|0160| | |SET|R3|;and set interrupted flag|
|8688| | | | | | |
|8689| | |6E85:| | |;we now have a good watering time|
|8690| | | | | |;with flag set if interrupted|
|8691|0164|AD 35 02| |LDA|E+1|;error if past midnite|
|8692|0167|C9 05| |CMP|#$05| |
|8693|0169| | |BLT|6E87| |
|8696|016B|F0 03| |BEQ|6E86| |
|8697|016D|4C BB B3| |JMP|6ERR2| |
|8698|0170|AD 34 02|6E86:|LDA|E| |
|8699|0173|C9 A0| |CMP|#$A0| |
|8700|0175| | |BLT|6E87| |
|8703|0177|4C BB B3| |JMP|6ERR2| |
|8704| | | | | | |
|8705|017A|A6 49|6E87:|LDX|VALVE|;modify time remaining|
|8706|017C| | |DBLX| |;by subtracting watering time from it|
|8714|0182|38| |SEC| | |

```
8715  B183  B5 98              LDA   TR+1,X
8716  B185  ED 37 02            SBC   WT+1
8717  B188  95 98              STA   TR+1,X
8718  B18A  B5 8F              LDA   TR,X
8719  B18C  ED 36 02            SBC   WT
8720  B18F  95 8F              STA   TR,X
8721  B191  A6 49              LDX   VALVE      ;then set up for next time
8722  B193                     DBLX
8730  B199  B5 8F              LDA   TR,X
8731  B19B  15 98              ORA   TR+1,X
8732  B19D  D0 0C              BNE   6E90
8733  B19F  A9 05              LDA   #$05       ;no time left for this station,
8734  B1A1  9D 39 02            STA   NXTTIME+1,X ;so no next time
8735  B1A4  A9 A0              LDA   #$A0
8736  B1A6  9D 38 02            STA   NXTTIME,X
8737  B1A9  80 32              BRA   6E95
8738
8739  B1AB  A5 BE      6E90:   LDA   R3         ;if watering interrupted,
8740  B1AD  F0 10              BEQ   6E91
8741  B1AF  A6 49              LDX   VALVE      ;then make it next one to start
8742  B1B1                     DBLX
8750  B1B7  9E 39 02            STZ   NXTTIME+1,X
8751  B1BA  9E 38 02            STZ   NXTTIME,X
8752  B1BD  80 1E              BRA   6E95
8753  B1BF  A6 49      6E91:   LDX   VALVE      ;else next time will be end + MINOFF
8754  B1C1  BD 4B 15            LDA   MINOFF,X
8755  B1C4  85 BD              STA   R2
8756  B1C6                     DBLX
8764  B1CC  18                 CLC
8765  B1CD  AD 34 02            LDA   E
8766  B1D0  65 BD              ADC   R2
8767  B1D2  9D 38 02            STA   NXTTIME,X
8768  B1D5  AD 35 02            LDA   E+1
8769  B1D8  69 00              ADC   #0
8770  B1DA  9D 39 02            STA   NXTTIME+1,X
8771
8772  B1DD  A6 49      6E95:   LDX   VALVE      ;send along base or soak
8773  B1DF  BD 4A 02            LDA   BASETYPE,X
8774  B1E2  85 D7              STA   SUB
8775  B1E4  20 EB 9F            JSR   BUILD_START ;make a start @ STARTPTR
8776                                              ;using S, WT, VALVE
8777  B1E7  90 03              BCC   6E96
8778  B1E9  4C 07 B3            JMP   6ERR1      ;too many starts
8779  B1EC  A6 49      6E96:   LDX   VALVE
8780  B1EE  FE 54 02            INC   NSPLIT,X
8781  B1F1  4C 8A AF            JMP   6ENXT      ;else do next start
8782
8783  B1F4  20 07 AA   6E97:   JSR   FIRSTSTART ;good exit
8784  B1F7                     MOV16 E,DONETIME
8790  B203                     MOV16 BASE_START,GENTIME
8796  B20F  AD B0 15            LDA   SYRINGE_START+1 ;GENTIME = lesser of base or syringe start
8797  B212  CD EE 15            CMP   GENTIME+1
8798  B215                     BLT   6E9A
8801  B217  F0 02              BEQ   6E9C
8802  B219  80 14              BRA   6E9B
8803  B21B  AD AF 15   6E9C:   LDA   SYRINGE_START
8804  B21E  CD ED 15            CMP   GENTIME
8805  B221                     BGE   6E9B
8808  B223       6E9A:         MOV16 SYRINGE_START,GENTIME
8814             6E9B:                           ;point to next start
8815  B22F                     MOV16 HOUR,IBFR+4
8821  B239  20 B3 AB            JSR   HM2MIN
8822  B23C  A5 7A      6EE0:   LDA   STARTCTR   ;see if any more starts
8823  B23E  CD EC 15            CMP   NSTARTS
8824  B241  F0 17              BEQ   6EE4       ;nope, we missed the whole day
8825  B243  A0 01              LDY   #1         ;see if current time
8826  B245  B1 7B              LDA   (STARTPTR),Y ;is < start time
8827  B247  C5 D0              CMP   OFFSET+1
```

```
8828  B249  F0 04                    BEQ    GEE1
8829  B24B                           BLT    GEE2
8832  B24D  80 0B                    BRA    GEE4
8833  B24F  B2 7B          GEE1:     LDA    (STARTPTR)
8834  B251  C5 CF                    CMP    OFFSET
8835  B253                           BGE    GEE4
8838  B255  20 F7 A9       GEE2:     JSR    NEXTSTART        ;start was < current time,
8839  B258  80 E2                    BRA    GEE0             ;look at next one
8840                       GEE4:                             ;done, STARTPTR points to next start to do
8841  B25A  64 79                    STZ    ERROR
8842  B25C  18                       CLC
8843  B25D  60                       RTS
8844
8845                       GSC:                              ;generate syringe cycles
8846  B25E  A9 01                    LDA    #1
8847  B260  85 D7                    STA    SUB
8848  B262  EE 71 02                 INC    NSYR
8849  B265                           MOV16  NXTTIME,E
8855  B271  64 49                    STZ    VALVE
8856  B273  20 A7 9E       GSC1:     JSR    NXTVALVE         ;for each valve
8857  B276  90 03                    BCC    GSC2
8858  B278  4C D1 B2                 JMP    GSC5
8859  B27B  A6 49          GSC2:     LDX    VALVE
8860  B27D                           DBLX
8868  B283  BD 7E 15                 LDA    DUR2,X           ;if no duration, skip
8869  B286  1D 7F 15                 ORA    DUR2+1,X
8870  B289  F0 E8                    BEQ    GSC1
8871  B28B  BD 7E 15                 LDA    DUR2,X           ;else WT=duration
8872  B28E  8D 36 02                 STA    WT
8873  B291  BD 7F 15                 LDA    DUR2+1,X
8874  B294  8D 37 02                 STA    WT+1
8875  B297                           MOV16  E,S              ;start=end of last one
8881  B2A3                           ADD16  S,WT,E           ;end=start + WT, nothing can interfere
8890  B2B6  AD 35 02                 LDA    E+1              ;except going past midnite
8891  B2B9  C9 05                    CMP    #$05
8892  B2BB                           BLT    GSC3
8895  B2BD  F0 03                    BEQ    GSC4
8896  B2BF  4C 0B B3                 JMP    GERR2
8897  B2C2  AD 34 02       GSC4:     LDA    E
8898  B2C5  C9 A0                    CMP    #$A0
8899  B2C7                           BLT    GSC3
8902  B2C9  4C 0B B3                 JMP    GERR2
8903  B2CC  20 EB 9F       GSC3:     JSR    BUILD_START      ;make the start
8904  B2CF  80 A2                    BRA    GSC1             ;next valve
8905                       GSC5:                             ;find next syringe time
8906  B2D1                           ADD16  NXTTIME,SOFTEN,NXTTIME
8915  B2E4  AD 39 02                 LDA    NXTTIME+1        ;if nxttime > end of syringes
8916  B2E7  CD B2 15                 CMP    SYRINGE_END+1
8917  B2EA                           BLT    GSC9
8920  B2EC  F0 02                    BEQ    GSC7
8921  B2EE  80 0A                    BRA    GSC8
8922  B2F0  AD 38 02       GSC7:     LDA    NXTTIME
8923  B2F3  CD B1 15                 CMP    SYRINGE_END
8924  B2F6                           BLT    GSC9
8927  B2F8  F0 0A                    BEQ    GSC9
8928  B2FA  A9 05          GSC8:     LDA    #$05             ;then no more
8929  B2FC  8D 39 02                 STA    NXTTIME+1
8930  B2FF  A9 A0                    LDA    #$A0
8931  B301  8D 38 02                 STA    NXTTIME
8932  B304  4C 8A AF       GSC9:     JMP    GENXT            ;go back to base watering
8933
8934                                                         ;generator errors
8935  B307  A9 01          GERR1:    LDA    #1               ;1=too many starts
8936  B309  80 04                    BRA    GERR
8937  B30B  A9 02          GERR2:    LDA    #2               ;2=past midnite
8938  B30D  80 00                    BRA    GERR
8939  B30F  85 79          GERR:     STA    ERROR
8940  B311  38                       SEC
```

```
8941  B312  60                   RTS
8942
8943              CHECK:                           ;check setup for errors
8944  B313                   SET    CHKFLAG        ;ignore budget settings for check
8948  B318  AD 41 15          LDA    CYCLE_TYPE    ;if "so many" days,
8949  B31B  D0 0E             BNE    CHK1
8950  B31D                   SET    DAYNUM         ;just check 1st day
8954  B322  9C 1B 03          STZ    DAYNUM+1
8955  B325  9C 1C 03          STZ    DAYNUM+2
8956  B328  4C E1 AD          JMP    GE0
8957  B32B              CHK1: SET    DAYNUM         ;if specific days
8961  B330  9C 1B 03          STZ    DAYNUM+1
8962  B333  9C 1C 03          STZ    DAYNUM+2
8963  B336  EE 1C 03    CHK2: INC    DAYNUM+2      ;check the first week
8964  B339  AD 1C 03          LDA    DAYNUM+2
8965  B33C  C9 08             CMP    #8
8966  B33E  F0 0B             BEQ    CHK4
8967  B340  20 E1 AD          JSR    GE0
8968  B343  90 F1             BCC    CHK2
8969  B345  60                RTS
8970  B346  18          CHK3: CLC
8971  B347  66 73             ROR    CTR
8972  B349  80 EB             BRA    CHK2
8973  B34B  18          CHK4: CLC
8974  B34C  60                RTS
8975
8976
8977
8978                    ;---------------------------------
8979                    ;     MATH ROUTINES
8980                    ;---------------------------------
8981
8982              MULT:                             ;MULTIPLIER (8) * MULTIPLICAND (8) =
8983                                                ;PRODUCT (16 bits, LSB,MSB)
8984  B34D  A9 00             LDA    #0
8985  B34F  85 51             STA    PRODUCT+1
8986  B351  A2 08             LDX    #8
8987  B353  0A          MUL1: ASL    A
8988  B354  26 51             ROL    PRODUCT+1
8989  B356  06 4E             ASL    MULTIPLIER
8990  B358  90 07             BCC    MUL2
8991  B35A  18                CLC
8992  B35B  65 4F             ADC    MULTIPLICAND
8993  B35D  90 02             BCC    MUL2
8994  B35F  E6 51             INC    PRODUCT+1
8995  B361  CA          MUL2: DEX
8996  B362  D0 EF             BNE    MUL1
8997  B364  85 50             STA    PRODUCT
8998  B366  60                RTS
8999
9000              DIVIDE:                           ;DIVIDEND (15) / DIVISOR (7) =
9001                                                ;QUOTIENT (8), with remainder in A
9002  B367  A2 08             LDX    #8
9003  B369  A5 52             LDA    DIVIDEND
9004  B36B  85 56             STA    QUOTIENT
9005  B36D  A5 53             LDA    DIVIDEND+1
9006  B36F  06 56       DIV1: ASL    QUOTIENT
9007  B371  2A                ROL    A
9008  B372  C5 54             CMP    DIVISOR
9009  B374  90 04             BCC    DIV2
9010  B376  E5 54             SBC    DIVISOR
9011  B378  E6 56             INC    QUOTIENT
9012  B37A  CA          DIV2: DEX
9013  B37B  D0 F2             BNE    DIV1
9014  B37D  60                RTS
9015
9016              DIV16:                            ;DIVIDEND(16) / DIVISOR(16) =
9017                                                ;QUOTIENT (16)
```

```
9018   B37E  A9 00           LDA   #0              ;clear partial dividend
9019   B380  85 41           STA   LSB
9020   B382  85 42           STA   MSB
9021   B384  A2 10           LDX   #16             ;dividend bit count=16
9022   B386  06 52   NXTBT:  ASL   DIVIDEND        ;shift dividend (quotient) left
9023   B388  26 53           ROL   DIVIDEND+1
9024   B38A  26 41           ROL   LSB             ;shift partial dividend left
9025   B38C  26 42           ROL   MSB
9026   B38E  A5 41           LDA   LSB             ;subtract low bytes
9027   B390  38              SEC
9028   B391  E5 54           SBC   DIVISOR
9029   B393  A8              TAY                   ;save low result in Y
9030   B394  A5 42           LDA   MSB             ;subtract hi bytes
9031   B396  E5 55           SBC   DIVISOR+1
9032   B398  90 06           BCC   CNTDN           ;divisor>dividend?
9033   B39A  E6 52           INC   DIVIDEND        ;no, set bit in quotient
9034   B39C  85 42           STA   MSB             ; and enter subtraction result
9035   B39E  84 41           STY   LSB             ; into partial dividend
9036   B3A0  CA      CNTDN:  DEX                   ;decrement bit count
9037   B3A1  D0 E3           BNE   NXTBT           ;loop until 16 bits are done
9038   B3A3                  MOV16 DIVIDEND,QUOTIENT
9044   B3AB  60              RTS
9045
9046
9047                         ;----------------------------------
9048                         ;     EEPROM SUPPORT
9049                         ;----------------------------------
9050
9051   B3AC  A5 4C   E2CSHI: LDA   E2MASK          ;bring EEPROM chip select high
9052   B3AE  09 04           ORA   00000100B
9053   B3B0  85 4C           STA   E2MASK
9054   B3B2  85 1D           STA   E2
9055   B3B4  60              RTS
9056
9057   B3B5  A9 08   E2STANDBY: LDA #00001000B     ;initialize EEPROM interface
9058   B3B7  85 4C           STA   E2MASK          ;VE high, CS low, DI low
9059   B3B9  85 1D           STA   E2
9060   B3BB  60              RTS
9061
9062   B3BC  A5 4C   E2CLK:  LDA   E2MASK          ;bring EEPROM serial clock high
9063   B3BE  09 02           ORA   00000010B
9064   B3C0  85 4C           STA   E2MASK
9065   B3C2  85 1D           STA   E2
9066   B3C4  A5 4C           LDA   E2MASK          ;then low
9067   B3C6  29 FD           AND   11111101B
9068   B3C8  85 4C           STA   E2MASK
9069   B3CA  85 1D           STA   E2
9070   B3CC  60              RTS
9071
9072   B3CD  A9 30   E2EWEN: LDA   #E2EWEN_CMD     ;EEPROM erase/write enable
9073   B3CF  20 D3 B3        JSR   E2CMD           ;E2ADDR must be 0
9074   B3D2  60              RTS
9075
9076   B3D3  85 4B   E2CMD:  STA   E2WR            ;send EEPROM command in A
9077   B3D5  20 B5 B3        JSR   E2STANDBY
9078   B3D8  20 AC B3        JSR   E2CSHI
9079   B3DB  A5 4C           LDA   E2MASK          ;send 0 start bit
9080   B3DD  29 FE           AND   11111110B
9081   B3DF  85 4C           STA   E2MASK
9082   B3E1  20 BC B3        JSR   E2CLK
9083   B3E4  A5 4C           LDA   E2MASK          ;send 1 start bit
9084   B3E6  09 01           ORA   00000001B
9085   B3E8  85 4C           STA   E2MASK
9086   B3EA  20 BC B3        JSR   E2CLK
9087   B3ED  A5 4D           LDA   E2ADDR
9088   B3EF  05 4B           ORA   E2WR
9089   B3F1  20 F5 B3        JSR   E2TX
9090   B3F4  60              RTS
```

```
9091
9092  B3F5  85 4B       E2TX:   STA   E2WR          ;send byte in A to EEPROM
9093  B3F7  A2 08               LDX   #8            ;8 bits, no start
9094  B3F9  66 4C       E2T1:   ROR   E2MASK        ;prepare to get D0
9095  B3FB  26 4B               ROL   E2WR          ;MSB of data
9096  B3FD  26 4C               ROL   E2MASK        ;into D0 of E2MASK (DI of EEPROM)
9097  B3FF  A5 4C               LDA   E2MASK
9098  B401  85 1D               STA   E2            ;send the bit
9099  B403  20 BC B3            JSR   E2CLK
9100  B406  CA                  DEX
9101  B407  D0 F0               BNE   E2T1
9102  B409  60                  RTS
9103
9104                    E2READ:                     ;read word from EEPROM @ E2ADDR
9105                                                ;into MSB, LSB
9106                                                ;carry set if error
9107  B40A  A9 80               LDA   #E2READ_CMD
9108  B40C  20 D3 B3            JSR   E2CMD
9109  B40F  A5 1D               LDA   E2
9110  B411  30 14               BMI   E2RNG         ;DO start bit should be 0
9111  B413  A2 10               LDX   #16           ;get in 16 data bits
9112  B415  20 BC B3    E2R1:   JSR   E2CLK
9113  B418  A5 1D               LDA   E2            ;bit is in D7
9114  B41A  2A                  ROL   A             ;bit is in carry
9115  B41B  26 41               ROL   LSB           ;now in target word
9116  B41D  26 42               ROL   MSB
9117  B41F  CA                  DEX
9118  B420  D0 F3               BNE   E2R1
9119  B422  20 B5 B3    E2ROK:  JSR   E2STANDBY     ;good exit
9120  B425  18                  CLC
9121  B426  60                  RTS
9122  B427  20 B5 B3    E2RNG:  JSR   E2STANDBY     ;didn't get start bit
9123  B42A  38                  SEC
9124  B42B  60                  RTS
9125
9126  B42C  A9 C0       E2ERASE: LDA  #E2ERASE_CMD  ;erase EEPROM @ E2ADDR
9127  B42E  80 02               BRA   E2W2
9128
9129                    E2WRITE:                    ;write word to EEPROM @ E2ADDR
9130                                                ;from MSB, LSB
9131                                                ;carry set if error
9132  B430  A9 40               LDA   #E2WRITE_CMD
9133  B432  20 D3 B3    E2W2:   JSR   E2CMD
9134  B435  A5 42               LDA   MSB           ;send data
9135  B437  20 F5 B3            JSR   E2TX
9136  B43A  A5 41               LDA   LSB
9137  B43C  20 F5 B3            JSR   E2TX
9138  B43F  20 B5 B3            JSR   E2STANDBY
9139  B442  20 BC B3            JSR   E2CLK         ;start programming cycle
9140  B445  20 AC B3            JSR   E2CSHI
9141  B448  A9 14               LDA   #20
9142  B44A  85 BC               STA   R1            ;wait 20 ms. max
9143  B44C  A0 01       E2W1:   LDY   #1
9144  B44E  20 C0 A2            JSR   WAITMS
9145  B451  A5 1D               LDA   E2
9146  B453  30 09               BMI   E2WOK         ;for cycle to finish
9147  B455  C6 BC               DEC   R1
9148  B457  D0 F3               BNE   E2W1
9149  B459  20 B5 B3    E2WNG:  JSR   E2STANDBY     ;didn't get ready bit
9150  B45C  38                  SEC
9151  B45D  60                  RTS
9152  B45E  20 B5 B3    E2WOK:  JSR   E2STANDBY     ;good exit
9153  B461  18                  CLC
9154  B462  60                  RTS
9155
9156
9157                    ;-----------------------------------
9158                    ;      INTERRUPT ROUTINE
9159                    ;-----------------------------------
9160
```

```
9161                           ;INT reloads the TIMER to generate the next INT
9162
9163                           ;These are the tasks of the interrupt:
9164                           ;       Clear the watchdog
9165                           ;       Decrement a down counter
9166                           ;       Shut down in battery removed or battery low
9167                           ;       Return keys to the main program with debounce and repeat
9168                           ;       Blink the cursor
9169                           ;       Blink the question mark
9170                           ;       Scroll messages of more than two lines
9171                           ;       Update the clock
9172
9173                           ;The variable BLINK controls blinking and scrolling.
9174                           ;       0= no blink
9175                           ;       1= blink cursor @ CURSOR
9176                           ;       2= blink ? @ CURSOR
9177                           ;       3= scroll message
9178                           ;       4= repeat message after scroll
9179                           ;       5= blink special char in lower right corner
9180
9181    B463   48       INTR:  PHA                      ;interrupt service routine (TIMER)
9182    B464   DA              PHX                      ;save registers
9183    B465   5A              PHY
9184    B466   A5 41           LDA     LSB
9185    B468   48              PHA
9186    B469   A5 42           LDA     MSB
9187    B46B   48              PHA
9188
9189    B46C   85 1B           STA     WATCHDOG         ;clear watchdog timer
9190    B46E   C6 46           DEC     TIMCTR           ;decrement down counter
9191    B470   C6 47           DEC     TIMCTR2
9192    B472   C6 A2           DEC     SECCTR+1         ;decrement seconds counter
9193    B474   D0 0F           BNE     INT1
9194    B476   C6 A1           DEC     SECCTR
9195    B478   A9 19           LDA     #PERSEC
9196    B47A   85 A2           STA     SECCTR+1
9197    B47C   A5 6D           LDA     FLAGS            ;that's all if no power key
9198    B47E   29 01           AND     #00000001B
9199    B480   D0 03           BNE     INT1
9200    B482   4C 89 B6        JMP     INT70
9201
9202    B485   A5 12    INT1:  LDA     STATUS1          ;if power key now gone,
9203    B487   29 01           AND     #00000001B
9204    B489   F0 07           BEQ     INT2
9205    B48B   A9 80           LDA     #01000000B       ;then return it as a key pressed
9206    B48D   85 5D           STA     KEYPRESS
9207    B48F   4C 01 B6        JMP     INT60
9208    B492   A5 12    INT2:  LDA     STATUS1          ;or if battery low
9209    B494   29 20           AND     #00100000B
9210    B496   F0 07           BEQ     INT20
9211    B498   A9 81           LDA     #10000001B
9212    B49A   85 5D           STA     KEYPRESS
9213    B49C   4C 01 B6        JMP     INT60
9214
9215    B49F   A5 5C    INT20: LDA     KEYREG           ;manage keyboard
9216    B4A1   D0 1D           BNE     INT22
9217    B4A3   A5 13           LDA     STATUS2          ;no keys in progress
9218    B4A5   25 5E           AND     KEYMASK
9219    B4A7   F0 40           BEQ     INT25            ;no new ones either
9220    B4A9   A0 05           LDY     #5               ;one is here, debounce
9221    B4AB   20 C8 A2        JSR     WAITMS
9222    B4AE   A5 13           LDA     STATUS2
9223    B4B0   25 5E           AND     KEYMASK
9224    B4B2   F0 35           BEQ     INT25            ;bogus key
9225    B4B4   85 5D           STA     KEYPRESS         ;key still here, save it
9226    B4B6   85 5C           STA     KEYREG
9227    B4B8   A9 19           LDA     #PERSEC          ;start repeat counter after 1 sec.
9228    B4BA   85 5F           STA     REPCTR
```

```
9229  B4BC  64 E3              STZ    CMDCTR        ;reset auto-key
9230  B4BE  80 4D              BRA    INT30
9231
9232  B4C0  A5 13     INT22:   LDA    STATUS2       ;working on a key already
9233  B4C2  25 5E              AND    KEYMASK
9234  B4C4  C5 5C              CMP    KEYREG
9235  B4C6  D0 12              BNE    INT23         ;key is gone, make sure
9236  B4C8  25 68     INT24:   AND    REPEAT_MASK   ;key still here
9237  B4CA  F0 41              BEQ    INT30
9238  B4CC  C6 5F              DEC    REPCTR
9239  B4CE  D0 3D              BNE    INT30         ;don't repeat yet
9240  B4D0  A5 5C              LDA    KEYREG        ;repeat time up, send another key
9241  B4D2  85 5D              STA    KEYPRESS
9242  B4D4  A5 6E              LDA    REPEAT_RATE   ;and reload the counter
9243  B4D6  85 5F              STA    REPCTR
9244  B4D8  80 33              BRA    INT30
9245
9246  B4DA  A0 05     INT23:   LDY    #5            ;key is going away
9247  B4DC  20 C0 A2           JSR    WAITMS        ;debounce
9248  B4DF  A5 13              LDA    STATUS2
9249  B4E1  25 5E              AND    KEYMASK
9250  B4E3  C5 5C              CMP    KEYREG
9251  B4E5  F0 E1              BEQ    INT24         ;it's still here
9252  B4E7  64 5C              STZ    KEYREG        ;it's really gone
9253
9254  B4E9  A5 E2     INT25:   LDA    INTCMD        ;no keys in progress
9255  B4EB  D0 04              BNE    INT26         ;do auto-key
9256  B4ED  64 E3              STZ    CMDCTR
9257  B4EF  80 1C              BRA    INT30
9258  B4F1  A5 E3     INT26:   LDA    CMDCTR        ;if new command,
9259  B4F3  D0 09              BNE    INT27
9260  B4F5  A6 E2              LDX    INTCMD
9261  B4F7  BD 7E F8           LDA    CMDRATE1,X
9262  B4FA  85 E3              STA    CMDCTR        ;wait before 1st key
9263  B4FC  80 0F              BRA    INT30
9264  B4FE  C6 E3     INT27:   DEC    CMDCTR        ;old command, dec ctr
9265  B500  D0 0B              BNE    INT30
9266  B502  A6 E2              LDX    INTCMD        ;if =0, reload counter with rep rate,
9267  B504  BD 82 F8           LDA    CMDRATE2,X
9268  B507  85 E3              STA    CMDCTR
9269  B509  A9 10              LDA    #NOKEY        ;and send NO key
9270  B50B  85 5D              STA    KEYPRESS
9271
9272  B50D  A5 6C     INT30:   LDA    BLINK         ;blink cursor
9273  B50F  C9 01              CMP    #1
9274  B511  F0 13              BEQ    INT31
9275  B513  A5 6D              LDA    FLAGS         ;no cursor mode, therefore
9276  B515  29 40              AND    #01000000B    ;if cursor left on,
9277  B517  F0 48              BEQ    INT40         ;turn it off
9278  B519  A5 6D              LDA    FLAGS         ;no cursor mode, cursor off
9279  B51B  29 BF              AND    #10111111B
9280  B51D  85 6D              STA    FLAGS
9281  B51F                     CURSOR_OFF
9285  B524  80 33              BRA    INT40
9286  B526  A5 5C     INT31:   LDA    KEYREG        ;if keypress, then cursor on
9287  B528  D0 21              BNE    INT33
9288  B52A  A5 6B              LDA    INTCTR
9289  B52C  F0 05              BEQ    INT32
9290  B52E  C6 6B              DEC    INTCTR        ;blink counter running
9291  B530  4C 01 B6           JMP    INT60
9292  B533  A9 06     INT32:   LDA    #BLINK_RATE   ;time up, reload
9293  B535  85 6B              STA    INTCTR
9294  B537  A5 6D              LDA    FLAGS
9295  B539  29 40              AND    #01000000B
9296  B53B  F0 0E              BEQ    INT33
9297  B53D  A5 6D              LDA    FLAGS         ;cursor was on, turn off
9298  B53F  29 BF              AND    #10111111B
9299  B541  85 6D              STA    FLAGS
```

```
9300  B543                            CURSOR_OFF
9304  B548  4C 01 B6                  JMP    INT60
9305  B54B  A5 6D           INT33: LDA   FLAGS      ;cursor was off, turn on
9306  B54D  09 40                     ORA    0010000008
9307  B54F  85 6D                     STA    FLAGS
9308  B551                            CURSOR_ON
9312  B556  4C 01 B6                  JMP    INT60
9313
9314  B559  A5 6C           INT40: LDA   BLINK      ;blink "?"
9315  B55B  C9 02                     CMP    #2
9316  B55D  F0 0C                     BEQ    INT45
9317  B55F  C9 05                     CMP    #5         ;or OK char
9318  B561  F0 08                     BEQ    INT45
9319  B563  A5 6D                     LDA    FLAGS      ;if not, clear flag
9320  B565  29 7F                     AND    #01111111B
9321  B567  85 6D                     STA    FLAGS
9322  B569  80 56                     BRA    INT50
9323  B56B  A5 5C           INT45: LDA   KEYREG     ;? on if keypress
9324  B56D  F0 02                     BEQ    INT46
9325  B56F  80 11                     BRA    INT41
9326  B571  A5 6B           INT46: LDA   INTCTR     ;time to blink?
9327  B573  F0 05                     BEQ    INT42
9328  B575  C6 6B                     DEC    INTCTR     ;blink counter running
9329  B577  4C 01 B6                  JMP    INT60
9330  B57A  A9 06           INT42: LDA   #BLINK_RATE ;time up, reload
9331  B57C  85 6B                     STA    INTCTR
9332  B57E  A5 6D                     LDA    FLAGS
9333  B580  30 35                     BMI    INT43
9334  B582  A5 6D           INT41: LDA   FLAGS      ;char was off, turn on
9335  B584  09 80                     ORA    #10000000B
9336  B586  85 6D                     STA    FLAGS
9337  B588  A5 6C                     LDA    BLINK
9338  B58A  C9 02                     CMP    #2
9339  B58C  F0 04                     BEQ    INT4A
9340  B58E  A9 0B                     LDA    #0         ;char=OK if blink=5
9341  B590  80 02                     BRA    INT44
9342  B592  A9 3F           INT4A: LDA   #'?'       ;char=? if blink=2
9343  B594  A6 6C           INT44: LDX   BLINK      ;display the char
9344  B596  E0 02                     CPX    #2
9345  B598  F0 13                     BEQ    INT4B
9346  B59A  A6 48                     LDX    CURSOR     ;if blink=5, display in corner
9347  B59C  DA                        PHX
9348  B59D  48                        PHA
9349  B59E                            SET_CURSOR LINE2+15
9353  B5A3  68                        PLA
9354  B5A4  20 10 A3                  JSR    DCHAR
9355  B5A7  68                        PLA
9356  B5A8  20 BC A3                  JSR    LCD_ADDR
9357  B5AB  80 54                     BRA    INT60
9358  B5AD  20 10 A3        INT4B: JSR   DCHAR      ;if blink=2, display at cursor
9359  B5B0                            BACKUP 1
9363  B5B5  80 4A                     BRA    INT60
9364  B5B7  A5 6D           INT43: LDA   FLAGS      ;char was on, turn off
9365  B5B9  29 7F                     AND    #01111111B
9366  B5BB  85 6D                     STA    FLAGS
9367  B5BD  A9 20                     LDA    #' '
9368  B5BF  80 D3                     BRA    INT44
9369
9370  B5C1  A5 6C           INT50: LDA   BLINK
9371  B5C3  C9 03                     CMP    #3
9372  B5C5  F0 04                     BEQ    INT55
9373  B5C7  C9 04                     CMP    #4
9374  B5C9  D0 36                     BNE    INT60
9375  B5CB  A5 6B           INT55: LDA   INTCTR     ;see if time to scroll
9376  B5CD  F0 04                     BEQ    INT51      ;no, keep counting
9377  B5CF  C6 6B                     DEC    INTCTR
9378  B5D1  80 2E                     BRA    INT60
9379  B5D3  A9 3E           INT51: LDA   #SRATE2    ;yes, reload counter
```

```
9380   B505  85 6B                      STA      INTCTR
9381   B507  E6 06                      INC      SCREEN        ;show next screen
9382   B509  20 85 A3                   JSR      DISPLAY_CLR
9383   B50C  20 F5 A2                   JSR      DMSG
9384   B50F  A5 6C                      LDA      BLINK
9385   B5E1  C9 03                      CMP      #3
9386   B5E3  F0 12                      BEQ      INT52
9387   B5E5  A5 06                      LDA      SCREEN        ;if blink=4
9388   B5E7  C5 05                      CMP      SCREENS
9389   B5E9                             BLT      INT60
9392   B5EB  F0 14                      BEQ      INT60
9393   B5ED  20 85 A3                   JSR      DISPLAY_CLR   ;ask repeat msg after last screen
9394   B5F0                             MESSAGE  111
9398   B5F5  80 06                      BRA      INT53
9399
9400   B5F7  A5 06          INT52:      LDA      SCREEN        ;if blink=3 and last screen then quit
9401   B5F9  C5 05                      CMP      SCREENS
9402   B5FB  D0 04                      BNE      INT60
9403
9404   B5FD                 INT53:      NOBLINK                ;stop scrolling
9408
9409   B601  20 D6 A4       INT60:      JSR      READ_RTC      ;update clock
9410   B604  F0 03                      BEQ      INT70
9411   B606  20 EF A4                   JSR      UPDATE_CLOCK  ;when it needs it
9412
9413   B609  85 80          INT70:      STA      TIMER_LOAD    ;restart TIMER
9414
9415   B60B  68                         PLA
9416   B60C  85 42                      STA      MSB
9417   B60E  68                         PLA
9418   B60F  85 41                      STA      LSB
9419   B611  7A                         PLY                    ;restore registers
9420   B612  FA                         PLX
9421   B613  68                         PLA
9422   B614  40                         RTI
9423
9424   B615  40             NMIINT:     RTI                    ;never happens
9425
9426
9427
9428
9429   B616                             INCLUDE  HELP.ASM
9430                                    ;----------------------------------
9431                                    ;    SCROLLING MESSAGES
9432                                    ;----------------------------------
9433   B616
9434   B616  01 1E 54 68 69 SCROLL0:    BYTE     1,30,'This feature is NOT AVAILABLE.'
9435   B636
9436   B636  02 1B 43 68 6F SCROLL1:    BYTE     2,27,'Choose whether to exit the'
9437   B653  19 4D 6F 64 65             BYTE     25,'Mode or do     it again.'
9438   B66D
9439   B66D  02 20 4E 6F 20 SCROLL2:    BYTE     2,32,'No watering    schedule set up.'
9440   B68F  16 44 6F 20 53             BYTE     22,'Do SET SCHEDULESfirst.'
9441   B6A6
9442   B6A6  02 19 54 6F 20 SCROLL3:    BYTE     2,25,'To start       watering,'
9443   B6C1  18 54 61 6B 65             BYTE     24,'Take POWER KEY out now.'
9444   B6DA
9445   B6DA  02 19 54 68 69 SCROLL4:    BYTE     2,25,'This Set Up has an error.'
9446   B6F5  16 44 6F 20 53             BYTE     22,'Do SET SCHEDULESagain.'
9447   B70C
9448   B70C  02 1C 54 68 65 SCROLL5:    BYTE     2,28,'The SETUP type you selected'
9449   B72A  1C 68 61 73 20             BYTE     28,'has not been   entered yet.'
9450   B747
9451                                    ; global message for new setup or modify CONFIRM screens
9452   B747
9453   B747  02 20 50 72 65 SCROLL6:    BYTE     2,32,'Press OK to-   CONFIRM setting;'
9454   B769  1A 50 72 65 73             BYTE     26,'Press NO to    CHANGE it.'
9455   B784
```

```
9456                          ; global message for HISTORY or SETTINGS review screens
9457   B784
9458   B784  02 20 50 72 65   SCROLL7:  BYTE   2,32,'Press OK to viewthe next screen,'
9459   B7A6  20 6F 72 20 4E             BYTE   32,'or NO to start  the review over.'
9460   B7C7
9461                          ; global message for all COPY TO NEXT VALVE screens
9462   B7C7
9463   B7C7  03 20 50 72 65   SCROLL8:  BYTE   3,32,'Press OK to use the SAME setting'
9464   B7E9  1B 66 6F 72 20             BYTE   27,'for the next     station, or'
9465   B805  20 70 72 65 73             BYTE   32,'press NO to set a different one.'
9466   B826
9467   B826  03 18 57 65 6C   SCROLL9:  BYTE   3,24,'Welcome to the  SOLATROL'
9468   B840  1B 4C 45 49 54             BYTE   27,'LEIT(TM) 8000   Controller.'
9469   B85C  20 57 61 6E 74             BYTE   32,'Want Directions?(Press NO or OK)'
9470   B87D
9471                          ; Directions (Scroll10-Scroll23)
9472   B87D
9473   B87D  04 18 53 4F 4C   SCROLL10: BYTE   4,24,'SOLATROL         welcomes'
9474   B897  1D 45 4E 56 49             BYTE   29,'ENVIRONMENTAL    INDUSTRIES to'
9475   B8B5  1B 74 68 65 20             BYTE   27,'the LEIT(TM)8000Controller.'
9476   B8D1  20 57 61 6E 74             BYTE   32,'Want Directions?(Press OK or NO)'
9477   B8F2
9478   B8F2  03 1F 54 68 69   SCROLL11: BYTE   3,31,'This Controller uses and stores'
9479   B913  1B 6C 69 67 68             BYTE   27,'light energy to run up to 8'
9480   B92F  20 53 4F 4C 41             BYTE   32,'SOLATROL         SUPERVALVES(TM).'
9481   B950
9482   B950  08 1F 57 68 65   SCROLL12: BYTE   8,31,'When the displayasks a question'
9483   B971  1E 6F 72 20 62             BYTE   30,'or blinks the    underline (_),'
9484   B990  20 79 6F 75 20             BYTE   32,'you press OK  ,  to answer YES or'
9485   B9B1  1E 74 6F 20 61             BYTE   30,'to accept the    current number'
9486   B9D0  1F 6F 72 20 79             BYTE   31,'or you press NO to see the next'
9487   B9F0  17 63 68 6F 69             BYTE   23,'choice or        number.'
9488   BA08  1D 48 6F 6C 64             BYTE   29,'Holding down theNO key causes'
9489   BA26  1F 74 68 65 20             BYTE   31,'the numbers to change rapidly.'
9490   BA46
9491   BA46  09 20 57 68 65   SCROLL13: BYTE   9,32,'When you need toenter numbers or'
9492   BA68  1E 73 65 6C 65             BYTE   30,'select options   from a list of'
9493   BA87  1A 63 68 6F 69             BYTE   26,'choices, the     Controller'
9494   BAA2  1D 61 75 74 6F             BYTE   29,'automatically    advances thru'
9495   BAC0  20 74 68 65 20             BYTE   32,'the choices or   numbers for you.'
9496   BAE1  1B 50 72 65 73             BYTE   27,'Press OK when    the correct'
9497   BAFD  1D 63 68 6F 69             BYTE   29,'choice or numberis displayed.'
9498   BB1B  20 48 6F 6C 64             BYTE   32,'Holding down theNO key makes the'
9499   BB3C  17 64 69 73 70             BYTE   23,'display change faster.'
9500   BB54
9501   BB54  06 1C 59 6F 75   SCROLL14: BYTE   6,28,'You can press   the HELP key'
9502   BB72  1A 74 6F 20 68             BYTE   26,'to have the      Controller'
9503   BB8D  1E 65 78 70 6C             BYTE   30,'explain the      question or to'
9504   BBAC  1C 67 65 74 20             BYTE   28,'get more         information.'
9505   BBC9  1F 54 68 65 20             BYTE   31,'The STOP key canbe used to exit'
9506   BBE9  20 66 72 6F 6D             BYTE   32,'from Help to theprevious screen.'
9507   BC0A
9508   BC0A  08 1F 54 68 65   SCROLL15: BYTE   8,31,'There are 4 mainoptions used in'
9509   BC2B  1B 73 65 74 74             BYTE   27,'setting up and   running the'
9510   BC47  1D 43 6F 6E 74             BYTE   29,'Controller.-     These options'
9511   BC65  20 61 72 65 20             BYTE   32,'are chosen from a self-advancing'
9512   BC86  1B 6C 69 73 74             BYTE   27,'list by pressingthe OK key.'
9513   BCA2  1F 54 68 65 20             BYTE   31,'The STOP Key     always abandons'
9514   BCC2  20 74 68 65 20             BYTE   32,'the current      screen & returns'
9515   BCE3  1A 79 6F 75 20             BYTE   26,'you to the       beginning.'
9516   BCFE
9517   BCFE  08 1E 45 4E 54   SCROLL16: BYTE   8,30,'ENTER SETUP     lets you enter'
9518   BD1E  19 53 43 48 45             BYTE   25,'SCHEDULES or     ALTERNATE'
9519   BD3B  18 53 43 48 45             BYTE   24,'SCHEDULES to     tell the'
9520   BD51  1A 43 6F 6E 74             BYTE   26,'Controller when and how to'
9521   BD6C  1B 72 75 6E 20             BYTE   27,'run each valve  or station.'
9522   BD88  1F 45 4E 54 45             BYTE   31,'ENTER SETUP alsolets you set up'
9523   BDAB  1D 74 68 65 20             BYTE   29,'the SYSTEM to    fit your site'
9524   BDC6  1C 61 6E 64 20             BYTE   28,'and specific     application.'
9525   BDE3
```

```
9526  BDE3  03 1C 52 55 4E   SCROLL17:  BYTE  3,28,'RUN STATIONS    lets you run'
9527  BE01  1F 73 74 61 74              BYTE  31,'stations in 3  ways: AUTOMATIC'
9528  BE21  19 53 45 4D 49              BYTE  25,'SEMI-AUTOMATIC, & MANUAL.'
9529  BE3B
9530  BE3B  03 1E 41 55 54   SCROLL18:  BYTE  3,30,'AUTOMATIC RUN isthe normal way'
9531  BE5B  1B 74 6F 20 74              BYTE  27,'to turn valves  on & off as'
9532  BE77  1E 73 63 68 65              BYTE  30,'scheduled in    Set SCHEDULES.'
9533  BE96
9534  BE96  04 1B 53 45 4D   SCROLL19:  BYTE  4,27,'SEMI-AUTO RUN  lets you do'
9535  BEB3  1E 61 6E 20 69              BYTE  30,'an immediate OneTime Soak or a'
9536  BED2  1C 6E 6F 72 6D              BYTE  28,'normal watering cycle before'
9537  BEEF  1E 72 65 76 65              BYTE  30,'reverting to    AUTOMATIC RUN.'
9538  BF0E
9539  BF0E  05 1D 4D 41 4E   SCROLL20:  BYTE  5,29,'MANUAL RUN      allows you to'
9540  BF2D  1E 6F 70 65 72              BYTE  30,'operate Valves  one at a time,'
9541  BF4C  1E 6F 72 20 69              BYTE  30,'or in a defined TEST SEQUENCE,'
9542  BF6B  1D 61 6E 64 20              BYTE  29,'and it lets you take Moisture'
9543  BF89  10 53 65 6E 73              BYTE  16,'Sensor readings.'
9544  BF9A
9545  BF9A  04 1F 4E 4F 20   SCROLL21:  BYTE  4,31,'NO WATERING willoccur if you OK'
9546  BFBB  1E 53 54 41 59              BYTE  30,'STAY IDLE/OFF. The Controller'
9547  BFDA  1C 77 69 6C 6C              BYTE  28,'will keep all    your setups,'
9548  BFF7  1C 62 75 74 20              BYTE  28,'but none of theawill be run.'
9549  C014
9550  C014  04 1F 56 49 45   SCROLL22:  BYTE  4,31,'VIEW INFO lets  you see HISTORY'
9551  C035  1F 65 76 65 6E              BYTE  31,'events by date, see DIRECTIONS,'
9552  C055  1E 73 65 65 20              BYTE  30,'see RUN TOTALS, or do a system'
9553  C074  0A 53 45 4C 46              BYTE  10,'SELF TEST.'
9554  C07F
9555  C07F  06 1F 42 65 66   SCROLL23:  BYTE  6,31,'Before you can BEGIN WATERING,'
9556  C0A0  1D 79 6F 75 20              BYTE  29,'you need to     complete both'
9557  C0BE  1E 53 65 74 75              BYTE  30,'Setup SYSTEM &  Set SCHEDULES.'
9558  C0DD  1D 54 68 65 6E              BYTE  29,'Then choose     RUN STATIONS,'
9559  C0FB  1E 74 68 65 6E              BYTE  30,'then either     AUTOMATIC RUN,'
9560  C11A  1E 53 45 4D 49              BYTE  30,'SEMI-AUTO RUN, or MANUAL RUN.'
9561  C139
9562                                    ; message for Self Test question
9563  C139
9564  C139  03 1D 54 68 65   SCROLL24:  BYTE  3,29,'The SELF TEST   automatically'
9565  C158  1D 74 65 73 74              BYTE  29,'tests the wiringand tells you'
9566  C176  1F 74 68 65 20              BYTE  31,'the time, date, & current mode.'
9567  C196
9568  C196  04 20 50 72 65   SCROLL25:  BYTE  4,32,'Press STOP to   temporarily STOP'
9569  C1B8  18 52 55 4E 4E              BYTE  24,'RUNNING your    watering'
9570  C1D1  1A 73 63 68 65              BYTE  26,'schedule, or    REMOVE the'
9571  C1EC  1D 50 4F 57 45              BYTE  29,'POWER KEY to    keep running.'
9572  C20A
9573                                    ; message for Secret Codes (only use if Secret Code set)
9574  C20A
9575  C20A  06 1F 54 6F 20   SCROLL26:  BYTE  6,31,'To change the  settings of the'
9576  C22B  1B 43 6F 6E 74              BYTE  27,'Controller,     you need to'
9577  C247  1E 65 6E 74 65              BYTE  30,'enter your      USER CODE now.'
9578  C266  1D 49 66 20 79              BYTE  29,'If you remove  the POWER KEY'
9579  C284  1D 6E 6F 77 2C              BYTE  29,'now, all        settings will'
9580  C2A2  1A 72 65 6D 61              BYTE  26,'remain the same as before.'
9581  C2BD
9582  C2BD  02 1B 45 6E 74   SCROLL27:  BYTE  2,27,'Enter how long  to run each'
9583  C2DA  1E 53 74 61 74              BYTE  30,'Station (from    1-30 minutes).'
9584
9585  C2F9                   SCROLL28:
9586  C2F9
9587  C2F9                   SCROLL29:
9588  C2F9
9589  C2F9  03 1E 45 4E 54   SCROLL30:  BYTE  3,30,'ENTER SETUP modelets you enter'
9590  C319  19 53 43 48 45              BYTE  25,'SCHEDULES,      ALTERNATE'
9591  C333  20 53 43 48 45              BYTE  32,'SCHEDULES, or  SYSTEM SETTINGS.'
9592  C354
9593  C354  02 1E 53 65 74   SCROLL31:  BYTE  2,30,'Set SCHEDULES   lets you enter'
9594  C374  20 76 61 72 69              BYTE  32,'various types ofwatering setups.'
```

```
9595  C395
9596  C395  03 1E 53 65 74    SCROLL32: BYTE  3,30,'Set ALT. SCHED. lets you enter'
9597  C3B5  1F 61 6C 74 65              BYTE  31,'alternate      versions of the'
9598  C3D5  20 76 61 72 69              BYTE  32,'various types of watering setups.'
9599  C3F6
9600  C3F6  03 1F 53 65 74    SCROLL33: BYTE  3,31,'Setup SYSTEM    lets you set up'
9601  C417  1D 74 68 65 20              BYTE  29,'the SYSTEM to   fit your site'
9602  C435  1C 61 6E 64 20              BYTE  28,'and specific    application.'
9603  C452
9604  C452  03 1F 54 68 65    SCROLL34: BYTE  3,31,'There are no    wired stations.'
9605  C473  1A 4F 6C 64 20              BYTE  26,'Old ID will be  kept until'
9606  C48E  1A 77 69 72 65              BYTE  26,'wires are       connected.'
9607  C4A9
9608  C4A9  08 1F 43 68 6F    SCROLL35: BYTE  8,31,'Choose (OK)     "Use site info"'
9609  C4CA  1E 74 6F 20 61              BYTE  30,'to automatically enter the best'
9610  C4E9  1E 73 70 6C 69              BYTE  30,'split ON and OFF times based on'
9611  C508  20 74 62 65 20              BYTE  32,'the type of     soil, terrain, &'
9612  C529  1C 73 70 72 69              BYTE  28,'sprinklers for  each station'
9613  C546  1B 6C 6F 63 61              BYTE  27,'location, or    choose (OK)'
9614  C562  1D 22 45 6E 74              BYTE  29,'"Enter directly"to enter your'
9615  C580  1F 6F 77 6E 20              BYTE  31,'own maximum ONs,& minimum OFFs.'
9616  C5A0
9617  C5A0  05 20 50 72 65    SCROLL36: BYTE  5,32,'Press OK when   the correct type'
9618  C5C2  1D 6F 66 20 74              BYTE  29,'of terrain and  soil for this'
9619  C5E0  1B 73 74 61 74              BYTE  27,'station is      shown, then'
9620  C5FC  20 70 72 65 73              BYTE  32,'press OK when   the correct type'
9621  C61D  16 6F 66 20 73              BYTE  22,'of sprinkler is shown.'
9622  C634
9623  C634              SCROLL37:
9624  C634
9625  C634  01 1D 54 68 69    SCROLL38: BYTE  1,29,'This HELP is    for Set Site.'
9626  C653
9627  C653  02 1F 53 65 74    SCROLL39: BYTE  2,31,'Set TIME/DATE   lets you see or'
9628  C674  1F 63 68 61 6E              BYTE  31,'change the time & date setting.'
9629  C694
9630  C694  03 1E 44 6F 20    SCROLL40: BYTE  3,30,'Do WIRE CHECK   lets you check'
9631  C6B4  1D 66 6F 72 20              BYTE  29,'for shorted or  broken (open)'
9632  C6D2  16 76 61 6C 76              BYTE  22,'valve or sensor wires.'
9633  C6E9
9634  C6E9  03 1D 53 65 74    SCROLL41: BYTE  3,29,'Setup STATIONS  lets you View'
9635  C708  1E 43 75 72 72              BYTE  30,'Current Station IDs (numbers),'
9636  C727  20 6F 72 20 45              BYTE  32,'or Enter New IDs to change ID #s.'
9637
9638                        ;add to Scroll41 when add "Assign Types" function:
9639  C748
9640              ;         BYTE  25,'It also lets you designate'
9641              ;         BYTE  31,'station uses.   Stations can be'
9642              ;         BYTE  30,'used for REGULAR valves, MASTER'
9643              ;         BYTE  32,'valves, or for a SPECIAL use like'
9644              ;         BYTE  16,'lights or pumps.'
9645  C748
9646  C748
9647  C748  07 1D 53 65 74    SCROLL42: BYTE  7,29,'Setup SENSORS   lets you View'
9648  C767  1E 43 75 72 72              BYTE  30,'Current Sensor  IDs (numbers),'
9649  C786  20 6F 72 20 45              BYTE  32,'or Enter New IDs to change ID #s.'
9650  C7A7  1D 49 74 20 61              BYTE  29,'It also lets you assign sensor'
9651  C7C5  20 70 6F 73 69              BYTE  32,'positions to    different sensor'
9652  C7E6  1C 74 79 70 65              BYTE  28,'types, such as  Moisture, or'
9653  C803  0D 52 61 69 6E              BYTE  13,'Rain Sensors.'
9654  C811
9655  C811  02 1E 53 65 74    SCROLL43: BYTE  2,30,'Set USER CODES  limits who may'
9656  C831  1F 68 61 76 65              BYTE  31,'have access to  the Controller.'
9657  C851
9658  C851  02 20 50 72 65    SCROLL44: BYTE  2,32,'Press OK to EXIT this task and go'
9659  C873  1A 62 61 63 6B              BYTE  26,'back to the     beginning.'
9660  C88E
9661  C88E              SCROLL45:
9662  C88E
```

```
9663  C88E                       SCROLL46:
9664  C88E
9665  C88E                       SCROLL47:
9666  C88E
9667  C88E  03 1F 41 20 40       SCROLL48: BYTE  3,31,'A MASTER VALVE  is a valve that'
9668  C8AF  1C 69 73 20 74                 BYTE  28,'is turned on      whenever any'
9669  C8CC  13 6F 74 68 65                 BYTE  19,'other valve is on.'
9670  C8E0
9671  C8E0  02 20 54 68 65       SCROLL49: BYTE  2,32,'The Controller  is asking if the'
9672  C902  1C 73 65 74 74                 BYTE  28,'settings shown   are correct.'
9673  C91F
9674  C91F  02 19 50 72 65       SCROLL50: BYTE  2,25,'Press OK to see or change'
9675  C93A  1B 77 68 69 63                 BYTE  27,'which stations  are active.'
9676  C956
9677  C956                       SCROLL51:
9678  C956
9679  C956  02 1C 54 68 65       SCROLL52: BYTE  2,28,'The valve shown is presently'
9680  C974  19 73 65 74 20                 BYTE  25,'set up to do NO WATERING.'
9681  C98E
9682  C98E  05 1F 45 6E 74       SCROLL53: BYTE  5,31,'Enter when to   START WATERING.'
9683  C9AF  1F 55 73 65 20                 BYTE  31,'Use a Start Time early enough to'
9684  C9CF  1F 66 69 6E 69                 BYTE  31,'finish before   midnight if you'
9685  C9EF  1D 61 72 65 20                 BYTE  29,'are using long 100% Watering'
9686  CA0D  1F 44 75 72 61                 BYTE  31,'Durations or    Excluded Times.'
9687  CA2D
9688  CA2D  07 1D 45 6E 74       SCROLL54: BYTE  7,29,'Enter the TOTAL watering time'
9689  CA4C  1D 70 65 72 20                 BYTE  29,'per day for this valve. Enter'
9690  CA6A  1C 68 6F 75 72                 BYTE  28,'hours (h), then minutes (m).'
9691  CA87  1D 4F 4B 20 30                 BYTE  29,'OK 0h to enter minutes only.'
9692  CAA5  20 45 6E 74 65                 BYTE  32,'Entering a 100% Duration = 0h+0m'
9693  CAC6  1D 6C 65 74 73                 BYTE  29,'lets you SKIP   watering with'
9694  CAE4  0B 74 68 69 73                 BYTE  11,'this valve.'
9695  CAF0
9696  CAF0  02 1D 45 6E 74       SCROLL55: BYTE  2,29,'Enter HOW OFTEN to water from'
9697  C00F  20 31 2D 39 30                 BYTE  32,'1-90 days (every1 days = daily).'
9698  CB30
9699  CB30  04 1F 22 53 4F       SCROLL56: BYTE  4,31,'"SO MANY" DAYS waters at fixed'
9700  CB51  1A 69 6E 74 65                 BYTE  26,'intervals from 1-90 days.'
9701  CB6C  1E 22 53 50 45                 BYTE  30,'"SPECIFIC DAYS" waters only on'
9702  CB8B  1A 63 65 72 74                 BYTE  26,'certain days    each week.'
9703  CBA6
9704  CBA6                       SCROLL57:
9705  CBA6
9706  CBA6  06 1C 54 68 65       SCROLL58: BYTE  6,28,'The WATER BUDGET increases or'
9707  CBC4  1E 64 65 63 72                 BYTE  30,'decreases the   water applied.'
9708  CBE3  1E 41 20 76 61                 BYTE  30,'A value of 100% waters exactly'
9709  CC02  17 61 63 63 6F                 BYTE  23,'according to the Set Up.'
9710  CC1A  1F 54 68 65 20                 BYTE  31,'The water budget does not affect'
9711  CC3A  17 53 6F 61 6B                 BYTE  23,'Soak & syringe cycles.'
9712  CC52
9713  CC52  03 19 54 68 65       SCROLL59: BYTE  3,25,'The display     shows the'
9714  CC6D  1B 63 75 72 72                 BYTE  27,'currently active station #s.'
9715  CC89  18 50 72 65 73                 BYTE  24,'Press NO to make changes.'
9716  CCA2
9717  CCA2  02 1C 50 72 65       SCROLL60: BYTE  2,28,'Press OK for    each station'
9718  CCC0  1D 74 68 61 74                 BYTE  29,'that you want to use (ENABLE).'
9719  CCDE
9720  CCDE  04 1E 53 50 4C       SCROLL61: BYTE  4,30,'SPLITS let you split the 100%'
9721  CCFE  1C 77 61 74 65                 BYTE  28,'watering time   into shorter'
9722  CD1B  1D 4F 4E 20 74                 BYTE  29,'ON times to     reduce runoff'
9723  CD39  0C 61 6E 64 20                 BYTE  12,'and erosion.'
9724  CD46
9725  CD46  03 1C 43 68 6F       SCROLL62: BYTE  3,28,'Choose whether to turn this'
9726  CD64  1E 73 74 61 74                 BYTE  30,'station OFF/ON, go to the NEXT'
9727  CD83  1B 73 74 61 74                 BYTE  27,'station, or EXIT Manual Run.'
9728
9729  CD9F  06 1D 54 68 65       SCROLL63: BYTE  6,29,'The top line    shows whether'
9730  CDBE  1E 73 74 61 74                 BYTE  30,'stations are ON (number shown)'
9731  CDDD  1F 6F 72 20 4F                 BYTE  31,'or OFF (-).     The bottom line'
```

```
9732  CDFD  1F 6C 65 74 73            BYTE  31,'lets you Turn ON or Turn OFF the'
9733  CE1D  1E 69 6E 64 69            BYTE  30,'indicated Sta #, go to the NEXT'
9734  CE3C  1B 73 74 61 74            BYTE  27,'station, or EXIT manual run.'
9735  CE58
9736  CE58  04 1A 54 68 69  SCROLL64: BYTE  4,26,'This HISTORY   event is a'
9737  CE74  1D 76 61 6C 76            BYTE  29,'valve start. The display shows'
9738  CE92  1D 74 68 65 20            BYTE  29,'the valve #, the start time, &'
9739  CEB0  1E 74 68 65 20            BYTE  30,'the actual     watering time.'
9740  CECF
9741  CECF  04 1A 54 68 69  SCROLL65: BYTE  4,26,'This HISTORY   event is a'
9742  CEEB  1A 74 69 6D 65            BYTE  26,'time and date  stamp. All'
9743  CF06  1F 65 76 65 6E            BYTE  31,'events displayed after the stamp'
9744  CF26  14 6F 63 63 75            BYTE  20,'occurred on that day.'
9745  CF3B
9746  CF3B  03 20 54 68 69  SCROLL66: BYTE  3,32,'This HISTORY     event shows when'
9747  CF5D  20 6F 70 65 72            BYTE  32,'operating Modes or the Power Key'
9748  CF7E  0F 68 61 76 65            BYTE  15,'have been used.'
9749  CF8E
9750  CF8E  07 1F 53 65 65  SCROLL67: BYTE  7,31,'See DIRECTIONS shows operating'
9751  CFAF  1B 70 72 6F 63            BYTE  27,'procedures;    See HISTORY'
9752  CFCB  1B 73 68 6F 77            BYTE  27,'shows the last 128 events;'
9753  CFE7  1D 53 65 65 20            BYTE  29,'See RUN TOTALS shows monthly'
9754  D005  1A 63 75 6D 75            BYTE  26,'cumulative run times; and'
9755  D020  1F 44 6F 20 53            BYTE  31,'Do SELF TEST   shows the mode,'
9756  D040  20 74 69 6D 65            BYTE  32,'time & date,   & wiring status.'
9757  D061
9758  D061  02 1C 2A 45 52  SCROLL68: BYTE  2,28,'#ERROR# The 2nd time MUST be'
9759  D07F  19 4C 41 54 45            BYTE  25,'LATER THAN the 1st time.'
9760  D099
9761  D099  02 1C 4E 4F 20  SCROLL69: BYTE  2,28,'NO WATERING    will be done'
9762  D0B7  14 6F 6E 20 74            BYTE  20,'on the selected day.'
9763  D0CC
9764  D0CC  04 1F 53 65 6C  SCROLL70: BYTE  4,31,'Select a number of days to WAIT'
9765  D0ED  20 62 65 66 6F            BYTE  32,'before watering with this valve.'
9766  D10E  1C 53 65 6C 65            BYTE  28,'Select # to    water at the'
9767  D12B  1B 66 69 72 73            BYTE  27,'first allowable start time.'
9768  D147
9769  D147  03 1D 2A 45 52  SCROLL71: BYTE  3,29,'#ERROR#        Set Up empty.'
9770  D166  20 55 73 65 20            BYTE  32,'Use ENTER SETUP to Set SCHEDULE,'
9771  D187  20 66 6F 72 20            BYTE  32,'for the Set Up you want to run.'
9772  D1A8
9773  D1A8  05 1D 50 72 65  SCROLL72: BYTE  5,29,'Press OK for   each week day'
9774  D1C7  1E 6F 6E 20 77            BYTE  30,'on which you   want to water.'
9775  D1E6  1C 49 66 20 6F            BYTE  28,'If only one day is selected,'
9776  D203  1C 63 68 6F 6F            BYTE  28,'choose every   1wk (7 days)'
9777  D220  1E 75 70 20 74            BYTE  30,'up to every    9wk (63 days).'
9778  D23F
9779  D23F  02 1E 48 45 4C  SCROLL73: BYTE  2,30,'HELP message is not available.'
9780  D25F  1D 52 65 66 65            BYTE  29,'Refer to the   USERS MANUAL.'
9781  D27D
9782  D27D  04 20 2A 45 52  SCROLL74: BYTE  4,32,'#ERROR#         Too many starts.'
9783  D29F  19 54 68 65 20            BYTE  25,'The maximum    number is'
9784  D2B9  1D 31 32 38 20            BYTE  29,'128 per day, or an average of'
9785  D2D7  0F 31 36 20 70            BYTE  15,'16 per station.'
9786  D2E7
9787  D2E7  05 1D 2A 45 52  SCROLL75: BYTE  5,29,'#ERROR#        Sequence runs'
9788  D306  1E 70 61 73 74            BYTE  30,'past midnight! Set an earlier'
9789  D325  1D 53 74 61 72            BYTE  29,'Start Time,    set a shorter'
9790  D343  1E 45 78 63 6C            BYTE  30,'Excluded Time, or use a lower'
9791  D362  0D 57 61 74 65            BYTE  13,'Water Budget.'
9792
9793  D370                  SCROLL76:
9794
9795  D370  05 20 45 6E 74  SCROLL77: BYTE  5,32,'Enter the split ON time for this'
9796  D392  1E 76 61 6C 76            BYTE  30,'valve. Shorter times give you'
9797  D3B1  17 6D 6F 72 65            BYTE  23,'more repeat    cycles.'
9798  D3C9  1C 54 68 65 20            BYTE  28,'The sum of all the split ON'
9799  D3E6  1F 74 69 6D 65            BYTE  31,'times equals the total duration.'
```

```
9800
9801  D406  03 1E 53 65 74    SCROLL78:  BYTE  3,30,'Set the MINIMUM time the valve'
9802  D426  1F 69 73 20 4F              BYTE  31,'is OFF between  split ON times.'
9803  D446  1E 49 6E 20 6D              BYTE  30,'In most cases 30minutes is OK.'
9804  D465
9805  D465                   SCROLL79:
9806
9807  D465  04 1E 45 58 43    SCROLL80:  BYTE  4,30,'EXCLUDED PERIOD is a time when'
9808  D485  1B 4E 4F 20 57              BYTE  27,'NO WATERING willoccur. Any'
9809  D4A1  1E 75 6E 66 69              BYTE  30,'unfinished ON   cycles will be'
9810  D4C0  1C 66 69 6E 69              BYTE  28,'finished after  this period.'
9811  D4DD
9812  D4DD  02 1C 45 6E 74    SCROLLB1:  BYTE  2,28,'Enter the START time for the'
9813  D4FB  07 70 65 72 69              BYTE  7,'period.'
9814  D503
9815  D503  02 1C 45 6E 74    SCROLL82:  BYTE  2,28,'Enter the ENDINGtime for the'
9816  D521  07 70 65 72 69              BYTE  7,'period.'
9817  D529
9818  D529  05 1C 43 68 6F    SCROLL83:  BYTE  5,28,'Choose whether  you want to:'
9819  D547  1C 52 45 56 49              BYTE  28,'REVIEW SETUP    (view only),'
9820  D564  20 4D 4F 44 49              BYTE  32,'MODIFY SETUP    (change values),'
9821  D585  20 44 4F 20 4E              BYTE  32,'DO NEW SETUP    (start over), or'
9822  D5A6  09 45 58 49 54              BYTE  9,'EXIT NOW.'
9823  D5B0
9824  D5B0  03 1B 50 72 65    SCROLL84:  BYTE  3,27,'Press OK to see the entered'
9825  D5CD  1B 64 75 72 61              BYTE  27,'durations, splitcycles, and'
9826  D5E9  0E 77 61 74 65              BYTE  14,'watering days.'
9827  D5F8
9828  D5F8  05 1E 53 59 52    SCROLL85:  BYTE  5,30,'SYRINGES are    short watering'
9829  D618  20 63 79 63 6C              BYTE  32,'cycles at fixed intervals during'
9830  D639  20 61 20 66 69              BYTE  32,'a fixed period  every day during'
9831  D65A  20 61 63 74 69              BYTE  32,'active months. Use syringes for'
9832  D67B  1F 66 72 6F 73              BYTE  31,'frost wipes, or summer cooling.'
9833  D69B
9834  D69B  02 1F 50 72 65    SCROLL86:  BYTE  2,31,'Press OK for    each month that'
9835  D6BC  1F 79 6F 75 20              BYTE  31,'you want to havedaily syringes.'
9836  D6DC
9837  D6DC  03 20 45 6E 74    SCROLL87:  BYTE  3,32,'Enter the       syringe duration'
9838  D6FE  1E 69 6E 20 6D              BYTE  30,'in minutes (m) per syringe ON'
9839  D71D  16 74 69 6D 65              BYTE  22,'time for this   valve.'
9840  D734
9841  D734  04 20 41 20 53    SCROLL88:  BYTE  4,32,'A SYRINGE       DURATION = 0h+0m'
9842  D756  1F 68 61 73 20              BYTE  31,'has been enteredfor this valve.'
9843  D776  1D 54 68 61 74              BYTE  29,'That tells the  Controller to'
9844  D794  1B 4E 4F 54 20              BYTE  27,'NOT syringe withthis valve.'
9845  D7B0
9846  D7B0  04 20 45 6E 74    SCROLL89:  BYTE  4,32,'Enter HOW OFTEN to syringe every'
9847  D7D2  1D 64 61 79 20              BYTE  29,'day during      active months'
9848  D7F0  1B 69 6E 20 6B              BYTE  27,'in hours (h) andminutes (m)'
9849  D80C  19 62 65 74 77              BYTE  25,'between syringe ON times.'
9850  D826
9851  D826  06 1F 50 72 65    SCROLL90:  BYTE  6,31,'Press OK if you want to see the'
9852  D847  1F 45 4E 44 49              BYTE  31,'ENDING TIME for the day, and/or'
9853  D867  1E 74 68 65 20              BYTE  30,'the sequential  START TIMES by'
9854  D886  1E 76 61 6C 76              BYTE  30,'valve for each  regular, soak,'
9855  D8A5  1D 6F 72 20 73              BYTE  29,'or syringe ON   time (if any)'
9856  D8C3  17 66 6F 72 20              BYTE  23,'for this Valve  Set Up.'
9857  D8DB
9858  D8DB  06 1E 4F 4B 20    SCROLL91:  BYTE  6,30,'OK a BUDGET from10-200% to use'
9859  D8FB  1F 66 6F 72 20              BYTE  31,'for viewing the daily schedule.'
9860  D91B  1E 41 20 62 75              BYTE  30,'A budget of 100%waters exactly'
9861  D93A  17 61 63 63 6F              BYTE  23,'according to theSet Up.'
9862  D952  1A 53 6F 61 6B              BYTE  26,'Soak and syringecycles are'
9863  D96D  1B 4E 4F 54 20              BYTE  27,'NOT affected by the budget.'
9864  D989
9865  D989  02 1C 59 6F 75    SCROLL92:  BYTE  2,28,'You can review  the watering'
9866  D9A7  20 73 63 68 65              BYTE  32,'schedule for ANYDAY of the week.'
9867  D9CB
```

```
9868  D9CB  02 1E 49 6E 64    SCROLL93: BYTE  2,30,'Indicate which  week # of your'
9869  D9E8  1E 6D 75 6C 74              BYTE    30,'multiple week    setup to view.'
9870  DA07
9871  DA07  05 1D 49 6E 64    SCROLL94: BYTE  5,29,'Indicate which  day # of your'
9872  DA26  1E 6D 75 6C 74              BYTE    30,'multiple day    setup to view.'
9873  DA45  1D 41 4C 4C 20              BYTE    29,'ALL active valvestations will'
9874  DA63  20 41 4C 57 41              BYTE    32,'ALWAYS water on DAY #1 no matter'
9875  DA84  1E 77 68 69 63              BYTE    30,'which day cycle you are using.'
9876  DAA3
9877  DAA3  08 20 50 72 65    SCROLL95: BYTE  8,32,'Press OK for    each ON time, or'
9878  DAC5  1C 70 72 65 73              BYTE    28,'press NO to STOPthis review.'
9879  DAE2  1F 45 61 63 68              BYTE    31,'Each screen     shows the VALVE'
9880  DB02  1F 4E 55 4D 42              BYTE    31,'NUMBER, the     CYCLE TYPE, the'
9881  DB22  1B 63 75 72 72              BYTE    27,'current & total ON CYCLE #s'
9882  DB3E  1E 28 4F 4E 20              BYTE    30,'(ON # _ of _),  and the ACTUAL'
9883  DB5D  1E 44 55 52 41              BYTE    30,'DURATION and    START TIME for'
9884  DB7C  0D 74 68 69 73              BYTE    13,'this ON time.'
9885  DB8A
9886  DB8A  03 1D 55 73 65    SCROLL96: BYTE  3,29,'Use the MINI    Set Up if you'
9887  DBA9  1A 6F 6E 6C 79              BYTE    26,'only need ONE   START TIME'
9888  DBC4  0A 70 65 72 20              BYTE    10,'per valve.'
9889  DBCF
9890  DBCF  06 15 54 68 65    SCROLL97: BYTE  6,21,'The AUTOSPLIT   Setup'
9891  DBE6  1C 6C 65 74 73              BYTE    28,'lets you SPLIT  the watering'
9892  DC03  1E 64 75 72 61              BYTE    30,'durations into  shorter repeat'
9893  DC22  1F 63 79 63 6C              BYTE    31,'cycles. The     Controller then'
9894  DC42  1E 41 55 54 4F              BYTE    30,'AUTOMATICALLY   calculates all'
9895  DC61  1F 74 68 65 20              BYTE    31,'the sequential  split ON times.'
9896  DC81
9897  DC81  02 1E 55 73 65    SCROLL98: BYTE  2,30,'Use the RATION  Setup to water'
9898  DCA1  19 6F 6E 6C 79              BYTE    25,'only on EVEN or ODD days.'
9899  DCBB
9900                          ; ISC
9901  DCBB
9902  DCBB                    SCROLL99:
9903  DCBB
9904                          ; One-time
9905  DCBB
9906  DCBB                    SCROLL100:
9907  DCBB
9908                          ; Special
9909  DCBB
9910  DCBB  01 1E 54 68 69    SCROLL101: BYTE 1,30,'This feature is NOT AVAILABLE.'
9911  DCDB
9912  DCDB  05 20 55 73 65    SCROLL102: BYTE 5,32,'Use FAILSAFE to enter a watering'
9913  DCFD  1B 73 63 68 65              BYTE    27,'schedule to be  used if the'
9914  DD19  1E 43 6F 6E 74              BYTE    30,'Controller lens is covered for'
9915  DD38  1F 70 72 6F 6C              BYTE    31,'prolonged       periods causing'
9916  DD58  0D 61 20 70 6F              BYTE    13,'a power loss.'
9917  DD66
9918  DD66                    SCROLL103:
9919  DD66
9920  DD66                    SCROLL104:
9921  DD66
9922  DD66                    SCROLL105:
9923  DD66
9924  DD66  04 20 53 65 74    SCROLL106: BYTE 4,32,'Set Up ALREADY  EXISTS. You can'
9925  DD88  1F 52 45 56 49              BYTE    31,'REVIEW the      current Set Up,'
9926  DDA8  1E 6F 72 20 45              BYTE    30,'or ERASE it by  entering a new'
9927  DDC7  07 53 65 74 20              BYTE     7,'Set Up.'
9928  DDCF
9929  DDCF  03 1E 54 68 65    SCROLL107: BYTE 3,30,'The ENDING TIME for the day is'
9930  DDEF  20 74 68 65 20              BYTE    32,'the time when   the last ON time'
9931  DE10  1A 66 6F 72 20              BYTE    26,'for the day is  completed.'
9932  DE2B
9933  DE2B  02 1D 53 45 4D    SCROLL108: BYTE 2,29,'SEMI-AUTO with SPECIFIC DAYS'
9934  DE4A  1D 69 73 20 4E              BYTE    29,'is NOT AVAILABLEat this time.'
9935  DE68
```

```
9936                              ; wire checking
9937   DE68
9938   DE6B  04 1E 54 68 65       SCROLL109: BYTE  4,30,'The LEFT symbol on the display'
9939   DE88  1A 73 68 6F 77                  BYTE  26,'shows the status of the TOP'
9940   DEA3  20 77 69 72 65                  BYTE  32,'wire position   where "o" = OPEN'
9941   DEC4  20 22 56 22 20                  BYTE  32,'"V" = VALVE,    and "x" = SHORT.'
9942   DEE5
9943                              ; assign station IDs
9944   DEE5
9945   DEE5  05 1B 50 72 65       SCROLL110: BYTE  5,27,'Press OK to see the current'
9946   DF02  1C 53 74 61 74                  BYTE  28,'Station ID #s. The LEFTMOST'
9947   DF1F  1F 6E 75 6D 62                  BYTE  31,'number shows the number assigned'
9948   DF3F  1E 74 6F 20 74                  BYTE  30,'to the TOP lightgrey connector'
9949   DF5E  1F 70 61 69 72                  BYTE  31,'pair on the left terminal strip.'
9950   DF7E
9951   DF7E  04 1E 50 72 65       SCROLL111: BYTE  4,30,'Press OK to     Enter new IDs.'
9952   DF9E  19 54 68 69 73                  BYTE  25,'This allows you to change'
9953   DFB8  20 73 74 61 74                  BYTE  32,'station #s       without changing'
9954   DFD9  0B 74 68 65 20                  BYTE  11,'the wiring.'
9955   DFE5
9956   DFE5  03 1E 49 66 20       SCROLL112: BYTE  3,30,'If you do not  want to ID all'
9957   E005  20 74 68 65 20                  BYTE  32,'the stations now wired, press NO,'
9958   E026  1F 26 20 65 6E                  BYTE  31,'& enter how many stations to ID.'
9959   E046
9960   E046  09 1F 54 6F 20       SCROLL113: BYTE  9,31,'To ID station 1,go to the valve'
9961   E067  1E 73 74 61 74                  BYTE  30,'station that you want to be #1.'
9962   E086  20 55 6E 70 6C                  BYTE  32,'Unplug the wire connector on the'
9963   E0A7  1F 76 61 6C 76                  BYTE  31,'valve pigtail,  wait 2 seconds,'
9964   E0C7  1F 74 68 65 6E                  BYTE  31,'then reconnect  the wires. The'
9965   E0E7  1D 43 6F 6E 74                  BYTE  29,'Controller will automatically'
9966   E105  1D 61 73 73 69                  BYTE  29,'assign #1 to    this station.'
9967   E123  1F 52 65 70 65                  BYTE  31,'Repeat this     process for all'
9968   E143  0F 77 69 72 65                  BYTE  15,'wired stations.'
9969   E153
9970   E153  03 18 50 72 65       SCROLL114: BYTE  3,24,'Press OK to     SAVE the'
9971   E16D  1C 6E 65 77 20                  BYTE  28,'new valve number assignments,'
9972   E18A  19 61 6E 64 20                  BYTE  25,'and ERASE the   old ones.'
9973   E1A4
9974   E1A4  07 1C 2A 45 52       SCROLL115: BYTE  7,28,'*ERROR* Shorted wire exists!'
9975   E1C2  1D 42 65 66 6F                  BYTE  29,'Before you can  assign ID #s,'
9976   E1E0  1B 79 6F 75 20                  BYTE  27,'you must repair all shorts.'
9977   E1FC  1D 55 73 65 20                  BYTE  29,'Use built-in    WIRE CHECKING'
9978   E21A  1E 74 6F 20 69                  BYTE  30,'to identify     shorted wires.'
9979   E239  1A 4E 45 56 45                  BYTE  26,'NEVER USE A     CONTINUITY'
9980   E254  10 54 45 53 54                  BYTE  16,'TESTER FOR THIS!'
9981   E265
9982                              ;Automatic mode
9983   E265
9984   E265  03 20 55 73 65       SCROLL116: BYTE  3,32,'Use this RAIN  DELAY to suspend'
9985   E287  20 77 61 74 65                  BYTE  32,'watering for    0-14 days before'
9986   E2A8  20 79 6F 75 72                  BYTE  32,'your watering   schedule starts.'
9987
9988   E2C9                       SCROLL117:
9989   E2C9
9990   E2C9  03 1A 53 65 6C       SCROLL118: BYTE  3,26,'Select which    previously'
9991   E2E5  18 65 6E 74 65                  BYTE  24,'entered         schedule'
9992   E2FE  1D 79 6F 75 20                  BYTE  29,'you want to use for watering.'
9993   E31C
9994   E31C  03 1D 49 66 20       SCROLL119: BYTE  3,29,'If you REMOVE   the POWER KEY'
9995   E33B  1D 6E 6F 77 2C                  BYTE  29,'now, watering   will begin on'
9996   E359  1A 74 68 65 20                  BYTE  26,'the first day   scheduled.'
9997   E374
9998                              ;Semi-Automatic
9999   E374
10000  E374  06 1D 49 66 20       SCROLL120: BYTE  6,29,'If you REMOVE   the POWER KEY'
10001  E393  1A 6E 6F 77 2C                  BYTE  26,'now, watering   will begin'
10002  E3AE  19 69 6D 6D 65                  BYTE  25,'immediately, and when this'
10003  E3C8  1B 77 61 74 65                  BYTE  27,'watering        sequence is'
```

```
10004  E3E4  1F 63 6F 6D 70            BYTE    31,'completed, the Controller will'
10005  E404  1E 72 65 76 65            BYTE    30,'revert to      AUTOMATIC RUN.'
10006  E423
10007                      ;Soak messages
10008  E423
10009  E423  04 1F 53 4F 41  SCROLL121: BYTE   4,31,'SOAK CYCLES let you do periodic'
10010  E444  1F 6C 6F 6E 67            BYTE    31,'long watering   cycles for deep'
10011  E464  1F 77 61 74 65            BYTE    31,'watering trees  in lawns or for'
10012  E484  0F 6C 65 61 63            BYTE    15,'leaching salts.'
10013  E494
10014  E494  04 1D 45 6E 74  SCROLL122: BYTE   4,29,'Enter the TOTAL SOAK TIME'
10015  E4AF  1D 70 65 72 20            BYTE    29,'per day for thisvalve. Enter'
10016  E4CD  1C 68 6F 75 72            BYTE    28,'hours (h), then minutes (m).'
10017  E4EA  1D 4F 4B 20 30            BYTE    29,'OK 0h to enter  minutes only.'
10018  E508
10019  E508  04 17 41 20 53  SCROLL123: BYTE   4,23,'A SOAK DURATION = 0h+0m'
10020  E521  1F 68 61 73 20            BYTE    31,'has been enteredfor this valve.'
10021  E541  1D 54 68 61 74            BYTE    29,'That tells the  Controller to'
10022  E55F  1B 4E 4F 54 20            BYTE    27,'NOT soak with   this valve.'
10023  E57B
10024  E57B  02 1C 45 6E 74  SCROLL124: BYTE   2,28,'Enter HOW OFTEN to soak from'
10025  E599  20 31 20 39 30            BYTE    32,'1-90 days (every1 days = daily).'
10026  E5BA
10027  E5BA  05 1D 50 72 65  SCROLL125: BYTE   5,29,'Press OK for    each week day'
10028  E5D9  1E 74 68 61 74            BYTE    30,'that you to use as a SOAK day.'
10029  E5F8  1C 49 66 20 6F            BYTE    28,'If only one day is selected,'
10030  E615  1C 63 68 6F 6F            BYTE    28,'choose every    1wk (7 days)'
10031  E632  1E 75 70 20 74            BYTE    30,'up to every     9wk (63 days).'
10032  E651
10033  E651                  SCROLL126:
10034
10035
10036  E651                  INCLUDE     MSG.ASM
10037                        ;-------------------------------------
10038                        ;   STRING STORAGE
10039                        ;-------------------------------------
10040
10041  E651  1E 20 50 72 65  MSG0:   BYTE    30,' Press OK when  most readable '
10042  E670  0F 43 48 4F 4F  MSG1:   BYTE    15,'CHOOSE ONE (OK)'
10043  E680  0C 45 4E 54 45  MSG2:   BYTE    12,'ENTER SETUP '
10044  E68D  0D 52 55 4E 20  MSG3:   BYTE    13,'RUN STATIONS '
10045  E69B  0E 53 54 41 59  MSG4:   BYTE    14,'STAY IDLE/OFF '
10046  E6AA  0A 56 49 45 57  MSG5:   BYTE    10,'VIEW INFO '
10047  E6B5  00              MSG6:   BYTE    0
10048  E6B6  00              MSG7:   BYTE    0
10049  E6B7  1B 43 68 61 72  MSG8:   BYTE    27,'Charging...     Please Wait'
10050  E6D3  0C 52 75 6E 20  MSG9:   BYTE    12,'Run Stations'
10051  E6E0  0D 52 75 6E 20  MSG10:  BYTE    13,'Run Test Seq.'
10052  E6EE  0D 52 65 61 64  MSG11:  BYTE    13,'Read Sensors '
10053  E6FC  00              MSG12:  BYTE    0
10054  E6FD  09 45 58 49 54  MSG13:  BYTE    9,'EXIT now '
10055  E707  0D 53 65 74 20  MSG14:  BYTE    13,'Set SCHEDULES'
10056  E715  0E 53 65 74 20  MSG15:  BYTE    14,'Set ALT.SCHED.'
10057  E724  0D 53 65 74 75  MSG16:  BYTE    13,'Setup SYSTEM '
10058  E732  0D 41 55 54 4F  MSG17:  BYTE    13,'AUTOMATIC RUN'
10059  E740  0D 53 45 4D 49  MSG18:  BYTE    13,'SEMI-AUTO RUN'
10060  E74E  0A 4D 41 4E 55  MSG19:  BYTE    10,'MANUAL RUN'
10061  E759  0E 53 65 65 20  MSG20:  BYTE    14,'See DIRECTIONS'
10062  E768  0C 53 65 65 20  MSG21:  BYTE    12,'See HISTORY '
10063  E775  0E 53 65 65 20  MSG22:  BYTE    14,'See RUN TOTALS'
10064  E784  0D 44 6F 20 53  MSG23:  BYTE    13,'Do SELF TEST '
10065  E792  00              MSG24:  BYTE    0
10066  E793  07 20 73 70 6C  MSG25:  BYTE    7,' splits'
10067  E79B  09 4F 4E 20 64  MSG26:  BYTE    9,'ON days: '
10068  E7A5  1D 20 53 74 61  MSG27:  BYTE    29,' Stations       wired: ID all '
10069  E7C3  06 20 31 30 30  MSG28:  BYTE    6,' 100%='
10070  E7CA  03 20 4F 4E     MSG29:  BYTE    3,' ON'
10071  E7CE  1A 3A 55 73 65  MSG30:  BYTE    26,':Use Splits (100%=        )'
```

```
10072  E7E9  0F 40 20 20 6D   MSG31:  BYTE   15,'@ = ON, = OFF'
10073  E7F9  09 53 74 61 74   MSG32:  BYTE   9,'Station #'
10074  E803  05 20 64 61 79   MSG33:  BYTE   5,' days'
10075  E809  14 55 73 65 20   MSG34:  BYTE   20,'Use SAME settingfor '
10076  E81E  04 20 77 6B 73   MSG35:  BYTE   4,' wks'
10077  E823  18 53 74 61 72   MSG36:  BYTE   24,'Start Time each ON day ='
10078  E83C  13 20 57 61 74   MSG37:  BYTE   19,' Watering Duration='
10079  E850  06 65 76 65 72   MSG38:  BYTE   6,'every '
10080  E857  14 41 55 54 4F   MSG39:  BYTE   20,'AUTO emulation Day#'
10081  E86C  09 55 73 65 20   MSG40:  BYTE   9,'Use Mini '
10082  E876  0D 55 73 65 20   MSG41:  BYTE   13,'Use Autosplit'
10083  E884  0B 55 73 65 20   MSG42:  BYTE   11,'Use Ration '
10084  E890  08 55 73 65 20   MSG43:  BYTE   8,'Use ISC '
10085  E899  0D 55 73 65 20   MSG44:  BYTE   13,'Use One-time '
10086  E8A7  0C 55 73 65 20   MSG45:  BYTE   12,'Use Special '
10087  E8B4  0D 55 73 65 20   MSG46:  BYTE   13,'Use Failsafe '
10088  E8C2  09 45 58 49 54   MSG47:  BYTE   9,'EXIT now '
10089  E8CC  10 45 78 63 6C   MSG48:  BYTE   16,'Excluded Period:'
10090  E8DD  1F 44 6F 20 79   MSG49:  BYTE   31,'Do you want an  Excluded Period'
10091  E8FD  1B FF FF 4B 49   MSG50:  BYTE   27,$FF,$FF,'HISTORY DONE',$FF,$FF,'Please Wait'
10092  E919  10 57 61 74 65   MSG51:  BYTE   16,'Water Day Cycle='
10093  E92A  0F 22 53 6F 20   MSG52:  BYTE   15,'"So many" days?'
10094  E93A  0E 53 70 65 63   MSG53:  BYTE   14,'Specific days?'
10095  E949  1A 20 57 61 74   MSG54:  BYTE   26,' Water only    on       days'
10096  E964  04 20 4F 44 44   MSG55:  BYTE   4,' ODD'
10097  E969  04 45 56 45 4E   MSG56:  BYTE   4,'EVEN'
10098  E96E  1B 42 61 73 65   MSG57:  BYTE   27,'Base Multiplier:Water     %'
10099  E98A  1D 57 61 74 65   MSG58:  BYTE   29,'Water Budget   to use =   %'
10100  E9A8  08 44 49 53 41   MSG59:  BYTE   8,'DISABLED'
10101  E9B1  08 45 4E 41 42   MSG60:  BYTE   8,'ENABLED '
10102  E9BA  07 53 74 6E 20   MSG61:  BYTE   7,'Stn #: '
10103  E9C2  07 20 53 65 6E   MSG62:  BYTE   7,' Sensor'
10104  E9CA  10 44 72 79 20   MSG63:  BYTE   16,'Dry Level :     %'
10105  E9DB  10 53 6F 61 6B   MSG64:  BYTE   16,'Soak Level:     %'
10106  E9EC  19 44 6F 20 79   MSG65:  BYTE   25,'Do you want    syringes '
10107  EA06  08 20 20 20 20   MSG66:  BYTE   8,'        '
10108  EA0F  04 54 69 6D 65   MSG67:  BYTE   4,'Time'
10109  EA14  0D 65 76 65 72   MSG68:  BYTE   13,'every    days'
10110  EA22  1C 53 74 6F 70   MSG69:  BYTE   28,'Stopping       all watering'
10111  EA3F  0A 69 73 20 52   MSG70:  BYTE   10,'is RUNNING'
10112  EA4A  1D 43 6F 6E 74   MSG71:  BYTE   29,'Controller IDLE (No watering)'
10113  EA6B  1D 2A 2A 4C 4F   MSG72:  BYTE   29,'LOW BATTERY in Power Key'
10114  EA86  03 53 74 6E      MSG73:  BYTE   3,'Stn'
10115  EA8A  05 53 65 74 75   MSG74:  BYTE   5,'Setup'
10116  EA90  02 2D 2D         MSG75:  BYTE   2,'--'
10117  EA93  00               MSG76:  BYTE   0
10118  EA94  03 4A 41 4E      MSG77:  BYTE   3,'JAN'
10119  EA98  03 46 45 42      MSG78:  BYTE   3,'FEB'
10120  EA9C  03 4D 41 52      MSG79:  BYTE   3,'MAR'
10121  EAA0  03 41 50 52      MSG80:  BYTE   3,'APR'
10122  EAA4  03 4D 41 59      MSG81:  BYTE   3,'MAY'
10123  EAA8  03 4A 55 4E      MSG82:  BYTE   3,'JUN'
10124  EAAC  03 4A 55 4C      MSG83:  BYTE   3,'JUL'
10125  EAB0  03 41 55 47      MSG84:  BYTE   3,'AUG'
10126  EAB4  03 53 45 50      MSG85:  BYTE   3,'SEP'
10127  EAB8  03 4F 43 54      MSG86:  BYTE   3,'OCT'
10128  EABC  03 4E 4F 56      MSG87:  BYTE   3,'NOV'
10129  EAC0  03 44 45 43      MSG88:  BYTE   3,'DEC'
10130  EAC4  08 54 69 6D 65   MSG89:  BYTE   8,'Time is '
10131  EACD  1D 52 65 70 6C   MSG90:  BYTE   29,'Replace Battery  in Power Key'
10132  EAEB  03 4D 4F 4E      MSG91:  BYTE   3,'MON'
10133  EAEF  03 54 55 45      MSG92:  BYTE   3,'TUE'
10134  EAF3  03 57 45 44      MSG93:  BYTE   3,'WED'
10135  EAF7  03 54 48 55      MSG94:  BYTE   3,'THU'
10136  EAFB  03 46 52 49      MSG95:  BYTE   3,'FRI'
10137  EAFF  03 53 41 54      MSG96:  BYTE   3,'SAT'
10138  EB03  03 53 55 4E      MSG97:  BYTE   3,'SUN'
10139  EB07  06 52 65 70 65   MSG98:  BYTE   6,'Repeat'
```

| | | | | | |
|---|---|---|---|---|---|
| 10140 | ED0E | 20 54 61 6B 65 | MSG99: | BYTE | 32,'Take Power Key  out now to IDLE!' |
| 10141 | ED2F | 0C 48 49 53 54 | MSG100: | BYTE | 12,'HISTORY for:' |
| 10142 | ED3C | 05 43 6F 64 65 | MSG101: | BYTE | 5,'Code#' |
| 10143 | ED42 | 0D 50 6F 77 65 | MSG102: | BYTE | 13,'Power Key in' |
| 10144 | ED50 | 03 6D 69 6E 2E | MSG103: | BYTE | 3,'min.' |
| 10145 | ED55 | 0D 4E 4F 20 57 | MSG104: | BYTE | 13,'NO Watering ?' |
| 10146 | ED63 | 0A 45 58 49 54 | MSG105: | BYTE | 10,'EXIT now ?' |
| 10147 | ED6E | 1B 41 6C 6C 20 | MSG106: | BYTE | 27,'All assigned    Stations OK' |
| 10148 | ED8A | 0F 53 74 6E 20 | MSG107: | BYTE | 15,'Stn wires OPEN:' |
| 10149 | ED9A | 10 53 74 6E 20 | MSG108: | BYTE | 16,'Stn wires SHORT:' |
| 10150 | EDAB | 15 3A 20 56 69 | MSG109: | BYTE | 21,': View      Site Info' |
| 10151 | EDC1 | 08 20 20 76 2E | MSG110: | BYTE | 8,'   v.2.09' |
| 10152 | EDCA | 1C 52 65 70 65 | MSG111: | BYTE | 28,'Repeat           the message ' |
| 10153 | EDE7 | 1F 54 61 6B 65 | MSG112: | BYTE | 31,'Take Power Key  out to quit, or' |
| 10154 | EC07 | 1A 52 65 70 65 | MSG113: | BYTE | 26,'Repeat          self test ' |
| 10155 | EC22 | 1E 53 65 6C 66 | MSG114: | BYTE | 30,'Self test       in progress...' |
| 10156 | EC41 | 1F 48 45 4C 4C | MSG115: | BYTE | 31,'HELLO! Press OKto pick options' |
| 10157 | EC61 | 1E 54 6F 20 77 | MSG116: | BYTE | 30,'To water, take  Power Key out!' |
| 10158 | EC80 | 1D 54 75 72 6E | MSG117: | BYTE | 29,'Turn on valves      min. each?' |
| 10159 | EC9E | 06 54 65 73 74 | MSG118: | BYTE | 6,'Test: ' |
| 10160 | ECA5 | 00 | MSG119: | BYTE | 0 |
| 10161 | ECA6 | 00 | MSG120: | BYTE | 0 |
| 10162 | ECA7 | 00 | MSG121: | BYTE | 0 |
| 10163 | ECA8 | 0E 4F 6E 2C 20 | MSG122: | BYTE | 14,'On,       left' |
| 10164 | ECB7 | 0B 54 75 72 6E | MSG123: | BYTE | 11,'Turning Off' |
| 10165 | ECC3 | 1F 44 6F 20 79 | MSG124: | BYTE | 31,'Do you want to  do a self-test?' |
| 10166 | ECE3 | 1F 41 6E 79 20 | MSG125: | BYTE | 31,'Any valves ON   are turning OFF' |
| 10167 | ED03 | 08 56 61 6C 76 | MSG126: | BYTE | 8,'Valve # ' |
| 10168 | ED0C | 07 55 73 69 6E | MSG127: | BYTE | 7,'Using: ' |
| 10169 | ED14 | 0B 49 73 20 74 | MSG128: | BYTE | 11,'Is this OK ' |
| 10170 | ED20 | 04 55 73 65 20 | MSG129: | BYTE | 4,'Use ' |
| 10171 | ED25 | 1E 44 6F 20 79 | MSG130: | BYTE | 30,'Do you want to  delay watering' |
| 10172 | ED44 | 1B 44 65 6C 61 | MSG131: | BYTE | 27,'Delay watering  for     days' |
| 10173 | ED60 | 1B 56 69 65 77 | MSG132: | BYTE | 27,'View active     station #s ' |
| 10174 | ED7C | 00 | MSG133: | BYTE | 0 |
| 10175 | ED7D | 00 | MSG134: | BYTE | 0 |
| 10176 | ED7E | 0D 52 65 76 69 | MSG135: | BYTE | 13,'Review Setup?' |
| 10177 | ED8C | 0D 4D 6F 64 69 | MSG136: | BYTE | 13,'Modify Setup?' |
| 10178 | ED9A | 0D 44 6F 20 4E | MSG137: | BYTE | 13,'Do New Setup?' |
| 10179 | EDA8 | 0A 45 58 49 54 | MSG138: | BYTE | 10,'EXIT now ?' |
| 10180 | EDB3 | 16 53 79 72 69 | MSG139: | BYTE | 22,'Syringe IntervalEvery ' |
| 10181 | EDCA | 1C 20 73 79 72 | MSG140: | BYTE | 28,' syringes at    interval' |
| 10182 | EDE7 | 1D 44 6F 20 79 | MSG141: | BYTE | 29,'Do you want     a Soak Cycle ' |
| 10183 | EE05 | 17 52 65 76 69 | MSG142: | BYTE | 23,'Review for      Day = #' |
| 10184 | EE1D | 17 52 65 76 69 | MSG143: | BYTE | 23,'Review for      week= #' |
| 10185 | EE35 | 04 4D 69 64 6E | MSG144: | BYTE | 4,'Midn' |
| 10186 | EE3A | 04 4E 6F 6F 6E | MSG145: | BYTE | 4,'Noon' |
| 10187 | EE3F | 09 3A 20 44 6F | MSG146: | BYTE | 9,': Do Soak' |
| 10188 | EE49 | 10 4E 4F 20 77 | MSG147: | BYTE | 16,'NO watering for ' |
| 10189 | EE5A | 04 20 4F 4E 20 | MSG148: | BYTE | 4,' ON ' |
| 10190 | EE5F | 04 20 53 59 52 | MSG149: | BYTE | 4,' SYR' |
| 10191 | EE64 | 04 53 4F 41 4B | MSG150: | BYTE | 4,'SOAK' |
| 10192 | EE69 | 18 44 6F 20 79 | MSG151: | BYTE | 24,'Do you want to  Emulate ' |
| 10193 | EE82 | 1F 56 61 6C 76 | MSG152: | BYTE | 31,'Valves:         starting at top' |
| 10194 | EEA2 | 1B 50 72 65 73 | MSG153: | BYTE | 27,'Press OK to see ending time' |
| 10195 | EEBE | 19 52 65 76 69 | MSG154: | BYTE | 25,'Review daily    schedule ' |
| 10196 | EED8 | 1B 3A 20 6E 6F | MSG155: | BYTE | 27,': not split (Are you sure?)' |
| 10197 | EEF4 | 07 52 65 76 69 | MSG156: | BYTE | 7,'Review ' |
| 10198 | EEFC | 07 4D 6F 64 69 | MSG157: | BYTE | 7,'Modify ' |
| 10199 | EF04 | 0C 42 61 73 69 | MSG158: | BYTE | 12,'Basic setup ' |
| 10200 | EF11 | 0E 53 79 72 69 | MSG159: | BYTE | 14,'Syringe setup ' |
| 10201 | EF20 | 0B 53 6F 61 6B | MSG160: | BYTE | 11,'Soak setup ' |
| 10202 | EF2C | 1C 50 72 65 73 | MSG161: | BYTE | 28,'Press OK to see each ON time' |
| 10203 | EF49 | 0F 4E 6F 6E 65 | MSG162: | BYTE | 15,'None entered  ' |
| 10204 | EF59 | 0A 53 79 73 74 | MSG163: | BYTE | 10,'System Low' |
| 10205 | EF64 | 04 53 56 4C 20 | MSG164: | BYTE | 4,'SVL ' |
| 10206 | EF69 | 0D 50 6F 77 65 | MSG165: | BYTE | 13,'Power Key Low' |
| 10207 | EF77 | 0A 50 77 72 4B | MSG166: | BYTE | 10,'PwrKey Out' |
| 10208 | EF82 | 09 50 77 72 4B | MSG167: | BYTE | 9,'PwrKey In' |
| 10209 | EF8C | 0E 53 74 61 72 | MSG168: | BYTE | 14,'Start Watering' |

```
10210  EF9B   0D 48 61 6C 74   MSG169: BYTE   13,'Halt Watering'
10211  EFA9   1C 50 72 65 73   MSG170: BYTE   28,'Press HELP-NO-OK to RESET RAM'
10212  EFC6   1C 56 69 65 77   MSG171: BYTE   28,'View current    station IDs '
10213  EFE3   1C 45 6E 74 65   MSG172: BYTE   28,'Enter new       station IDs '
10214  F000   17 43 75 72 72   MSG173: BYTE   23,'Current ID (fromTOP) : '
10215  F018   20 53 74 6E 20   MSG174: BYTE   32,'Stn #s:         Unplug # to ID!'
10216  F039   1F 53 74 6E 20   MSG175: BYTE   31,'Stn #s:         Save new Stn ID'
10217  F059   0F 45 6E 61 62   MSG176: BYTE   15,'Enable/Disable '
10218  F069   0D 41 73 73 69   MSG177: BYTE   13,'Assign ID #s '
10219  F077   0D 41 73 73 69   MSG178: BYTE   13,'Assign Types '
10220  F085   10 53 41 56 49   MSG179: BYTE   16,'SAVING new Setup'
10221  F096   1A 50 72 65 73   MSG180: BYTE   26,'Press OK to see each event'
10222  F0B1   1C 50 72 65 73   MSG181: BYTE   28,'Press STOP to   STOP running'
10223  F0CE   12 57 61 74 65   MSG182: BYTE   18,'Watering ends   at '
10224  F0E2   09 53 6F 61 6B   MSG183: BYTE    9,'Soak Dur='
10225  F0EC   0F 77 69 74 68   MSG184: BYTE   15,'with       # ONs'
10226  F0FC   14 4E 4F 20 53   MSG185: BYTE   20,'NO Soak Cycle  for '
10227  F111   06 20 53 6F 61   MSG186: BYTE    6,' Soak='
10228  F118   0C 53 79 72 69   MSG187: BYTE   12,'Syringes ON '
10229  F125   0C 53 79 72 69   MSG188: BYTE   12,'Syringes OFF'
10230  F132   0D 53 65 74 20   MSG189: BYTE   13,'Set SITE INFO'
10231  F140   0D 20 53 79 72   MSG190: BYTE   13,' Syr Months :'
10232  F14E   17 53 79 72 69   MSG191: BYTE   23,'Syringe Duration =  #'
10233  F166   0F 4E 4F 20 53   MSG192: BYTE   15,'NO Syringes for'
10234  F176   10 53 79 72 69   MSG193: BYTE   16,'Syringe Period :'
10235  F187   0D 53 65 74 20   MSG194: BYTE   13,'Set TIME/DATE'
10236  F195   0D 44 6F 20 57   MSG195: BYTE   13,'Do WIRE CHECK'
10237  F1A3   0E 53 65 74 75   MSG196: BYTE   14,'Setup STATIONS'
10238  F1B2   0D 53 65 74 75   MSG197: BYTE   13,'Setup SENSORS'
10239  F1C0   0E 53 65 74 20   MSG198: BYTE   14,'Set USER CODES'
10240  F1CF   18 23 20 6F 66   MSG199: BYTE   24,'# of stations   to ID : '
10241  F1E8   0D 54 75 72 6E   MSG200: BYTE   13,'Turn # OFF?'
10242  F1F6   0C 54 75 72 6E   MSG201: BYTE   12,'Turn # ON?'
10243  F203   0E 47 6F 20 74   MSG202: BYTE   14,'Go to Stn # ?'
10244  F212   0B 4D 69 6E 69   MSG203: BYTE   11,'Mini setup?'
10245  F21E   10 41 75 74 6F   MSG204: BYTE   16,'Autosplit setup?'
10246  F22F   0D 52 61 74 69   MSG205: BYTE   13,'Ration setup?'
10247  F23D   0A 49 53 43 20   MSG206: BYTE   10,'ISC setup?'
10248  F248   0F 4F 6E 65 2D   MSG207: BYTE   15,'One-time setup?'
10249  F258   0E 53 70 65 63   MSG208: BYTE   14,'Special setup?'
10250  F267   0F 46 61 69 6C   MSG209: BYTE   15,'Failsafe setup?'
10251  F277   0A 45 58 49 54   MSG210: BYTE   10,'EXIT now ?'
10252  F282   1E 44 6F 20 79   MSG211: BYTE   30,'Do you want     to use splits '
10253  F2A1   0F 4D 61 78 20   MSG212: BYTE   15,'Max ON/Min OFF:'
10254  F2B1   0A 20 53 69 74   MSG213: BYTE   10,' Site Info'
10255  F2BC   1F 50 72 65 73   MSG214: BYTE   31,'Press ',0,' to splitusing site info'
10256  F2DC   0B 6C 65 76 65   MSG215: BYTE   11,'level sand?'
10257  F2E8   0B 68 69 6C 6C   MSG216: BYTE   11,'hilly sand?'
10258  F2F4   0B 6C 65 76 65   MSG217: BYTE   11,'level loam?'
10259  F300   0B 68 69 6C 6C   MSG218: BYTE   11,'hilly loam?'
10260  F30C   0B 6C 65 76 65   MSG219: BYTE   11,'level clay?'
10261  F318   0B 68 69 6C 6C   MSG220: BYTE   11,'hilly clay?'
10262  F324   0C 66 6C 61 74   MSG221: BYTE   12,'flat sprays?'
10263  F331   0C 6C 61 77 6E   MSG222: BYTE   12,'lawn sprays?'
10264  F33E   0C 72 6F 74 6F   MSG223: BYTE   12,'rotor heads?'
10265  F34B   0D 69 6D 70 61   MSG224: BYTE   13,'impact heads?'
10266  F359   0E 73 74 72 65   MSG225: BYTE   14,'stream sprays?'
10267  F368   0C 6D 69 63 72   MSG226: BYTE   12,'microsprays?'
10268  F375   0E 64 72 69 70   MSG227: BYTE   14,'drip emitters?'
10269  F384   1F 55 73 69 6E   MSG228: BYTE   31,'Using site info to auto-split..'
10270  F3A4   1E 55 73 69 6E   MSG229: BYTE   30,'Using site info to calculate..'
10271  F3C3   09 4E 6F 74 20   MSG230: BYTE    9,'Not split'
10272
10273                                        ;---------------------------------
10274                                        ;       TABLES
10275                                        ;---------------------------------
10276
10277  F3CD   01              LCDTBL: BYTE   00000001B       ;Clear display
```

```
10278  F3CE  02                BYTE  00000010B   ;Cursor home
10279  F3CF  06                BYTE  00000110B   ;Entry mode, no scrolling
10280  F3D0  0E                BYTE  00001110B   ;Display on, show cursor
10281  F3D1  08                BYTE  00001000B   ;Display off
10282  F3D2  0C                BYTE  00001100B   ;Display on, no cursor
10283  F3D3  0D                BYTE  00001101B   ;Display on, blink cursor position
10284  F3D4  14                BYTE  00010100B   ;Move cursor right
10285  F3D5  18                BYTE  00011000B   ;Scroll display left
10286  F3D6  38                BYTE  00111000B   ;Interface data length=8 bits
10287  F3D7      ADDR_CMD:
10288  F3D7  80                BYTE  10000000B   ;Set address for data display
10289                                            ;AND address (0-50H) with command
10290  F3D8  40                BYTE  01000000B   ;Set Custom Character RAM to 0
10291
10292           CUSTOMTBL:                       ;this is the custom char data
10293  F3D9  1C 14 1C 00 05    BYTE  $1C,$14,$1C,0,$05,$06,$05,0
10294
10295  F3E1  51E6     MSGTBL:  WORD  MSG0        ;table of msg addresses
10296  F3E3  70E6              WORD  MSG1
10297  F3E5  80E6              WORD  MSG2
10298  F3E7  8DE6              WORD  MSG3
10299  F3E9  9BE6              WORD  MSG4
10300  F3EB  AAE6 B5E6 B6E6    WORD  MSG5,MSG6,MSG7,MSG8,MSG9
       F3F1  B7E6 D3E6
10301  F3F5  E0E6 EEE6 FCE6    WORD  MSG10,MSG11,MSG12,MSG13,MSG14
       F3FB  FDE6 07E7
10302  F3FF  15E7 24E7 32E7    WORD  MSG15,MSG16,MSG17,MSG18,MSG19
       F405  40E7 4EE7
10303  F409  59E7 68E7 75E7    WORD  MSG20,MSG21,MSG22,MSG23,MSG24
       F40F  84E7 92E7
10304  F413  93E7 9BE7 A5E7    WORD  MSG25,MSG26,MSG27,MSG28,MSG29
       F419  C3E7 CAE7
10305  F41D  CEE7 E9E7 F9E7    WORD  MSG30,MSG31,MSG32,MSG33,MSG34
       F423  03E8 09E8
10306  F427  1EE8 23E8 3CE8    WORD  MSG35,MSG36,MSG37,MSG38,MSG39
       F42D  50E8 57E8
10307  F431  6CE8 76E8 B4E8    WORD  MSG40,MSG41,MSG42,MSG43,MSG44
       F437  90E8 99E8
10308  F43B  A7E8 B4E8 C2E8    WORD  MSG45,MSG46,MSG47,MSG48,MSG49
       F441  CCE8 DDE8
10309  F445  FDE8 19E9 2AE9    WORD  MSG50,MSG51,MSG52,MSG53,MSG54
       F44B  3AE9 49E9
10310  F44F  64E9 69E9 6EE9    WORD  MSG55,MSG56,MSG57,MSG58,MSG59
       F455  8AE9 A8E9
10311  F459  B1E9 BAE9 C2E9    WORD  MSG60,MSG61,MSG62,MSG63,MSG64
       F45F  CAE9 DBE9
10312  F463  ECE9 06EA 0FEA    WORD  MSG65,MSG66,MSG67,MSG68,MSG69
       F469  14EA 22EA
10313  F46D  3FEA 4AEA 68EA    WORD  MSG70,MSG71,MSG72,MSG73,MSG74
       F473  86EA 8AEA
10314  F477  90EA 93EA 94EA    WORD  MSG75,MSG76,MSG77,MSG78,MSG79
       F47D  98EA 9CEA
10315  F481  A0EA A4EA ABEA    WORD  MSG80,MSG81,MSG82,MSG83,MSG84
       F487  ACEA B0EA
10316  F4BB  B4EA B8EA BCEA    WORD  MSG85,MSG86,MSG87,MSG88,MSG89
       F491  C0EA C4EA
10317  F495  CDEA EBEA EFEA    WORD  MSG90,MSG91,MSG92,MSG93,MSG94
       F49B  F3EA F7EA
10318  F49F  FBEA FFEA 03EB    WORD  MSG95,MSG96,MSG97,MSG98,MSG99
       F4A5  07EB 0EEB
10319  F4A9  2FEB 3CEB 42EB    WORD  MSG100,MSG101,MSG102,MSG103,MSG104
       F4AF  50EB 55EB
10320  F4B3  63EB 6EEB 8AEB    WORD  MSG105,MSG106,MSG107,MSG108,MSG109
       F4B9  9AEB ABEB
10321  F4BD  C1EB CAEB E7EB    WORD  MSG110,MSG111,MSG112,MSG113,MSG114
       F4C3  07EC 22EC
10322  F4C7  41EC 61EC 88EC    WORD  MSG115,MSG116,MSG117,MSG118,MSG119
       F4CD  9EEC A5EC
```

```
10323   F4D1  A6EC A7EC A8EC          WORD    MSG120,MSG121,MSG122,MSG123,MSG124
        F4D7  B7EC C3EC
10324   F4DB  E3EC 03ED 0CED          WORD    MSG125,MSG126,MSG127
10325
10326   F4E1  14ED 20ED       MSGTBL1: WORD   MSG128,MSG129
10327   F4E5  25ED 44ED 60ED          WORD    MSG130,MSG131,MSG132,MSG133,MSG134
        F4EB  7CED 7DED
10328   F4EF  7EED 8CED 9AED          WORD    MSG135,MSG136,MSG137,MSG138,MSG139
        F4F5  A8ED B3ED
10329   F4F9  CAED E7ED 05EE          WORD    MSG140,MSG141,MSG142,MSG143,MSG144
        F4FF  1DEE 35EE
10330   F503  3AEE 3FEE 49EE          WORD    MSG145,MSG146,MSG147,MSG148,MSG149
        F509  5AEE 5FEE
10331   F50D  64EE 69EE 82EE          WORD    MSG150,MSG151,MSG152,MSG153,MSG154
        F513  A2EE BEEE
10332   F517  D8EE F4EE FCEE          WORD    MSG155,MSG156,MSG157,MSG158,MSG159
        F51D  04EF 11EF
10333   F521  20EF 2CEF 49EF          WORD    MSG160,MSG161,MSG162,MSG163,MSG164
        F527  59EF 64EF
10334   F52B  69EF 77EF 82EF          WORD    MSG165,MSG166,MSG167,MSG168,MSG169
        F531  8CEF 9BEF
10335   F535  A9EF C6EF E3EF          WORD    MSG170,MSG171,MSG172,MSG173,MSG174
        F53B  00F0 18F0
10336   F53F  39F0 59F0 69F0          WORD    MSG175,MSG176,MSG177,MSG178,MSG179
        F545  77F0 85F0
10337   F549  96F0 B1F0 CEF0          WORD    MSG180,MSG181,MSG182,MSG183,MSG184
        F54F  E2F0 ECF0
10338   F553  FCF0 11F1 18F1          WORD    MSG185,MSG186,MSG187,MSG188,MSG189
        F559  25F1 32F1
10339   F55D  40F1 4EF1 66F1          WORD    MSG190,MSG191,MSG192,MSG193,MSG194
        F563  76F1 87F1
10340   F567  95F1 A3F1 B2F1          WORD    MSG195,MSG196,MSG197,MSG198,MSG199
        F56D  C0F1 CFF1
10341   F571  E8F1 F6F1 03F2          WORD    MSG200,MSG201,MSG202,MSG203,MSG204
        F577  12F2 1EF2
10342   F57B  2FF2 3DF2 4BF2          WORD    MSG205,MSG206,MSG207,MSG208,MSG209
        F581  58F2 67F2
10343   F585  77F2 82F2 A1F2          WORD    MSG210,MSG211,MSG212,MSG213,MSG214
        F58B  B1F2 BCF2
10344   F58F  DCF2 EBF2 F4F2          WORD    MSG215,MSG216,MSG217,MSG218,MSG219
        F595  00F3 0CF3
10345   F599  18F3 24F3 31F3          WORD    MSG220,MSG221,MSG222,MSG223,MSG224
        F59F  3EF3 4BF3
10346   F5A3  59F3 68F3 75F3          WORD    MSG225,MSG226,MSG227,MSG228,MSG229
        F5A9  84F3 A4F3
10347   F5AD  C3F3                    WORD    MSG230
10348
10349
10350                          SCROLLTBL:              ;groups of lines for scrolling
10351   F5AF  16B6 36B6 6DB6          WORD    SCROLL0,SCROLL1,SCROLL2,SCROLL3,SCROLL4
        F5B5  A6B6 DAB6
10352   F5B9  0CB7 47B7 84B7          WORD    SCROLL5,SCROLL6,SCROLL7,SCROLL8,SCROLL9
        F5BF  C7B7 26B8
10353   F5C3  7DB8 F2B8 50B9          WORD    SCROLL10,SCROLL11,SCROLL12,SCROLL13,SCROLL14
        F5C9  46BA 54BB
10354   F5CD  0ABC FEBC E3BD          WORD    SCROLL15,SCROLL16,SCROLL17,SCROLL18,SCROLL19
        F5D3  3BBE 96BE
10355   F5D7  0EBF 9ABF 14C0          WORD    SCROLL20,SCROLL21,SCROLL22,SCROLL23,SCROLL24
        F5DD  7FC0 39C1
10356   F5E1  96C1 0AC2 BDC2          WORD    SCROLL25,SCROLL26,SCROLL27,SCROLL28,SCROLL29
        F5E7  F9C2 F9C2
10357   F5EB  F9C2 54C3 95C3          WORD    SCROLL30,SCROLL31,SCROLL32,SCROLL33,SCROLL34
        F5F1  F6C3 52C4
10358   F5F5  A9C4 A0C5 34C6          WORD    SCROLL35,SCROLL36,SCROLL37,SCROLL38,SCROLL39
        F5FB  34C6 53C6
10359   F5FF  94C6 E9C6 48C7          WORD    SCROLL40,SCROLL41,SCROLL42,SCROLL43,SCROLL44
        F605  11C8 51C8
```

```
10360  F609  8EC8 8EC8 8EC8           WORD   SCROLL45,SCROLL46,SCROLL47,SCROLL48,SCROLL49
       F60F  8EC8 E8C8
10361  F613  1FC9 56C9 56C9           WORD   SCROLL50,SCROLL51,SCROLL52,SCROLL53,SCROLL54
       F619  8EC9 2DCA
10362  F61D  F0CA 30CB A6CB           WORD   SCROLL55,SCROLL56,SCROLL57,SCROLL58,SCROLL59
       F623  A6CB 52CC
10363  F627  A2CC DECC 46CD           WORD   SCROLL60,SCROLL61,SCROLL62,SCROLL63,SCROLL64
       F62D  9FCD 58CE
10364  F631  CFCE 3BCF 8ECF           WORD   SCROLL65,SCROLL66,SCROLL67,SCROLL68,SCROLL69
       F637  61D0 99D0
10365  F63B  CCD0 47D1 ABD1           WORD   SCROLL70,SCROLL71,SCROLL72,SCROLL73,SCROLL74
       F641  3FD2 7DD2
10366  F645  E7D2 70D3 70D3           WORD   SCROLL75,SCROLL76,SCROLL77,SCROLL78,SCROLL79
       F64B  06D4 65D4
10367  F64F  65D4 DDD4 03D5           WORD   SCROLL80,SCROLL81,SCROLL82,SCROLL83,SCROLL84
       F655  29D5 00D5
10368  F659  F8D5 9BD6 DCD6           WORD   SCROLL85,SCROLL86,SCROLL87,SCROLL88,SCROLL89
       F65F  34D7 00D7
10369  F663  26D8 DBD8 89D9           WORD   SCROLL90,SCROLL91,SCROLL92,SCROLL93,SCROLL94
       F669  C8D9 07DA
10370  F66D  A3DA 8ADB CFDB           WORD   SCROLL95,SCROLL96,SCROLL97,SCROLL98,SCROLL99
       F673  81DC BBDC
10371  F677  BBDC BBDC DBDC           WORD   SCROLL100,SCROLL101,SCROLL102,SCROLL103,SCROLL104
       F67D  66DD 66DD
10372  F681  66DD 66DD CFDD           WORD   SCROLL105,SCROLL106,SCROLL107,SCROLL108,SCROLL109
       F687  2BDE 68DE
10373  F68B  E5DE 7EDF E5DF           WORD   SCROLL110,SCROLL111,SCROLL112,SCROLL113,SCROLL114
       F691  46E0 53E1
10374  F695  A4E1 65E2 C9E2           WORD   SCROLL115,SCROLL116,SCROLL117,SCROLL118,SCROLL119
       F69B  C9E2 1CE3
10375  F69F  74E3 23E4 94E4           WORD   SCROLL120,SCROLL121,SCROLL122,SCROLL123,SCROLL124
       F6A5  08E5 7BE5
10376  F6A9  BAE5 51E6                WORD   SCROLL125,SCROLL126
10377
10378  F6AD                  SCROLLTBL1:
10379
10380
10381                        MENUTBL:       ;mode mode+1 msg#,line 1 msg#,line2 help# jmp
10382  F6AD  01 00 01 02 10           BYTE   1,$0,1,2,16
10383  F6B2  83AD                     WORD   NEXTLEVEL     ;SETUP
10384  F6B4  02 00 01 03 11           BYTE   2,$0,1,3,17
10385  F6B9  83AD                     WORD   NEXTLEVEL     ;RUN
10386  F6BB  03 00 01 04 15           BYTE   3,$0,1,4,21
10387  F6C0  B786                     WORD   IDLE_MODE     ;IDLE
10388  F6C2  04 00 01 05 16           BYTE   4,$0,1,5,22
10389  F6C7  83AD                     WORD   NEXTLEVEL     ;INFO
10390  F6C9  01 10 02 0E 10           BYTE   1,$10,2,14,16
10391  F6CE  83AD                     WORD   NEXTLEVEL     ;SETUP SCHED
10392  F6D0  01 20 02 0F 10           BYTE   1,$20,2,15,16
10393  F6D5  79AD                     WORD   NA            ;SETUP ALT SCHED
10394  F6D7  01 30 02 10 10           BYTE   1,$30,2,16,16
10395  F6DC  83AD                     WORD   NEXTLEVEL     ;SETUP SYSTEM
10396  F6DE  02 10 03 11 12           BYTE   2,$10,3,17,18
10397  F6E3  2E8D                     WORD   AUTO_MODE     ;AUTO RUN
10398  F6E5  02 20 03 12 13           BYTE   2,$20,3,18,19
10399  F6EA  248D                     WORD   SEMI_MODE     ;SEMI-AUTO RUN
10400  F6EC  02 30 03 13 14           BYTE   2,$30,3,19,20
10401  F6F1  83AD                     WORD   NEXTLEVEL     ;MANUAL RUN
10402  F6F3  04 10 05 14 43           BYTE   4,$10,5,20,67
10403  F6F8  79AD                     WORD   NA            ;DIRECTIONS
10404  F6FA  04 20 05 15 43           BYTE   4,$20,5,21,67
10405  F6FF  708B                     WORD   HIST          ;HISTORY
10406  F701  04 30 05 16 43           BYTE   4,$30,5,22,67
10407  F706  79AD                     WORD   NA            ;LOG RUN TOTALS
10408  F708  04 40 05 17 43           BYTE   4,$40,5,23,67
10409  F70D  79AD                     WORD   NA            ;SELF-TEST
10410  F70F  01 11 0E 28 60           BYTE   1,$11,14,40,96
10411  F714  7791                     WORD   VM0           ;Mini
```

```
10412  F716  01 12 0E 29 61        BYTE    1,$12,14,41,97
10413  F71B  7791                  WORD    VM8              ;Auto-split
10414  F71D  01 13 0E 2A 62        BYTE    1,$13,14,42,98
10415  F722  79AD                  WORD    NA               ;Ration
10416  F724  01 14 0E 2B 63        BYTE    1,$14,14,43,99
10417  F729  79AD                  WORD    NA               ;ISC
10418  F72B  01 15 0E 2C 64        BYTE    1,$15,14,44,100
10419  F73B  79AD                  WORD    NA               ;One time
10420  F732  01 16 0E 2D 65        BYTE    1,$16,14,45,101
10421  F737  79AD                  WORD    NA               ;Special
10422  F739  01 17 0E 2E 66        BYTE    1,$17,14,46,102
10423  F73E  79AD                  WORD    NA               ;Failsafe
10424  F740  01 31 10 C2 27        BYTE    1,$31,16,194,39
10425  F745  0087                  WORD    SET_TIME         ;Set Time
10426  F747  01 32 10 BD 26        BYTE    1,$32,16,189,38
10427  F74C  0B88                  WORD    SET_SITE         ;Set Site Info
10428  F74E  01 33 10 C3 6D        BYTE    1,$33,16,195,109
10429  F753  F7BB                  WORD    WIRE_CHECKV      ;Wire Checking
10430  F755  01 34 10 C4 29        BYTE    1,$34,16,196,41
10431  F75A  6D89                  WORD    STATION_SETUP    ;Station Setup
10432  F75C  01 35 10 C5 2A        BYTE    1,$35,16,197,42
10433  F761  79AD                  WORD    NA               ;Sensor Setup
10434  F763  01 36 10 C6 2B        BYTE    1,$36,16,198,43
10435  F768  4E8B                  WORD    SET_CODES        ;Secret Codes
10436  F76A  02 31 13 09 14        BYTE    2,$31,19,9,20
10437  F76F  468E                  WORD    MMV              ;Manual Valves
10438  F771  02 32 13 0A 14        BYTE    2,$32,19,10,20
10439  F776  23BF                  WORD    MMT              ;Manual Test Seq.
10440  F778  02 33 13 0B 14        BYTE    2,$33,19,11,20
10441  F77D  79AD                  WORD    NA               ;Manual Sensors
10442  F77F  FF                    BYTE    $FF              ;end of table
10443
10444  F780  00           DAYTBL:  BYTE    0                ;number of days in each month
10445  F781  1F                    BYTE    31               ;JAN
10446  F782  1C                    BYTE    28               ;FEB
10447  F783  1F                    BYTE    31               ;MAR
10448  F784  1E                    BYTE    30               ;APR
10449  F785  1F                    BYTE    31               ;MAY
10450  F786  1E                    BYTE    30               ;JUN
10451  F787  1F                    BYTE    31               ;JUL
10452  F788  1F                    BYTE    31               ;AUG
10453  F789  1E                    BYTE    30               ;SEP
10454  F78A  1F                    BYTE    31               ;OCT
10455  F78B  1E                    BYTE    30               ;NOV
10456  F78C  1F                    BYTE    31               ;DEC
10457
10458                     SSTBL:                            ;default system settings
10459  F78D  01 00 05 01 01        BYTE    1,0,5,1,1,88,31                      ;time
10460  F794  00 C8 C8 C8 C8        BYTE    0,$C8,$C8,$C8,$C8,$C8,$C8,$C8        ;VS
10461  F79D  00 00 00 00 00        BYTE    0,0,0,0,0,0,0,0                      ;sensor status
10462  F7A6  00 00 00 00 00        BYTE    0,0,0,0,0,0,0,0                      ;dry level
10463  F7AF  00 00 00 00 00        BYTE    0,0,0,0,0,0,0,0                      ;soak level
10464  F7B8  00                    BYTE    0                                    ;rain sensor
10465  F7B9  00 00 00 00 00        BYTE    0,0,0,0,0,0,0,0,0,0,0,0              ;codes
10466  F7C6  41 42 43 44 45        BYTE    'ABCDEF'                             ;controller ID
10467  F7CC  05 00 0A 00           BYTE    5,0,10,0                             ;emergency
10468  F7D0  00                    BYTE    0                ;default valve ID table
10469  F7D1  00                    BYTE    00000000B        ;valve 1, position 0, +
10470  F7D2  09                    BYTE    00001001B        ;valve 2, position 1, +
10471  F7D3  12                    BYTE    00010010B        ;valve 3, position 2, +
10472  F7D4  1B                    BYTE    00011011B        ;valve 4, position 3, +
10473  F7D5  24                    BYTE    00100100B        ;valve 5, position 4, +
10474  F7D6  2D                    BYTE    00101101B        ;valve 6, position 5, +
10475  F7D7  36                    BYTE    00110110B        ;valve 7, position 6, +
10476  F7D8  3F                    BYTE    00111111B        ;valve 8, position 7, +
10477  F7D9  00 00 00 00 00        BYTE    0,0,0,0,0,0,0,0                      ;sensor ID
10478  F7E2  01 01 01 01 01        BYTE    1,1,1,1,1,1,1,1,1                    ;terrain
10479  F7EB  01 01 01 01 01        BYTE    1,1,1,1,1,1,1,1,1                    ;sprinkler types
```

```
10480
10481                       RUNTBL:                       ;default RUN settings
10482   F7F4  00 00 00         BYTE    0,0,0              ;no setups yet
10483   F7F7  00 64            BYTE    0,100              ;no rain delay or global budget
10484   F7F9  00 64 64 64 64   BYTE    0,100,100,100,100,100,100,100,100
10485
10486                       SOURCEADDR:                   ;start addresses of valve setups, etc
10487   F802  0000             WORD    0
10488   F804  00B9             WORD    SRC1               ;Mini
10489   F806  AC09             WORD    SRC2               ;Auto-split
10490   F808  580A             WORD    SRC3               ;Ration
10491   F80A  040B             WORD    SRC4               ;ISC
10492   F80C  B00B             WORD    SRC5               ;One-time
10493   F80E  5C0C             WORD    SRC6               ;Special
10494   F810  0B0D             WORD    SRC7               ;Failsafe
10495   F812  0C0D             WORD    SRC8               ;ISC starts
10496   F814  0C11             WORD    SRC9               ;Special starts
10497   F816  7602             WORD    SYSTEM_BLOCK       ;system settings
10498   F818  FA02             WORD    RUN_BLOCK          ;run settings
10499
10500                       OBJECTADDR:                   ;start addresses object areas
10501   F81A  4015             WORD    OBJBASE
10502   F81C  4015             WORD    OBJBASE
10503   F81E  4015             WORD    OBJBASE
10504   F820  4015             WORD    OBJBASE
10505   F822  4015             WORD    OBJBASE
10506   F824  4015             WORD    OBJBASE
10507   F826  0000             WORD    0
10508   F828  F115             WORD    STARTS
10509   F82A  F115             WORD    STARTS
10510
10511                       SOURCELEN:                    ;length of blocks
10512   F82C  0000             WORD    0
10513   F82E  AC00             WORD    172
10514   F830  AC00             WORD    172
10515   F832  AC00             WORD    172
10516   F834  AC00             WORD    172
10517   F836  AC00             WORD    172
10518   F838  AC00             WORD    172
10519   F83A  0400             WORD    4
10520   F83C  0004             WORD    1024
10521   F83E  0004             WORD    1024
10522   F840  8400             WORD    132
10523   F842  2300             WORD    35
10524
10525   F844  4D 54 57 54 46  SDTBL:  BYTE  'MTWTFSS'
10526
10527   F84B  20 4A 46 4D 41  MONTBL: BYTE  ' JFMAMJJASOND'
10528
10529                       CBTBL:                        ;cycle byte specific days
10530   F858  80               BYTE    10000000B          ;bit not used
10531   F859  40               BYTE    01000000B          ;Mon
10532   F85A  20               BYTE    00100000B          ;Tue
10533   F85B  10               BYTE    00010000B          ;Wed
10534   F85C  08               BYTE    00001000B          ;Thur
10535   F85D  04               BYTE    00000100B          ;Fri
10536   F85E  02               BYTE    00000010B          ;Sat
10537   F85F  01               BYTE    00000001B          ;Sun
10538
10539                       TYPETBL:                      ;start type for set ups
10540   F860  00               BYTE    0
10541   F861  E0               BYTE    11100000B          ;mini
10542   F862  E0               BYTE    11100000B          ;normal
10543   F863  E0               BYTE    11100000B          ;special
10544   F864  E0               BYTE    11100000B          ;ration
10545   F865  81               BYTE    10000001B          ;add-on soak
10546   F866  82               BYTE    10000010B          ;add-on syringe
10547
```

```
10548                    LABELTBL:                        ;letter designations for source
10549  F867  46             BYTE    'F'
10550  F868  4D             BYTE    'M'
10551  F869  41             BYTE    'A'
10552  F86A  52             BYTE    'R'
10553  F86B  49             BYTE    'I'
10554  F86C  4F             BYTE    'O'
10555  F86D  53             BYTE    'S'
10556
10557                    BITON:                           ;use OR to turn bit on
10558  F86E  01             BYTE    00000001B            ;bit 0
10559  F86F  02             BYTE    00000010B
10560  F870  04             BYTE    00000100B
10561  F871  08             BYTE    00001000B
10562  F872  10             BYTE    00010000B
10563  F873  20             BYTE    00100000B
10564  F874  40             BYTE    01000000B
10565  F875  80             BYTE    10000000B
10566
10567                    BITOFF:                          ;use AND to turn bit off
10568  F876  FE             BYTE    11111110B            ;bit 0
10569  F877  FD             BYTE    11111101B
10570  F878  FB             BYTE    11111011B
10571  F879  F7             BYTE    11110111B
10572  F87A  EF             BYTE    11101111B
10573  F87B  DF             BYTE    11011111B
10574  F87C  BF             BYTE    10111111B
10575  F87D  7F             BYTE    01111111B
10576
10577                                                     ;wait times are 25 per second
10578                    CMDRATE1:                        ;wait time before 1st auto key
10579  F87E  00 64 64 64    BYTE    0,100,100,100        ;slow, med, fast
10580
10581                    CMDRATE2:                        ;wait time between auto keys
10582  F882  00 64 32 12    BYTE    0,100,50,18
10583
10584                    CONTRAST_TBL:                    ;contrst for LCD
10585  F886  00 08 06 04 02 BYTE    0,8,6,4,2,0
10586
10587                    MINOFFTBL:                       ;minimum OFF times for terrain
10588  F88C  0F 0F 1E 1E 2D BYTE    15,15,30,30,45,45
10589
10590                    MAXONTBL:                        ;maximum ON times for sprinkler type,
10591  F892  03 03 06 03 03 BYTE    3,3,6,3,3,2         ;and terrain
10592  F898  05 05 09 05 05 BYTE    5,5,9,5,5,3
10593  F89E  08 08 10 08 08 BYTE    8,8,16,8,8,5
10594  F8A4  08 08 10 08 08 BYTE    8,8,16,8,8,5
10595  F8AA  08 08 10 08 08 BYTE    8,8,16,8,8,5
10596  F8B0  0A 0A 14 0A 0A BYTE    10,10,20,10,10,7
10597  F8B6  1E 1E 3C 1E 1E BYTE    30,30,60,30,30,30
10598
10599                    SOAKDURTBL:                      ;Soak durations for sprinkler type,
10600  F8BC  1500 1500 2400 WORD    21,21,36,36,48,32   ;and terrain
       F8C2  2400 3000 2000
10601  F8C8  2300 2300 3600 WORD    35,35,54,60,80,48
       F8CE  3C00 5000 3000
10602  F8D4  3800 3800 6000 WORD    56,56,96,96,128,80
       F8DA  6000 8000 5000
10603  F8E0  3800 3800 6000 WORD    56,56,96,96,128,80
       F8E6  6000 8000 5000
10604  F8EC  3800 3800 6000 WORD    56,56,96,96,128,80
       F8F2  6000 8000 5000
10605  F8F8  4600 4600 7800 WORD    70,70,120,120,160,112
       F8FE  7800 A000 7000
10606  F904  D200 D200 6801 WORD    210,210,360,360,480,480
       F90A  6801 E001 E001
10607
```

```
10608                   ;----------------------------------
10609                   ;         VECTORS
10610                   ;----------------------------------
10611
10612   FFFA                     ORG     0FFFAH
10613   FFFA  1586               WORD    NMIINT
10614   FFFC  0008               WORD    RESET
10615   FFFE  63B4               WORD    INTR
10616
10617
10618
10619
10620
10621
10622
10623
10624   0008                     END
```

Lines Assembled : 10624            Assembly Errors : 0

What is claimed is:

1. A method of setting up an irrigation system having an irrigation controller selectively communicating with a plurality of irrigation elements logically identified by the controller, and a plurality of physical irrigation elements each connected by wiring to respective physical terminals of the irrigation controller, so that the physical terminals to which the plurality of irrigation elements respectively connect may be selectively individually associated with the logical plurality of irrigation elements that the controller controls, the method comprising:

first identifying to the irrigation controller, by manually momentarily inducing electrical continuity across terminals to which a one of the plurality of irrigation elements is connected, an existence of an irrigation element that is connected to these terminals, the momentary inducing of electrical continuity across terminals continuing until, at a certain time, each one of the physical plurality of irrigation elements has been identified to the particular terminals to which it electrically connects;

second identifying to the irrigation controller the logical number of each of the logical plurality of irrigation elements upon each of the times when each corresponding one of the physical plurality of irrigation elements is also first identified to the irrigation controller by the momentary manual inducing of the electrical continuity; and building a cross-reference map in the irrigation controller by which it may associate each numbered one of the logical plurality of irrigation elements that it serves to control with a corresponding physical one of the physical plurality of irrigation elements.

2. The method according to claim 1 wherein the first identifying further comprises:

momentarily inducing an electrical continuity event at the location of each of the plurality of irrigation elements.

3. The method according to claim 1 wherein the first identifying comprises:

manually placing and then removing an electrical short circuit at each successive one of the physical plurality of irrigation elements to which the irrigation controller is connected.

* * * * *